US012410065B2

(12) United States Patent
Milliron et al.

(10) Patent No.: US 12,410,065 B2
(45) Date of Patent: Sep. 9, 2025

(54) POROUS ELECTROCHROMIC NIOBIUM OXIDE FILMS AND METHODS OF MAKING AND USE THEREOF

(71) Applicant: BOARD OF REGENTS, THE UNIVERSITY OF TEXAS SYSTEM, Austin, TX (US)

(72) Inventors: Delia Milliron, Austin, TX (US); Gary Ong, Temecula, CA (US); Camila Saez Cabezas, Austin, TX (US); Hsin-Che Lu, Austin, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 863 days.

(21) Appl. No.: 17/283,089

(22) PCT Filed: Oct. 8, 2019

(86) PCT No.: PCT/US2019/055154
§ 371 (c)(1),
(2) Date: Apr. 6, 2021

(87) PCT Pub. No.: WO2020/076798
PCT Pub. Date: Apr. 16, 2020

(65) Prior Publication Data
US 2021/0340022 A1    Nov. 4, 2021

Related U.S. Application Data

(60) Provisional application No. 62/742,556, filed on Oct. 8, 2018.

(51) Int. Cl.
*C01G 33/00*    (2006.01)
*B82Y 40/00*    (2011.01)
(Continued)

(52) U.S. Cl.
CPC .............. *C01G 33/00* (2013.01); *C09K 9/00* (2013.01); *G02F 1/155* (2013.01); *B82Y 40/00* (2013.01);
(Continued)

(58) Field of Classification Search
CPC ........... C01G 33/00; C09K 9/00; G02F 1/155; G02F 2201/12; G02F 2202/36;
(Continued)

(56) References Cited

U.S. PATENT DOCUMENTS 6,128,430 A    10/2000   Chu et al.
10,515,736 B2    12/2019   Milliron et al.
(Continued)

OTHER PUBLICATIONS

International Search Report and Written Opinion dated Dec. 27, 2019, from International Application No. PCT/US2019/055154, 8 pages.
(Continued)

*Primary Examiner* — Sally A Merkling
*Assistant Examiner* — Logan Edward Laclair
(74) *Attorney, Agent, or Firm* — Meunier Carlin & Curfman LLC

(57) ABSTRACT

Disclosed herein are porous electrochromic niobium oxide films comprising a plurality of niobium oxide nanocrystals, wherein the plurality of niobium oxide nanocrystals comprise niobium oxide having a formula of $NbO_x$ where x represents the average Nb:O ratio in the niobium oxide and where x is from 2 to 2.6. Also disclosed herein are methods of making the porous electrochromic niobium oxide films, methods of use of the porous electrochromic niobium oxide films, and devices comprising the porous electrochromic niobium oxide films.

20 Claims, 110 Drawing Sheets

*Figure 1*

(51) Int. Cl.
  C09K 9/00 (2006.01)
  G02F 1/155 (2006.01)
(52) U.S. Cl.
  CPC ...... C01P 2002/77 (2013.01); C01P 2004/03 (2013.01); C01P 2004/04 (2013.01); C01P 2004/16 (2013.01); C01P 2004/64 (2013.01); C01P 2006/14 (2013.01); C01P 2006/40 (2013.01); G02F 2201/12 (2013.01); G02F 2202/36 (2013.01)
(58) Field of Classification Search
  CPC .... G02F 1/1524; B82Y 40/00; C01P 2002/77; C01P 2004/03; C01P 2004/04; C01P 2004/16; C01P 2004/64; C01P 2006/14; C01P 2006/40; C01P 2004/54; C01P 2002/72; C01P 2002/82; C01P 2002/84; C01P 2004/24
  See application file for complete search history.

(56) References Cited

U.S. PATENT DOCUMENTS

| | | | |
|---|---|---|---|
| 11,387,451 B2* | 7/2022 | Ying | H01M 4/525 |
| 2005/0141074 A1 | 6/2005 | Chen | |
| 2011/0043886 A1 | 2/2011 | Jeon et al. | |
| 2014/0220362 A1 | 8/2014 | Milliron et al. | |
| 2017/0031224 A1 | 2/2017 | Gil et al. | |
| 2019/0146294 A1 | 5/2019 | Milliron et al. | |
| 2019/0187532 A1 | 6/2019 | Milliron et al. | |

OTHER PUBLICATIONS

Yao, D. et al. "High Performance Electrochromic Devices Based On Anodized Nanoporous Nb2O5", The Journal of Physical Chemistry, 2014, 118, 476-81.
Ab Kadir, Rosmalini, et al. "Nb2O5 Schottky based ethanol vapour sensors: Effect of metallic catalysts." Sensors and Actuators B: Chemical 202 (2014): 74-82.
Ab Kadir, Rosmalini, et al. "Optical gas sensing properties of nanoporous Nb2O5 films." ACS applied materials & interfaces 7.8 (2015): 4751-4758.
Agrawal, Ankit, et al. "Localized surface plasmon resonance in semiconductor nanocrystals." Chemical reviews 118.6 (2018): 3121-3207.
Ali, Rana Faryad, Amir H. Nazemi, and Byron D. Gates. "Surfactant controlled growth of niobium oxide nanorods." Crystal Growth & Design 17.9 (2017): 4637-4646.
Andersen, E. N., et al. "Nanometer structural columns and frustration of magnetic ordering in Nb 12 O 29." Physical Review B 72.3 (2005): 033413.
Augustyn, Veronica, et al. "High-rate electrochemical energy storage through Li+ intercalation pseudocapacitance." Nature materials 12.6 (2013): 518-522.
Balaji, Subramanian, et al. "Hexagonal tungsten oxide based electrochromic devices: spectroscopic evidence for the Li ion occupancy of four-coordinated square windows." Chemistry of Materials 21.7 (2009): 1381-1389.
Blanquart, Timothee, et al. "Evaluation and comparison of novel precursors for atomic layer deposition of Nb2O5 thin films." Chemistry of materials 24.6 (2012): 975-980.
Blanquart, Timothee, et al. "High-performance imido-amido precursor for the atomic layer deposition of Ta2O5." Semiconductor Science and Technology 27.7 (2012): 074003.
Brandão, Rodrigo F., et al. "Synthesis, characterization and use of Nb2O5 based catalysts in producing biofuels by transesterification, esterification and pyrolysis." Journal of the Brazilian Chemical Society 20.5 (2009): 954-966.

Brayner, Roberta, and François Bozon-Verduraz. "Niobium pentoxide prepared by soft chemical routes: morphology, structure, defects and quantum size effect." Physical Chemistry Chemical Physics 5.7 (2003): 1457-1466.
Bronstein, Lyudmila M., et al. "Influence of iron oleate complex structure on iron oxide nanoparticle formation." Chemistry of materials 19.15 (2007): 3624-3632.
Buonsanti, Raffaella, et al. "Nonhydrolytic synthesis of high-quality anisotropically shaped brookite TiO2 nanocrystals." Journal of the American Chemical Society 130.33 (2008): 11223-11233.
Cava, et al., "Lithium insertion in Wadsley-Roth phases based on niobium oxide." Journal of the Electrochemical Society 130.12 (1983): 2345-2351.
Cava, R. J., et al. "Electrical and magnetic properties of Nb 2 O 5-δ crystallographic shear structures." Physical Review B 44.13 (1991): 6973-6981.
Chaneliere, C., et al. "Properties of amorphous and crystalline Ta 2 O 5 thin films deposited on Si from a Ta (OC 2 H 5) 5 precursor." Journal of applied physics 83.9 (1998): 4823-4829.
Chaneliere, C., et al. "Tantalum pentoxide (Ta2O5) thin films for advanced dielectric applications." Materials Science and Engineering: R: Reports 22.6 (1998): 269-322.
Chang, Hogeun, et al. "Molecular-level understanding of continuous growth from iron-oxo clusters to iron oxide nanoparticles." Journal of the American Chemical Society 141.17 (2019): 7037-7045.
Chen, Dongchang, et al. "Unraveling the nature of anomalously fast energy storage in T-Nb2O5." Journal of the American Chemical Society 139.20 (2017): 7071-7081.
Chen, Si-Guang, et al. "Preparation of Nb2O5 coated TiO2 nanoporous electrodes and their application in dye-sensitized solar cells." Chemistry of Materials 13.12 (2001): 4629-4634.
Cheng, Qiushi, et al. "Bulk Ti 2 Nb 10 O 29 as long-life and high-power Li-ion battery anodes." Journal of Materials Chemistry A 2.41 (2014): 17258-17262.
Cho, Shin Hum, et al. "Syntheses of colloidal F: In2O3 cubes: Fluorine-induced faceting and infrared plasmonic response." Chemistry of Materials 31.7 (2019): 2661-2676.
Dahlman, Clayton J., et al. "Spectroelectrochemical signatures of capacitive charging and ion insertion in doped anatase titania nanocrystals." Journal of the American Chemical Society 137.28 (2015): 9160-9166.
Dai, Zhengfei, et al. "Monodispersed Nb2O5 microspheres: facile synthesis, air/water interfacial self-assembly, Nb2O5-based composite films, and their selective NO2 sensing." Advanced Materials Interfaces 2.11 (2015): 1500167.
Den Otter, Jan H., and Krijn P. De Jong. "Highly Selective and Active Niobia-Supported Cobalt Catalysts for Fischer-Tropsch Synthesis." Topics in catalysis 57.6-9 (2014): 445-450.
Dinh, Cao-Thang, et al. "Shape-controlled synthesis of highly crystalline titania nanocrystals." ACS nano 3.11 (2009): 3737-3743.
Dong, Angang, et al. "A generalized ligand-exchange strategy enabling sequential surface functionalization of colloidal nanocrystals." Journal of the American Chemical Society 133.4 (2011): 998-1006.
Dudarev, S. L., et al. "Electron-energy-loss spectra and the structural stability of nickel oxide: An LSDA+ U study." Physical Review B 57.3 (1998): 1505.
Farrell, Francis J., Victor A. Maroni, and Thomas G. Spiro. "Vibrational analysis for Nb6O19 8- and Ta6O19 8- and the the Raman intensity criterion for metal-metal interaction." Inorganic Chemistry 8.12 (1969): 2638-2642.
Feld, Artur, et al. "Chemistry of Shape-Controlled Iron Oxide Nanocrystal Formation." ACS nano 13.1 (2018): 152-162.
Fu, Zheng-Wen, Ji-Jie Kong, and Qi-Zong Qin. "Electrochemical and electrochromic properties of niobium oxide thin films fabricated by pulsed laser deposition." Journal of the Electrochemical Society 146.10 (1999): 3914.
Fullmer, Lauren B., et al. "Nb2O5 and Ta2O5 thin films from polyoxometalate precursors: a single proton makes a difference." Crystal Growth & Design 15.8 (2015): 3885-3892.
Gilroy KD et al. "Bimetallic Nanocrystals: Syntheses, Properties, and Applications." Chem. Rev. 2016, 116 (18), 10414-10472.

(56) References Cited

OTHER PUBLICATIONS

Gimon-Kinsel, Mary E., and Kenneth J. Balkus Jr. "Pulsed laser deposition of mesoporous niobium oxide thin films and application as chemical sensors." Microporous and Mesoporous Materials 28.1 (1999): 113-123.
Gordon, Thomas R., et al. "Nonaqueous synthesis of TiO2 nanocrystals using TiF4 to engineer morphology, oxygen vacancy concentration, and photocatalytic activity." Journal of the American Chemical Society 134.15 (2012): 6751-6761.
Gordon, Thomas R., et al. "Shape-dependent plasmonic response and directed self-assembly in a new semiconductor building block, indium-doped cadmium oxide (ICO)." Nano letters 13.6 (2013): 2857-2863.
Gotrik, Kevin W., et al. "Morphology control in block copolymer films using mixed solvent vapors." ACS nano 6.9 (2012): 8052-8059.
Griffith, Kent J., et al. "Niobium tungsten oxides for high-rate lithium-ion energy storage." Nature 559.7715 (2018): 556-563.
Hens, Zeger, and José C. Martins. "A solution NMR toolbox for characterizing the surface chemistry of colloidal nanocrystals." Chemistry of Materials 25.8 (2013): 1211-1221.
Heo, Sungyeon, et al. "Template-free mesoporous electrochromic films on flexible substrates from tungsten oxide nanorods." Nano letters 17.9 (2017): 5756-5761.
Hoffeditz, William L., et al. "Determining the conduction Band-edge potential of solar-cell-relevant Nb2O5 fabricated by atomic layer deposition." Langmuir 33.37 (2017): 9298-9306.
Hyeon, Taeghwan, et al. "Synthesis of highly crystalline and monodisperse maghemite nanocrystallites without a size-selection process." Journal of the American Chemical Society 123.51 (2001): 12798-12801.
Ikeya, Tomohiko, and Mamoru Senna. "Change in the structure of niobium pentoxide due to mechanical and thermal treatments." Journal of non-crystalline solids 105.3 (1988): 243-250.
Jain, Anubhav, et al. "Commentary: The Materials Project: A materials genome approach to accelerating materials innovation." APL materials 1.1 (2013): 011002.
Jana, Subhra, and Robert M. Rioux. "Seeded growth induced amorphous to crystalline transformation of niobium oxide nanostructures." Nanoscale 4.5 (2012): 1782-1788.
Jansons, Adam W., and James E. Hutchison. "Continuous growth of metal oxide nanocrystals: Enhanced control of nanocrystal size and radial dopant distribution." ACS nano 10.7 (2016): 6942-6951.
Jehng, Jih Mirn, and Israel E. Wachs. "Structural chemistry and Raman spectra of niobium oxides." Chemistry of Materials 3.1 (1991): 100-107.
Jehng, Jih-Mirn, and Israel E. Wachs. "Niobium oxide solution chemistry." Journal of Raman spectroscopy 22.2 (1991): 83-89.
Kabisch, G. "Raman spectra and crystal structure of polycrystalline tetramethylammonium salts." Journal of Raman Spectroscopy 9.5 (1980): 279-285.
Kim, Byung Hyo, et al. "High mobility in nanocrystal-based transparent conducting oxide thin films." ACS nano 12.4 (2018): 3200-3208.
Kim, Byung Hyo, et al. "Large-scale synthesis of uniform and extremely small-sized iron oxide nanoparticles for high-resolution T 1 magnetic resonance imaging contrast agents." Journal of the American Chemical Society 133.32 (2011): 12624-12631.
Kim, Jong Woung, Veronica Augustyn, and Bruce Dunn. "The effect of crystallinity on the rapid pseudocapacitive response of Nb2O5." Advanced Energy Materials 2.1 (2012): 141-148.
Kim, Jongwook, et al. "Nanocomposite architecture for rapid, spectrally-selective electrochromic modulation of solar transmittance." Nano letters 15.8 (2015): 5574-5579.
Koçer, Can P., et al. "First-principles study of localized and delocalized electronic states in crystallographic shear phases of niobium oxide." Physical Review B 99.7 (2019): 075151.
Kresse, Georg, and Jürgen Hafner. "Ab initio molecular dynamics for liquid metals." Physical Review B 47.1 (1993): 558-561.
Kumagai, Naoaki, et al. "Thermodynamics and Kinetics of Lithium Intercalation into Nb2 O 5 Electrodes for a 2 V Rechargeable Lithium Battery." Journal of the Electrochemical Society 146.9 (1999): 3203-3210.
Le Viet, A., et al. "Nb2O5 photoelectrodes for dye-sensitized solar cells: choice of the polymorph." The Journal of Physical Chemistry C 114.49 (2010): 21795-21800.
Lee GR. and Crayston JA. "$Nb_2O_5$ and $Nb_2O_5$/silicone composite thin films prepared by sol-gel processing," Journal of Materials Chemistry, 1991, 1, 381-386.
Lee GR. and Crayston JA. "Electrochromic $Nb_2O_5$ and $Nb_2O_5$/silicone composite thin films prepared by sol-gel processing," Journal of Materials Chemistry, 1991, 1, 381-386, 1087.
Li, Yan, Chunwen Sun, and John B. Goodenough. "Electrochemical lithium intercalation in monoclinic Nb12O29." Chemistry of Materials 23.9 (2011): 2292-2294.
Lindström, Henrik, et al. "Li+ ion insertion in TiO2 (anatase). 2. Voltammetry on nanoporous films." The Journal of Physical Chemistry B 101.39 (1997): 7717-7722.
Liu Y. "Lindqvist polyoxoniobate ion-assisted electrodeposition of cobalt and nickel water oxidation catalysts," Applied Materials and Interfaces, 2015, 7(30), 16632-16644.
Llordés, Anna, et al. "Linear topology in amorphous metal oxide electrochromic networks obtained via low-temperature solution processing." Nature materials 15.12 (2016): 1267-1273.
Llordes, Anna, et al. "Polyoxometalates and colloidal nanocrystals as building blocks for metal oxide nanocomposite films." Journal of Materials Chemistry 21.31 (2011): 11631-11638.
Llordés, Anna, et al. "Tunable near-infrared and visible-light transmittance in nanocrystal-in-glass composites." Nature 500.7462 (2013): 323-326.
Lopes, Osmando F., Elaine C. Paris, and Caue Ribeiro. "Synthesis of Nb2O5 nanoparticles through the oxidant peroxide method applied to organic pollutant photodegradation: A mechanistic study." Applied Catalysis B: Environmental 144 (2014): 800-808.
Luo X et al. "Enhanced photovoltaic response of the first polyoxometalate-modified zinc oxide photoanode for solar cell application," J. Mater. Chem, 2012, 22, 15050-15055.
Maček, Marjeta, and Boris Orel. "Electrochromism of sol-gel derived niobium oxide films." Solar energy materials and solar cells 54.1-4 (1998): 121-130.
Maček, Marjeta, Boris Orel, and U. Opara Krašovec. "The Effect of Lithiation on the Electrochromism of Sol-Gel Derived Niobium Oxide Films." Journal of the Electrochemical Society 144.9 (1997): 3002.
Marchetti, Fabio, Guido Pampaloni, and Stefano Zacchini. "The chemistry of niobium and tantalum halides, MX5, with haloacetic acids and their related anhydrides: Anhydride C—H bond activation promoted by MF5." Polyhedron 27.8 (2008): 1969-1976.
Maruyama, Toshiro, and Tetsuya Kanagawa. "Electrochromic properties of niobium oxide thin films prepared by chemical vapor deposition." Journal of the Electrochemical Society 141.10 (1994): 2868.
Masse, J-P., et al. "Stability and effect of annealing on the optical properties of plasma-deposited Ta2O5 and Nb2O5 films." Thin Solid Films 515.4 (2006): 1674-1682.
Matveeva, Eugenia. "Electrochemistry of the indium-tin oxide electrode in 1 M NaOH electrolyte." Journal of The Electrochemical Society 152.9 (2005): H138.
McConnell, A. Ann, J. S. Aderson, and C. N. R. Rao. "Raman spectra of niobium oxides." Spectrochimica Acta Part A: Molecular Spectroscopy 32.5 (1976): 1067-1076.
Mjejri, Issam, Romain Grocassan, and Aline Rougier. "Enhanced coloration for hybrid niobium-based electrochromic devices." ACS Applied Energy Materials 1.8 (2018): 4359-4366.
Murray, C. B., Norris, D. J., & Bawendi, M. G. (1993). Synthesis and Characterization of Nearly M0nodisperse CdE (E: S, Se, Te) Semic0nduct0r NanocrystaUites. Am. Chem. Soc, 8706-8715.
Murray, Christopher B., A. Cr Kagan, and M. G. Bawendi. "Synthesis and characterization of monodisperse nanocrystals and close-packed nanocrystal assemblies." Annual review of materials science 30.1 (2000): 545-610.

(56) References Cited

OTHER PUBLICATIONS

Naito, Keiji, and Tsuneo Matsui. "Review on phase equilibria and defect structures in the niobium-oxygen system." Solid State Ionics 12 (1984): 125-134.

Naito, Keiji, Naoki Kamegashira, and Norio Sasaki. "Phase equilibria in the system between NbO2 and Nb2O5 at high temperatures." Journal of Solid State Chemistry 35.3 (1980): 305-311.

Nakajima, Kiyotaka, et al. "Nb2O5• nH2O as a heterogeneous catalyst with water-tolerant Lewis acid sites." Journal of the American Chemical Society 133.12 (2011): 4224-4227.

Nowak, Izabela, and Maria Ziolek. "Niobium compounds: preparation, characterization, and application in heterogeneous catalysis." Chemical Reviews 99.12 (1999): 3603-3624.

Nyman, May, and Peter C. Burns. "A comprehensive comparison of transition-metal and actinyl polyoxometalates." Chemical Society Reviews 41.22 (2012): 7354-7367.

Nyman, May, et al. "Solid-state Structures and Solution Behavior of Alkali Salts of the [Nb6O19] 8-Lindqvist Ion*." Journal of Cluster Science 17.2 (2006): 197-219.

Ohtani, Bunsho, et al. "Electrochromism of Niobium Oxide Thin Films Prepared by the Sol-Gel Process." Journal of the Electrochemical Society 141.9 (1994): 2439.

Orel, Boris, et al. "In situ UV-Vis and ex situ IR spectroelectrochemical investigations of amorphous and crystalline electrochromic Nb 2 O 5 films in charged/discharged states." Journal of Solid State Electrochemistry 2.4 (1998): 221-236.

Ou, Jian Zhen, et al. "Elevated temperature anodized Nb2O5: a photoanode material with exceptionally large photoconversion efficiencies." ACS nano 6.5 (2012): 4045-4053.

Özer, Nilgün, Din-Guo Chen, and Carl M. Lampert. "Preparation and properties of spin-coated Nb2O5 films by the sol-gel process for electrochromic applications." Thin Solid Films 277.1-2 (1996): 162-168.

Özer, Nilgün, Michael D. Rubin, and Carl M. Lampert. "Optical and electrochemical characteristics of niobium oxide films prepared by sol-gel process and magnetron sputtering A comparison." Solar Energy Materials and Solar Cells 40.4 (1996): 285-296.

Park, Jongnam, et al. "Ultra-large-scale syntheses of monodisperse nanocrystals." Nature materials 3.12 (2004): 891-895.

Pauporté, Th, and D. Lincot. "Hydrogen peroxide oxygen precursor for zinc oxide electrodeposition I. Deposition in perchlorate medium." Journal of the Electrochemical Society 148.4 (2001): C310.

Perdew, John P., Kieron Burke, and Matthias Ernzerhof. "Generalized gradient approximation made simple." Physical review letters 77.18 (1996): 3865-3868.

Rani, Rozina Abdul, et al. "Thin films and nanostructures of niobium pentoxide: fundamental properties, synthesis methods and applications." Journal of Materials Chemistry A 2.38 (2014): 15683-15703.

Reichman, Benjamin, and Allen J. Bard. "Electrochromism at niobium pentoxide electrodes in aqueous and acetonitrile solutions." J. Electrochem. Soc 127.1 (1980): 241-242.

Romero, R., et al. "Nb2O5 thin films obtained by chemical spray pyrolysis." Surface and Interface Analysis: An International Journal devoted to the development and application of techniques for the analysis of surfaces, interfaces and thin films 36.8 (2004): 888-891.

Rosenkilde, Christian, et al. "Raman Spectroscopic and ab initio Quantum Chemical Investigations of Molecules and Complex Ions in the Molten System CsCl—NbCl5—NbOCl3." Inorganic Chemistry 34.17 (1995): 4360-4369.

Rosi et al. "Nanostructures in Biodiagnostics" Chem. Rev. 2005, 105 (4), 1547-1562.

Runnerstrom, Evan L., et al. "Nanostructured electrochromic smart windows: traditional materials and NIR-selective plasmonic nanocrystals." Chemical communications 50.73 (2014): 10555-10572.

Schäfer, Harald, R. Gruehn, and F. Schulte. "The modifications of niobium pentoxide." Angewandte Chemie International Edition in English 5.1 (1966): 40-52.

Schmitt, M., et al. "Electrochromic properties of Nb2O5 sol-gel coatings." Solar energy materials and solar cells 54.1-4 (1998): 9-17.

Schmitt, Michael, and Michel A. Aegerter. "Electrochromic properties of pure and doped Nb2O5 coatings and devices." Electrochimica acta 46.13-14 (2001): 2105-2111.

Shieh, Felice, Aaron E. Saunders, and Brian A. Korgel. "General shape control of colloidal CdS, CdSe, CdTe quantum rods and quantum rod heterostructures." The Journal of Physical Chemistry B 109.18 (2005): 8538-8542.

Stracke, Jordan J., and Richard G. Finke. "Electrocatalytic Water Oxidation Beginning with the Cobalt Polyoxometalate [Co4 (H2O) 2 (PW9O34) 2] 10-: Identification of Heterogeneous CoO x as the Dominant Catalyst." Journal of the American Chemical Society 133.38 (2011): 14872-14875.

Tao, Andrea R., Susan Habas, and Peidong Yang. "Shape control of colloidal metal nanocrystals." small 4.3 (2008): 310-325.

Tench, Dennis, and Leslie F. Warren. "Electrodeposition of conducting transition metal oxide/hydroxide films from aqueous solution." Journal of The Electrochemical Society 130.4 (1983): 869.

Tobias, R. Stuart. "A Comparison of the Raman Crystal and Solution Spectra of the Hexaniobate and Hexatantalate Ions." Canadian Journal of Chemistry 43.5 (1965): 1222-1225.

Venkataraj, S., et al. "Structural and optical properties of thin zirconium oxide films prepared by reactive direct current magnetron sputtering." Journal of applied physics 92.7 (2002): 3599-3607.

Venkataraj, S., et al. "Temperature stability of sputtered niobium-oxide films." Journal of Applied Physics 91.8 (2002): 4863-4871.

Villa, Eric M., et al. "Reaction dynamics of the decaniobate ion [HxNb10O28](6-x)—in water." Angewandte Chemie International Edition 47.26 (2008): 4844-4846.

Wadsley AD et al. In Perspectives in Structural Chemistry; Dunitz, J. D., Ibers, J. A., Eds.; John Wiley & Sons: Chichester, 1970; vol. 3, p. 14.

Waldron, J. E. L., M. A. Green, and D. A. Neumann. "Charge and spin ordering in monoclinic Nb12O29." Journal of the American Chemical Society 123.24 (2001): 5833-5834.

Wang, Dianyuan, et al. "Mineralizer-assisted shape-control of rare earth oxide nanoplates." Chemistry of Materials 26.22 (2014): 6328-6332.

Wang, Shi-Ming, et al. "A new electrodeposition approach for preparing polyoxometalates-based electrochromic smart windows." Journal of Materials Chemistry A 1.2 (2013): 216-220.

Wang, Shi-Ming, et al. "High performance visible and near-infrared region electrochromic smart windows based on the different structures of polyoxometalates." Electrochimica Acta 113 (2013): 240-247.

Wang, Yang, et al. "Disentangling photochromism and electrochromism by blocking hole transfer at the electrolyte interface." Chemistry of Materials 28.20 (2016): 7198-7202.

Wang, Yang, Evan L. Runnerstrom, and Delia J. Milliron. "Switchable materials for smart windows." Annual review of chemical and biomolecular engineering 7 (2016): 283-304.

Weissman, J. G., et al. "High-resolution electron microscopy and image simulation of TT-, T-, and H-niobia and model silica-supported niobium surface oxides." Chemistry of Materials 1.2 (1989): 187-193.

William, W. Yu, et al. "Synthesis of monodisperse iron oxide nanocrystals by thermal decomposition of iron carboxylate salts." Chemical Communications 20 (2004): 2306-2307.

Yadav, J. S., et al. "Niobium (V) chloride: an efficient catalyst for selective acetylation of alcohols and phenols." Journal of Molecular Catalysis A: Chemical 230.1-2 (2005): 107-111.

Yao, David D., et al. "High performance electrochromic devices based on anodized nanoporous Nb2O5." The Journal of Physical Chemistry C 118.1 (2014): 476-481.

Yao, David Di, et al. "Electrodeposited α-and β-phase MoO3 films and investigation of their gasochromic properties." Crystal growth & design 12.4 (2012): 1865-1870.

Yoshimura, Kazuki, et al. "Characterization of niobium oxide electrochromic thin films prepared by reactive de magnetron sputtering." Thin Solid Films 281 (1996): 235-238.

(56) References Cited

OTHER PUBLICATIONS

Yoshimura, Kazuki, Takeshi Miki, and Sakae Tanemura. "Electrochromic properties of niobium oxide thin films prepared by DC magnetron sputtering." Journal of the Electrochemical Society 144.9 (1997): 2982.

Zhitomirsky I. "Electrolytic deposition of niobium oxide films," Materials Letters, 1998, 35(3-4) 188-193.

Zhitomirsky, I. "Electrolytic deposition of oxide films in the presence of hydrogen peroxide." Journal of the European Ceramic Society 19.15 (1999): 2581-2587.

International Preliminary Report on Patentability issued for Application No. PCT/US2019/055154, Apr. 22, 2021.

* cited by examiner

[1x250x4]

Length: 95.77 nm
Width: 8.28 nm

POROUS ELECTROCHROMIC NIOBIUM OXIDE FILMS AND METHODS OF MAKING AND USE THEREOF

CROSS-REFERENCE TO RELATED APPLICATIONS

This application claims the benefit of priority to U.S. Provisional Application No. 62/742,556 filed Oct. 8, 2018, which is hereby incorporated herein by reference in its entirety.

BACKGROUND

Nanomaterial and nanostructure development exemplify how material properties at a device level can be tuned by changes in geometry and size or by further introduction of a superstructure. In electrochemical systems, the downsizing of bulk materials into the nanoscale has afforded improved qualities such as superior strain accommodation, faster kinetics, access to metastable phases, and/or dramatic differences in material properties when compared to the bulk counterpart. In the subfield of electrochromic materials, the challenge has been to develop a material that is electrochemically durable, with fast kinetics for quick coloration, access to modulation in the visible and near-infrared (NIR) regions, and to achieve all this with simple processing of an earth abundant material. Inorganic candidates that meet some of these characteristics include traditional electrochromic systems such as niobium oxide, tungsten oxide, and nickel oxide that achieve a colored state via lithium intercalation and subsequent coloration, or more recently by using plasmonic metal oxide nanocrystals that color via broadband plasmonic resonance absorption in the range of interest upon electrochemical charging.

Niobium oxide is one of the oldest known electrochromic materials but has only been sparingly used due to its slow lithiation kinetics and poor electrochemical durability upon cycling. Its limited modulation primarily in the visible region further prohibits its application as a widespread electrochromic material. However, one significant benefit of niobium oxide is its abundance in bulk form. Thus, if the material can be processed so as to remove the aforementioned limitations in a simple scalable route, such as solution processing, then adoption of the material as a standard electrochromic coating can be encouraged. The compositions, devices and methods discussed herein address these and other needs.

SUMMARY

In accordance with the purposes of the disclosed devices and methods, as embodied and broadly described herein, the disclosed subject matter relates to porous electrochromic niobium oxide films and methods of making and using thereof.

Disclosed herein are porous electrochromic niobium oxide films comprising a plurality of niobium oxide nanocrystals, wherein the plurality of niobium oxide nanocrystals comprise niobium oxide having a formula $NbO_x$ where x represents the average Nb:O ratio in the niobium oxide and where x is from 2 to 2.6. In some examples, x is from 2.3 to 2.5. In some examples, the plurality of niobium oxide nanocrystals comprise $Nb_2O_5$, $Nb_{12}O_{29}$, or a combination thereof. In some examples, the plurality of niobium oxide nanocrystals have an average particle shape that is isotropic. In some examples, the plurality of niobium oxide nanocrystals have an average particle shape that is isotropic and the plurality of niobium oxide nanocrystals have an average particle size of from 0.5 nm to 20 nm or from 2 nm to 20 nm.

In some examples, the plurality of niobium oxide nanocrystals have an average particle shape that is anisotropic.

In some examples, the plurality of niobium oxide nanocrystals are substantially rod-shaped such that the plurality of niobium oxide nanocrystals comprise a plurality of rod-shaped niobium oxide nanocrystals. In some examples, the plurality of rod-shaped niobium oxide nanocrystals have an average length of from 0.5 nm to 200 nm and an average width of: from 0.5 nm to 20 nm. In some examples, the plurality of rod-shaped niobium oxide nanocrystals have an average length of from 2 nm to 200 nm and an average width of from 2 nm to 20 nm. In some examples, the average length of the plurality of rod-shaped niobium oxide nanocrystals is from 20 nm to 80 nm. In some examples, the average width of the plurality of rod-shaped niobium oxide nanocrystals is from 2 nm to 4 nm. In some examples, the average width of the plurality of rod-shaped niobium oxide nanocrystals is from 0.5 nm to 4 nm or from 0.5 to 2 nm. In some examples, the plurality of rod-shaped niobium oxide nanocrystals have an average aspect ratio of from greater than 1 to 100 or from 5 to 40.

In some example, the plurality of niobium oxide nanocrystals are substantially plate-shaped such that the plurality of niobium oxide nanocrystals comprise a plurality of plate-shaped niobium oxide nanocrystals. In some examples, the plurality of plate-shaped niobium oxide nanocrystals have an average length of from 0.5 nm to 200 nm, an average width of from 0.5 nm to 100 nm, and an average thickness of: from 0.5 nm to 20 nm. In some examples, the plurality of plate-shaped niobium oxide nanocrystals have an average length of from 2 nm to 200 nm, an average width of from 2 nm to 100 nm, and an average thickness of from 2 nm to 20 nm. In some examples, the plurality of plate-shaped niobium oxide nanocrystals have an average length of from 50 nm to 150 nm. In some examples, the plurality of plate-shaped niobium oxide nanocrystals have an average width of from 2 nm to 20 nm. In some examples, the plurality of plate-shaped niobium oxide nanocrystals have an average aspect ratio of from greater than 1 to 100.

In some examples, wherein the plurality of niobium oxide nanocrystals have a crystal structure that is substantially orthorhombic, pseudo-hexagonal, substantially monoclinic, or a combination thereof. In some examples, the plurality of niobium oxide nanocrystals have a crystal structure that is substantially orthorhombic, substantially monoclinic, or a combination thereof.

In some examples, the plurality of niobium oxide nanocrystals are substantially free of ligands and/or capping materials.

In some examples, the porous electrochromic niobium oxide film has an average porosity of from 15% to 80%, from 15% to 75%, or from 15% to 60%.

In some examples, the porous electrochromic niobium oxide film has an average thickness of from 10 nm to 2 microns, or from 80 nm to 400 nm.

In some examples, the porous electrochromic niobium oxide film has a first optical state and a second optical state, and wherein the porous electrochromic niobium oxide film can be switched from the first optical state to the second optical state and/or from the second optical state to the first optical state upon application of a potential to the electrochromic niobium oxide film. In some examples, the porous electrochromic niobium oxide film can be switched from the first optical state to the second optical state and/or from the second optical state to the first optical state in an amount of time of 20 minutes or less, 10 minutes or less, 5 minutes or less, 1 minute or less, or 30 seconds or less. In some examples, the average transmittance of the first optical state decreases by 5% or less after 200 switching cycles or more, 500 switching cycles or more, or 1,000 switching cycles or more. In some examples, the average transmittance of the second optical state decreases by 5% or less after 200 switching cycles or more, 500 switching cycles or more, or 1,000 switching cycles or more. In some examples, each of the first optical state and the second optical state has an average transmittance at one or more wavelengths from 350 nm to 2500 nm, and wherein the average transmittance of the second optical state is less than the average transmittance of the first optical state by 20% or more at one or more wavelengths from 350 nm to 2500 nm.

In some examples, the porous electrochromic niobium oxide film has a coloration efficiency at one or more wavelengths from 350 nm to 2500 nm of 25 $cm^2/C$ or more, 50 $cm^2/C$ or more, 75 $cm^2/C$ or more, 100 $cm^2/C$ or more, 125 $cm^2/C$ or more, 150 $cm^2/C$ or more, 175 $cm^2/C$ or more, or 200 $cm^2/C$ or more.

Also disclosed herein are methods of making the porous electrochromic niobium oxide films described herein. For example, the methods of making the porous electrochromic niobium oxide films can comprise: dispersing the plurality of niobium oxide nanocrystals in a solvent, thereby forming a dispersion; and depositing the dispersion on a substrate; thereby forming the electrochromic niobium oxide film. In some examples, the solvent comprises tetrahydrofuran (THF), dimethylformamide (DMF), N-methylformamide, formamide, dichloromethane ($CH_2Cl_2$), ethylene glycol, ethanol, methanol, propanol, isopropanol, water, acetonitrile, chloroform, toluene, methyl acetate, ethyl acetate, acetone, hexane, heptane, tetraglyme, propylene carbonate, diglyme, dimethyl sulfoxide (DMSO), dimethoxyethane, xylene, or a combination thereof. In some examples, depositing the plurality of nanocrystals comprises printing, spin coating, drop-casting, zone casting, dip coating, blade coating, spraying, vacuum filtration, slot die coating, curtain coating, or combinations thereof.

In some examples, the substrate comprises glass, quartz, silicon, a transparent polymer, MgO, $TiO_2$, TaO, or combinations thereof. In some examples, the substrate comprises a conducting layer. In some examples, the substrate comprises a conducting layer deposited on glass, quartz, silicon, a transparent polymer, MgO, $TiO_2$, TaO, or a combination thereof. In some examples, the conducting layer comprises a transparent conducting oxide, a carbon material, a nanostructured metal, or a combination thereof. In some examples, the conducting layer comprises a metal oxide. In some examples, the conducting layer comprises a metal oxide and the metal oxide comprises a metal selected from the group consisting of Cd, Cr, Cu, Ga, In, Ni, Sn, Ti, W, Zn, and combinations thereof. In some examples, the conducting layer comprises CdO, $CdIn_2O_4$, $Cd_2SnO_4$, $Cr_2O_3$, $CuCrO_2$, $CuO_2$, $Ga_2O_3$, $In_2O_3$, NiO, $SnO_2$, $TiO_2$, $ZnGa_2O_4$, ZnO, InZnO, InGaZnO, InGaO, ZnSnO, $Zn_2SnO_4$, CdSnO, $WO_3$, or combinations thereof. In some examples, the conducting layer comprises a transparent conducting oxide. In some examples, the conducting layer further comprises a dopant.

In some examples, the methods can further comprise making the plurality of niobium oxide nanocrystals. The method of making the plurality of niobium oxide nanocrystals can, for example, comprise aminolysis-driven formation of a plurality of niobium oxo clusters, condensation of the plurality of niobium oxo clusters into a plurality of amorphous niobium oxide seeds, and crystallization and growth of the plurality of amorphous niobium oxide seeds to thereby form the plurality of niobium oxide nanocrystals.

In some examples, the method comprises: mixing a niobium salt with a ligand and a solvent to form a solution comprising a niobium-ligand complex; mixing the solution comprising the niobium-ligand complex with an amine, an alcohol, or a combination thereof, and subsequently heating at a first temperature to form a solution comprising a plurality of niobium oxo clusters; and heating the solution comprising the plurality of niobium oxo clusters at a second temperature to crystallize and grow the plurality of niobium oxide nanocrystals. In some examples, the first temperature is from 100° C. to 200° C. In some examples, the second temperature is from 200° C. to 320° C. In some examples, the method is performed under an inert atmosphere.

In some examples, the niobium salt comprises a niobium halide, a niobium ethoxide, a niobium oxalate, or a combination thereof. In some examples, the niobium salt comprises a niobium chloride, a niobium bromide, a niobium iodide, a niobium fluoride, or a combination thereof. In some examples, the niobium salt comprises a niobium chloride. In some examples, the niobium salt comprises $NbCl_5$.

In some examples, the ligand comprises an alkyl carboxylic acid, an alkylphosphonic acid, and alkylphosphinic acid, an alkylsulfonic acid, or combinations thereof. In some examples, the ligand comprises an alkyl carboxylic acid. In some examples, the ligand comprises oleic acid.

In some examples, the amine comprises a primary amine, a secondary amine, a tertiary amine, or a combination thereof. In some examples, the amine comprises a primary alkyl amine, a secondary alkyl amine, a tertiary alkyl amine, or a combination thereof. In some examples, the amine comprises a primary amine and the primary amine comprises oleylamine In some examples, the alcohol comprises an alkyl alcohol, a diol, or combination thereof.

In some examples, the niobium-ligand complex comprises a niobium oleate complex. In some examples, the niobium-ligand complex comprises a chloro oleyl niobium (V) complex.

In some examples, the solvent comprises squalene, oleic acid, oleylamine, octadecene, dioctyl ether, diphenyl ether, dibenzyl ether, or a combination thereof. In some examples, the solvent comprises squalene, oleic acid, oleylamine, octadecene, or a combination thereof. In some examples, the solvent comprises octadecene.

In some examples, the methods can further comprise stripping the ligands from the plurality of niobium oxide nanocrystals prior to forming the electrochromic niobium oxide film.

Also disclosed herein are electrochromic electrodes comprising the porous electrochromic niobium oxide films described herein deposited on a conducting layer. In some examples, the conducting layer comprises a transparent conducting oxide, a carbon material, a nanostructured metal, or a combination thereof. In some examples, the conducting layer comprises a metal oxide. In some examples, the conducting layer comprises a metal oxide and the metal oxide comprises a metal selected from the group consisting of Cd, Cr, Cu, Ga, In, Ni, Sn, Ti, W, Zn, and combinations thereof. In some examples, the conducting layer comprises CdO, $CdIn_2O_4$, $Cd_2SnO_4$, $Cr_2O_3$, $CuCrO_2$, $CuO_2$, $Ga_2O_3$, $In_2O_3$, NiO, $SnO_2$, $TiO_2$, $ZnGa_2O_4$, ZnO, InZnO, InGaZnO, InGaO, ZnSnO, $Zn_2SnO_4$, CdSnO, $WO_3$, or combinations thereof. In some examples, the conducting layer comprises a transparent conducting oxide. In some examples, the conducting layer further comprises a dopant. In some examples, the electrochromic electrode has a charge capacity that decreases by 5% or less after 200 switching cycles or more, 500 switching cycles or more, or 1,000 switching cycles or more.

Also described herein are electrochromic devices comprising the electrochromic electrodes described herein, an electrolyte, and a counter electrode, wherein the electrochromic electrode and the counter electrode are in electrochemical contact with the electrolyte. In some examples, the electrolyte comprises $H^+$ ions, $Li^+$ ions, $Na^+$ ions, $K^+$ ions, $Mg^{2+}$ ions, $Ca^{2+}$ ions, $Al^{3+}$ ions, or combinations thereof. In some examples, the electrolyte comprises a lithium ion salt selected from the group consisting of LiTFSI, LiI, $LiPH_6$, $LiPF_6$, $LiBF_4$, $LiClO_4$, and combinations thereof. In some examples, the electrolyte has a concentration of from 0.001 M to 3 M. In some examples, the electrolyte further comprises a solvent selected from the group consisting of tetraglyme, propylene carbonate, diglyme, dimethyl sulfoxide (DMSO), dimethyl formamide (DMF), dimethoxyethane, acetonitrile, ethylene carbonate, dimethyl carbonate, and combinations thereof. In some examples, the electrochromic device further comprises a power supply that is in electrical contact with the electrochromic electrode and the counter electrode.

Also disclosed herein are electrochromic devices comprising any of the electrochromic films described herein.

In some examples, the electrochromic device comprises an electronic device, an energy storage device, an energy conversion device, an optical device, an optoelectronic device, or combinations thereof. In some examples, the electrochromic device comprises a touch panel, an electronic display, a transistor, a smart window, a solar cell, a fuel cell, a photovoltaic cell, a battery, a light emitting diode, or a combination thereof.

Also described herein are methods of use of the porous electrochromic niobium oxide films described herein, the methods comprising using the porous electrochromic niobium oxide film in an energy storage device, an energy conversion device, an optical device, an optoelectronic device, or a combination thereof.

Also described herein are methods of use of the porous electrochromic niobium oxide films described herein, the methods comprising using the porous electrochromic niobium oxide film in a touch panel, an electronic display, a transistor, a smart window, a solar cell, a fuel cell, a photovoltaic cell, a battery, a light emitting diode, or a combination thereof.

Also described herein are methods of use of the electrochromic electrodes described herein, the methods comprising using the electrochromic electrode in an energy storage device, an energy conversion device, an optical device, an optoelectronic device, or a combination thereof. Also described herein are methods of use of the electrochromic electrodes described herein, the methods comprising using the electrochromic electrode in a touch panel, an electronic display, a transistor, a smart window, a solar cell, a fuel cell, a photovoltaic cell, a battery, a light emitting diode, or a combination thereof.

Additional advantages of the disclosed devices and methods will be set forth in part in the description which follows, and in part will be obvious from the description. The advantages of the disclosed devices will be realized and attained by means of the elements and combinations particularly pointed out in the appended claims. It is to be understood that both the foregoing general description and the following detailed description are exemplary and explanatory only and are not restrictive of the disclosed devices and methods, as claimed.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURES

The accompanying figures, which are incorporated in and constitute a part of this specification, illustrate several aspects of the disclosure, and together with the description, serve to explain the principles of the disclosure.

Figure 119:
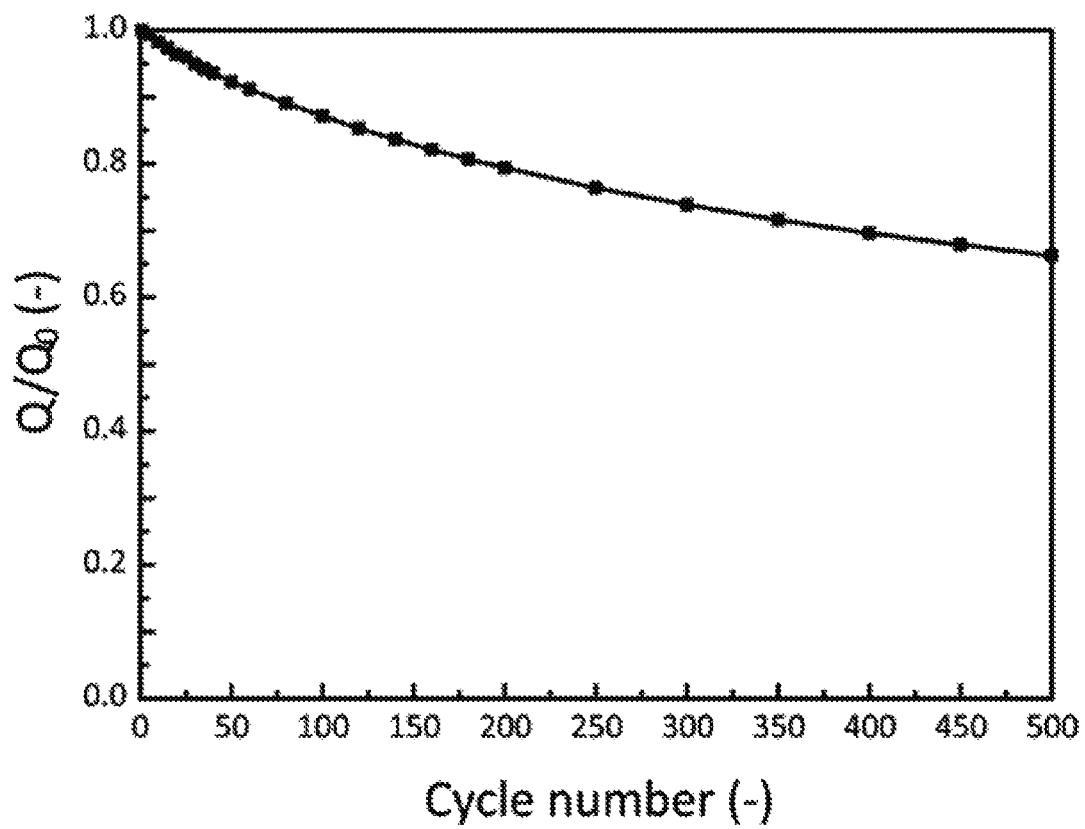

FIG. 119 shows a stability test using the retained charge density during continuous cycling between 4 V and 1.7 V with 5 min for each potential step using chronoamperometry.

Figure 120:
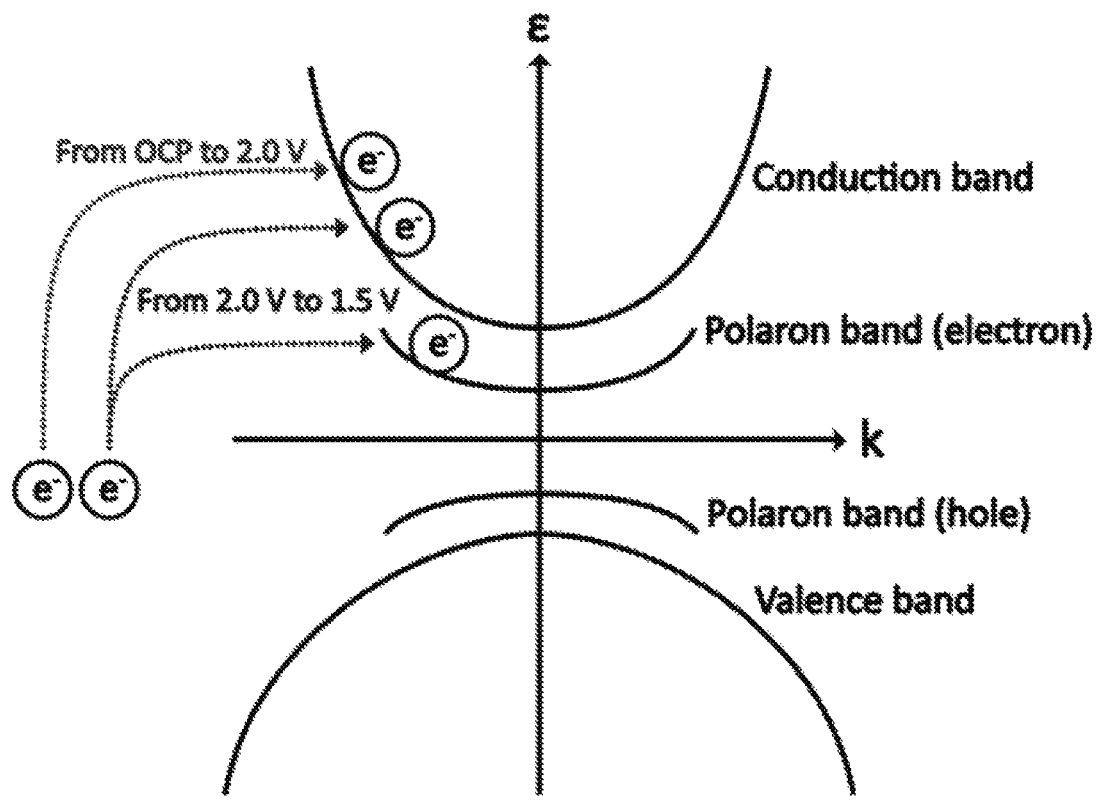

FIG. 120 is a schematic illustration of the band structure anisotropic monoclinic $Nb_{12}O_{29}$ nanocrystal films in 1 M Li-TFSI/tetraethylene glycol dimethyl ether, with electrons being populated into the conduction band as delocalized electrons (from open-circuit potential (OCP) to 2.0 V) and into both the polaron band as localized electrons and conduction band as delocalized electrons (from 2.0 V to 1.5 V).

Figure 121:
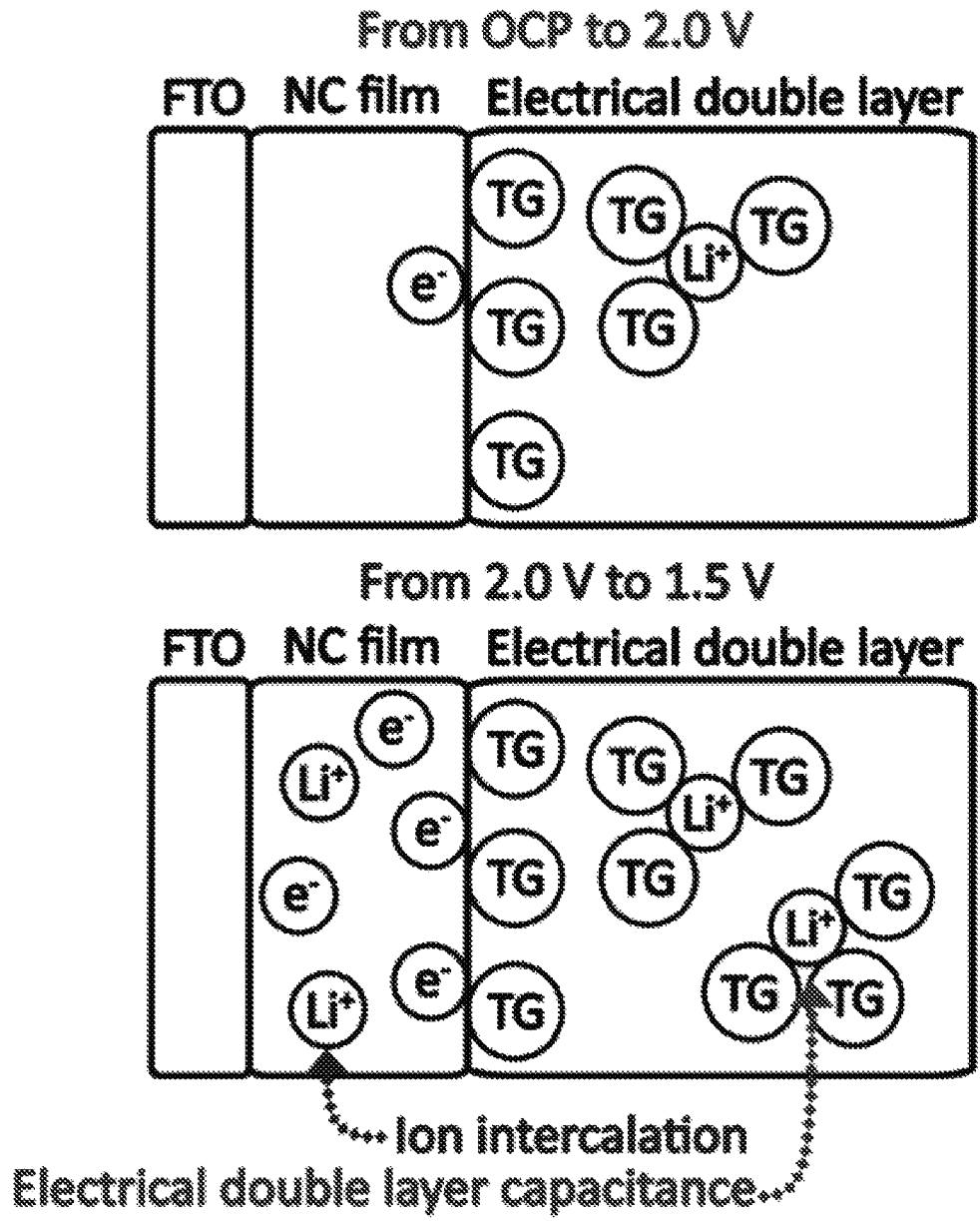

FIG. 121 is a schematic illustration of the electrochemical processes for the anisotropic monoclinic $Nb_{12}O_{29}$ nanocrystal films in 1 M Li-TFSI/tetraethylene glycol dimethyl ether showing electrical double layer capacitance in capacitive charging (from open-circuit potential to 2.0 V) and both ion intercalation and electrical double layer capacitance (from 2.0 V to 1.5 V). Tetraethylene glycol dimethyl ether (TG) is the molecule of the electrolyte.

Figure 122:
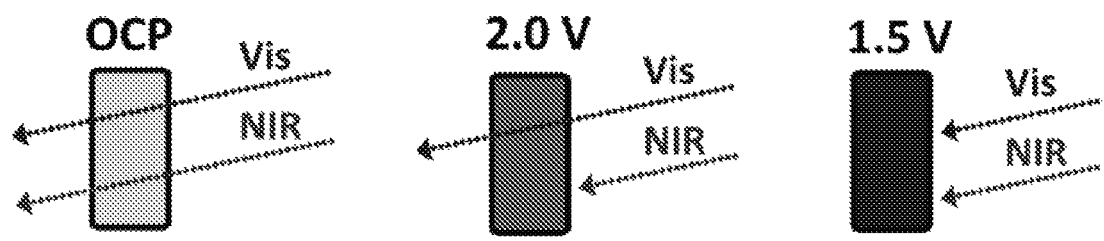

FIG. 122 is a schematic illustration of. dual-mode electrochromism of the nanocrystal films employed as smart window coatings for selectively blocking NIR light (2.0 V) and both NIR and visible light (1.5 V).

DETAILED DESCRIPTION

The compositions, devices, and methods described herein may be understood more readily by reference to the following detailed description of specific aspects of the disclosed subject matter and the Examples included therein.

Before the present compositions, devices, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "the compound" includes mixtures of two or more such compounds, reference to "an agent" includes mixture of two or more such agents, and the like.

"Optional" or "optionally" means that the subsequently described event or circumstance can or cannot occur, and that the description includes instances where the event or circumstance occurs and instances where it does not.

It is understood that throughout this specification the identifiers "first" and "second" are used solely to aid the reader in distinguishing the various components, features, or steps of the disclosed subject matter. The identifiers "first" and "second" are not intended to imply any particular order, amount, preference, or importance to the components or steps modified by these terms.

Porous Electrochromic Niobium Oxide Films

Disclosed herein are porous electrochromic niobium oxide films comprising a plurality of niobium oxide nanocrystals. The plurality of niobium oxide nanocrystals can be substantially free of ligands and/or capping materials. The plurality of niobium oxide nanocrystals can comprise niobium oxide having a formula $NbO_x$, where x represents the average Nb:O ratio in the niobium oxide and where x is 2 or more (e.g., 2.05 or more, 2.1 or more, 2.15 or more, 2.2 or more, 2.25 or more, 2.3 or more, 2.35 or more, 2.4 or more, 2.45 or more, or 2.5 or more). In some examples, the plurality of niobium oxide nanocrystals can comprise niobium oxide having a formula $NbO_x$ where x is 2.6 or less (e.g., 2.55 or less, 2.5 or less, 2.45 or less, 2.4 or less, 2.35 or less, 2.3 or less, 2.25 or less, 2.2 or less, 2.15 or less, or 2.1 or less). The value of x in $NbO_x$ (e.g., the Nb:O ratio) of the niobium oxide comprising the plurality of niobium oxide nanocrystals can range from any of the minimum values described above to any of the maximum values described above. For example, the plurality of niobium oxide nanocrystals can comprise niobium oxide having a formula of $NbO_x$ where x represents the average Nb:O ratio in the niobium oxide and where x is from 2 to 2.6 (e.g., from 2.1 to 2.5, from 2.2 to 2.5, from 2.3 to 2.5, or from 2.4 to 2.5). In some examples, the plurality of niobium oxide nanocrystals can comprise $Nb_2O_5$, $Nb_{12}O_{29}$, or a combination thereof.

The plurality of niobium oxide nanocrystals can have a crystal structure that is substantially anisotropic. For example, the plurality of niobium oxide nanocrystals can have a crystal structure that is substantially orthorhombic, pseudo-hexagonal, substantially monoclinic, or a combination thereof. In some examples, the plurality of niobium oxide nanocrystals can have a crystal structure that is substantially orthorhombic, substantially monoclinic, or a combination thereof. In some examples, the plurality of niobium oxide nanocrystals can have a crystal structure that is substantially orthorhombic. In some examples, the plurality of niobium oxide nanocrystals can have a crystal structure that is substantially monoclinic.

The plurality of niobium oxide nanocrystals can comprise nanocrystals of any shape (e.g., a sphere, a rod, a quadrilateral, an ellipse, a triangle, a polygon, etc.). In some examples, the plurality of niobium oxide nanocrystals can have an isotropic shape. In some examples, the plurality of niobium oxide nanocrystals can have an anisotropic shape. In some examples, the plurality of niobium oxide nanocrystals can be substantially rod-shaped such that the plurality of niobium oxide nanocrystals comprise a plurality of rod-shaped niobium oxide nanocrystals.

The plurality of niobium oxide nanocrystals can have an average particle size. "Average particle size" and "mean particle size" are used interchangeably herein, and generally refer to the statistical mean particle size of the particles (or crystals) in a population of particles (or crystals). For example, the average particle size for a plurality of particles with a substantially spherical shape can comprise the average diameter of the plurality of particles. For a particle with a substantially spherical shape, the diameter of a particle can refer, for example, to the hydrodynamic diameter. As used herein, the hydrodynamic diameter of a particle can refer to the largest linear distance between two points on the surface of the particle. Mean particle size can be measured using methods known in the art, such as evaluation by scanning electron microscopy, transmission electron microscopy, and/or dynamic light scattering. As used herein, the average particle size is determined by electron microscopy.

In certain examples, where the plurality of niobium oxide nanocrystals have a substantially isotropic shape, the plurality of niobium oxide nanocrystals can have an average particle size of 0.5 nm or more (e.g., 1 nm or more, 1.5 nm or more, 2 nm or more, 2.5 nm or more, 3 nm or more, 3.5 nm or more, 4 nm or more, 4.5 nm or more, 5 nm or more, 6 nm or more, 7 nm or more, 8 nm or more, 9 nm or more, 10 nm or more, 11 nm or more, 12 nm or more, 13 nm or more, 14 nm or more, 15 nm or more, 16 nm or more, 17 nm or more, or 18 nm or more). In certain examples, where the plurality of niobium oxide nanocrystals have a substantially isotropic shape, the plurality of niobium oxide nanocrystals can have an average particle size of 20 nm or less (e.g., 19 nm or less, 18 nm or less, 17 nm or less, 16 nm or less, 15 nm or less, 14 nm or less, 13 nm or less, 12 nm or less, 11 nm or less, 10 nm or less, 9 nm or less, 8 nm or less, 7 nm or less, 6 nm or less, 5 nm or less, 4.5 nm or less, 4 nm or less, 3.5 nm or less, 3 nm or less, 2.5 nm or less, 2 nm or less, or 1.5 nm or less). The average particle size of the plurality of niobium oxide nanocrystals with a substantially isotropic shape can range from any of the minimum values described above to any of the maximum values described above. For example, the plurality of niobium oxide nanocrystals having a substantially isotropic shape can have an average particle size of from 0.5 nm to 20 nm (e.g., from 0.5 nm to 10 nm, from 2 nm to 10 nm, from 10 nm to 20 nm, from 0.5 nm to 8 nm, from 2 nm to 8 nm, from 8 nm to 14 nm, from 14 nm to 20 nm, from 1 nm to 20 nm, from 2 nm to 20 nm, or from 3 nm to 19 nm).

In some examples, the plurality of niobium oxide nanocrystals having a substantially isotropic shape can be substantially monodisperse. "Monodisperse" and "homogeneous size distribution," as used herein, and generally describe a population of particles where all of the particles are the same or nearly the same size. As used herein, a monodisperse distribution refers to particle distributions in which 80% of the distribution (e.g., 85% of the distribution, 90% of the distribution, or 95% of the distribution) lies within 25% of the median particle size (e.g., within 20% of the average particle size, within 15% of the average particle size, within 10% of the average particle size, or within 5% of the average particle size).

In some examples, the plurality of niobium oxide nanocrystals are substantially rod-shaped such that the plurality of niobium oxide nanocrystals comprise a plurality of rod-shaped niobium oxide nanocrystals. The plurality of rod-shaped niobium oxide nanocrystals can have an average length and an average width. In some examples, the plurality of rod-shaped niobium oxide nanocrystals can have an average length of 0.5 nm or more (e.g., 1 nm or more, 1.5 nm or more, 2 nm or more, 2.5 nm or more, 3 nm or more, 3.5 nm or more, 4 nm or more, 4.5 nm or more, 5 nm or more, 6 nm or more, 7 nm or more, 8 nm or more, 9 nm or more, 10 nm or more, 15 nm or more, 20 nm or more, 25 nm or more, 30 nm or more, 35 nm or more, 40 nm or more, 45 nm or more, 50 nm or more, 60 nm or more, 70 nm or more, 80 nm or more, 90 nm or more, 100 nm or more, 110 nm or more, 120 nm or more, 130 nm or more, 140 nm or more, 150 nm or more, 160 nm or more, 170 nm or more, or 180 nm or more). In some examples, the plurality of rod-shaped niobium oxide nanocrystals can have an average length of 200 nm or less (e.g., 190 nm or less, 180 nm or less, 170 nm or less, 160 nm or less, 150 nm or less, 140 nm or less, 130 nm or less, 120 nm or less, 110 nm or less, 100 nm or less, 90 nm or less, 80 nm or less, 70 nm or less, 60 nm or less, 50 nm or less, 45 nm or less, 40 nm or less, 35 nm or less, 30 nm or less, 25 nm or less, 20 nm or less, 15 nm or less, 10 nm or less, 9 nm or less, 8 nm or less, 7 nm or less, 6 nm or less, 5 nm or less, 4.5 nm or less, 4 nm or less, 3.5 nm or less, 3 nm or less, 2.5 nm or less, 2 nm or less, or 1.5 nm or less). The average length of the plurality of rod-shaped niobium oxide nanocrystals can range from any of the minimum values described above to any of the maximum values described above. For example, the plurality of rod-shaped niobium oxide nanocrystals can have an average length of from 0.5 nm to 200 nm (e.g., from 0.5 nm to 100 nm, from 2 nm to 100 nm, from 100 nm to 200 nm, from 0.5 nm to 50 nm, from 2 nm to 50 nm, from 50 nm to 100 nm, from 100 nm to 150 nm, from 150 nm to 200 nm, from 1 nm to 200 nm, from 2 nm to 200 nm, from 1 nm to 100 nm, from 5 nm to 100 nm, from 10 nm to 90 nm, or from 20 nm to 80 nm).

The plurality of rod-shaped niobium oxide nanocrystals can, for example, have an average width of 0.5 nm or more (e.g., 1 nm or more, 1.5 nm or more, 2 nm or more, 2.5 nm or more, 3 nm or more, 3.5 nm or more, 4 nm or more, 4.5 nm or more, 5 nm or more, 6 nm or more, 7 nm or more, 8 nm or more, 9 nm or more, 10 nm or more, 11 nm or more, 12 nm or more, 13 nm or more, 14 nm or more, 15 nm or more, 16 nm or more, 17 nm or more, or 18 nm or more). In some examples, the plurality of rod-shaped niobium oxide nanocrystals can have an average width of 20 nm or less (e.g., 19 nm or less, 18 nm or less, 17 nm or less, 16 nm or less, 15 nm or less, 14 nm or less, 13 nm or less, 12 nm or less, 11 nm or less, 10 nm or less, 9 nm or less, 8 nm or less, 7 nm or less, 6 nm or less, 5 nm or less, 4.5 nm or less, 4 nm or less, 3.5 nm or less, 3 nm or less, 2.5 nm or less, 2 nm or less, or 1.5 nm or less). The average width of the plurality of rod-shaped niobium oxide nanocrystals can range from any of the minimum values described above to any of the maximum values described above. For example, the plurality of rod-shaped niobium oxide nanocrystals can have an average width of from 0.5 nm to 20 nm (e.g., from 0.5 nm to 10 nm, from 2 nm to 10 nm, from 10 nm to 20 nm, from 0.5 nm to 8 nm, from 2 nm to 8 nm, from 8 nm to 14 nm, from 14 nm to 20 nm, from 1 nm to 20 nm, from 2 nm to 20 nm, from 0.5 nm to 6 nm, from 1 nm to 6 nm, from 2 nm to 6 nm, from 0.5 nm to 4 nm, from 1 nm to 4 nm, from 0.5 nm to 2 nm, or from 2 nm to 4 nm). In some examples, the plurality of rod-shaped niobium oxide nanocrystals can be substantially monodisperse.

In some examples, the plurality of rod-shaped niobium oxide nanocrystals can be described by their aspect ratio, which, as used herein is the average length divided by the average width. For example, the plurality of rod-shaped niobium oxide nanocrystals can have an average aspect ratio of greater than 1 (e.g., 5 or more, 10 or more, 15 or more, 20 or more, 25 or more, 30 or more, 35 or more, 40 or more, 45 or more, 50 or more, 60 or more, 70 or more, or 80 or more). In some examples, the plurality of rod-shaped niobium oxide nanocrystals can have an average aspect ratio of 100 or less (e.g., 90 or less, 80 or less, 70 or less, 60 or less, 50 or less, 45 or less, 40 or less, 35 or less, 30 or less, 25 or less, 20 or less, 15 or less, or 10 or less). The average aspect ratio of the plurality of rod-shaped niobium oxide nanocrystals can range from any of the minimum values described above to any of the maximum values described above. For example, the plurality of rod-shaped niobium oxide nanocrystals can have an average aspect ratio of from greater than 1 to 100 (e.g., from 1 to 50, from 50 to 100, from 1 to 20, from 20 to 40, from 40 to 60, from 60 to 80, from 80 to 100, from 10 to 100, from 5 to 40, from 5 to 20, from 10 to 40, from 10 to 20, from 1 to 10, or from 5 to 10).

In some examples, the plurality of niobium oxide nanocrystals are substantially plate-shaped such that the plurality of niobium oxide nanocrystals comprise a plurality of plate-shaped niobium oxide nanocrystals. The plurality of plate-shaped niobium oxide nanocrystals can have an average length, an average width, and an average thickness. In some examples, the plurality of plate-shaped niobium oxide nanocrystals can have an average length of 0.5 nm or more (e.g., 1 nm or more, 1.5 nm or more, 2 nm or more, 2.5 nm or more, 3 nm or more, 3.5 nm or more, 4 nm or more, 4.5 nm or more, 5 nm or more, 6 nm or more, 7 nm or more, 8 nm or more, 9 nm or more, 10 nm or more, 15 nm or more, 20 nm or more, 25 nm or more, 30 nm or more, 35 nm or more, 40 nm or more, 45 nm or more, 50 nm or more, 60 nm or more, 70 nm or more, 80 nm or more, 90 nm or more, 100 nm or more, 110 nm or more, 120 nm or more, 130 nm or more, 140 nm or more, 150 nm or more, 160 nm or more, 170 nm or more, or 180 nm or more). In some examples, the plurality of plate-shaped niobium oxide nanocrystals can have an average length of 200 nm or less (e.g., 190 nm or less, 180 nm or less, 170 nm or less, 160 nm or less, 150 nm or less, 140 nm or less, 130 nm or less, 120 nm or less, 110 nm or less, 100 nm or less, 90 nm or less, 80 nm or less, 70 nm or less, 60 nm or less, 50 nm or less, 45 nm or less, 40 nm or less, 35 nm or less, 30 nm or less, 25 nm or less, 20 nm or less, 15 nm or less, 10 nm or less, 9 nm or less, 8 nm or less, 7 nm or less, 6 nm or less, 5 nm or less, 4.5 nm or less, 4 nm or less, 3.5 nm or less, 3 nm or less, 2.5 nm or less, 2 nm or less, or 1.5 nm or less). The average length of the plurality of plate-shaped niobium oxide nanocrystals can range from any of the minimum values described above to any of the maximum values described above. For example, the plurality of plate-shaped niobium oxide nanocrystals can have an average length of from 0.5 nm to 200 nm (e.g., from 0.5 nm to 100 nm, from 2 nm to 100 nm, from 100 nm to 200 nm, from 0.5 nm to 50 nm, from 2 nm to 50 nm, from 50 nm to 100 nm, from 100 nm to 150 nm, from 150 nm to 200 nm, from 50 nm to 150 nm, from 1 nm to 200 nm, from 2 nm to 200 nm, from 1 nm to 100 nm, from 2 nm to 100 nm, from 5 nm to 100 nm, from 10 nm to 90 nm, or from 20 nm to 80 nm).

The plurality of plate-shaped niobium oxide nanocrystals can, for example, have an average width of 0.5 nm or more (e.g., 1 nm or more, 1.5 nm or more, 2 nm or more, 2.5 nm or more, 3 nm or more, 3.5 nm or more, 4 nm or more, 4.5 nm or more, 5 nm or more, 6 nm or more, 7 nm or more, 8 nm or more, 9 nm or more, 10 nm or more, 15 nm or more, 20 nm or more, 25 nm or more, 30 nm or more, 35 nm or more, 40 nm or more, 45 nm or more, 50 nm or more, 60 nm or more, 70 nm or more, or 80 nm or more). In some examples, the plurality of plate-shaped niobium oxide nanocrystals can have an average width of 100 nm or less (e.g., 90 nm or less, 80 nm or less, 70 nm or less, 60 nm or less, 50 nm or less, 45 nm or less, 40 nm or less, 35 nm or less, 30 nm or less, 25 nm or less, 20 nm or less, 15 nm or less, 10 nm or less, 9 nm or less, 8 nm or less, 7 nm or less, 6 nm or less, 5 nm or less, 4.5 nm or less, 4 nm or less, 3.5 nm or less, 3 nm or less, 2.5 nm or less, 2 nm or less, or 1.5 nm or less). The average width of the plurality of plate-shaped niobium oxide nanocrystals can range from any of the minimum values described above to any of the maximum values described above. For example, the plurality of plate-shaped niobium oxide nanocrystals can have an average width of from 0.5 nm to 100 nm (e.g., from 0.5 nm to 50 nm, from 2 nm to 50 nm, from 50 nm to 100 nm, from 0.5 nm to 20 nm, from 2 nm to 20 nm, from 20 nm to 40 nm, from 40 nm to 60 nm, from 60 nm to 80 nm, from 80 nm to 100 nm, from 1 nm to 100 nm, from 2 nm to 100 nm, or from 5 nm to 95 nm).

The plurality of plate-shaped niobium oxide nanocrystals can, for example, have an average thickness of 0.5 nm or more (e.g., 1 nm or more, 1.5 nm or more, 2 nm or more, 2.5 nm or more, 3 nm or more, 3.5 nm or more, 4 nm or more, 4.5 nm or more, 5 nm or more, 6 nm or more, 7 nm or more, 8 nm or more, 9 nm or more, 10 nm or more, 11 nm or more, 12 nm or more, 13 nm or more, 14 nm or more, 15 nm or more, 16 nm or more, 17 nm or more, or 18 nm or more). In some examples, the plurality of plate-shaped niobium oxide nanocrystals can have an average thickness of 20 nm or less (e.g., 19 nm or less, 18 nm or less, 17 nm or less, 16 nm or less, 15 nm or less, 14 nm or less, 13 nm or less, 12 nm or less, 11 nm or less, 10 nm or less, 9 nm or less, 8 nm or less, 7 nm or less, 6 nm or less, 5 nm or less, 4.5 nm or less, 4 nm or less, 3.5 nm or less, 3 nm or less, 2.5 nm or less, 2 nm or less, or 1.5 nm or less). The average thickness of the plurality of plate-shaped niobium oxide nanocrystals can range from any of the minimum values described above to any of the maximum values described above. For example, the plurality of plate-shaped niobium oxide nanocrystals can have an average thickness of from 0.5 nm to 20 nm (e.g., from 0.5 nm to 10 nm, from 2 nm to 10 nm, from 10 nm to 20 nm, from 0.5 nm to 8 nm, from 2 nm to 8 nm, from 8 nm to 14 nm, from 14 nm to 20 nm, from 1 nm to 20 nm, from 2 nm to 20 nm, from 0.5 nm to 6 nm, from 1 nm to 6 nm, from 2 nm to 6 nm, from 0.5 nm to 4 nm, from 1 nm to 4 nm, or from 2 nm to 4 nm). In some examples, the plurality of plate-shaped niobium oxide nanocrystals can be substantially monodisperse.

In some examples, the plurality of plate-shaped niobium oxide nanocrystals can be described by their aspect ratio, which, as used herein is the average length divided by the average width. For example, the plurality of plate-shaped niobium oxide nanocrystals can have an average aspect ratio of greater than 1 (e.g., 5 or more, 10 or more, 15 or more, 20 or more, 25 or more, 30 or more, 35 or more, 40 or more, 45 or more, 50 or more, 60 or more, 70 or more, or 80 or more). In some examples, the plurality of plate-shaped niobium oxide nanocrystals can have an average aspect ratio of 100 or less (e.g., 90 or less, 80 or less, 70 or less, 60 or less, 50 or less, 45 or less, 40 or less, 35 or less, 30 or less, 25 or less, 20 or less, 15 or less, or 10 or less). The average aspect ratio of the plurality of plate-shaped niobium oxide nanocrystals can range from any of the minimum values described above to any of the maximum values described above. For example, the plurality of plate-shaped niobium oxide nanocrystals can have an average aspect ratio of from greater than 1 to 100 (e.g., from 1 to 50, from 50 to 100, from 1 to 20, from 20 to 40, from 40 to 60, from 60 to 80, from 80 to 100, from 10 to 100, from 5 to 40, from 5 to 20, from 10 to 40, from 10 to 20, from 1 to 10, or from 5 to 10). In some examples, the plurality of niobium oxide nanocrystals can comprise: a first population of nanocrystals comprising a first niobium oxide material and having a first particle shape having a first average particle size, a first average length, a first average width, a first average aspect ratio, or a combination thereof; and a second population of nanocrystals comprising a second niobium oxide material and having a second particle shape having a second set average particle size, a second average length, a second average width, a second average aspect ratio, or a combination thereof; wherein the first particle shape and the second particle shape are different, the first material and the second material are different, the first average particle size and the second average particle size are different, the first average length and the second average length are different, the first average width and the second average width are different, the first average aspect ratio and the second average aspect ratio are different, or a combination thereof. In some examples, the plurality of niobium oxide nanocrystals can comprise a mixture of a plurality of populations of nanocrystals, wherein each population of nanocrystals within the mixture is different with respect to shape, composition, size, length width, aspect ratio, or combinations thereof.

The porous electrochromic niobium oxide films can have an average porosity. The average porosity of the porous electrochromic niobium oxide films can be determined by methods known in the art, such as ellipsometric porosimetry. The porous electrochromic niobium oxide films can, for example, have an average porosity of 15% or more (e.g., 20% or more, 25% or more, 30% or more, 35% or more, 40% or more, 45% or more, 50% or more, 55% or more, 60% or more, 65% or more, or 70% or more). In some examples, the porous electrochromic niobium oxide films can have an average porosity of 80% or less (e.g., 75% or less, 70% or less, 65% or less, 60% or less, 55% or less, 50% or less, 45% or less, 40% or less, 35% or less, 30% or less, or 25% or less). The average porosity of the porous electrochromic niobium oxide films can range from any of the minimum values described above to any of the maximum values described above. For example, the porous electrochromic niobium oxide films can have an average porosity of from 15% to 80% (e.g., 15% to 50%, from 50% to 80%, from 15% to 25%, from 25% to 35%, from 25% to 45%, from 45% to 55%, from 55% to 65%, from 65% to 80%, from 15% to 75%, or from 15% to 60%). The average porosity of the porous electrochromic niobium oxide films can be selected in view of a variety of factors. In some examples, the shape, average size, average length, average width, average aspect ratio, or a combination thereof of the plurality of niobium oxide nanocrystals can be selected such that the electrochromic niobium oxide film has a desired porosity.

The porous electrochromic niobium oxide films can have an average thickness. The average thickness of the porous electrochromic niobium oxide films can be determined by methods known in the art, for example profilometry, cross-sectional electron microscopy, atomic force microscopy (AFM), ellipsometry, or combinations thereof. As used herein, the average thickness of the porous electrochromic niobium oxide films is determined by profilometry.

The porous electrochromic niobium oxide films can, for example, have an average thickness of 10 nanometers (nm) or more (e.g., 20 nm or more, 30 nm or more, 40 nm or more, 50 nm or more, 60 nm or more, 70 nm or more, 80 nm or more, 90 nm or more, 100 nm or more, 125 nm or more, 150 nm or more, 175 nm or more, 200 nm or more, 225 nm or more, 250 nm or more, 275 nm or more, 300 nm or more, 325 nm or more, 350 nm or more, 375 nm or more, 400 nm or more, 425 nm or more, 450 nm or more, 475 nm or more, 500 nm or more, 550 nm or more, 600 nm or more, 650 nm or more, 700 nm or more, 800 nm or more, 900 nm or more, 1 micrometer (micron, $\mu m$) or more, 1.25 $\mu m$ or more, or 1.5 $\mu m$ or more). In some example, the porous electrochromic niobium oxide films can have an average thickness of 2 $\mu m$ or less (e.g., 1.75 $\mu m$ or less, 1.5 $\mu m$ or less, 1 $\mu m$ or less, 900 nm or less, 800 nm or less, 700 nm or less, 650 nm or less, 600 nm or less, 550 nm or less, 500 nm or less, 475 nm or less, 450 nm or less, 425 nm or less, 400 nm or less, 375 nm or less, 350 nm or less, 325 nm or less, 300 nm or less, 275 nm or less, 250 nm or less, 225 nm or less, 200 nm or less, 175 nm or less, 150 nm or less, 125 nm or less, 100 nm or less, 90 nm or less, 80 nm or less, 70 nm or less, 60 nm or less, 50 nm or less, 40 nm or less, or 30 nm or less). The average thickness of the porous electrochromic niobium oxide films can range from any of the minimum values described above to any of the maximum values described above. For example, the porous electrochromic niobium oxide films can have an average thickness of from 10 nm to 2 $\mu m$ (e.g., from 10 nm to 800 nm, from 800 nm to 2 $\mu m$, from 10 nm to 1.5 $\mu m$, from 10 nm to 1 $\mu m$, from 10 nm to 900 nm, from 20 nm to 700 nm, from 30 nm to 650 nm, from 40 nm to 600 nm, from 50 nm to 550 nm, from 60 nm to 500 nm, from 70 nm to 450 nm, or from 80 nm to 400 nm).

The porous electrochromic niobium oxide films can control optical properties such as optical transmission, absorption, reflectance, and/or emittance in a continual but reversible manner on application of a voltage. The porous electrochromic niobium oxide films can also be used to reduce near infrared transmission.

In some examples, the porous electrochromic niobium oxide films can transition from different optical states. These different states can be referred to herein as a first optical state and a second optical state. The use of the terms first and second here is not intended to imply that there are only two distinct optical states, but rather that the porous electrochromic niobium oxide films can change between different optical states.

In some examples, the porous electrochromic niobium oxide films can be switched from the first optical state to the second optical state and/or from the second optical state to the first optical state upon application of a potential to the porous electrochromic niobium oxide films. In some examples, the potential applied to the porous electrochromic niobium oxide film can be 1 volt (V) or more relative to Li/Li$^+$ (e.g., 1.1 V or more, 1.2 V or more, 1.3 V or more, 1.4 V or more, 1.5 V or more, 1.75 V or more, 2 V or more, 2.25 V or more, 2.5 V or more, 2.75 V or more, 3 V or more, 3.25 V or more, or 3.5 V or more). In some examples, the potential applied to the porous electrochromic niobium oxide film can be 4 V or less relative to Li/Li$^+$ (e.g., 3.75 V or less, 3.5 V or less, 3.25 V or less, 3 V or less, 2.75 V or less, 2.5 V or less, 2.25 V or less, 2 V or less, 1.75 V or less, or 1.5 V or less). The potential applied to the porous electrochromic niobium oxide film can range from any of the minimum values described above to any of the maximum values described above. For example, the potential applied to the porous electrochromic niobium oxide film can be from 1 V to 4 V relative to Li/Li$^+$ (e.g., from 1 V to 2.5 V, from 2.5 V to 4 V, from 1 V to 2 V, from 2 V to 3 V, from 3 V to 4 V, from 1.2 V to 4 V, or from 1.5 V to 3.5 V).

In some examples, the porous electrochromic niobium oxide film can be switched from the first optical state to the second optical state and/or from the second optical state to the first optical state by applying the potential for an amount of time of 20 minutes or less (e.g., 15 minutes or less, 10 minutes or less, 5 minutes or less, 1 minute or less, 50 seconds or less, 40 seconds or less, 30 seconds or less, or 20 seconds or less). In some examples, the time the potential is applied to the porous electrochromic niobium oxide film to switch the porous electrochromic niobium oxide film from the first optical state to the second optical state can be referred to as the switching speed.

In some examples, the porous electrochromic niobium oxide films can be durable. As used herein, durability of the porous electrochromic niobium oxide films means that one or more properties of the porous electrochromic niobium oxide films (e.g., transmittance of the first optical state, transmittance of the second optical state) decreases by 5% or less (e.g., 4.75% or less, 4.5% or less, 4.25% or less, 4% or less, 3.75% or less, 3.5% or less, 3.25% or less, 3% or less, 2.75% or less, 2.5% or less, 2.25% or less, 2% or less, 1.75% or less, 1.5% or less, 1.25% or less, 1% or less, 0.75% or less, 0.5% or less, or 0.25% or less) over 200 cycles or more (e.g., 300 cycles or more, 400 cycles or more, 500 cycles or more, 600 cycles or more, 700 cycles or more, 800 cycles or more, 900 cycles or more, or 1000 cycles or more). As used herein, a cycle refers to the porous electrochromic niobium oxide film switching from the first optical state to the second optical state, and then back to the first optical state from the second optical state or switching from the second optical state to the first optical state and then back to the second optical state from the first optical state.

In certain examples, each of the first optical state and the second optical state can have an average transmittance at one or more wavelengths from 350 nm to 2500 nm and the average transmittance of the second optical state can be less than the average transmittance of the first optical state by 20% or more (e.g., 25% or more, 30% or more, 35% or more, 40% or more, 45% or more, 50% or more, 55% or more, 60% or more, 65% or more, 70% or more, 75% or more, 80% or more, 85% or more, 90% or more, or 95% or more) at one or more wavelengths from 350 nm to 2500 nm. For example, the first optical state can be substantially transparent at one or more wavelengths from 350 nm to 2500 nm and the second optical state can be substantially opaque at one or more wavelengths from 350 nm to 2500 nm.

In some examples, the porous electrochromic niobium oxide film has a coloration efficiency at one or more wavelengths from 350 nm to 2500 nm of 25 cm$^2$/C or more (e.g. 30 cm$^2$/C or more, 35 cm$^2$/C or more, 40 cm$^2$/C or more, 45 cm$^2$/C or more, 50 cm$^2$/C or more, 55 cm$^2$/C or more, 60 cm$^2$/C or more, 65 cm$^2$/C or more, 70 cm$^2$/C or more, 75 cm$^2$/C or more, 80 cm$^2$/C or more, 85 cm$^2$/C or more, 90 cm$^2$/C or more, 95 cm$^2$/C or more, 100 cm$^2$/C or more, 125 cm$^2$/C or more, 150 cm$^2$/C or more, 175 cm$^2$/C or more, or 200 cm$^2$/C or more). As used herein, the coloration efficiency refers to the change in optical density from the first optical state to the second optical state (e.g., the difference between the optical density of the first optical state and the optical density of the second optical state) relative to the charge density injected into the porous electrochromic niobium oxide film to switch the porous electrochromic niobium oxide film from the first optical state and the second optical state.

Methods of Making

Also disclosed herein are methods of making the porous electrochromic niobium oxide films described herein, the method comprising: dispersing the plurality of niobium oxide nanocrystals in a solvent, thereby forming a dispersion; and depositing the dispersion on a substrate; thereby forming the electrochromic niobium oxide film.

Depositing the plurality of nanocrystals can, for example, comprise printing, spin coating, drop-casting, zone casting, dip coating, blade coating, spraying, vacuum filtration, slot die coating, curtain coating, or combinations thereof.

Examples of solvents include, but are not limited to, tetrahydrofuran (THF), dimethylformamide (DMF), N-methylformamide, formamide, dichloromethane (CH$_2$Cl$_2$), ethylene glycol, ethanol, methanol, propanol, isopropanol, water, acetonitrile, chloroform, toluene, methyl acetate, ethyl acetate, acetone, hexane, heptane, tetraglyme, propylene carbonate, diglyme, dimethyl sulfoxide (DMSO), dimethoxyethane, xylene, and combinations thereof.

In some examples, the substrate can comprise glass, quartz, silicon, a transparent polymer, MgO, TiO$_2$, TaO, or combinations thereof. In some examples, the substrate comprises a conducting layer. In some examples, the substrate comprises a conducting layer deposited on a non-conducting substrate such as glass, quartz, silicon, a transparent polymer, MgO, TiO$_2$, TaO, or combinations thereof. The conducting layer can, for example, comprise a transparent conducting oxide, a carbon material, a nanostructured metal, or a combination thereof.

As used herein, "nanostructured" means any structure with one or more nanosized features. A nanosized feature can be any feature with at least one dimension less than 1 micrometer (μm) in size. For example, a nanosized feature can comprise a nanowire, nanotube, nanoparticle, nanopore, and the like, or combinations thereof. As such, the nanostructured metal can comprise, for example, a nanowire, nanotube, nanoparticle, nanopore, or a combination thereof. In some examples, the nanostructured metal can comprise a metal that is not nanosized but has been modified with a nanowire, nanotube, nanoparticle, nanopore, or a combination thereof. The nanostructured metal can comprise, for example, a metal selected from the group consisting of Be, Mg, Al, Ca, Sc, Ti, V, Cr, Mn, Fe, Co, Ni, Cu, Zn, Ga, Sr, Y, Zr, Nb, Mo, Tc, Ru, Rh, Pd, Ag, Cd, In, Sn, Ba, Hf, Ta, W, Re, Os, Ir, Pt, Au, Hg, Tl, Pb, Bi, La, Ce, Pr, Nd, Pm, Sm, Eu, Gd, Tb, Dy, Ho, Er, Tm, Yb, and combinations thereof.

Examples of carbon materials include, but are not limited to, graphitic carbon and graphites, including pyrolytic graphite (e.g., highly ordered pyrolytic graphite (HOPG)) and isotropic graphite, amorphous carbon, carbon black, single- or multi-walled carbon nanotubes, graphene, glassy carbon, diamond-like carbon (DLC) or doped DLC, such as boron-doped diamond, pyrolyzed photoresist films, and others known in the art.

In some examples, the conducting layer can comprise a transparent conducting oxide. In some examples, the conducting layer can comprise a metal oxide. Examples of metal oxides include simple metal oxides (e.g., with a single metal element) and mixed metal oxides (e.g., with different metal elements). The metal oxide can, for example, comprise a metal selected from the group consisting of Cd, Cr, Cu, Ga, In, Ni, Sn, Ti, W, Zn, and combinations thereof. In some examples, the conducting layer can comprise CdO, $CdIn_2O_4$, $Cd_2SnO_4$, $Cr_2O_3$, $CuCrO_2$, $CuO_2$, $Ga_2O_3$, $In_2O_3$, NiO, $SnO_2$, $TiO_2$, $ZnGa_2O_4$, ZnO, InZnO, InGaZnO, InGaO, ZnSnO, $Zn_2SnO_4$, CdSnO, $WO_3$, or combinations thereof.

In some examples, the conducting layer can further comprise a dopant. The dopant can comprise any suitable dopant for the conducting layer. The dopant can, for example, be selected to tune the optical and/or electronic properties of the nanostructured conducting film. In some examples, the dopant can comprise an n-type dopant. The dopant can, for example, comprise Al, B, Ca, Ce, Cl, Cs, Dy, Er, Eu, F, Ga, Gd, Ho, In, La, Mg, Mo, N, Nb, Nd, Rb, Sb, Sn, Sm, Ta, or combinations thereof.

In some examples, the conducting layer can comprise a transparent conducting oxide selected from indium doped tin oxide, tin doped indium oxide, fluorine doped tin oxide, and combinations thereof.

In some examples, the methods further comprise making the plurality of niobium oxide nanocrystals. For example, the method of making the plurality of niobium oxide nanocrystals can comprise formation of a plurality of niobium oxo clusters (e.g., via aminolysis or alcoholysis), condensation of the plurality of niobium oxo clusters into a plurality of amorphous niobium oxide seeds, and crystallization and growth of the plurality of amorphous niobium oxide seeds to thereby form the plurality of niobium oxide nanocrystals.

In some examples, the method of making the plurality of niobium oxide nanocrystals can comprise: mixing a niobium salt with a ligand and a solvent to form a solution comprising a niobium-ligand complex; mixing the solution comprising the niobium-ligand complex with an amine, an alcohol, or combination thereof, and subsequently heating at a first temperature to form a solution comprising a plurality of niobium oxo clusters; and heating the solution comprising the plurality of niobium oxo clusters at a second temperature to crystallize and grow the plurality of niobium oxide nanocrystals, wherein the second temperature is above the first temperature.

The niobium salt can, for example, comprise a niobium halide, a niobium ethoxide, a niobium oxalate, or a combination thereof. In some examples, the niobium salt san comprise a niobium halide, wherein the niobium halide can comprise a niobium chloride, a niobium bromide, a niobium iodide, a niobium fluoride, or combination thereof. In some examples, the niobium salt can comprise a niobium chloride, such as $NbCl_5$.

The ligand can, for example, comprise any suitable ligand, such as those known in the art for nanocrystal synthesis. For example, the ligand can comprise an alkyl carboxylic acid, an alkylphosphonic acid, and alkylphosphinic acid, an alkylsulfonic acid, or combinations thereof.

In some examples, the ligand can comprise an alkyl carboxylic acid, such as mystiric acid, oleic acid, or combinations thereof. In some examples, the ligand can comprise oleic acid.

The amine can, for example, comprise a primary amine, a secondary amine, a tertiary amine, or a combination thereof. For example, the amine can comprise a primary alkyl amine, a secondary alkyl amine, a tertiary alkyl amine, or a combination thereof. In some examples, the amine can comprise a primary amine, such as oleylamine In some examples, the amine can comprise a tertiary amine, such as trioctylamine. The alcohol can, for example, comprise an alkyl alcohol, a diol, or a combination thereof. In some examples, the alcohol can comprise oleyl alcohol.

In some examples, the niobium-ligand complex can comprise a niobium oleate complex. In certain examples, the niobium-ligand complex can comprise a chloro oleyl niobium (V) complex.

The solvent can, for example, comprise any suitable solvent, such as those known in the art. For example, the solvent can comprise squalene, oleic acid, oleylamine, octadecene, dialkyl ether (e.g., dioctyl ether), diphenyl ether, dibenzyl ether, or a combination thereof. In some examples, the solvent can comprise octadecene.

The niobium salt, the ligand, and the primary amine can be provided in an appropriate amount. For example, the amount of the niobium salt, the amount of the ligand, and/or the amount of the primary amine can be selected in view of a variety of factors, such as the desired shape and/or size of the plurality of niobium oxide nanocrystals. In some examples, the niobium salt and the ligand can be provided in a molar ratio of 1:1 or less (e.g., 1:2 or less, 1:3 or less, 1:4 or less, 1:5 or less, 1:6 or less, 1:7 or less, 1:8 or less, 1:9 or less, or 1:10 or less). In some examples, the primary amine and the ligand can be provided in a molar ratio of 1:1 or less (e.g., 1:2 or less, 1:3 or less, 1:4 or less, 1:5 or less, 1:6 or less, 1:7 or less, 1:8 or less, 1:9 or less, or 1:10 or less).

The first temperature can, for example be 100° C. or more (e.g., 110° C. or more, 120° C. or more, 130° C. or more, 140° C. or more, 150° C. or more, 160° C. or more, 170° C. or more, or 180° C. or more). In some examples, the first temperature can be 200° C. or less (e.g., 190° C. or less, 180° C. or less, 170° C. or less, 160° C. or less, 150° C. or less, 140° C. or less, 130° C. or less, or 120° C. or less). The first temperature can range from any of the minimum values described above to any of the maximum values described above. For example, the first temperature can be from 100° C. to 200° C. (e.g., from 100° C. to 150° C., from 150° C. to 200° C., from 100° C. to 120° C., from 120° C. to 140° C., from 140° C. to 160° C., from 160° C. to 180° C., from 180° C. to 200° C., from 100° C. to 190° C., from 110° C. to 200° C., from 100° C. to 140° C., or from 110° C. to 130° C.).

The second temperature can, for example, the 200° C. or more (e.g., 210° C. or more, 220° C. or more, 230° C. or more, 240° C. or more, 250° C. or more, 260° C. or more, 270° C. or more, 280° C. or more, 290° C. or more, or 300° C. or more). In some examples, the second temperature can be 320° C. or less (e.g., 310° C. or less, 300° C. or less, 290° C. or less, 280° C. or less, 270° C. or less, 260° C. or less, 250° C. or less, 240° C. or less, 230° C. or less, or 220° C. or less). The second temperature can range from any of the minimum values described above to any of the maximum values described above. For example, the second temperature can be from 200° C. to 320° C. (e.g., from 200° C. to 260° C., from 260° C. to 300° C., from 200° C. to 220° C., from 220° C. to 240° C., from 240° C. to 260° C., from 260° C. to 280° C., from 280° C. to 300° C., from 300° C. to 320° C., from 200° C. to 300° C., from 210° C. to 320° C., or from 210° C. to 300° C.).

The method can, in some examples, be performed under an inert atmosphere (e.g., Ar, $N_2$, etc.).

In some examples, the methods can further comprise stripping the ligands from the plurality of niobium oxide nanocrystals prior to forming the electrochromic niobium oxide film.

Electrodes and Devices

Also disclosed herein are electrochromic electrodes comprising any of the porous electrochromic niobium oxide films described herein, electrochromic devices comprising any of the porous electrochromic niobium oxide films described herein, and electrochromic devices comprising any of the electrochromic electrodes described herein.

Also disclosed herein are electrochromic electrodes comprising any of the porous electrochromic niobium oxide films described herein, wherein the electrochromic electrode comprises the porous electrochromic niobium oxide film deposited on a conducting layer.

The conducting layer can, for example, comprise a transparent conducting oxide, a carbon material, a nanostructured metal, or a combination thereof. As used herein, "nanostructured" means any structure with one or more nanosized features. A nanosized feature can be any feature with at least one dimension less than 1 micrometer (μm) in size. For example, a nanosized feature can comprise a nanowire, nanotube, nanoparticle, nanopore, and the like, or combinations thereof. As such, the nanostructured metal can comprise, for example, a nanowire, nanotube, nanoparticle, nanopore, or a combination thereof. In some examples, the nanostructured metal can comprise a metal that is not nanosized but has been modified with a nanowire, nanotube, nanoparticle, nanopore, or a combination thereof. The nanostructured metal can comprise, for example, a metal selected from the group consisting of Be, Mg, Al, Ca, Sc, Ti, V, Cr, Mn, Fe, Co, Ni, Cu, Zn, Ga, Sr, Y, Zr, Nb, Mo, Tc, Ru, Rh, Pd, Ag, Cd, In, Sn, Ba, Hf, Ta, W, Re, Os, Ir, Pt, Au, Hg, Tl, Pb, Bi, La, Ce, Pr, Nd, Pm, Sm, Eu, Gd, Tb, Dy, Ho, Er, Tm, Yb, and combinations thereof.

Examples of carbon materials include, but are not limited to, graphitic carbon and graphites, including pyrolytic graphite (e.g., highly ordered pyrolytic graphite (HOPG)) and isotropic graphite, amorphous carbon, carbon black, single- or multi-walled carbon nanotubes, graphene, glassy carbon, diamond-like carbon (DLC) or doped DLC, such as boron-doped diamond, pyrolyzed photoresist films, and others known in the art.

In some examples, the conducting layer can comprise a transparent conducting oxide. In some examples, the conducting layer can comprise a metal oxide. Examples of metal oxides include simple metal oxides (e.g., with a single metal element) and mixed metal oxides (e.g., with different metal elements). The metal oxide can, for example, comprise a metal selected from the group consisting of Cd, Cr, Cu, Ga, In, Ni, Sn, Ti, W, Zn, and combinations thereof. In some examples, the conducting layer can comprise CdO, $CdIn_2O_4$, $Cd_2SnO_4$, $Cr_2O_3$, $CuCrO_2$, $CuO_2$, $Ga_2O_3$, $In_2O_3$, NiO, $SnO_2$, $TiO_2$, $ZnGa_2O_4$, ZnO, InZnO, InGaZnO, InGaO, ZnSnO, $Zn_2SnO_4$, CdSnO, $WO_3$, or combinations thereof.

In some examples, the conducting layer can further comprise a dopant. The dopant can comprise any suitable dopant for the conducting layer. The dopant can, for example, be selected to tune the optical and/or electronic properties of the nanostructured conducting film. In some examples, the dopant can comprise an n-type dopant. The dopant can, for example, comprise Al, B, Ca, Ce, Cl, Cs, Dy, Er, Eu, F, Ga, Gd, Ho, In, La, Mg, Mo, N, Nb, Nd, Rb, Sb, Sn, Sm, Ta, or combinations thereof.

In some examples, the conducting layer can comprise a transparent conducting oxide selected from indium doped tin oxide, tin doped indium oxide, fluorine doped tin oxide, and combinations thereof.

In some example, the electrochromic electrode can be durable. As used herein, durability of the electrochromic electrode means that one or more properties (e.g., charge capacity, transmittance of the first optical state, transmittance of the second optical state) decreases by 5% or less (e.g., 4.75% or less, 4.5% or less, 4.25% or less, 4% or less, 3.75% or less, 3.5% or less, 3.25% or less, 3% or less, 2.75% or less, 2.5% or less, 2.25% or less, 2% or less, 1.75% or less, 1.5% or less, 1.25% or less, 1% or less, 0.75% or less, 0.5% or less, or 0.25% or less) over 200 cycles or more (e.g., 300 cycles or more, 400 cycles or more, 500 cycles or more, 600 cycles or more, 700 cycles or more, 800 cycles or more, 900 cycles or more, or 1000 cycles or more).

Also disclosed herein are electrochromic devices comprising the electrochromic electrodes described herein. The electrochromic devices can, for example, comprise any of the electrochromic electrodes described herein, an electrolyte, and a counter electrode, wherein the electrochromic electrode and the counter electrode are in electrochemical contact with the electrolyte. In response to electrical stimulus, electronic charge can move in or out of the electrochromic electrode and ionic charge from the electrolyte can migrate into or out of the electrochromic electrode, thus affecting the optical properties of the porous electrochromic niobium oxide film.

The electrolyte can comprise $H^+$ ions, $Li^+$ ions, $Na^+$ ions, $K^+$ ions, $Mg^{2+}$ ions, $Ca^{2+}$ ions, $Al^{3+}$ ions, or combinations thereof. For example, the electrolyte can comprise a lithium ion salt selected from the group consisting of LiTFSI, LiI, $LiPH_6$, $LiPF_6$, $LiBF_4$, $LiClO_4$, and combinations thereof.

The concentration of the electrolyte can be, for example, 0.001 molar (M; mol/L) or more (e.g., 0.0025 M or more, 0.005 M or more, 0.0075 M or more, 0.01 M or more, 0.025 M or more, 0.05 M or more, 0.075 M or more, 0.1 M or more, 0.25 M or more, 0.5 M or more, 0.75 M or more, 1 M or more, 1.25 M or more, 1.5 M or more, 1.75 M or more, 2 M or more, 2.25 M or more, 2.5 M or more, or 2.75 M or more). In some examples, the concentration of the electrolyte can be 3 M or less (e.g., 2.75 M or more, 2.5 M or more, 2.25 M or more, 2 M or more, 1.75 M or more, 1.5 M or more, 1.25 M or more, 1 M or more, 0.75 M or more, 0.5 M or more, 0.25 M or more, 0.1 M or more, 0.075 M or more, 0.05 M or more, 0.025 M or more, 0.001 M or more, 0.0075 M or more, 0.005 M or more, or 0.0025 M or more). The concentration of the electrolyte can range from any of the minimum values described above to any of the maximum values described above. For example, the electrolyte can have a concentration of from 0.001 M to 3 M (e.g., from 0.001 M to 1.5 M, from 1.5 M to 3 M, from 0.001 M to 0.01 M, from 0.01 M to 0.1 M, from 0.1 M to 1 M, from 0.001 M to 1 M, from 0.025 M to 0.4 M, from 0.05 M to 0.3 M, or from 0.075 to 0.2 M).

The electrolyte can, in some examples, further comprise a solvent selected from the group consisting of tetraglyme, propylene carbonate, diglyme, dimethyl sulfoxide (DMSO), dimethyl formamide (DMF), dimethoxyethane, acetonitrile, ethylene carbonate, dimethyl carbonate, monoglyme (dimethoxyethane), and combinations thereof.

In some examples, the electrochromic devices described herein can be coupled to a power supply and optionally to one or more additional suitable features including, but not limited to, a voltmeter, an ammeter, a multimeter, an ohmmeter, a signal generator, a pulse generator, an oscilloscope, a frequency counter, a potentiostat, or a capacitance meter. For example, the electrochromic device can further comprise a power supply that is in electrical contact with the electrochromic electrode and the counter electrode. In some examples, the power supply is configured to apply a potential to the electrochromic electrode, the counter electrode, or a combination thereof.

In some examples, the electrochromic device can be durable. As used herein, durability of the electrochromic device means that one or more properties (e.g., charge capacity, transmittance of the first optical state, transmittance of the second optical state) decreases by 5% or less (e.g., 4.75% or less, 4.5% or less, 4.25% or less, 4% or less, 3.75% or less, 3.5% or less, 3.25% or less, 3% or less, 2.75% or less, 2.5% or less, 2.25% or less, 2% or less, 1.75% or less, 1.5% or less, 1.25% or less, 1% or less, 0.75% or less, 0.5% or less, or 0.25% or less) over 200 cycles or more (e.g., 300 cycles or more, 400 cycles or more, 500 cycles or more, 600 cycles or more, 700 cycles or more, 800 cycles or more, 900 cycles or more, or 1000 cycles or more).

The electrochromic devices described herein can, for example, comprise an electronic device, an energy storage device, an energy conversion device, an optical device, an optoelectronic device, or combinations thereof. In some examples, the electrochromic devices can comprise a touch panel, an electronic display, a transistor, a smart window, a solar cell, a fuel cell, a photovoltaic cell, a battery, a light emitting diode, or a combination thereof.

Methods of Use

Also provided herein are methods of use of the electrochromic devices, electrochromic electrodes, and porous electrochromic niobium oxide films described herein. For example, the electrochromic devices, electrochromic electrodes, and/or porous electrochromic niobium oxide films described herein can be used in, for example, an electronic device, an energy storage device, an energy conversion device, an optical device, an optoelectronic device, or combinations thereof. In some examples, the electrochromic devices, electrochromic electrodes, and/or porous electrochromic niobium oxide films described herein can be used in, for example, a touch panel, an electronic display, a transistor, a smart window, a solar cell, a fuel cell, a photovoltaic cell, a battery, a light emitting diode, or a combination thereof. Such devices can be fabricated by methods known in the art.

In some examples, the electrochromic devices, electrochromic electrodes, and/or porous electrochromic niobium oxide films described herein can be used in various articles of manufacture including electronic devices, energy storage devices, energy conversion devices, optical devices, optoelectronic devices, and combinations thereof. Examples of articles of manufacture (e.g., devices) using the electrochromic devices electrochromic electrodes, and/or porous electrochromic niobium oxide films described herein can include, but are not limited to touch panels, electronic displays, transistors, smart windows, solar cells, fuel cells, photovoltaic cells, batteries, light emitting diodes, and combinations thereof. Such articles of manufacture can be fabricated by methods known in the art.

The examples below are intended to further illustrate certain aspects of the methods and compounds described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods, compositions, and results. These examples are not intended to exclude equivalents and variations of the present invention, which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures, and other reaction ranges and conditions that can be used to optimize the product purity and yield obtained from the described process. Only reasonable and routine experimentation will be required to optimize such process conditions.

Example 1

Herein, an electrochromic coating designed from the bottom up based upon niobium oxide is described. By considering the many phases and stoichiometry of niobium oxide, it was determined that the desired phases are orthorhombic or pseudo-hexagonal niobium oxide with a stoichiometry of $Nb_2O_5$. Selection of stoichiometry was due to a necessary change in niobium oxidation state from +5 to +4 to achieve visible coloration. The choice of crystal structure on the other hand was motivated by studies suggesting preferential $Li^+$ intercalation and fast diffusion pathways along different crystallographic planes, possibility decoupling the design for strain accommodation and fast kinetics. Next, nanocrystal morphology was considered. Strain accommodation in nanostructures, previously demonstrated for silicon nanowires, allows minimal structural damage upon electrochemical cycling when an anisotropic morphology has a long axis coincident with the preferred intercalation plane. Furthermore, selection of certain crystal planes on the side of the anisotropic structure can facilitate Li ion motion throughout the structure, allowing enhanced kinetics.

Beyond intrinsic properties of the nanocrystal (composition, crystal structure, and shape), the necessary microstructure for fast kinetics was also considered. Prior work in electrochemical systems has shown that porosity can be important and, generally, electrodes with structures that are more porous than just the random packing of spheres exhibit better performance. The use of templating agents was avoided herein to maintain ease of processability. Therefore, porosity was instead incorporated by using long-range electrostatic repulsion that disallows close packing in nanorod systems. Further, all processing for the structures described herein was limited to the use of only solution techniques, with no vacuum processes or severe heating steps, to enable scalable use in high or low temperature setups.

Having considered the aforementioned factors, the electrochromic response of orthorhombic niobium oxide nanorods dominantly in the near infrared (NIR) was investigated and was shown to exhibit high electrochemical durability coupled with fast kinetics enabled by fast $Li^+$ transport pathways. Intercalative strain was preferentially accommodated by having nanorods with a [001] long axis for fast $Li^+$ transport along with a generally porous structure of the nanocrystal films that further enables fast $Li^+$ transport through the electrolyte.

Methods

Nanocrystal Synthesis

The synthesis of niobium oxide ($Nb_2O_5$) nanorods is based on established colloidal synthesis methods and was conducted in an air-free environment using a standard Schlenk line technique. Briefly, 0.545 g of niobium chloride (2 mmol, $NbCl_5$, Aldrich 99.995%) was mixed with 3.127 g oleic acid (11 mmol, Aldrich 90%) and 10 g of octadecene (40 mmol, Aldrich, 90%) under an inert environment to form a niobium oleate complex. This solution was left to stir until the niobium chloride completely dissolved to form a blood red solution of niobium oleate and was then degassed at 120° C. under vacuum for 30 minutes. Then, 0.534 g of oleylamine (2 mmol, 90% Acros Organics) was mixed with 0.789 g of octadecene and the mixture was injected into the niobium oleate solution, after which the combination was degassed at 120° C. under vacuum for 15 minutes. Then, the solution was heated to and held at 240° C. for 30 minutes to nucleate and grow the $Nb_2O_5$ nanorods.

Ligand Stripping

For a typical ligand stripping procedure, 1 mL of a 5 mg/mL solution of niobium oxide nanorods in toluene was mixed with 1 mL of dimethylformamide (DMF) with 5 mg of nitrosonium tetrafluoroborate (Aldrich 95%). This solution was sonicated for thirty minutes and then left to settle to observe the clear precipitation of a nanocrystal pellet. Then, the nanocrystals and solution were centrifuged at 2000 rpm to separate the nanocrystals from the solution. The nanocrystals were then dispersed in 1 mL of DMF, mixed with an equal part of hexane, shaken, and the resultant phase separated hexane layer removed. This process was repeated 3 times. Then, the nanocrystals were subjected to five cycles of purification by flocculation and dispersion in a solvent combination of toluene, for flocculation, and DMF, for dispersion. The final ligand-stripped niobium oxide nanorod product was then dispersed in DMF.

Thin Film Deposition

Ligand-stripped $Nb_2O_5$ nanorods were dispersed in 1:1 mixture of DMF and acetonitrile (30 mg/ml) and spin-coated at 1250 rpm on FTO-coated glass substrates.

Scanning Electron Microscopy

Scanning electron microscopy was performed on a Hitachi S5500 SEM/STEM at a 30 kV accelerating voltage. Nanorods were imaged in bright-field scanning transmission electron microscopy mode. Samples were prepared by drop casting a dilute nanocrystal solution in toluene on Type-A ultrathin carbon (Ted Pella, 01822, 400 mesh) copper TEM grids. Nanorod films spin-coated on silicon substrates were images in scanning electron microscopy mode.

Spectroelectrochemical and Standard Electrochemical Measurements

Electrochemical charging and in-situ optical modulation measurements were performed using a spectroelectrochemical cell in an Ar glovebox. In a typical half-cell measurement, a three-electrode configuration was used to electrochemically charge the $Nb_2O_5$ nanorod films, in which Li foil acts as the counter and reference electrode and the nanorod film on FTO-coated glass is the working electrode. For these experiments, lithium bis(trifluoromethanesulfonyl)imide (Li-TFSI) in anhydrous tetraglyme electrolytes of varying concentrations (0.1 M, 1 M, and 3 M) were prepared. In-situ transmission data as a function of applied potential (Biologic VMP3 potentiostat) was collected using an ASD Quality Spec Pro spectrometer connected to the cell with fiber optic cables. This setup was also used to perform chronoamperometry (CA), cyclic voltammetry (CV), and cycling stability studies.

X-Ray Diffraction (XRD)

Powder diffraction patterns were collected on a Rigaku R-Axis Spider using Cu $K_\alpha$ radiation (1.54 Å). Samples were mounted on a cryoloop using mineral oil.

Raman Spectroscopy

Raman spectroscopy was carried out on a LabRAM HR Evolution Raman instrument (Horiba). Samples were dropcasted on a glass substrate and spectra were collected using a 50× microscope objective with an acquisition time of 60 s at a 532 nm excitation wavelength (50 mW power laser source).

FTIR Spectroscopy

Fourier transform infrared spectroscopy was done on spin-coated thin films on undoped silicon substrates in transmission geometry with a 2 $cm^{-1}$ wavenumber resolution and an average of 128 scans on a Bruker Vertex 70 spectrometer.

X-Ray Photoelectron Spectroscopy (XPS)

XPS was carried out with a Kratos X-ray photoelectron spectrometer-axis ultra DLD using Al $K_\alpha$ source. Samples were identical to the nanorod films spin-coated on FTO for spectroelectrochemical and standard electrochemical measurements.

Results and Discussion

Nanocrystal Synthesis

Figure 1:
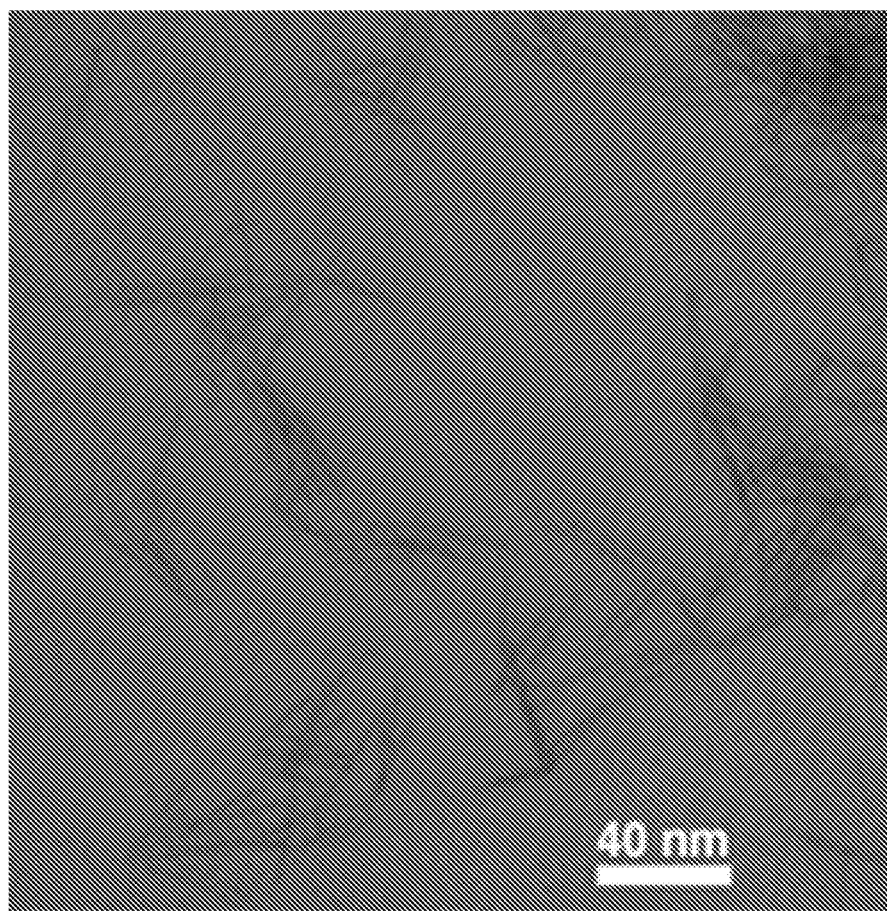
FIG. 1 is a STEM image of as synthesized $Nb_2O_5$ nanorods.
Figure 2:
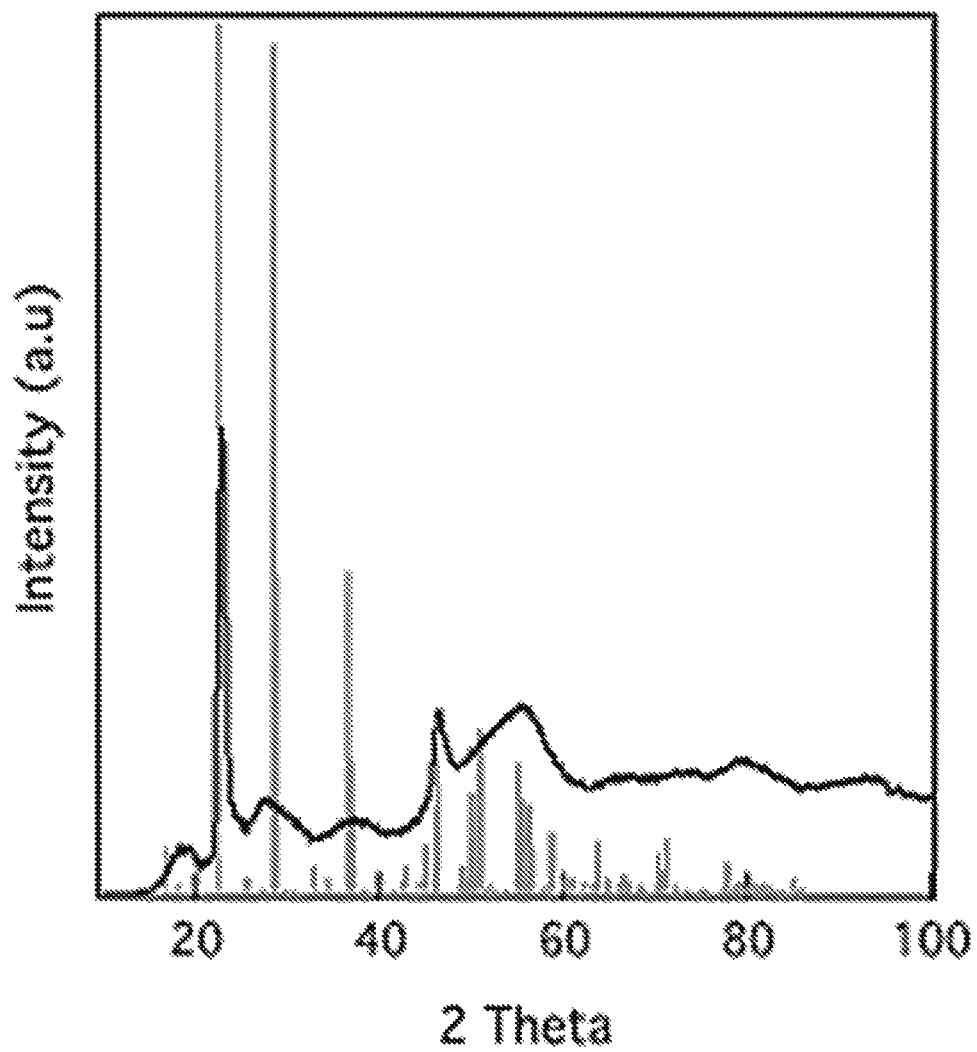
FIG. 2 is the X-ray diffraction (XRD) pattern of the as-synthesized $Nb_2O_5$ nanorods demonstrating crystallinity in the orthorhombic phase ($Nb_2O_5$ orthorhombic reference is provided PDF #00-027-1003).
Figure 3:
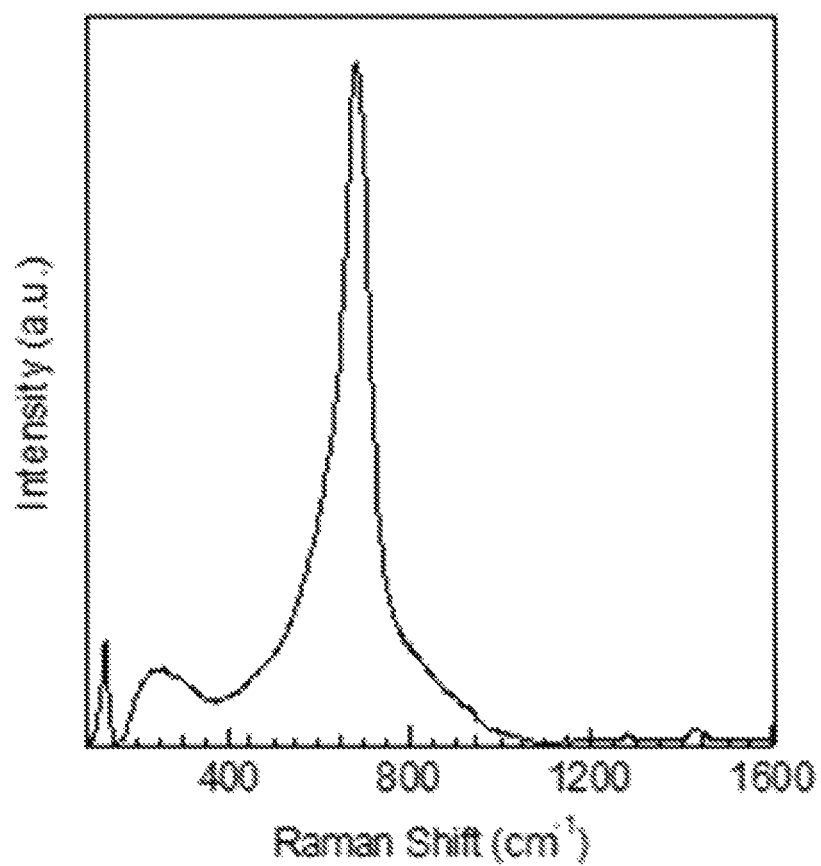
FIG. 3 is the Raman spectrum of the as-synthesized $Nb_2O_5$ nanorods and supports that the nanorods are orthorhombic phase.

Niobium oxide nanorods were synthesized via decomposition of a niobium oleate complex. The as-synthesized nanorods are in the orthorhombic phase and have approximate dimensions of 3 nm diameter and 40 nm length (FIG. 1 for nanorod diameter and length distribution). The X-ray diffraction (XRD) pattern and Raman spectrum of the as-synthesized nanorods are assigned to the $Nb_2O_5$ orthorhombic phase (FIG. 2 and FIG. 3, respectively). A sharp (001) reflection in the XRD pattern further confirms that the long axis of the nanorods is along the [001] direction (FIG. 2). In the Raman spectrum, the pronounced peak at 680 $cm^{-1}$ and less intense peak at 260 $cm^{-1}$ are indicative of Nb—O—Nb vibrational and bending modes, respectively, in the $NbO_6$ octahedron of orthorhombic $Nb_2O_5$ (FIG. 3).

Formation of Porous Films

Figure 4:
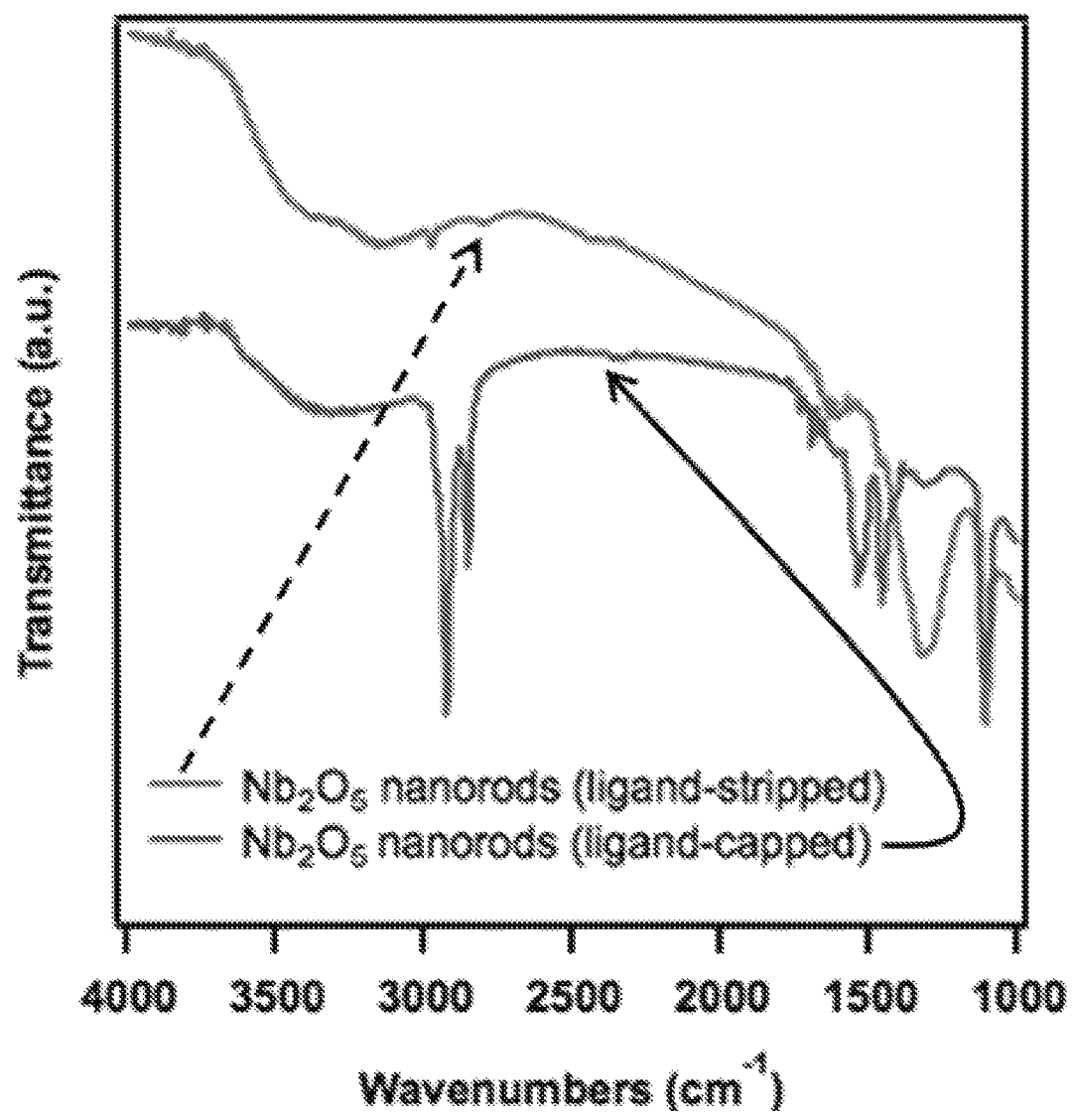
FIG. 4 is the Fourier transform infrared (FTIR) spectra of ligand capped and ligand-stripped $Nb_2O_5$ nanorods.
Figure 5:
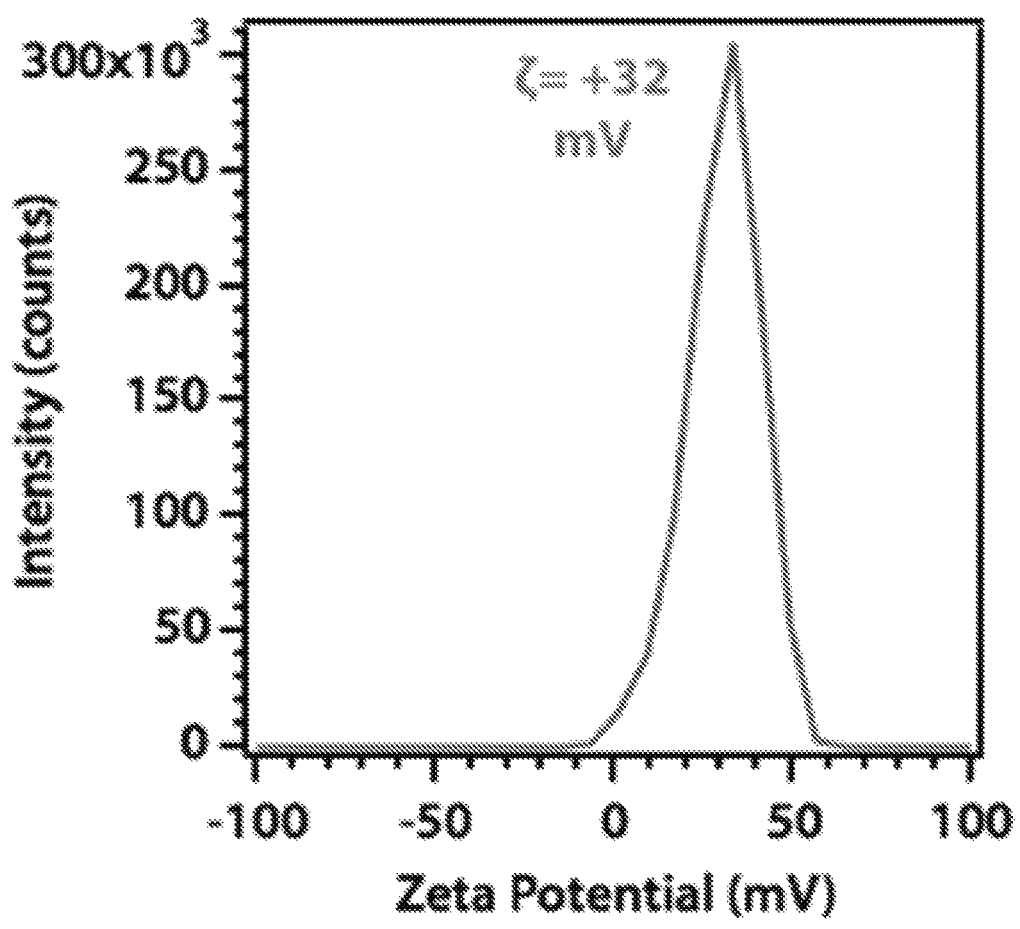
FIG. 5 is the zeta potential of ligand-stripped $Nb_2O_5$ nanorods.
Figure 6:
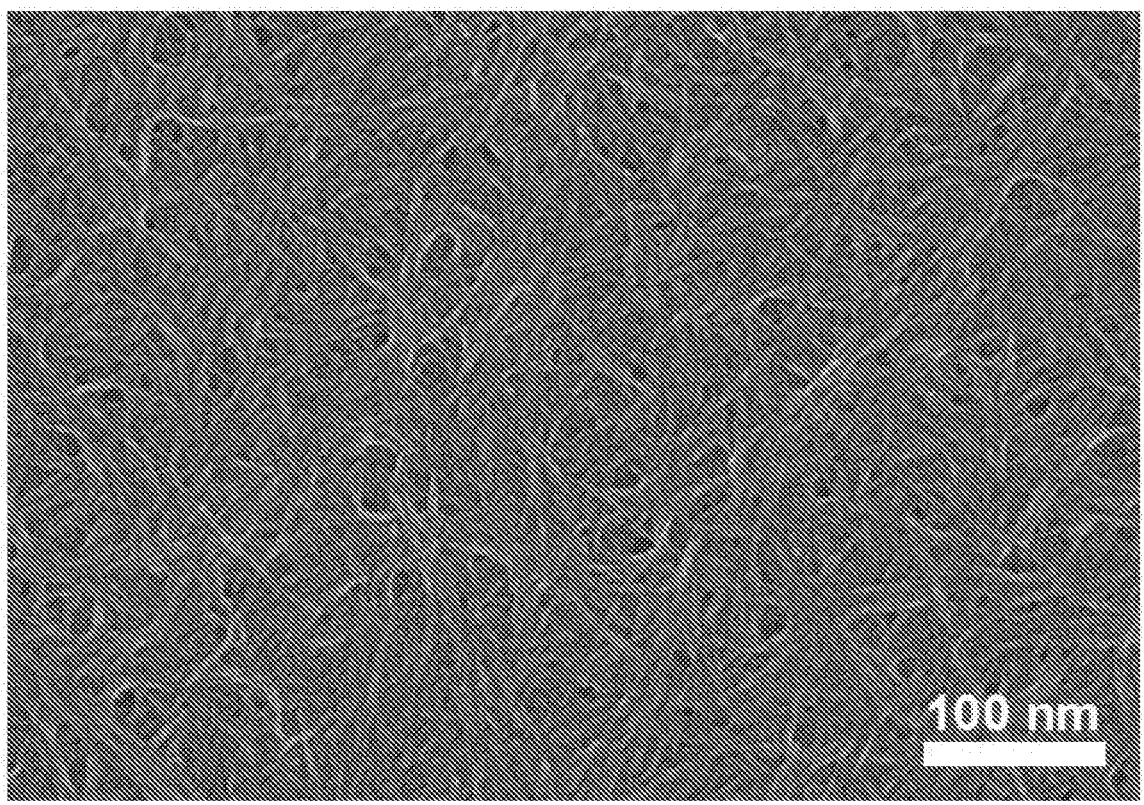
FIG. 6 is a scanning electron microscope (SEM) image of a film comprising ligand-stripped $Nb_2O_5$ nanorods.

To fabricate the electrochromic films, the nanorods were first ligand stripped to simultaneously remove the insulating organic ligands and create a charged surface to introduce electrostatic repulsion. Herein, nitrosonium tetrafluoroborate was utilized for the ligand-stripping; successful ligand removal was confirmed with Fourier transform infrared spectroscopy by the disappearance of the C—H stretch and emergence of a broad hydroxyl peak, suggesting the oxide surface is now ligand free and —OH terminated (FIG. 4). Zeta potential measurements further showed that the nanorods are charge stabilized with an average zeta potential of +32 mV (FIG. 5). The presence of long-range electrostatic repulsion in a charged anisotropic system such as nanorods is responsible for generating a disordered porous structure and can be a viable avenue towards simple low temperature fabrication of porous inorganic structures (Heo et al. Nano Lett. 2017, 17, 5756-5761).

Electrochromic Characterization

Figure 7:
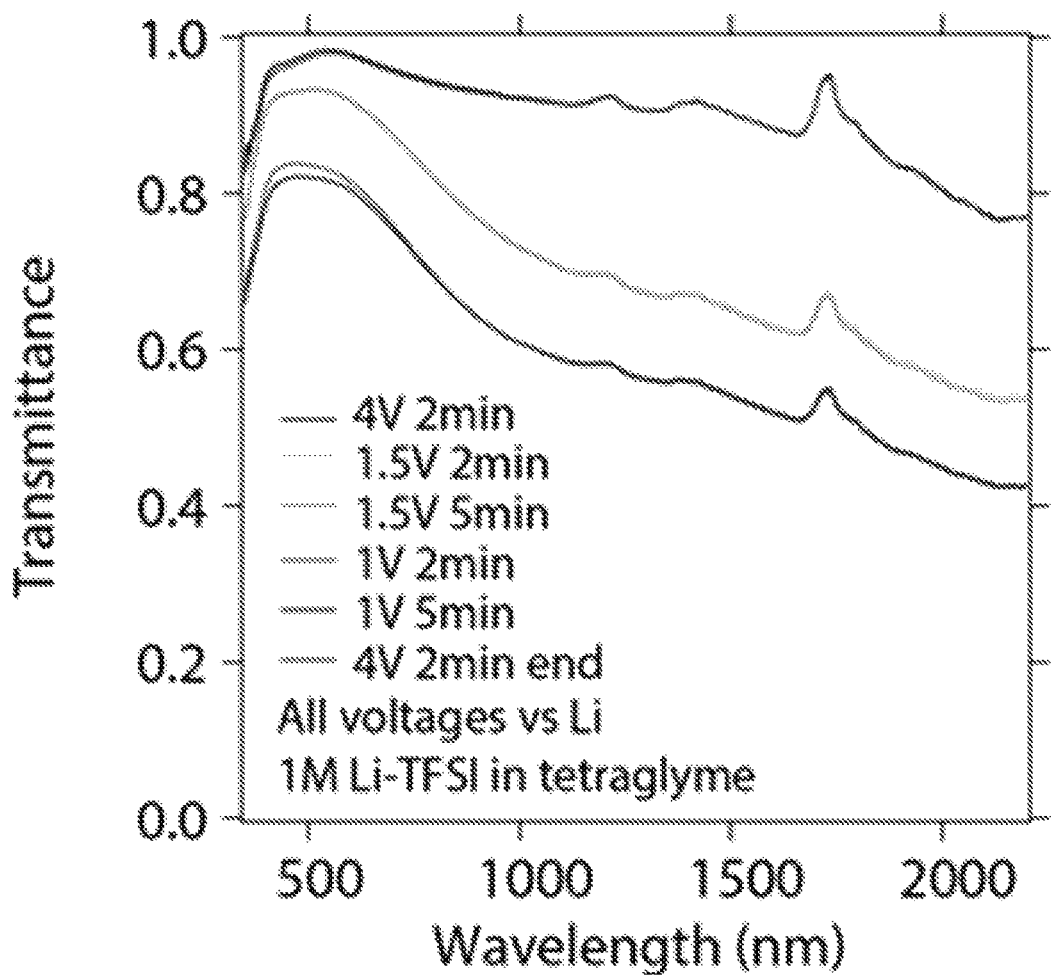
FIG. 7 shows the coloration of the orthorhombic $Nb_2O_5$ nanorod films at voltages of 1.5 V and 1 V.
Figure 8:
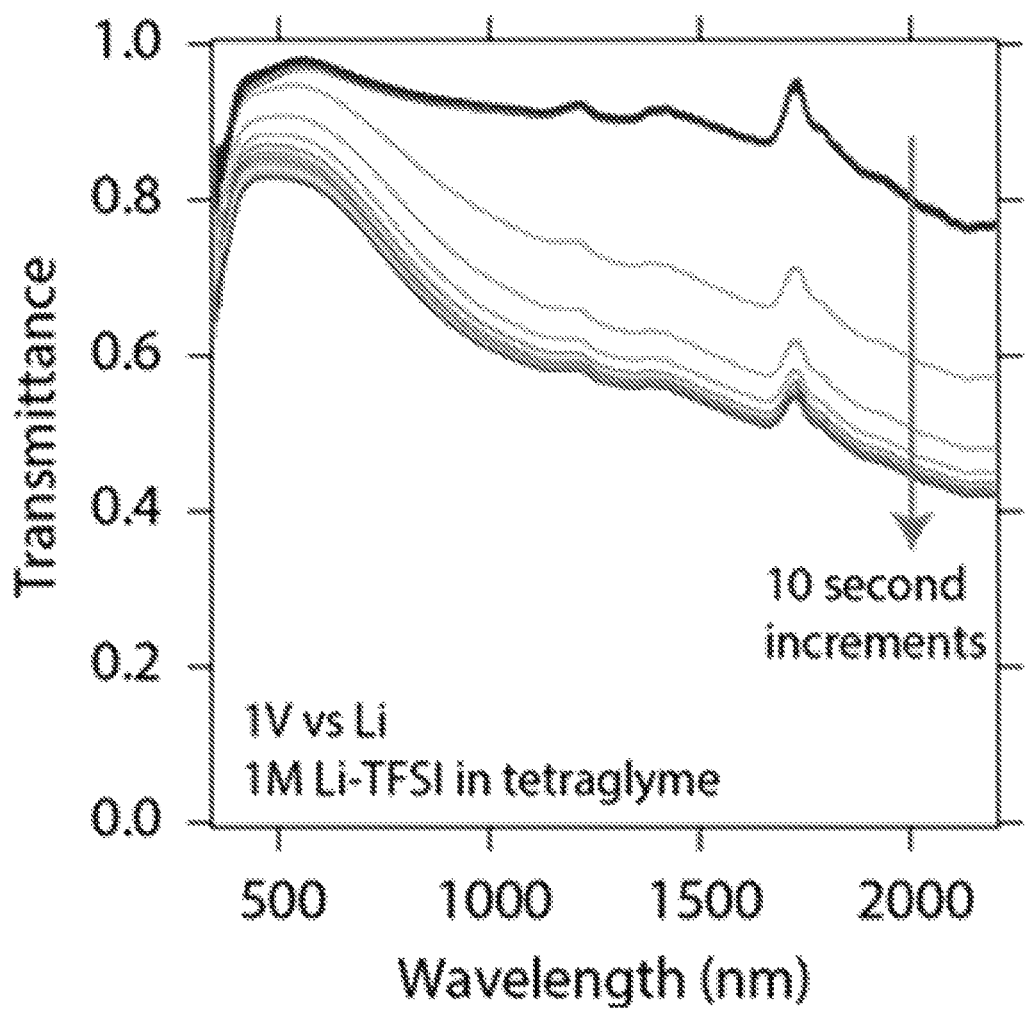
FIG. 8 shows the coloration of the orthorhombic $Nb_2O_5$ nanorod films as a function of time in 10 second increments.
Figure 9:
FIG. 9 is a picture of the orthorhombic $Nb_2O_5$ nanorod film after 1 V charging, showing that the orthorhombic $Nb_2O_5$ nanorod film exhibits a pale blue color after 1 V charging.

For electrochromic characterization, films were first spun on an FTO substrate from a ligand stripped $Nb_2O_5$ dispersion in a 1:1 DMF:ACN solution. The films were then tested in a half-cell configuration with a Li counter electrode by applying an oxidizing and reducing potential of 4 V and 1 V versus Li/Li' in a 1 M Li-TFSI/tetraglyme electrolyte. The system exhibited fast electrochromic response with almost complete coloration within a minute (FIG. 7-FIG. 9).

Figure 10:
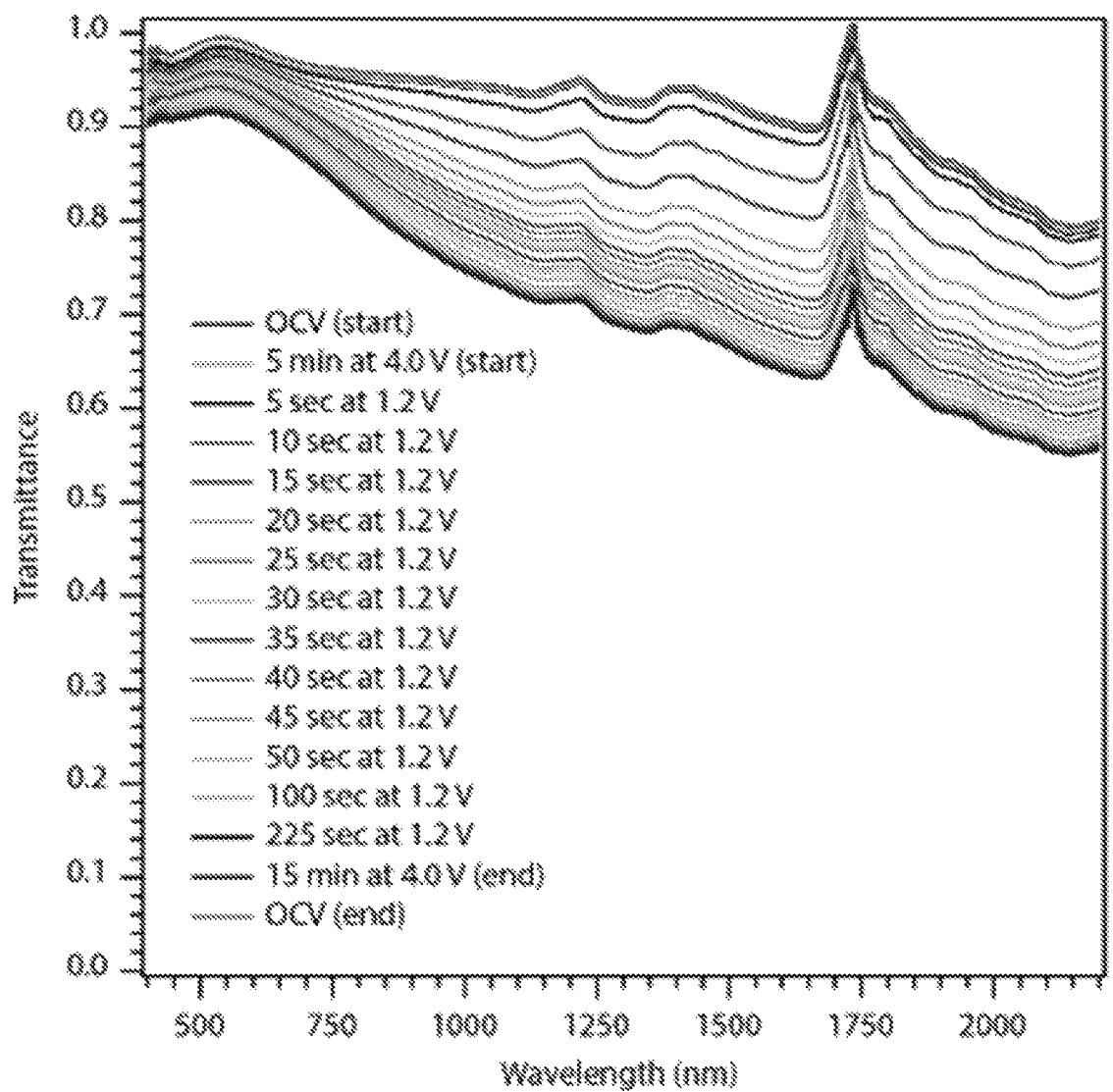
FIG. 10 shows the coloration response of the orthorhombic $Nb_2O_5$ nanorod films in an electrolyte comprising 0.1 M LiTFSI in tetraglyme.
Figure 11:
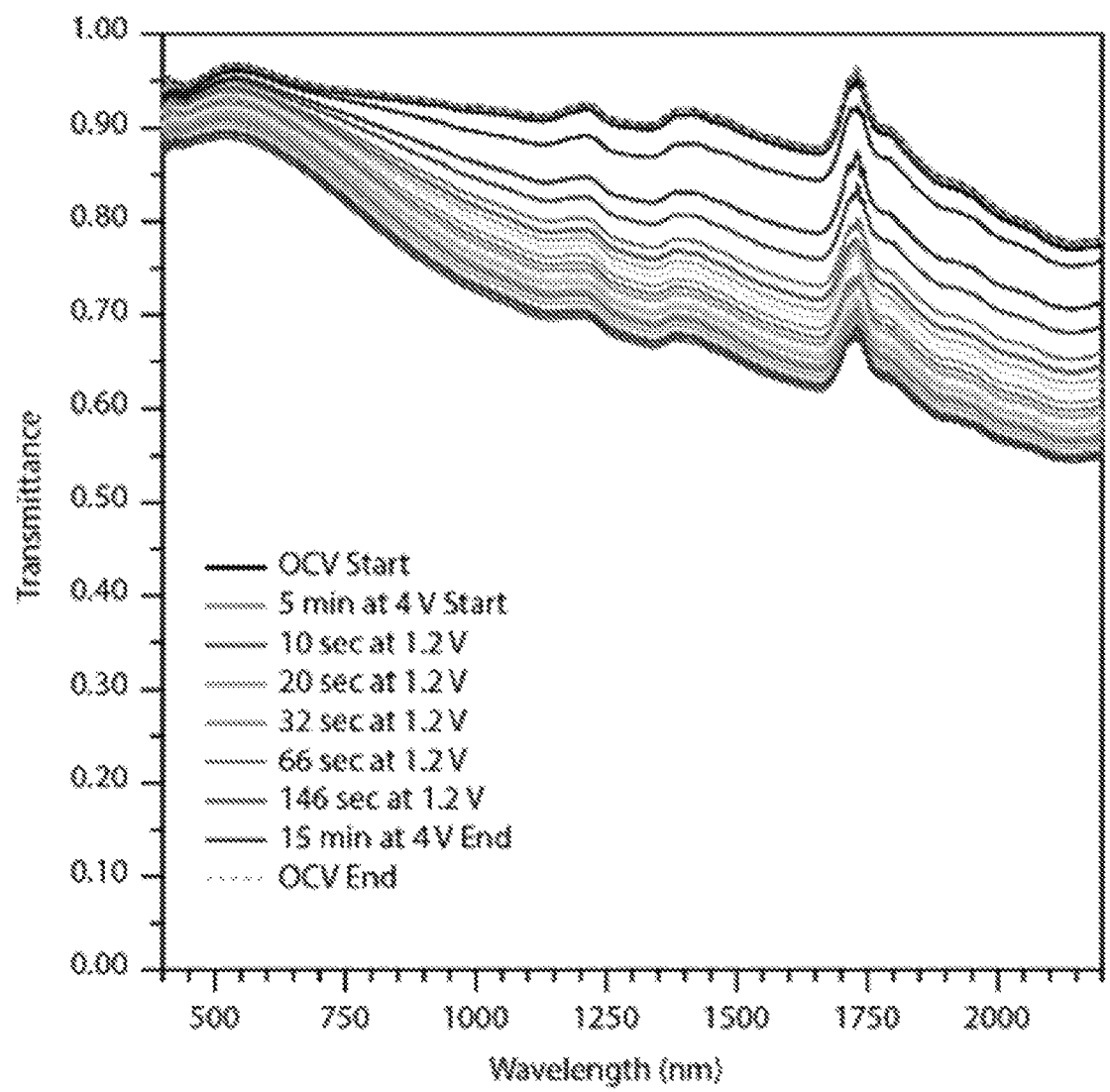
FIG. 11 show the coloration response of the orthorhombic $Nb_2O_5$ nanorod films in an electrolyte comprising 1 M LiTFSI in tetraglyme.
Figure 12:
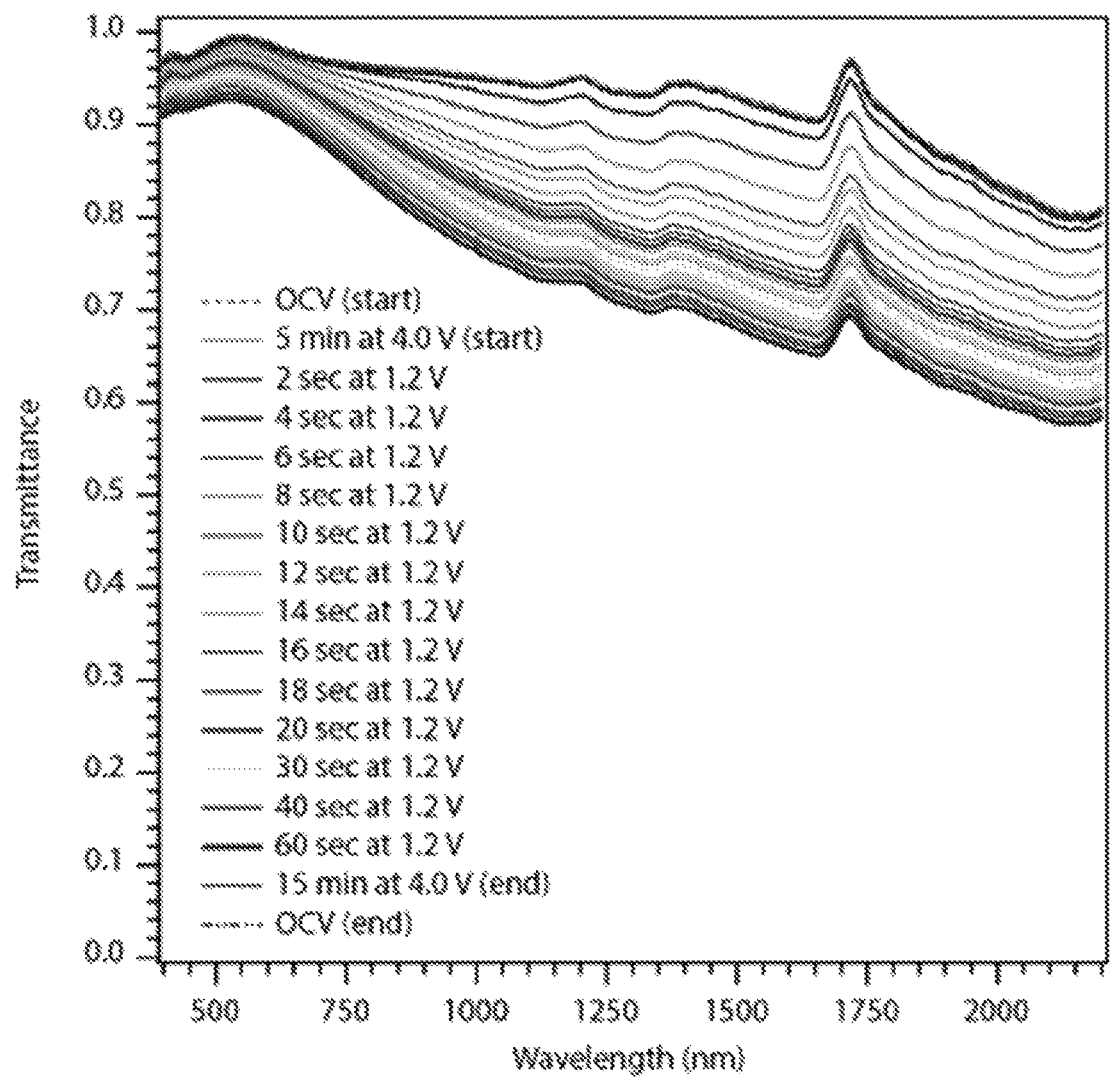
FIG. 12 each show the coloration response of the orthorhombic $Nb_2O_5$ nanorod films in an electrolyte comprising 3 M LiTFSI in tetraglyme.

Additional experiments with 3 M and 0.1 M electrolytes further demonstrated 20 second and 1-minute response times suggesting that, in this system, Li transport in the electrolyte is the primary bottleneck to switching kinetics (FIG. 10-FIG. 12). Similar to amorphous niobium oxide that exhibits coloration in the visible regime, the orthorhombic $Nb_2O_5$ nanorod films exhibits coloration in the visible regime. However, the orthorhombic $Nb_2O_5$ nanorod material also exhibits strong coloration in the near-infrared (NIR).

Figure 13:
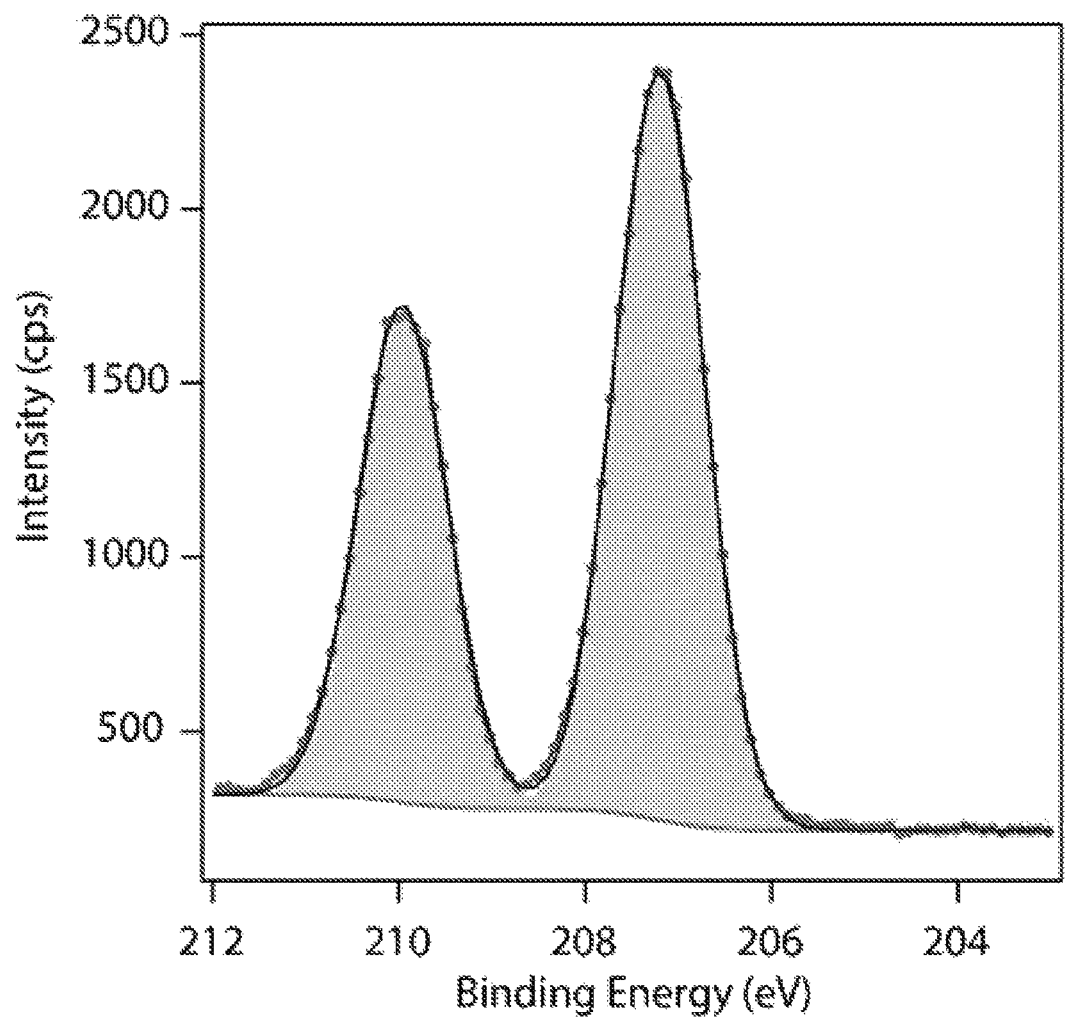
FIG. 13 shows the X-ray photoelectron spectroscopy of $Nb_2O_5$ before charging at 1.2 V.
Figure 14:
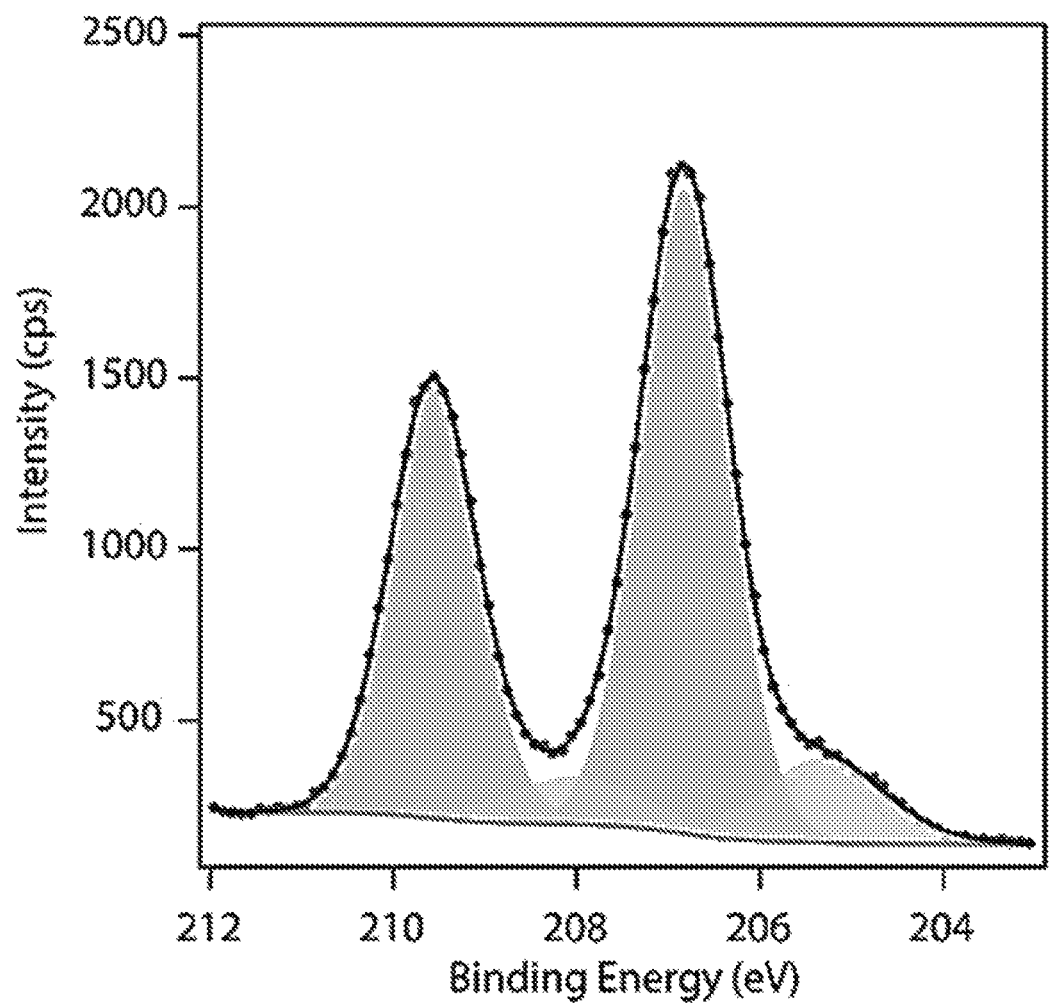
FIG. 14 shows the X-ray photoelectron spectroscopy of $Nb_2O_5$ after charging at 1.2 V.
Figure 15:
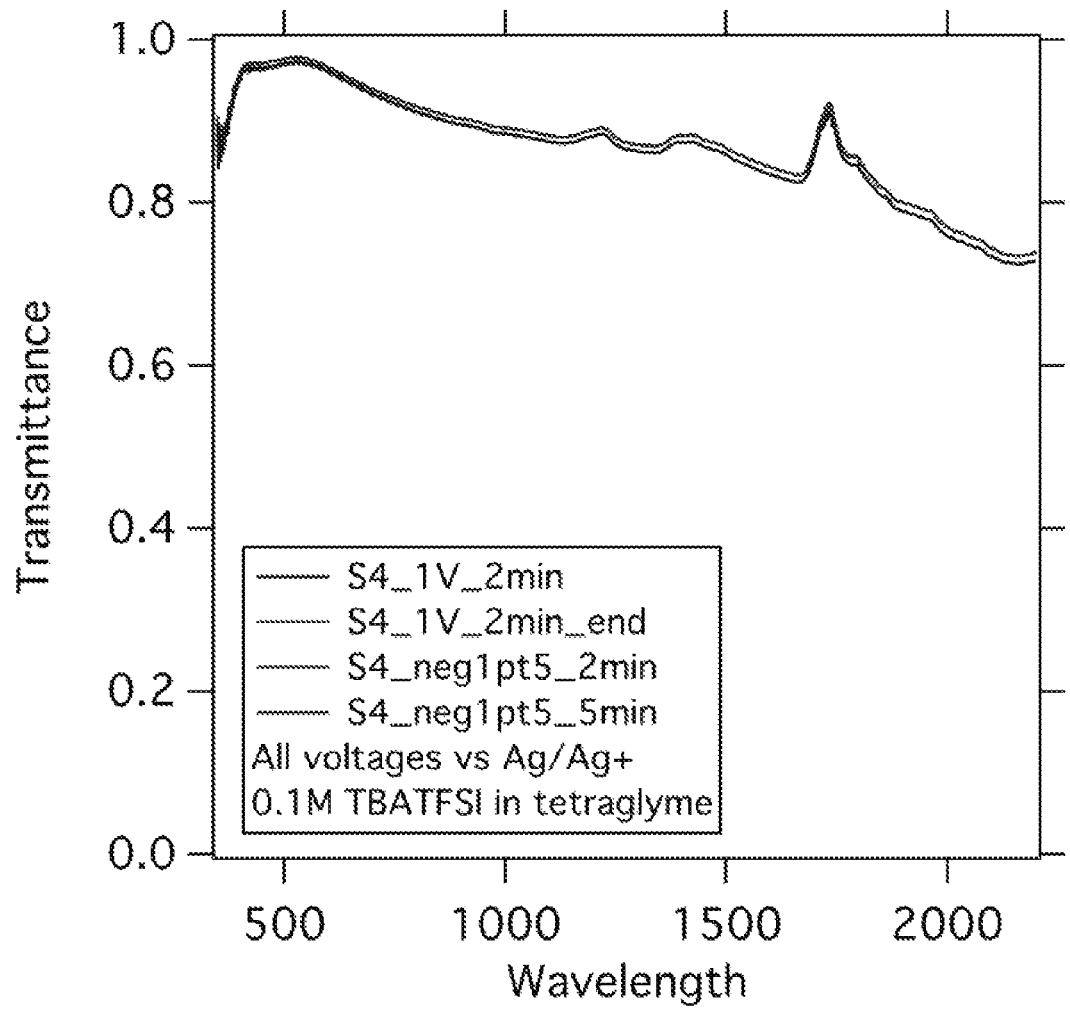
FIG. 15 shows an experiment with the orthorhombic $Nb_2O_5$ nanorod films and tetra-n-butylammonium bis(trifluoromethylsulfonyl)imide (TBA-TFSI), showing no coloration upon charging.

X-ray photoelectron spectroscopic measurements were conducted on the orthorhombic $Nb_2O_5$ nanorod material before and after electrochemical reduction to investigate the nature of the electrochemically induced coloration. The results of the X-ray photoelectron spectroscopy measurements on the orthorhombic $Nb_2O_5$ nanorod material clarified the redox changes that underlie the coloration phenomena in both the visible and NIR regimes. Specifically, a reduction of Nb from a +5 to +4 state was observed, which is known to be responsible for visible coloration in niobium oxides upon lithiation (FIG. 13-FIG. 14). Since no coloration was observed by purely capacitive charging (utilizing a tetra-n-butylammonium bis(trifluoromethylsulfonyl)imide (TBA-TFSI) electrolyte), the optical response in the infrared region can also be ascribed to $Li^+$ intercalation (FIG. 15).

Cyclic Stability

Figure 16:
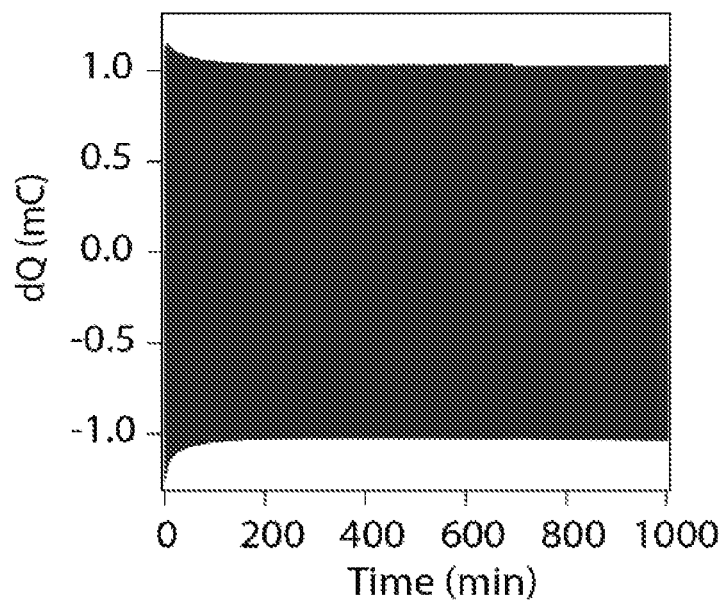
FIG. 16 shows the cyclic stability of $Nb_2O_5$ thin films demonstrating excellent stability over a 1000 minute period with a 1 minute charging and 1 minute discharging cycle, equating the 1000 minute period to 500 cycles.

One of the key figure of merit for an electrochromic device is its cyclic stability upon subjugation to multiple cycles of charge and discharge. The prototypical electrochromic material, $WO_3$, for instance, suffers from cyclic stability in the absence of specific surface modification to impart stability. Furthermore, previous attempts on engineering $Nb_2O_5$ electrochromics have also been hampered by the poor durability of this material upon multiple cycles of lithiation and delithiation. As shown in FIG. 16, the orthorhombic nanocrystal $Nb_2O_5$ materials described herein alter this paradigm as the orthorhombic $Nb_2O_5$ nanorod films exhibited a cyclic stability that is essentially stable within the 500 cycles that were tested.

Example 2

Existing niobium oxide electrochromic materials suffer from their sluggish lithiation rate and insulating-to-semiconducting nature, leading to slow electrochromic response. To facilitate the electronic and lithium transport of niobium oxides, appropriate design of their crystal structure and stoichiometry was considered. The electronic conductivity of niobium pentoxide can be increased upon introducing $Nb^{4+}$ and oxygen vacancies into its crystal lattice (Cava et al. Phys. Rev. B 1991, 44, 6973-6981). Among the non-stoichiometric niobium pentoxide polymorphs, $Nb_{12}O_{29}$ ($Nb^{4+}{}_2Nb^{5+}{}_{10}O_{29}$) shows the largest electronic conductivity with metallic property at room temperature. Furthermore, the monoclinic $Nb_{12}O_{29}$, its metastable phase at lower temperature, exhibits mostly vertex-shared niobium oxygen octahedra arranged into a Wadsley-Roth shear structure. The relatively open structural motifs in this crystal structure can serve as lithium sites and diffusion channels for fast lithiation upon switching. On the other hand, the electrochromic response of $Nb_{12}O_{29}$ can vary from the traditional $Nb_2O_5$ since the incorporation of $Nb^{4+}$ with $4d^1$ valence electron can change the polaronic absorption of niobium oxides, or moreover, can show a plasmonic response due to the metallic property of $Nb_{12}O_{29}$. Strain accommodation in materials to withstand volume expansion upon lithium intercalation can be a necessary consideration for long-term operation for electrochromic devices. In this regard, an anisotropic morphology can be preferred for their potential to accommodate large volume expansion.

To utilize the above advantages of $Nb_{12}O_{29}$ in electrochromic applications, a colloidal synthesis showing control over crystal structure and stoichiometry was designed with monoclinic $Nb_{12}O_{29}$ nanoplates as the paradigm product. The films based on monoclinic $Nb_{12}O_{29}$ nanoplates exhibited porous morphology due to their anisotropic morphology and surface modification to introduce electrostatic repulsion. Fast and reversible electrochromic response upon lithiation was observed for the investigated films. Furthermore, these films showed strong modulation in both visible and NIR region, unlike other studied niobium oxides.

Methods

Nanocrystal Synthesis

The synthesis of niobium oxide ($Nb_{12}O_{29}$) nanoplates was designed based on colloidal synthesis method and conducted in an inert environment using Schlenk line technique. A hot-injection method was used to initiate the synthesis at designated temperature. In a typical synthesis, 0.405 g of $NbCl_5$ powder (1.5 mmol, Aldrich 99.995%) and 4.237 g of oleic acid (15 mmol, Aldrich 90%) were mixed in a flask until the $NbCl_5$ powder was dissolved, forming a blood red solution of niobium oleate complex. Afterwards, this solution was degassed at 120° C. for 30 min and the color gradually changed to orange during this process. In the meantime, 11.298 g of oleic acid (40 mmol, Aldrich 90%) and 2.140 g of oleylamine (8 mmol, Acros Organics) were mixed in another flask, degassed at 120° C. for 30 min, heated to 300° C. and kept at this temperature. Once the degassing procedure for the niobium oleate complex was finished, the orange solution was injected into the flask containing the mixture of oleic acid and oleylamine at 300° C., and the mixture reacted for 10 min to obtain the $Nb_{12}O_{29}$ nanoplates. After that, the nanocrystal solution was purified with a washing procedure using toluene as a solvent for dispersion and isopropanol as an anti-solvent for flocculation. The final product of $Nb_{12}O_{29}$ nanoplates was dispersed in toluene after washing.

Ligand Stripping

For the ligand-stripping procedure of $Nb_{12}O_{29}$ nanoplates, 30 mg of $Nb_{12}O_{29}$ nanoplates were dispersed in 3 ml of hexane; 30 mg of nitrosonium tetrafluoroborate (Aldrich 95%) was dissolved in 3 ml of DMF and this solution was gradually added into the nanoplate solution. The mixed solution was stirred for 30 min, after which the upper solution, comprising most of the ligand-capped nanoplates in hexane, was removed. The ligand-stripped nanoplates in DMF were purified with a washing process using DMF as a solvent and toluene as an anti-solvent. The final ligand-stripped nanoplates were dispersed in DMF at a concentration of 50 mg/ml.

Thin Film Deposition

Ligand-stripped $Nb_{12}O_{29}$ nanoplates (30 µl) were drop-cased onto FTO-coated glass substrates, which were then dried at 150° C. for 30 min. The active area was controlled using a razor blade to be 1.5×1.5 $cm^2$. The same procedure was conducted on silicon substrates for imaging purposes.

Scanning Electron Microscopy

Scanning electron microscopy (SEM) and scanning transmission electron microscopy (STEM) images were collected using Hitachi S5500 SEM/STEM at 30 kV. Nanoplates were imaged in bright-field STEM mode by dropping the diluted nanoplate solution (before ligand stripping) on Type-A ultrathin carbon (Ted Pella, 01822, 400 mesh) copper TEM grids. Nanoplate thin films on silicon substrates were imaged in SEM mode.

X-Ray Diffraction (XRD)

Diffraction patterns of $Nb_{12}O_{29}$ nanoplates were collected on a Rigaku R-Axis Spider using Cu $K_\alpha$ radiation (1.54 Å). Nanoplate solutions were dried into powder and mounted on a cryoloop using mineral oil.

Spectroelectrochemical and Standard Electrochemical Measurements

Electrochemical and in-situ optical measurements were performed in a spectroelectrochemical cell in an Ar glovebox. In a typical measurement, the nanoplate thin film on FTO-coated glass was immersed into the electrolyte as the working electrode, while Li foil was also immersed into the electrolyte serving as the counter electrode. Electrolyte was prepared in an Ar glovebox and comprised 1 M of lithium bis(trifluoromethanesulfonyl)imide (LiTFSI) in anhydrous tetraglyme. Electrochemical data were collected using an electrochemical workstation (Bio-logic VMP3 potentiostat); meanwhile, in-situ optical data were collected using an ASD Quality Spec Pro spectrometer. Potential was applied to the cell by chronoamperometry (CA).

Results and Discussion

Figure 17:
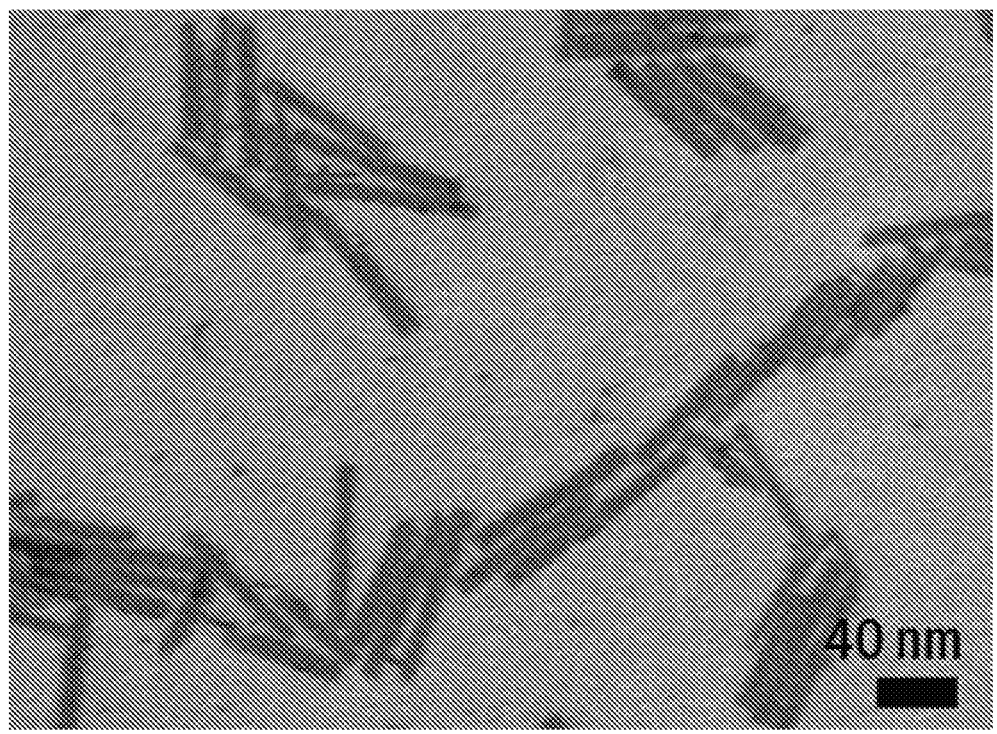
FIG. 17 is a STEM image of the as-synthesized $Nb_{12}O_{29}$ nanoplates.
Figure 18:
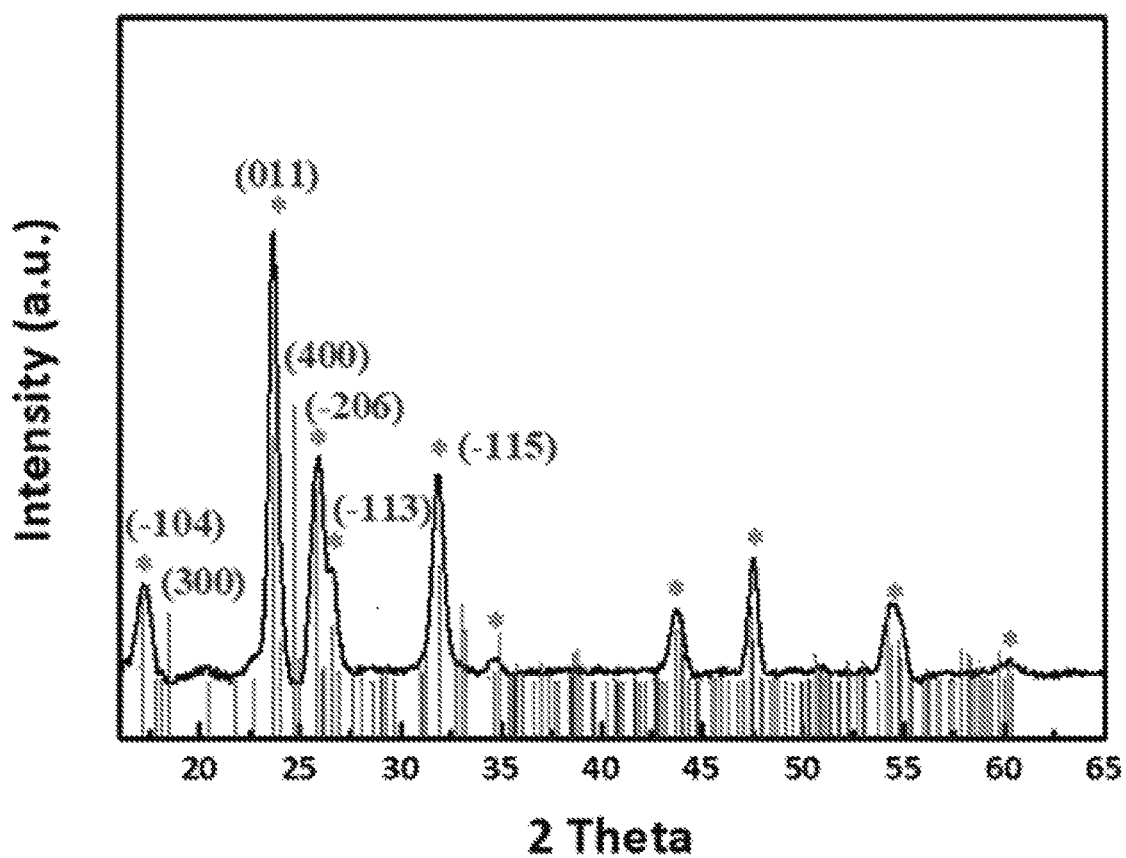
FIG. 18 is the XRD pattern of the as-synthesized $Nb_{12}O_{29}$ nanoplates demonstrating crystallinity in the monoclinic phase (monoclinic $Nb_{12}O_{29}$ reference is provided PDF #01-073-1610).
Figure 19:
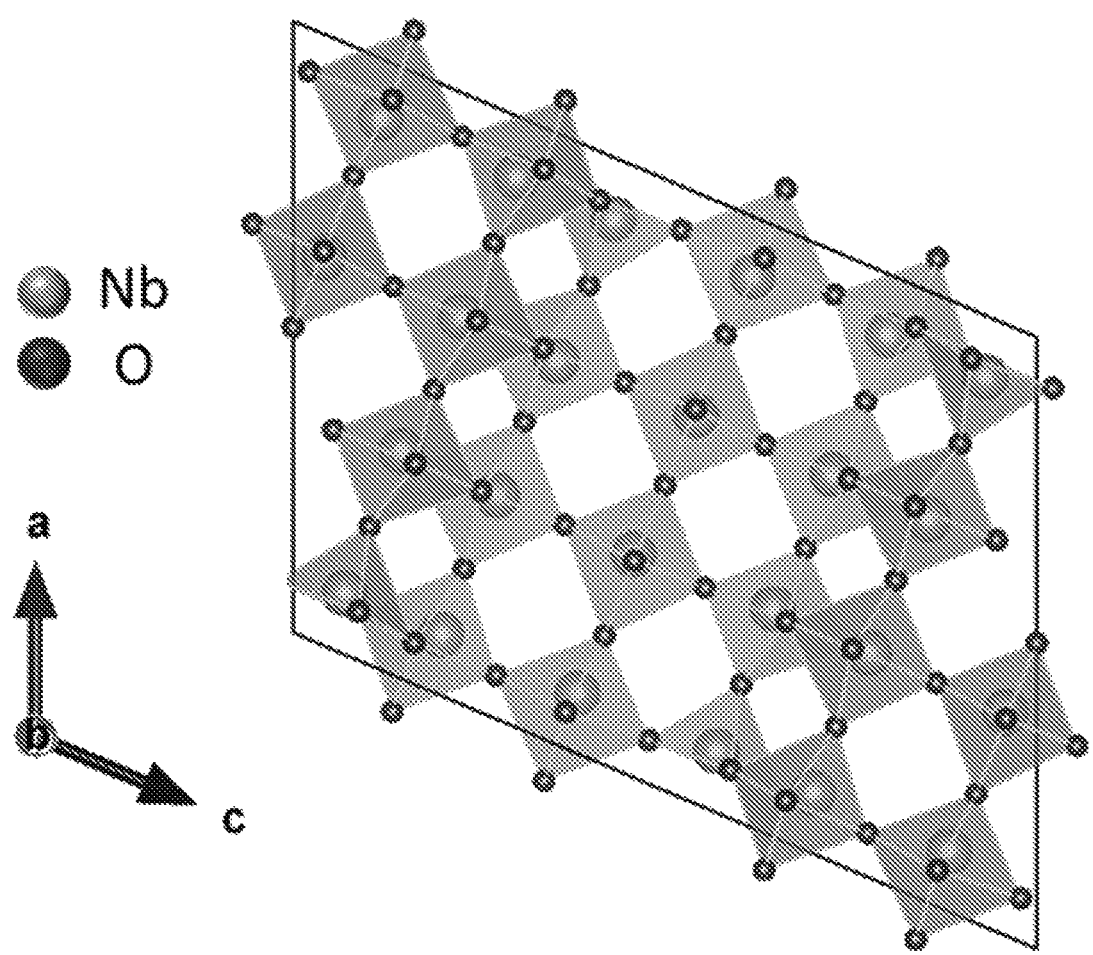
FIG. 19 is the crystal structure demonstrating the unit cell of monoclinic $Nb_{12}O_{29}$.

Nanocrystal Synthesis and Characterization $Nb_{12}O_{29}$ nanoplates were synthesized by injecting the preformed niobium oleate complex into a hot bath containing oleic acid and oleylamine. The STEM image in FIG. 17 shows the as-synthesized nanoplates with average length of 95 nm, width of 9.4 nm, and aspect ratio of 10.1. The XRD pattern of the nanoplates in FIG. 18 demonstrate that these nanoplates are in monoclinic phase with non-stoichiometric chemical formula of $Nb_{12}O_{29}$. The absence of diffraction peaks in a-axis ([400] and [300]) suggests that the nanoplates are elongated only in b- and c-axis (FIG. 18). The unit cell of monoclinic $Nb_{12}O_{29}$ is shown in FIG. 19; nanoplates are expected to be a Wadsley-Roth shear structure, showing mostly vertex-shared niobium oxygen octahedra with incorporation of oxygen vacancies and $Nb^{4+}$ in crystal lattice (Waldron et al. *J. Am. Chem. Soc.* 2001, 123, 5833-5834).

Formation of Porous Films

Figure 20:
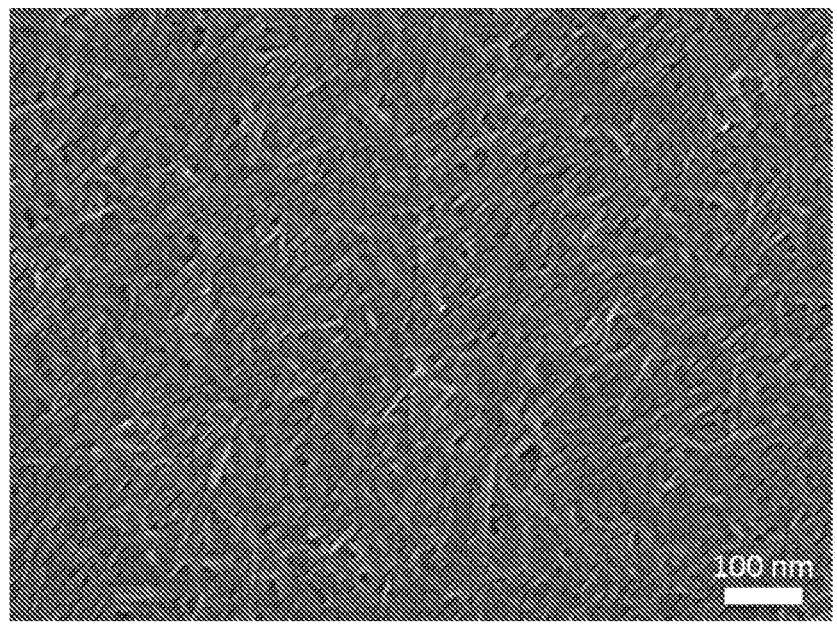
FIG. 20 is a SEM image of a film comprising ligand-stripped $Nb_{12}O_{29}$ nanoplates.

The organic ligands on the $Nb_{12}O_{29}$ nanoplates were stripped from the surface and replaced by a charged surface stabilized in DMF. Electrostatic repulsion provided by DMF and nitrosonium tetrafluoroborate between the $Nb_{12}O_{29}$ nanoplates allows a porous film morphology to be generated using solution-based coating (Heo et al. *Nano Lett.* 2017, 17, 5756-5761). A SEM image of a $Nb_{12}O_{29}$ nanoplate film with a thickness of 170 nm is shown in FIG. 20. The electrostatic repulsion between the ligand stripped $Nb_{12}O_{29}$ nanoplates creates a disordered porous morphology on the substrate upon drop casting. As compared to the $Nb_2O_5$ nanorod film (see Example 1), the $Nb_{12}O_{29}$ nanoplate film is relatively compact because of the lower aspect ratio of nanoplates.

Electrochromic Characterization

Figure 21:
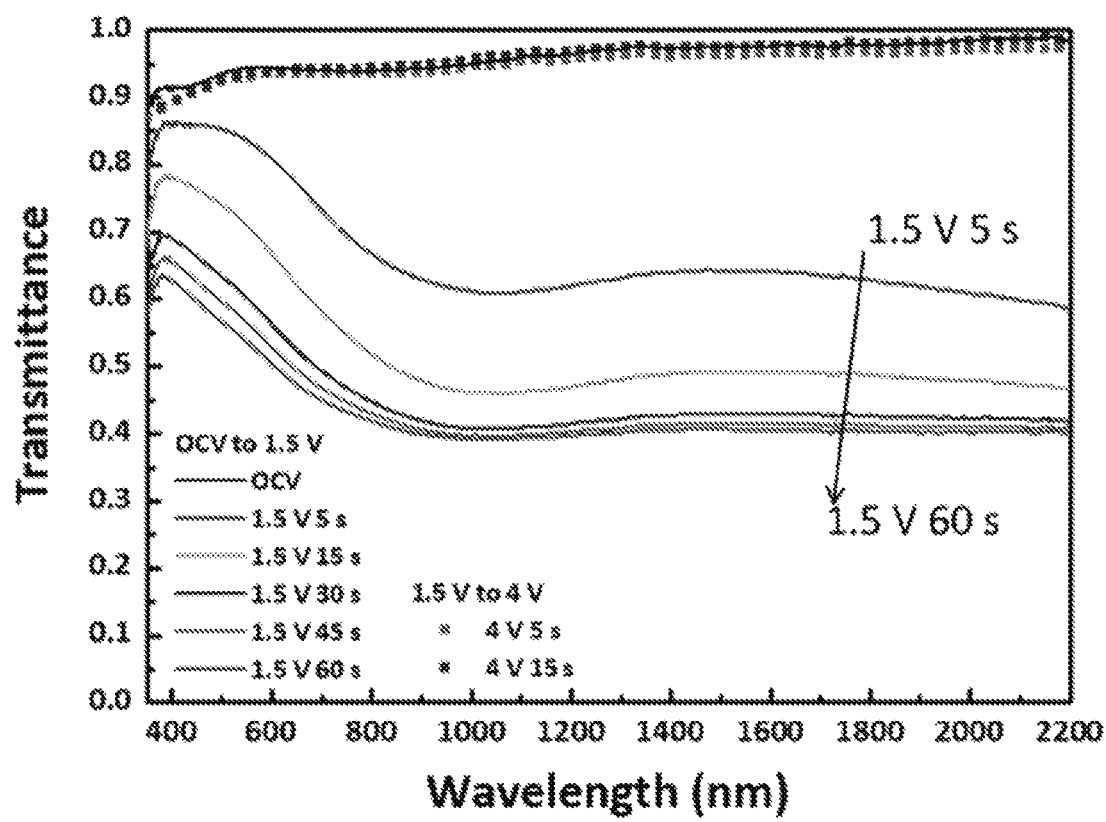
FIG. 21 shows the coloration response of the monoclinic $Nb_{12}O_{29}$ nanoplate films in an electrolyte comprising 1 M LiTFSI in tetraglyme.
Figure 22:
FIG. 22 is a photograph of niobium (V) chloride and oleic acid (1:5.5 molar ratio) dissolved in octadecene at room temperature.
Figure 23:
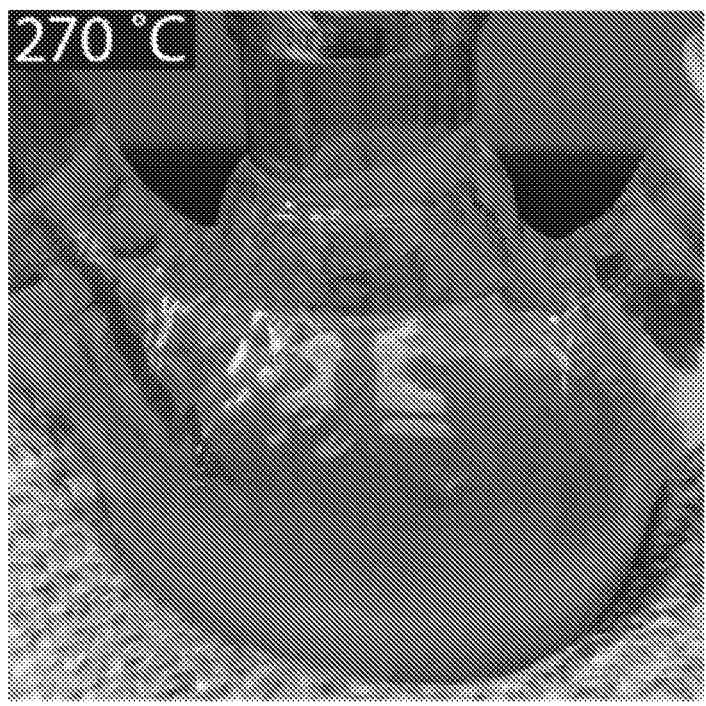
FIG. 23 is a photograph of the niobium (V) chloride and oleic acid (1:5.5 molar ratio) dissolved in octadecene reaction mixture at 270° C.
Figure 24:
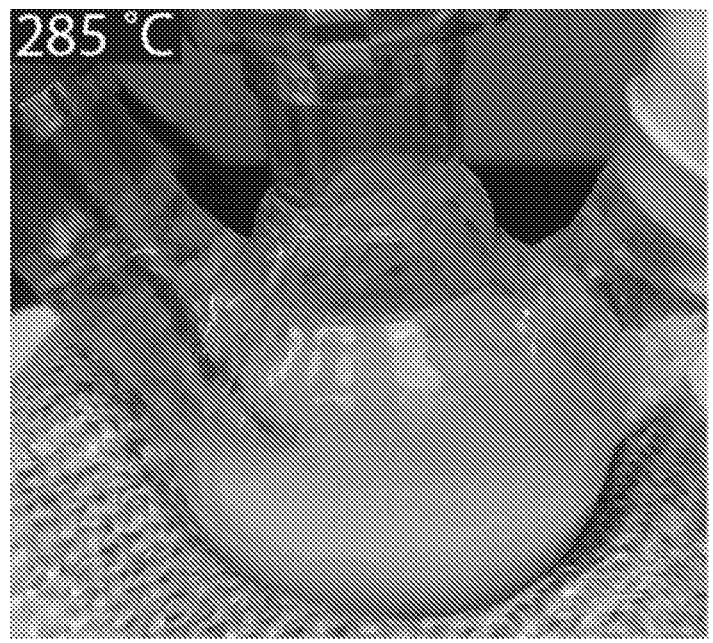
FIG. 24 is a photograph of the niobium (V) chloride and oleic acid (1:5.5 molar ratio) dissolved in octadecene reaction mixture at 285° C.
Figure 25:
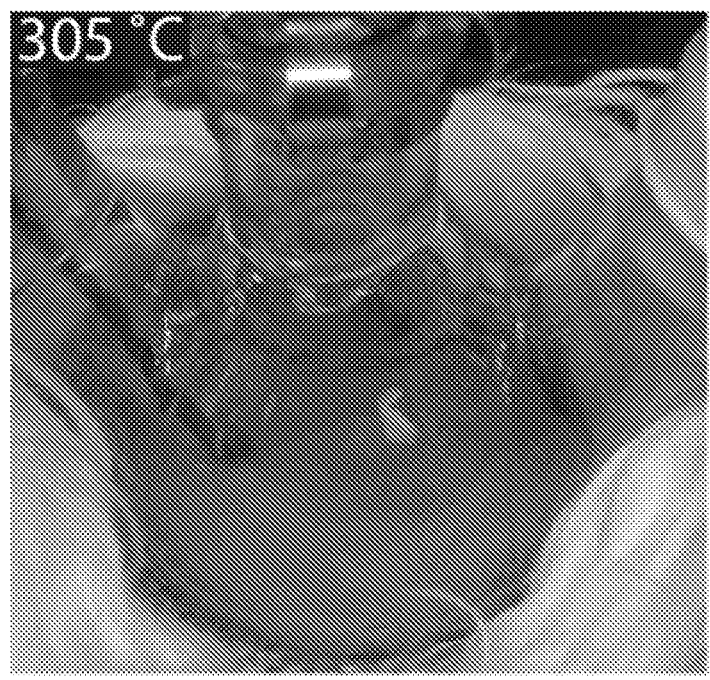
FIG. 25 is a photograph of the niobium (V) chloride and oleic acid (1:5.5 molar ratio) dissolved in octadecene reaction mixture at 305° C.
Figure 26:
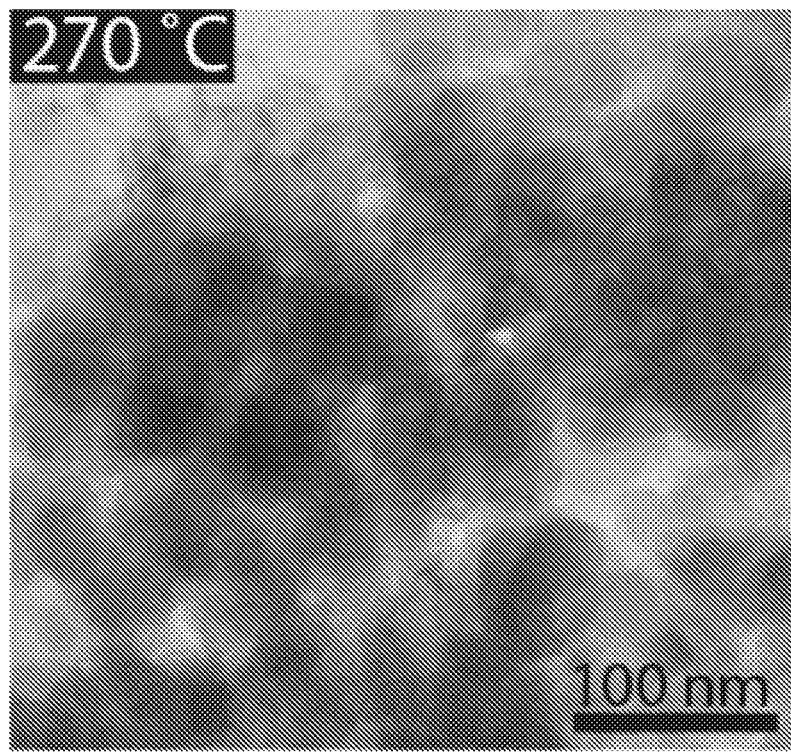
FIG. 26 is a scanning transmission electron microscopy (STEM) image of the product obtained at 270° C.
Figure 27:
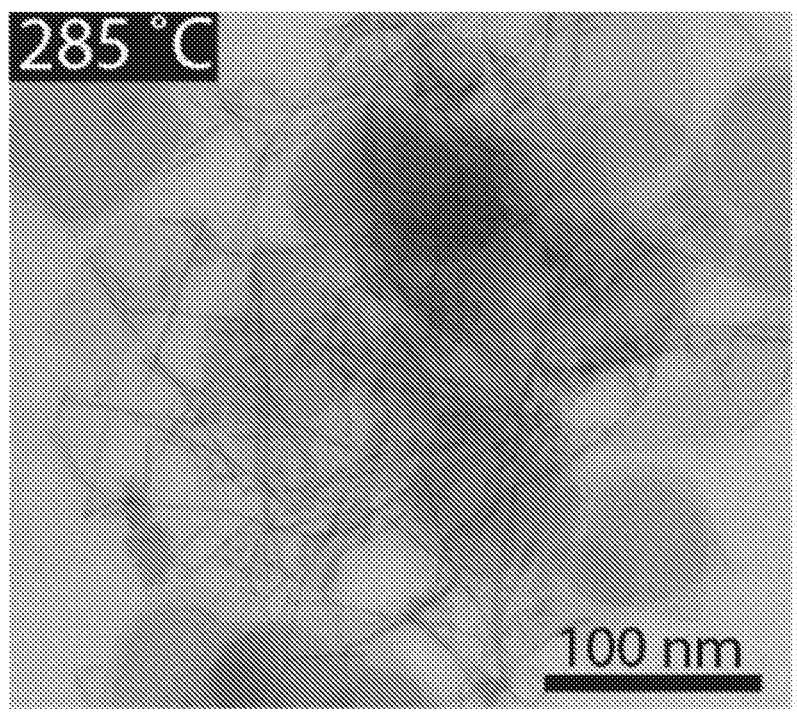
FIG. 27 is a STEM image of the product obtained at 285° C.
Figure 28:
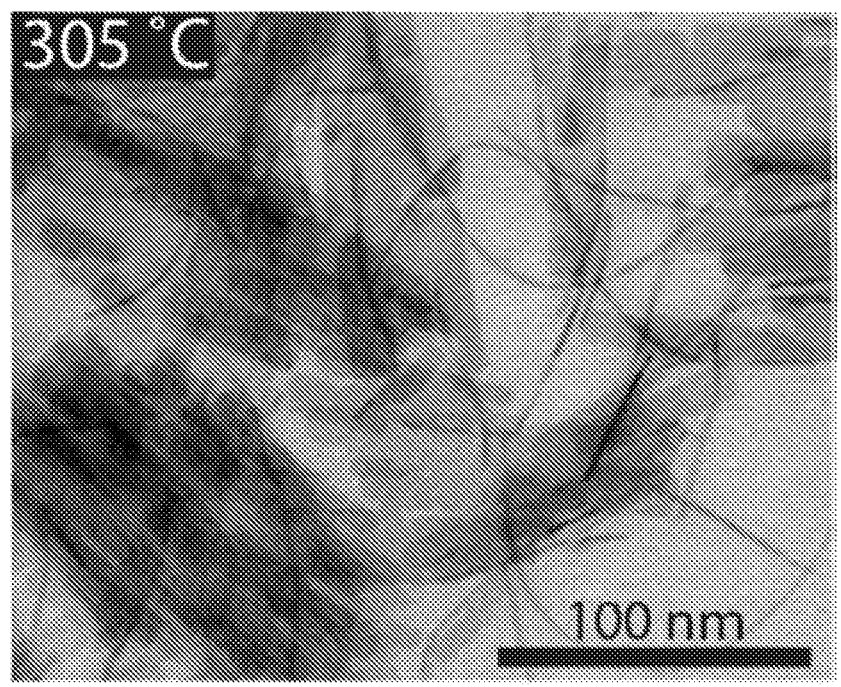
FIG. 28 is a STEM image of the product obtained at 305° C.
Figure 29:
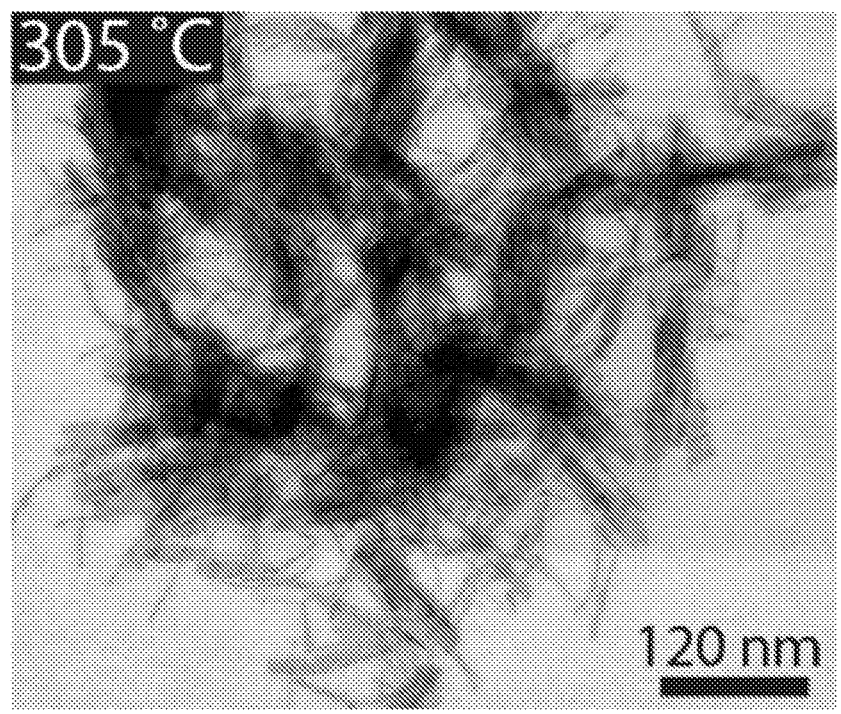
FIG. 29 is a STEM image of the product obtained at 305° C. at lower magnification.
Figure 30:
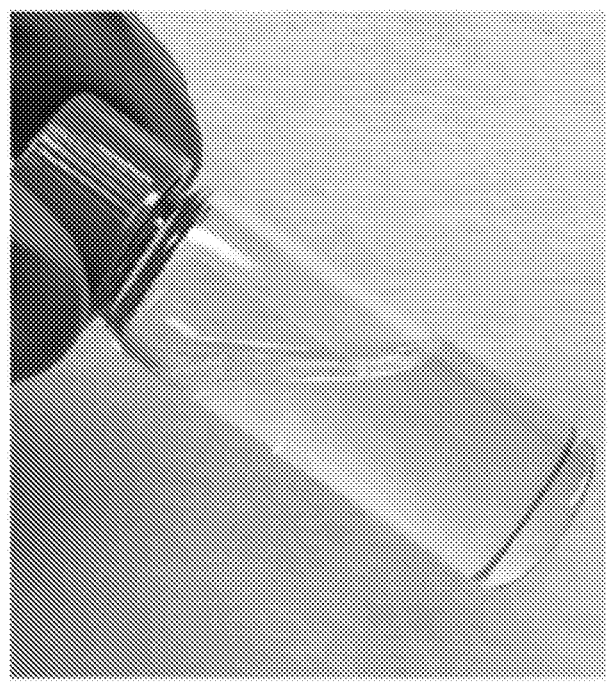
FIG. 30 is a photograph of the $Nb_2O_5$ nanorod colloid dispersed in toluene.
Figure 31:
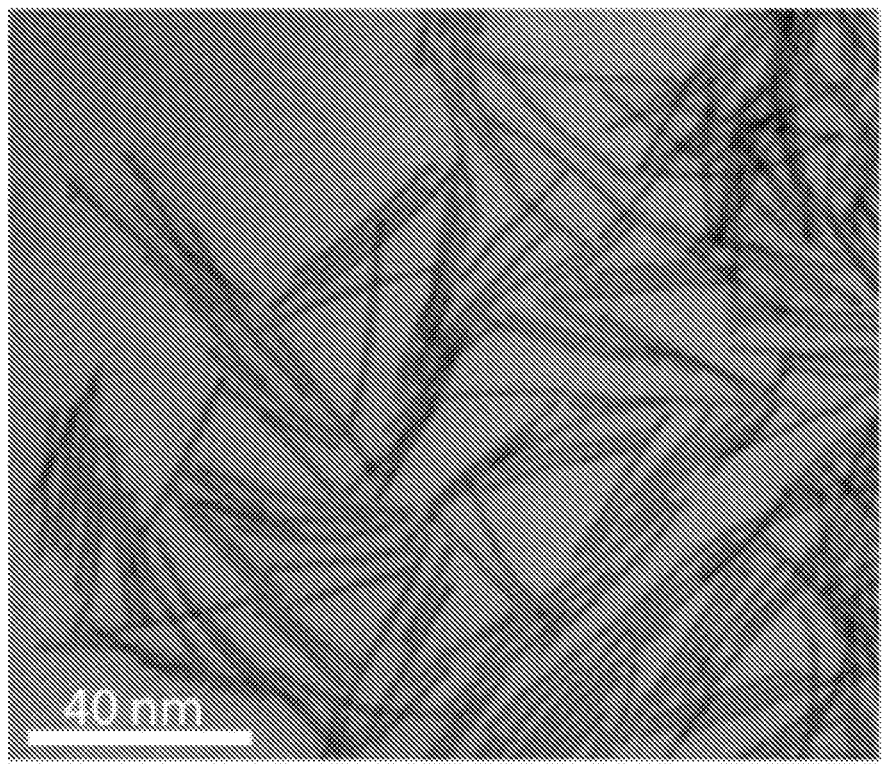
FIG. 31 is a STEM image of the $Nb_2O_5$ nanorods.

A 170 nm thick film of ligand-stripped $Nb_{12}O_{29}$ nanoplates on FTO-coated glass was used throughout the electrochromic measurements as the working electrode in a three-electrode configuration with Li foil as the counter electrode. Potential applied to the system was referenced to $Li/Li^+$ in a 1 M LiTFSI/tetraglyme electrolyte. As shown in FIG. 21, upon applying 1.5 V to the cell, the $Nb_{12}O_{29}$ nanoplate film showed electrochromic modulation across visible and NIR region with a blue tint. Fast coloration, saturated within a minute, was observed for the $Nb_{12}O_{29}$ nanoplate film. Meanwhile, reduction current in chronoamperometry was recorded, indicating the reduction of $Nb^{5+}$ into $Nb^{4+}$ accompanied by lithium intercalation. In the reversed process, 4 V was applied to the cell and bleaching of the tested $Nb_{12}O_{29}$ nanoplate film was complete within 15 seconds. Among the reported electrochromic niobium oxides, modulation is either dominant in visible region (amorphous) or in NIR region (crystalline). However, for the $Nb_{12}O_{29}$ nanoplate film tested herein, an almost even transmittance change between 900 nm and 2200 nm, and a smaller change in visible region, was observed. This is the first example of a niobium oxide material that shows strong modulation both in visible and NIR region.

Example 3

Within the context of materials with tunable optical properties, particularly in the subfield of smart windows electrochromic materials are of interest for their ability to exhibit on-demand change in optical properties upon application of an electrochemical bias. These devices can be used to modulate light transmission through windows based on application of charge with full reversibility. Established electrochromic materials are largely based on tungsten oxide, which suffers from issues of electrochemical and photochemical stability as well as charging kinetics on top of issues of abundance.

Electrochromic devices are used to modulate light transmittance by electrochemical charging or discharging of an active material. Due to the electrochemical nature of the phenomenon, the process can be slow and lead to degradation of the material over time. In application however, an electrochromic material must exhibit fast switching characteristics that are reversible with durability over thousands of cycles.

Current electrochromic technologies rely primarily on variants of tungsten oxide ($WO_{3-x}$) with only a small usage of niobium oxide, despite both materials having been explored as traditional electrochromic materials and niobium having a >10× abundance as a mineral resource (20 ppm vs 1.5 ppm in the Earth's crust). This is due to the latter's poor coloration kinetics and electrochemical durability prohibiting cyclic use. Current methods to synthesize niobium oxide usually rely on hydrothermal processes that yield micron-sized colloids or vacuum processes that yield thin films with limited control over porosity and crystal morphology. While the former allows tuning of crystal shape and dimensionality, the micrometer size prohibits film casting into films with high optical quality and low haze. The latter suffers from the inverse problem, with easy production of films of high optical quality, but difficult control of crystal shape and dimensionality.

Disclosed herein are colloidal niobium oxide nanocrystals that when deposited as a porous film act as an electrochromic layer with reversible coloration under applied bias, fast charging kinetics, and good electrochemical durability. The films described herein utilize deliberately nanostructured niobium oxide nanocrystals which predominantly present known planes for fast Li ion diffusion in a form factor that facilitates generation of intrinsic porosity and has inherent strain tolerance for good electrochemical durability.

By synthesizing colloidal nanocrystals of niobium oxide, colloids were generated that can yield films of high optical quality with two different niobium oxide crystals, $Nb_2O_5$ nanorods and monoclinic $Nb_{12}O_{29}$ nanoplates. The nanorod morphology of the $Nb_2O_5$ nanocrystals is tailored to take advantage of known fast Li ion diffusion pathways in the material and allow for fast kinetics and effective strain relaxation to avoid degradation, while introducing $Nb^{4+}$ and oxygen vacancy into nanoplates enhances the electrical conductivity that also leads to fast kinetics with additional feature of unique optical response upon coloration. Specifically, the niobium oxide nanocrystals were engineered i) with a long axis along the planes of fast Li ion diffusion to allow fast switching kinetics, and ii) into an anisotropic morphology to provide intrinsic porosity in the film as well strain accommodation during Li ion intercalation to provide stable electrochemical durability. Coupled with the nanocrystal ink form of the material that can be adopted into roll-to-roll and other solution-based processes, this material offers new properties previously not observed for niobium oxide electrochromic films in a form factor that is scalable and useful for applications from smart windows and batteries to optical filters, displays and sensors.

The technology described herein is based on nanoengineered niobium oxide and can be tailored to deliver a high durability, fully reversible, ultra-fast charging electrochromic films with the additional benefit of compatibility with solution based processes and improved color neutrality. The system described is capable of ultrafast electrochromic response (sub-30 seconds for near complete switching or sub-10 seconds by conventional 75% optical range electrochromic standards), alongside ultra stable (flat charge capacity upon cycling) durability. Coloration is more neutral than tungsten oxide and no unintended photochromic effect is present under ultraviolet light exposure.

The resulting system makes niobium oxide a viable electrochromic material by removing previous material limitations of kinetics and durability. The resulting material is several times faster than the conventional systems (not only comparing to other strategies for niobium oxide, but considering all known electrochromic films), has the potential to meet code standards for 50-100 k electrochemical cycles, thermal cycles, and is made with a material that is also 10× more abundant than the incumbent tungsten oxide electrochromic material. Furthermore, this material circumvents the photochemical instability of tungsten oxide electrodes.

Electrochromic films composed of niobium oxide ($Nb_2O_5$) are one of the earliest electrochromic materials explored. However, the material was considered unsuitable for widespread use due to its slow kinetics of coloration and poor electrochemical durability. The nano-engineering niobium oxide materials described herein changes the overall ensemble properties of this material and imparts the necessary kinetics and durability into this 'old' electrochromic material to make it viable for actual usage.

Described herein is a form of colloidal niobium oxide nanocrystal ink that upon being coated to form films, acts as a fast switching and durable electrochromic material. Specifically, the nanocrystal morphology can be tuned to exploit pathways of fast lithium transport that is intrinsic to the orthorhombic niobium oxide crystal structure. The material design applied to this system allowed system specifics such as a 10 second coloration time and at least 500 electrochemical cycles with no signs of degradation. Coupled to the nanocrystal ink form of the material, the material is also suitable for solution deposition and even roll-to-roll processing of electrochromic films.

Besides the advantages listed above, compared to the established electrochromic material tungsten oxide, the niobium oxide nanocrystal electrochromic materials described herein have a more favorable color when charged and circumvent unwanted photoinduced coloration. In the first case, tungsten oxide has a deep blue color that is not preferred and must be compensated for by a brown coloration, usually accomplished with a brown coloring counter electrode film, such as NiO. However, a blue tint often remains, at least at some stages of coloration. $Nb_2O_5$ nanorod films have a more neutral color when charged, making it easier to achieve a visually pleasing, neutral tint at all stages of darkening. In addition, tungsten oxide is well-known to undergo a photodarkening effect under ultraviolet exposure, particularly when in contact with organic (e.g. solution, polymer, or gel) electrolytes. This photochromic process degrades the electrolyte, can lead to accumulation of an unwanted surface coating on the tungsten oxide, and can result in irreversible darkening of the electrochromic material over time. While this problem is even more severe for nanocrystal films of tungsten oxide, owing to their large surface area, niobium oxide nanocrystals, including both the $Nb_2O_5$ nanorods and $Nb_{12}O_{29}$ nanoplates described herein, are immune to this photochromic effect, thus resolving a major durability challenge facing electrochromic windows. In addition, $Nb_{12}O_{29}$ nanoplates can modulate a broad range of incident light across the visible and IR regions, which has not been reported in niobium oxide electrochromic materials before.

The coloration efficiency of $Nb_2O_5$ nanocrystals is lower than that typically reported for tungsten oxide. This parameter describes the extent of optical tinting achieved for a given amount of charge injected. To simply overcome this challenge, thicker films of $Nb_2O_5$ can be used to achieve the required extent of darkening. The porous nature of nanocrystal films means that ion transport should still readily occur through the film thickness. The niobium oxide materials described herein were synthesized from niobium chloride, which is highly refined form of niobium precursor thus making the synthetic pathway costly to scale up. However, other precursors such as metal acetates, metal acetylacetonates, nitrates and so forth can be used instead. For niobium in particular, other precursors include niobic acids, niobium oxalate, and niobium oxide.

Uses for the electrochromic films described herein include uses in batteries and/or supercapacitors. Other uses include use in electrochromic windows for automobiles, trains, airplanes, residential and commercial buildings.

Example 4

Niobium oxide ($Nb_2O_5$) is an active material of interest for various technologies, such as catalysis, sensors, energy storage and electrochromic devices, owing to its unique optical, electronic, and electrochemical properties. These properties vary between different phases and morphologies in the $Nb_2O_5$ system, but systematic studies that correlate properties to phase and morphology are limited by current synthetic methods, which require post-synthetic high temperature treatments and suffer from a lack of direct and precise control over morphology, crystal structure, and stoichiometry. Herein, a heat up colloidal synthesis method that produces orthorhombic $Nb_2O_5$ nanorods with an aspect ratio of 1 nm in width by 31 nm in length that preferentially grow along the [001] direction is described. The synthesis is based upon aminolysis of niobium oleate and nanorods are formed through three distinct steps: aminolysis-driven formation of niobium oxo clusters, condensation into amorphous $Nb_2O_5$ seeds below the reaction temperature, and crystallization and growth of $Nb_2O_5$ nanorods. The electrochromic behavior of nanorod thin films upon $Li^+$ intercalation was investigated and predominantly near-infrared, fast switching kinetics, and durability for 500 charge-discharge cycles was observed.

Introduction

Niobium oxide has garnered significant interest in the recent decade as an active material in applications ranging from electrochemical devices like batteries (Kim et al. *Adv. Energy Mater.* 2012, 2(1), 141-148; Augustyn et al. *Nat. Mater.* 2013, 12(6), 518-522) and electrochromic windows (Fu et al. *J. Electrochem. Soc.* 1999, 10(146), 3914-3918; Llordes et al. *Nature* 2013, 500, 323-326; Heo et al. *Nano Lett.* 2017, 17 (9), 5756-5761; Kim et al. *Nano Lett.* 2015, 5574-5579; Llordes et al. *Nat. Mater.* 2016, 15 (12), 1267-1273) to solar devices (Le Viet et al. *J. Phys. Chem. C* 2010, 114(49), 21795-21800; Chen et al. *Chem. Mater.* 2001, 13(12), 4629-4634; Ou et al. *ACS Nano* 2012, 6(5), 4045-4053) and chemical sensors (Kadir et al. *Sensors Actuators, B Chem.* 2014, 202, 74-82; Dai et al. *Adv. Mater. Interfaces* 2015, 2(11), 1500167; Ab Kadir et al. *ACS Appl. Mater. Interfaces* 2015, 7(8), 4751-4758). The development of these technologies is enabled by the combination of optical, electronic, and electrochemical properties of niobium oxide such as a wide band gap, high dielectric constant, medium to high refractive index, and fast $Li^+$ transport (Gotrik et al. *ACS Nano* 2012, 6 (9), 8052-8059; Rani et al. *Journal of Materials Chemistry A* 2014, 2(38), 15683-15703; Schafer et al. *Angew. Chemie Int. Ed. English* 1966, 5 (1), 40-52). As an electrochromic material, niobium oxides are one of the oldest known comparable to tungsten oxide. The coloration is attributed to the intercalation of $Li^+$ into the niobium oxide lattice accompanied by the reduction of niobium oxide expressed in the formula below (Equation 1).

$$Nb_2O_5 + xLi^+ = Li_xNb_2O_5 \qquad \text{Equation (1)}$$

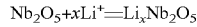

While the intercalative mechanism remains the same, the electrochromic properties of the various phases of niobium oxide and their amorphous counterpart varies significantly. The first observable distinction is a difference in coloration upon $Li^+$ intercalation: brown for amorphous niobium oxide and blue for crystalline niobium oxide. This phenomenon can be because amorphous niobium oxide absorbs with two distinct bands at 440 and 620 nm while crystalline niobium oxide absorbs with just one absorption band at 700 nm (Fu et al. *J. Electrochem. Soc.* 1999, 146 (10), 3914). Additionally, the observable coloration transitions from the visible to the near-infrared when the crystallite size exceeded 30 nm (Schmitt et al. *Electrochim. Acta* 2001, 46 (13-14), 2105-2111). Beyond coloration, electrochromic parameters like the magnitude of optical modulation, coloration efficiency, durability, and kinetics also differ between crystalline and amorphous niobium oxide: crystalline niobium oxide switches faster and is more durable than amorphous niobium oxide (Fu et al. *J. Electrochem. Soc.* 1999, 10(146), 3914-3918: Yoshimura et al. *J. Electrochem. Soc.* 1997, 144 (9), 2982; Reichman et al. *J. Electrochem. Soc.* 1980, 127 (1), 241; Ohtani et al. *J. Electrochem. Soc.* 1994, 141 (9), 2439). However, systematic study of these phenomena for the niobium oxide system is impeded by the incongruence between typical heat up synthetic protocols and the complex niobium oxide phase diagram (Naito et al. *Solid State Ionics* 1984, 12, 125-134; Naito et al. *J. Solid State Chem.* 1980, 35 (3), 305-311): heat up processes can often yield trace impurity phases as thermal cycles transition across different regions of the phase diagram.

Colloidal nanocrystal synthesis is an effective way to impose strict dimensional and phase control on materials and has been applied extensively to a variety of nanocrystal systems including metal nanoparticles (Gilroy et al. *Chem. Rev.* 2016, 116 (18), 10414-10472), metal oxides (Wang et al. *Chem. Mater.* 2014, 26 (22), 6328-6332; Dinh et al. *ACS Nano* 2009, 3 (11), 3737-3743; Gordon e al. *Nano Lett.* 2013, 13 (6), 2857-2863), doped metal oxides, and metal chalcogenides (Felice Shieh et al. *J Phys Chem B* 2005, 109(18), 8538-8542). Specific to the niobium oxide system, a reported method has shown the potential to control shape and phase of the resultant nanocrystals using seeded growth and high temperature thermal decomposition of niobium oleate to synthesize niobium oxide (Jana et al. *Nanoscale* 2012, 4 (5), 1782). This is a step towards the development of colloidal synthesis methods that yield size controlled and phase pure niobium oxide materials. However, a mechanistic understanding of the synthetic process was not elucidated, and the influence of nanostructuring through colloidal synthesis on the resulting properties compared to bulk niobium oxide systems remains to be investigated.

A mechanistic study of the synthesis of niobium oxide nanorods that is derived from the aminolysis of niobium oleate is discussed herein and the utility of the nanorods as an electrochromic material is demonstrated. The synthesis was developed to promote nanorod formation at significantly lower temperatures to sidestep agglomeration difficulties present in prior syntheses thus enabling the solution-based processing of these nanorods into thin films. Using a combination of microscopy, X-ray diffraction, and infrared, nuclear magnetic resonance, and Raman spectroscopy analysis, the mechanism underlying the nanorod formation was elucidated; the mechanism starts with the in situ formation of a chloro oleyl niobium (V) complex followed by the formation of amorphous niobium oxide seeds that then crystallize into orthorhombic niobium oxide ($Nb_2O_5$) nanorods. The electrochromic properties of nanorod thin films was then investigated and core electrochromic characteristics of the nanorod thin films, such as their coloration behavior, cyclic stability, and kinetics, is discussed. Unlike prior reports on the electrochromism of niobium oxides that are centered on electrochromic modulation in the visible regime, these films exhibit electrochromism that is predominantly in the infrared with a significantly diminished visible electrochromic response. This difference can be attributed to the dimensional constraint of the nanorod shape in the radial direction inhibiting the polaronic coloration of niobium oxide in the visible regime while maintaining the infrared red polaronic response.

Experimental Section

Materials.

All chemicals were used as received and without further purification. Niobium chloride ($NbCl_5$, 99%), oleic acid (technical grade, 90%), 1-octadecene (technical grade, 90%), N,N-dimethylformamide (ACS reagent, ≥99.8%), nitrosonium tetraborofluorate (95%), acetonitrile (ACS reagent, ≥99.5%), tetraethylene glycol dimethyl ether (tetraglyme, ≥99%), tetrabutylammonium bistrifluoromethane-sulfonimidate (TBATFSI, ≥99.0%) were purchased from Sigma Aldrich. Oleylamine (C-18 content 80-90%) was purchased from Acros Organics. Toluene (≥99.5%) and hexane (ACS reagent, various methylpentanes 4.2%, ≥98.5%) were purchased from Fisher Scientific. Lithium bis(trifluoromethanesulfonyl)imide (LiTFSI, 3M Fluorad) was purchased from 3M.

Nanorod Synthesis.

The synthesis of $Nb_2O_5$ nanorods is based on established colloidal synthesis methods. The reaction mixture was prepared in a nitrogen glovebox and kept in an air-free environment while it was transferred to the Schlenk line. Briefly, 0.545 g (2 mmol) $NbCl_5$ was mixed with 3.127 g (11 mmol) of oleic acid and 10 g (40 mmol) of octadecene. The reagents were stirred at room temperature under nitrogen until $NbCl_5$ was fully dissolved and a blood red solution of chloro oleyl niobium (V) was formed. This solution was degassed at 120° C. for 30 minutes. Then, a mixture of oleylamine (0.534 g or 2 mmol) and octadecene (0.789 g) was injected into the reaction flask at 120° C. under nitrogen. After the injection, the solution was degassed at 120° C. for 15 min, heated to 240° C., and allowed to react for 30 min under nitrogen. Once the solution cooled down to 70° C., 7.5 mL of toluene was injected into the flask to dilute the mixture. The nanorods were recovered and purified by precipitating with isopropanol, centrifuging at 3500 rpm for ten minutes, and re-dispersing in toluene. This step was repeated two more times.

Ligand-Stripping.

The native organic ligands on the nanorod surface were stripped following a method established previously (Dong et al. *J. Am. Chem. Soc.* 2011, 133 (4), 998-1006). In a typical procedure, 5 mg of nitrosonium tetrafluoroborate was added to a mixture containing 1 mL of a 5 mg/ml nanorod dispersion and 1 mL of N, N-dimethylformamide (DMF). This solution was sonicated for 30 min and then left to settle to allow the nanorods to precipitate. The nanorods were then dispersed in 1 mL of DMF. This dispersion was mixed with an equal volume of hexane, shaken, and left to settle to remove the top hexane layer. This step was repeated three times. Finally, the nanorods were purified by performing five cycles of flocculation with toluene, centrifugation at 4000 rpm for five minutes, and re-dispersion in DMF.

Thin Film Deposition.

Ligand-stripped nanorods were dispersed in 1:1 mixture of DMF and acetonitrile (30 mg/ml) and spin-coated at 1250 rpm on fluorine-doped tin oxide (FTO)-coated glass substrates.

Electron Microscopy.

Electron microscopy was performed on a Hitachi S5500 SEM/STEM instrument. Nanorods were imaged in bright-field scanning transmission electron (STEM) mode at a 30 kV accelerating voltage. Samples were dropcasted on Type-A ultrathin carbon copper TEM grids (Ted Pella, 01822, 400 mesh) from dilute nanorod dispersions in toluene. Nanorod films deposited on silicon substrates were imaged in scanning electron (SEM) mode at a 30 kV accelerating voltage.

X-Ray Diffraction (XRD).

Powder diffraction patterns were collected on a Rigaku R-Axis Spider using Cu Kα radiation (1.54 Å). Powders were obtained by precipitation from solution with isopropanol, centrifugation at 7000 rpm for five minutes, and drying under vacuum for 24 hours. Samples were mounted on a cryoloop using mineral oil.

Raman Spectroscopy.

Raman spectroscopy was performed with a Horiba LabRAM HR Evolution instrument equipped with a confocal microscope. Spectra were collected using a 532 nm laser source, 50 mW power, 50× objective, and 1 μm laser spot size. Powder samples were identical to the ones prepared for X-ray diffraction measurements. The bulk orthorhombic $Nb_2O_5$ powder used as a reference in FIG. 63-FIG. 69 was prepared by annealing a decaniobate ($[N(CH_3)_4]_6Nb_{10}O_{28}$) polyoxometalate powder at 600° C. for 12 hours under air (Llordes et al. *J. Mater. Chem.* 2011, 21, 11631-11638; Villa et al. *Angew. Chemie—Int. Ed.* 2008, 47(26), 4844-4846).

Fourier Transform Infrared Spectroscopy (FTIR).

FTIR spectroscopy was carried out in transmission geometry with a 4 $cm^{-1}$ resolution and an average of 128 scans on a Bruker Vertex 70 spectrometer. Chloro oleyl niobium (V) samples were transferred into a sealed liquid cell with KBr windows and a 0.0125 mm path length under inert conditions. Ligand-capped and ligand-stripped nanorod films were spin-coated on 1×1 cm undoped silicon substrates.

Nuclear Magnetic Resonance Spectroscopy (NMR).

NMR spectroscopy was performed on an Agilent 400 MHz instrument using a OneNMR probe with Protune accessory. The $^1H$ NMR was taken in a range of −2 to 14 ppm with 128 scans and a relaxation delay of 2 secs with a pulse angle of 30 degrees. The samples were prepared under an inert atmosphere and diluted into d-DMSO (10 μL, 600 μL).

Spectroelectrochemical Modulation.

In situ spectroelectrochemical measurements were performed using a custom-built cell in an Ar glovebox connected to a potentiostat (Bio-logic VMP3) and a spectrometer (ASD Quality Spec Pro). A three-electrode configuration was used in a typical experiment: Li foil (MTI) was both the counter and reference electrode, and the nanorod film on FTO-coated glass was the working electrode. The transmittance of the nanorod film immersed in Li-TFSI in anhydrous tetraglyme electrolytes of varying concentrations (0.1 M, 1 M, and 3 M) was recorded as a function of wavelength at each applied potential (1.2 and 4.0 V vs. $Li/Li^+$ for charging and discharging, respectively). This setup was also used to conduct cyclic voltammetry, cycling stability, and coloration efficiency experiments. Spectroelectrochemical experiments with the nonintercalating 1 M TBATFSI in tetraglyme electrolyte were also performed using a three-electrode configuration, but in this case, Pt foil was the counter electrode, non-aqueous $Ag/Ag^+$ was the reference electrode, and the nanorod film on FTO-coated glass was the working electrode.

X-Ray Photoelectron Spectroscopy (XPS).

XPS was carried out with a Kratos X-ray photoelectron spectrometer-axis ultra DLD using Al Kα source. Samples were identical to the nanorod films spin-coated on FTO for spectroelectrochemical modulation.

Zeta Potential.

Zeta potential measurements of the ligand-stripped $Nb_2O_5$ nanorods dispersed in dimethylformamide (~1 mg/ml) were conducted on a Malvern Zetasizer Nano ZS. A dip cell (ZEN1002, Malvern) was immersed in the dispersion, which was contained in a glass cuvette.

Galvanostatic Intermittent Titration Technique (GITT).

The same custom-built cell and three-electrode configuration described above was used to perform the galvanostatic intermittent titration technique experiment. Briefly, Li foil (counter and reference electrode) and the $Nb_2O_5$ nanorod film on fluorine-doped tin oxide (FTO)-coated glass (working electrode) were immersed in 1 M LiTFSI in tetraglyme electrolyte in a near-infrared quartz cuvette.

Figure 60:
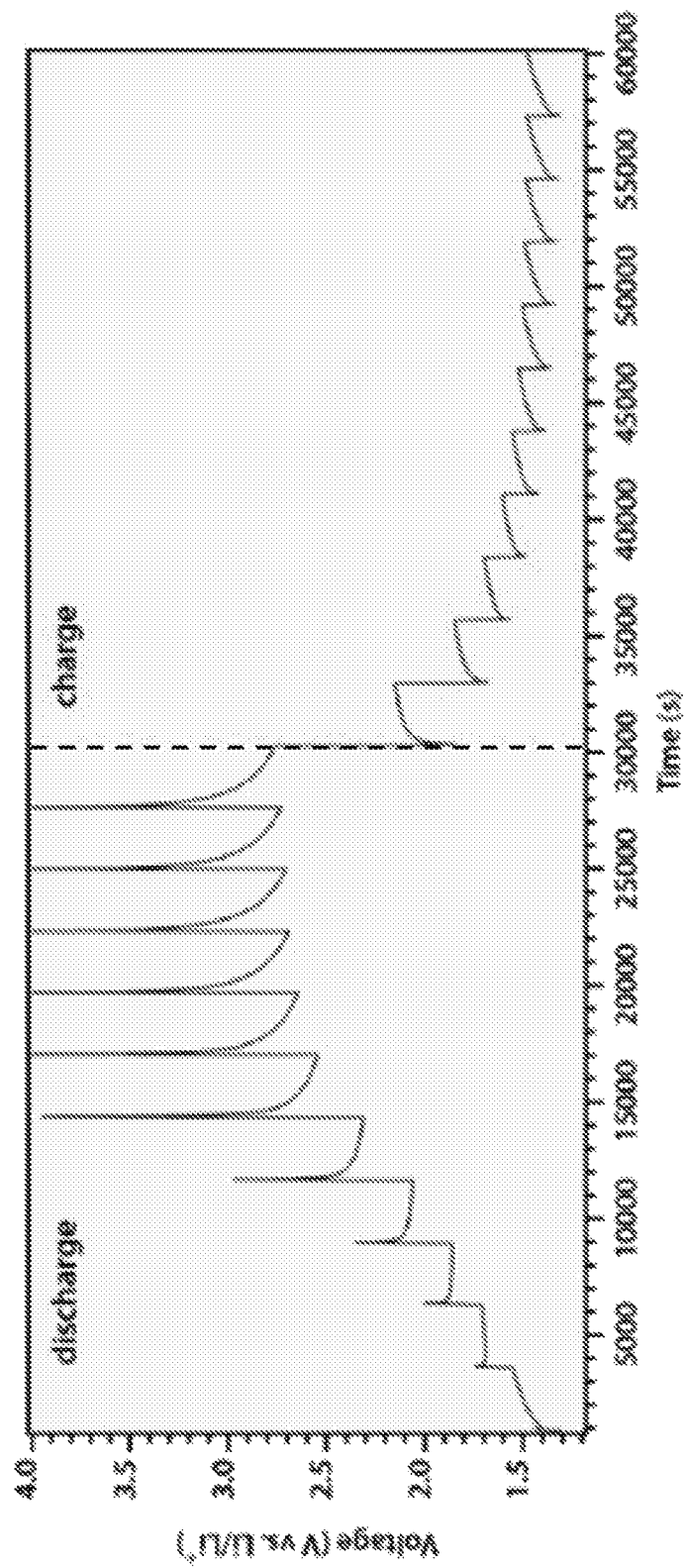
FIG. 60 is a voltage vs. time plot obtained during the discharge and charge cycle of a $Nb_2O_5$ nanorod film by galvanostatic intermittent titration technique (GITT). Data collected during the charge cycle (between 30000 and 60000 s) was used to estimate the coloration efficiency of the film (FIG. 57 and FIG. 61).
Figure 61:
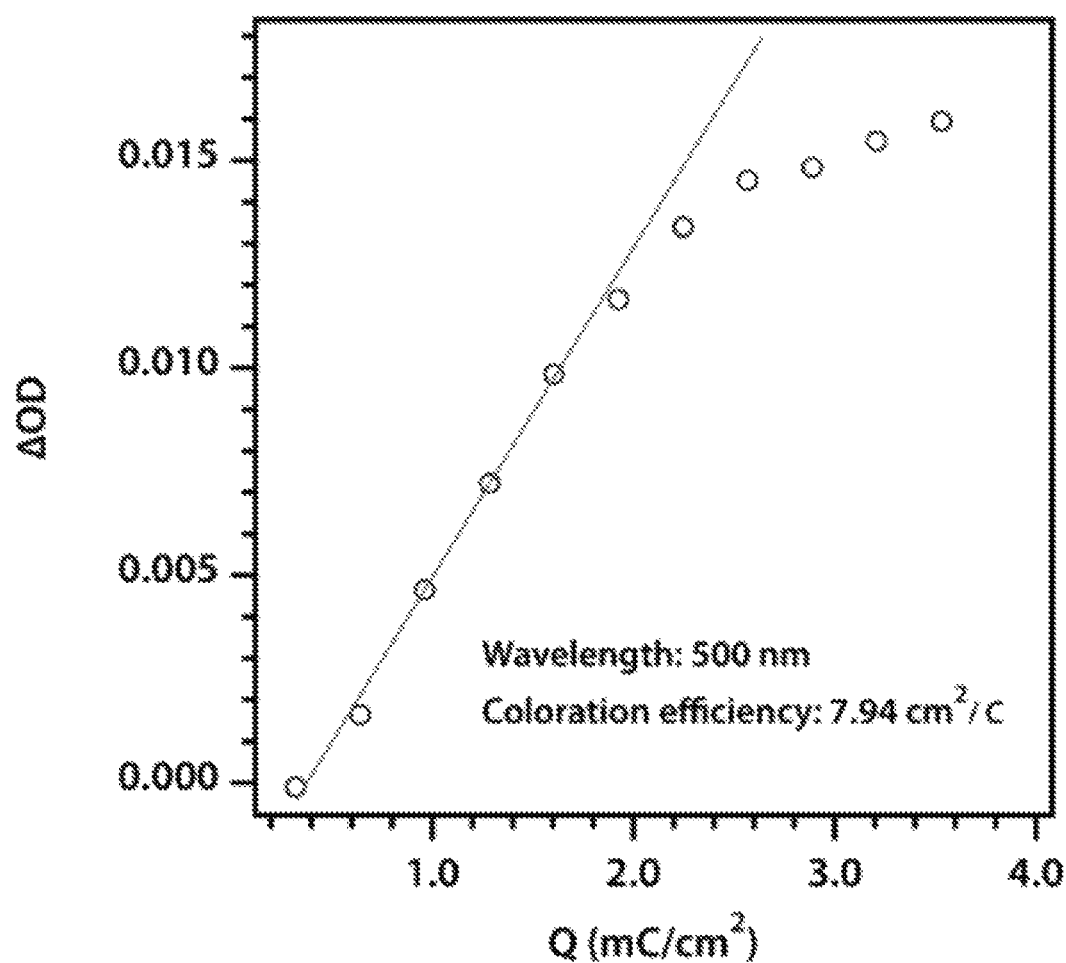
FIG. 61 shows the coloration efficiency (CE=$\Delta OD/\Delta Q$) of the $Nb_2O_5$ film in the visible spectral range (a, =500 nm). Transmittance spectra were collected at the end of each charging step of the galvanostatic intermittent titration technique (GITT) experiment (FIG. 60). Coloration efficiency was determined by fitting the linear region of the plot with $\Delta OD$ measured at 500 nm. Open circles are experimental data points and the solid line is the result of the fit.

Before performing the galvanostatic intermittent titration technique experiment, the film was bleached by applying 4.0 V for 5 min, colored by applying 1.2 V for min, and allowed to rest at open circuit voltage (OCV) for 5 min to determine the leakage current (−5 µA). The first galvanostatic intermittent titration technique sequence consisted of gradually discharging the film by withdrawing +15 µA every 1 s for 1 min and equilibrating at open circuit voltage for 44 min. This step was repeated until the working electrode potential reached 4.0 V (FIG. 60). Then, the film was gradually charged by injecting −15 µA every 1 s for 1 min and equilibrating at open circuit voltage for 44 min. This step was repeated until the working electrode potential reached 1.2 V (FIG. 60). Optical spectra were collected at the end of each discharge/charge step every 45 min. Regarding the coloration efficiency analysis, the absorbance of the bleaching step preceding the first charging step was used as the baseline to determine ΔOD and ΔQ injected between charging steps was 60 µA·s (0.6 mC) after correcting for the leakage current. The active area of the film was 1.87 cm$^2$.

Reflection Measurement of $Nb_2O_5$ Nanorod Film.

In situ reflectance and transmittance measurements were carried out in the same custom-built spectroelectrochemical cell and with the same three-electrode configuration described above. Briefly, Li foil (counter and reference electrode) and the $Nb_2O_5$ nanorod film on fluorine-doped tin oxide (FTO)-coated glass (working electrode) were immersed in 1 M LiTFSI in tetraglyme electrolyte in a near-infrared quartz cuvette. A constant potential was applied using a 5200 Biologic potentiostat while the film was illuminated with a white light source at a 75° incident angle. Reflectance and transmittance spectra were obtained by changing the detector position relative to the incident light and keeping the light source and film positions fixed. In the reflection configuration, the detector was placed at a 30° angle while in the transmission configuration, the detector was placed at a 180° angle. A bare glass substrate was used as the background in the transmission configuration while a silver mirror (Thorlabs, PFR10-P01) was used as the background in the reflection configuration. First, the film was bleached by applying 4.0 V for 5 min, then colored by applying 1.2 V for 10 min, and finally bleached again by applying 4.0 V for 5 min.

Optical Spectra of Colored $Nb_2O_5$ Nanorods in Different Dielectric Environment.

First, the nanorod film was bleached by applying 4.0 V for 5 min and subsequently charged by applying 1.2 V for 5 min using the same custom-built cell and three-electrode configuration described above. Then, the colored nanorod film was rinsed with dimethylcarbonate to remove excess 1M LiTFSI in tetraglyme electrolyte. The colored film and bare glass substrate were clipped to the near-infrared quartz cuvette using binder clips covered with insulating and solvent-resistant kapton tape to avoid discharging the film and to ensure consistent backgrounding after each solvent exchange. Solvent was dripped onto the colored film and the cuvette three times to fully exchange the dielectric environment before recording transmittance spectra in the pure solvent.

Results and Discussion

Figure 32:
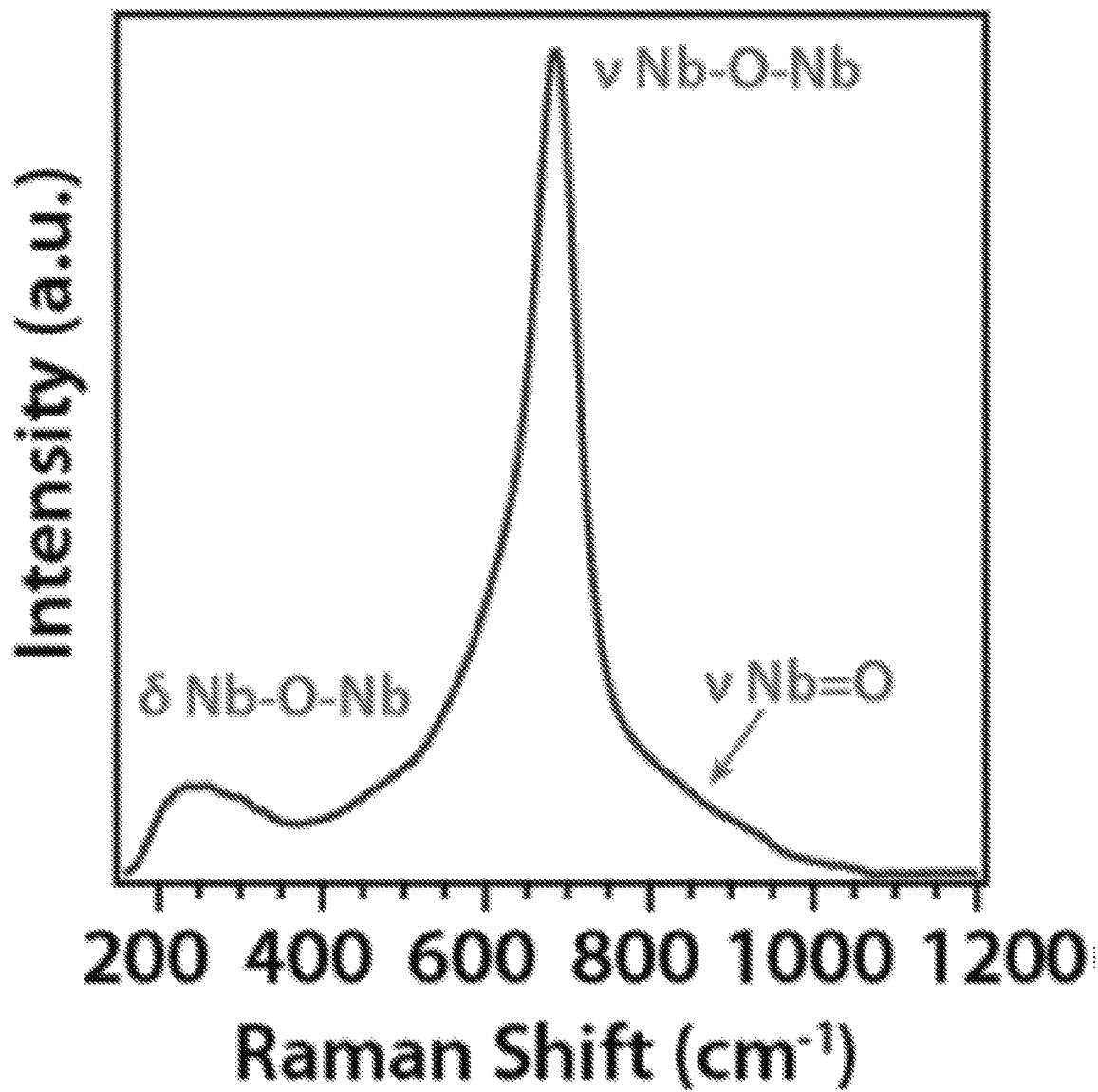
FIG. 32 is a Raman spectrum of the $Nb_2O_5$ nanorods.
Figure 33:
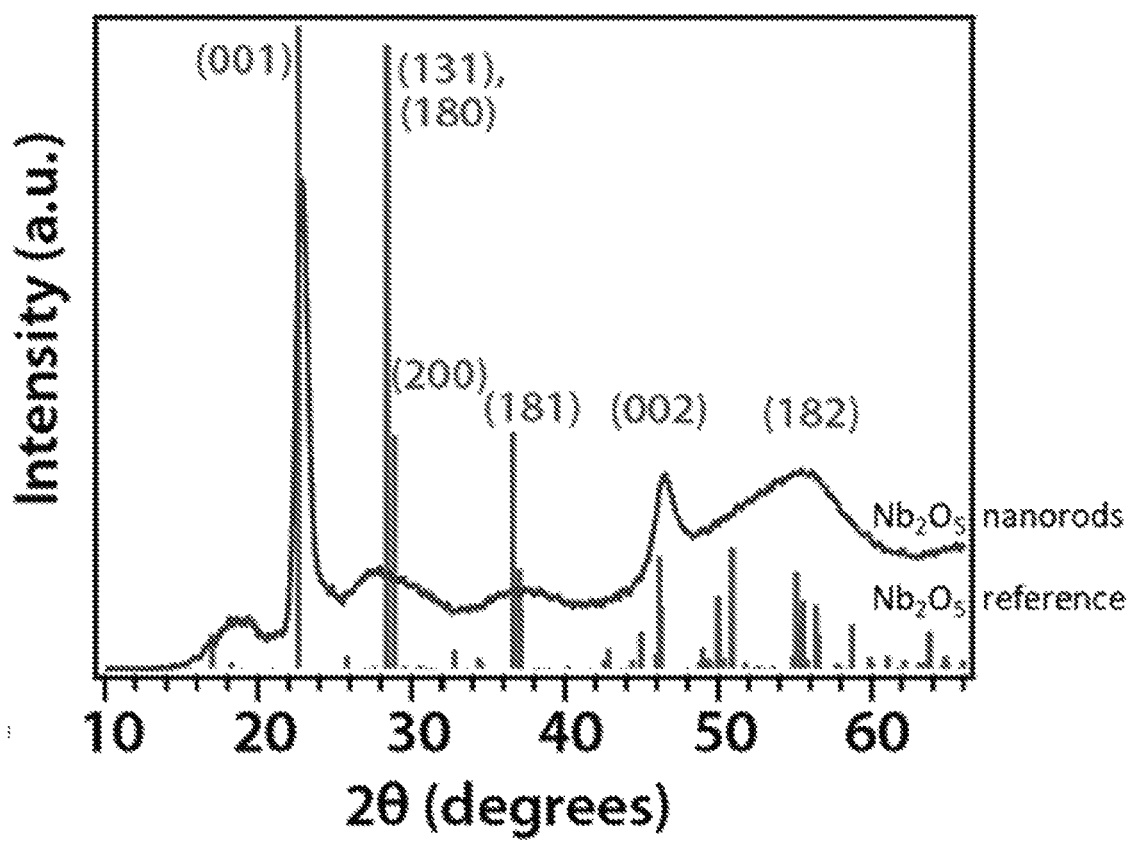
FIG. 33 is the powder XRD pattern of the $Nb_2O_5$ nanorods and orthorhombic $Nb_2O_5$ reference (PDF #00-027-1003).
Figure 34:
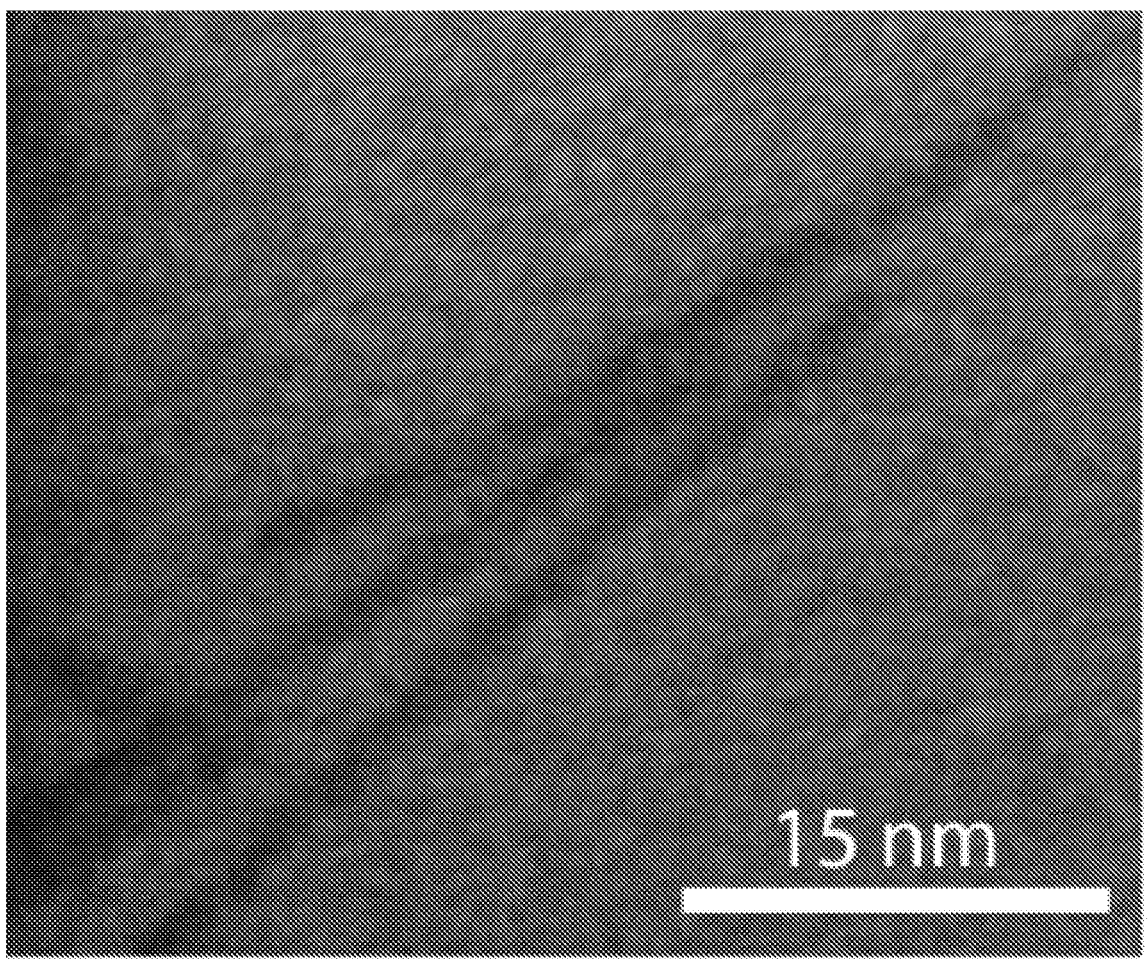
FIG. 34 is a high magnification scanning transmission electron microscopy image of niobium oxide nanorods.

The design of the one-pot colloidal synthesis of niobium oxide began with a well-established starting point for the synthesis of many metal oxides: the decomposition of a metal carboxylate, specifically a metal oleate (Yu et al. *Chem. Commun.* 2004, 356 (20), 2306; Kim et al. *J. Am. Chem. Soc.* 2011, 133 (32), 12624-12631; Park et al. *Nat. Mater.* 2004, 3 (12), 891-895). Thermal decomposition of the metal oleate, formed in situ through a reaction of niobium (V) chloride with oleic acid, required high temperatures exceeding 270° C. (Jana et al. *Nanoscale* 2012, 4 (5), 1782). The synthesis yielded nanorods that were, however, irreversibly aggregated (FIG. 22-FIG. 29) and unsuitable for the formation of homogeneous electrochromic films. To yield a colloidally stable product, the reaction mechanism was altered to one based on aminolysis of the metal-oleate complex with a primary amine. The results of the synthesis are summarized in FIG. 30-FIG. 33. As-synthesized, the nanorods are in the T-orthorhombic $Nb_2O_5$ phase with a significant aspect ratio of ca. 1 nm width by 31 nm length (FIG. 34). Nanorods were sized using the rotated rectangle tool in ImageJ. Six nanorods were measured to obtain the average length (31 nm) and width (1 nm). The long axis of the nanorod (direction of growth) is the [001] direction, as supported by the significant broadening of all peaks in the XRD pattern with the exception of planes in the {001} family (FIG. 33). The Raman spectrum of a powder sample of this material (FIG. 32) is in general agreement with the one reported for bulk orthorhombic $Nb_2O_5$: it is dominated by a strong band at 685 cm$^{-1}$ characteristic of stretching modes from niobium-oxygen bridges arranged in octahedral and pentagonal polyhedra structures. The weaker and broader bands at 250 and 800 cm$^{-1}$ correspond to bending modes from niobium-oxygen bridges and a low concentration of terminal niobium-oxygen double bonds, respectively (Jehng et al. *Chem. Mater.* 1991, 3 (1), 100-107).

Figure 35:
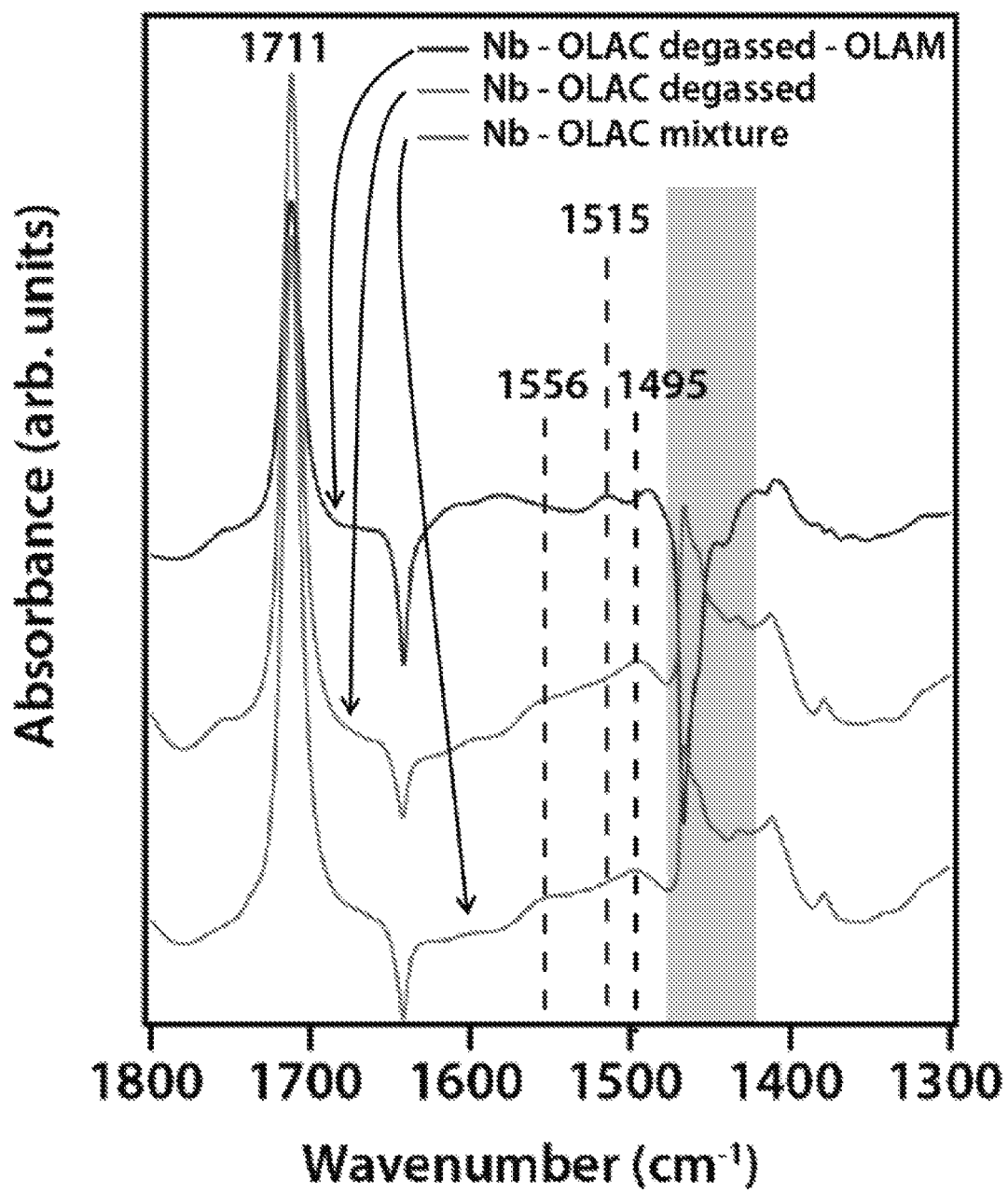
FIG. 35 is the FTIR spectra of aliquots collected at initial mixing, subsequent degassing, and with addition of oleylamine for the characterization of the niobium complex. The over subtracted peak in the shaded region of the top spectrum (Nb-OLAC degassed-OLAM) is due to the removal of small hydrocarbon chains during degassing.
Figure 36:
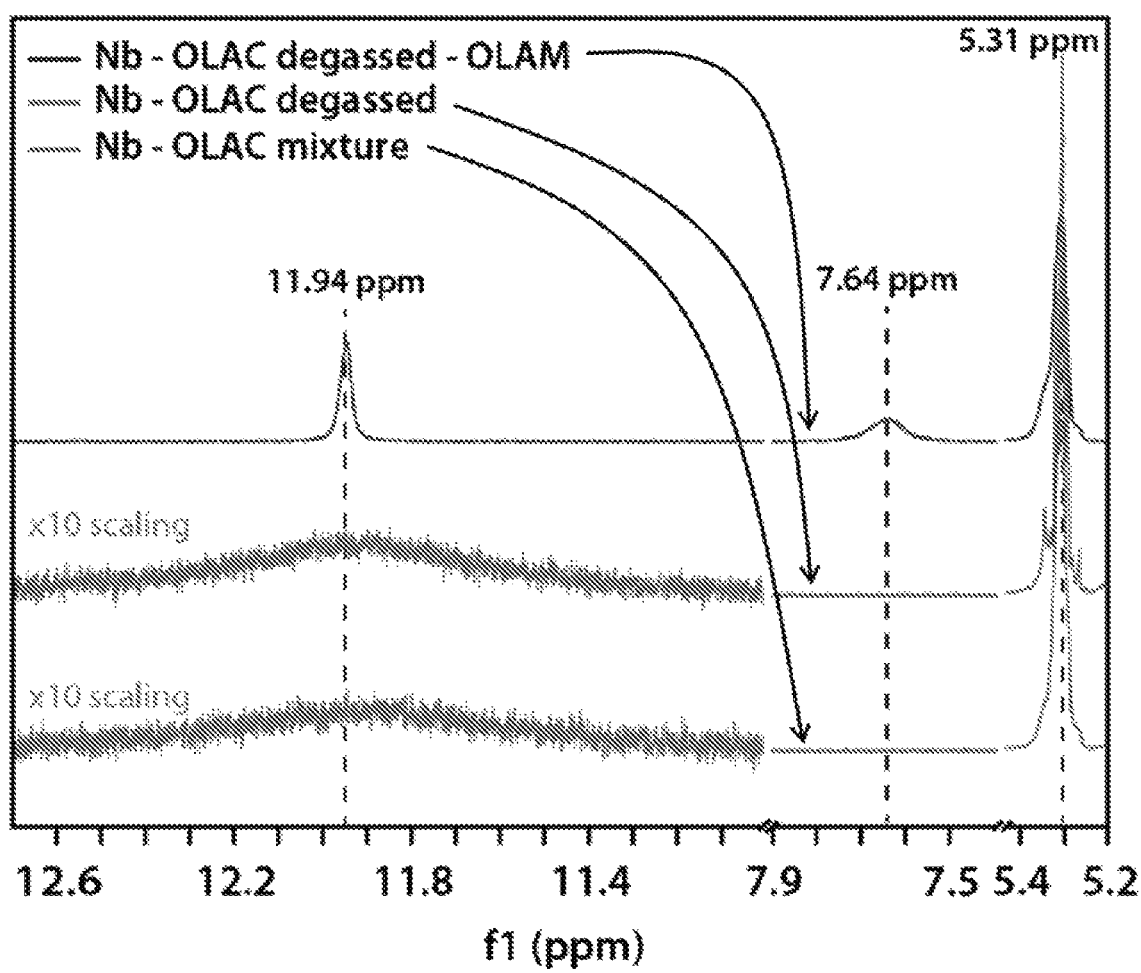
FIG. 36 is the NMR spectra of the same aliquots shown in FIG. 35, e.g., aliquots collected at initial mixing, subsequent degassing, and with addition of oleylamine for the characterization of the niobium complex.
Figure 37:
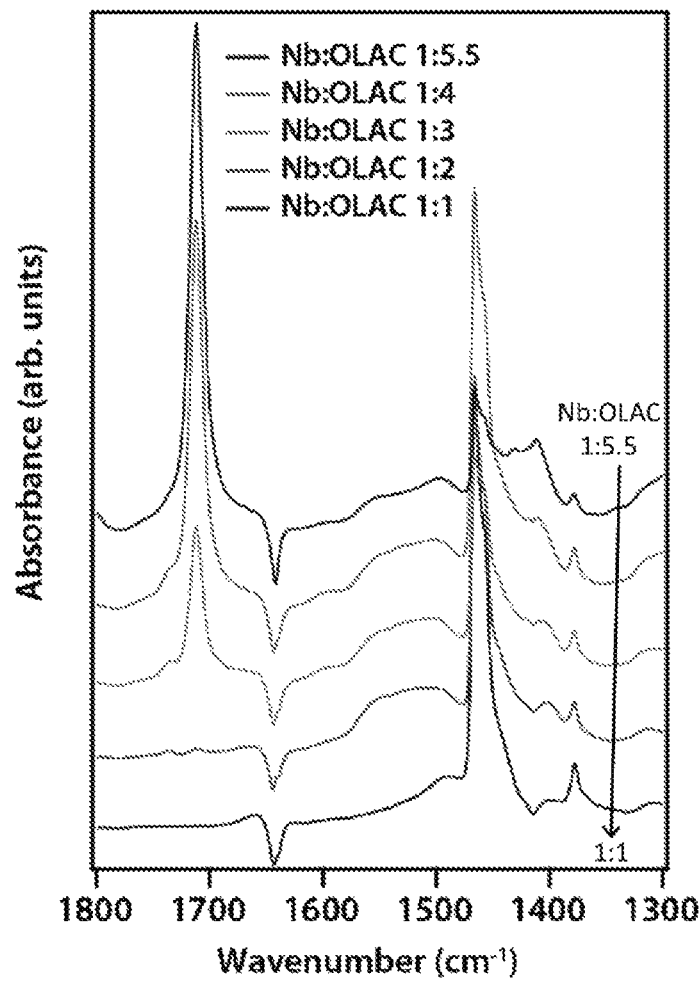
FIG. 37 is the Fourier transform infrared spectroscopy (FTIR) spectra of chloro oleyl niobium complex for a Niobium-to-oleic acid molar ratio (Nb:OLAC) series. Gradual emergence of the C=O stretch at 1711 $cm^{-1}$ while the intensity of the 1556 and 1495 $cm^{-1}$ peaks remains relatively constant, indicates that increasing the oleic acid content does not result in a pure niobium oleate complex (incomplete chlorine exchange).
Figure 40:
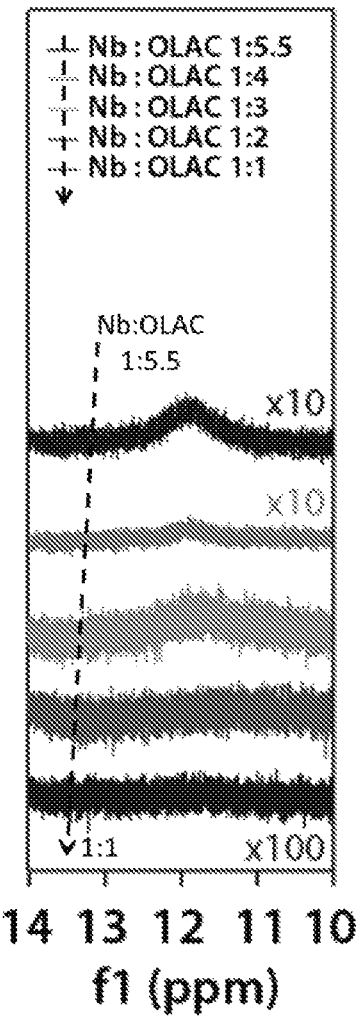
FIG. 40 magnified NMR spectra of the niobium-to-oleic acid molar ratio series in the 10-14 ppm region. Gradual emergence of the —COOH proton peak at 11.94 ppm as the oleic acid content increases indicates that a chloro oleyl niobium species (incomplete chlorine exchange), instead of a pure niobium oleate, is formed.
Figure 38:
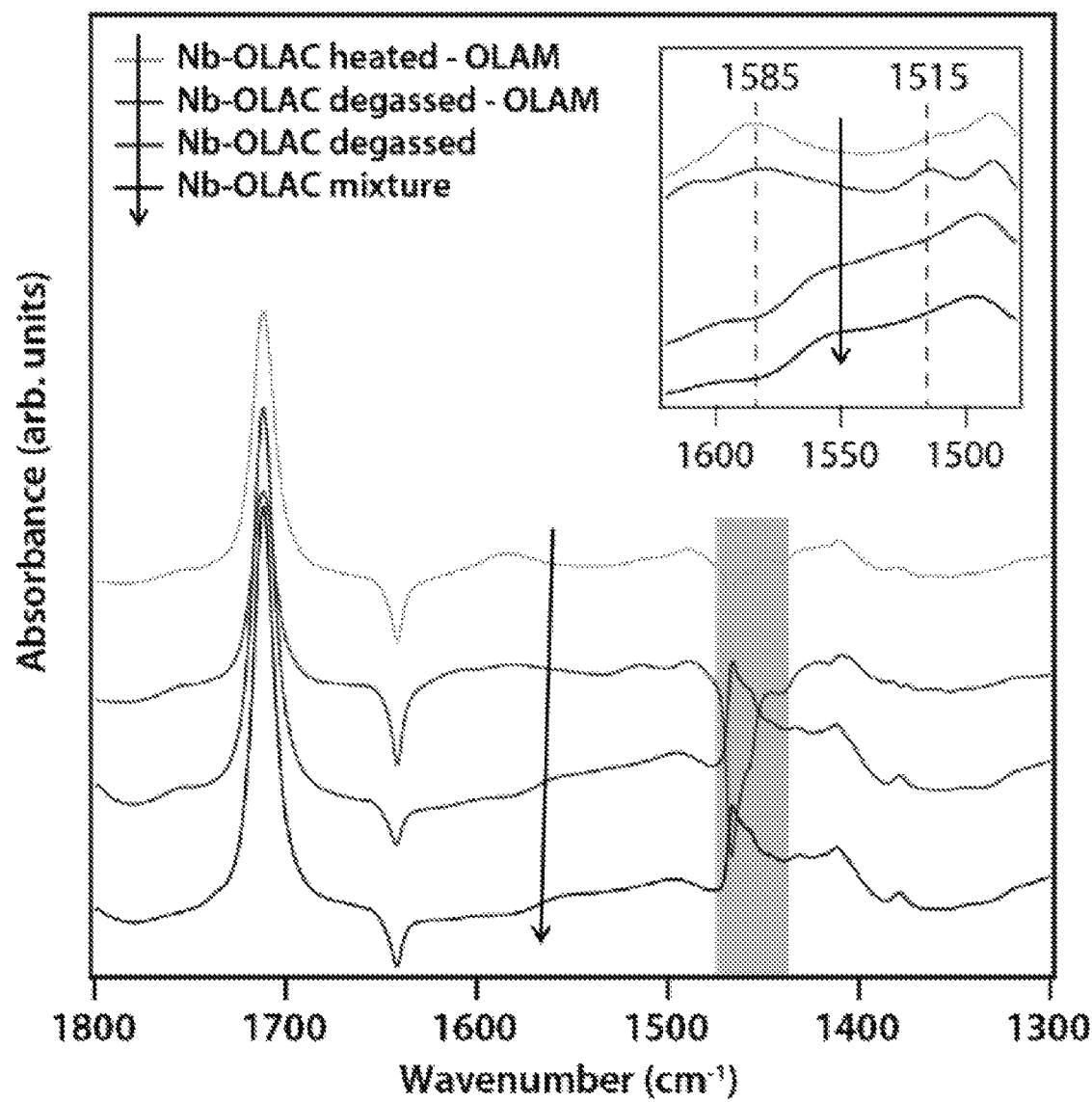
FIG. 38 is the Fourier transform infrared spectroscopy (FTIR) of chloro oleyl niobium complex Aminolysis of the chloro oleyl niobium complex after oleylamine (OLAM) injection is favored when the solution is heated at 120° C. and degassed (second spectrum from top), as opposed to only heated at 120° C. without degassing (top spectrum), and is detected by N—H bends (1515 $cm^{-1}$) from the amide byproduct. The peak at 1585 $cm^{-1}$ is assigned to N—H bends from amine. The over subtracted peak in the second spectrum from the top (shaded region) is due to the removal of small hydrocarbon chains during the degassing step.
Figure 39:
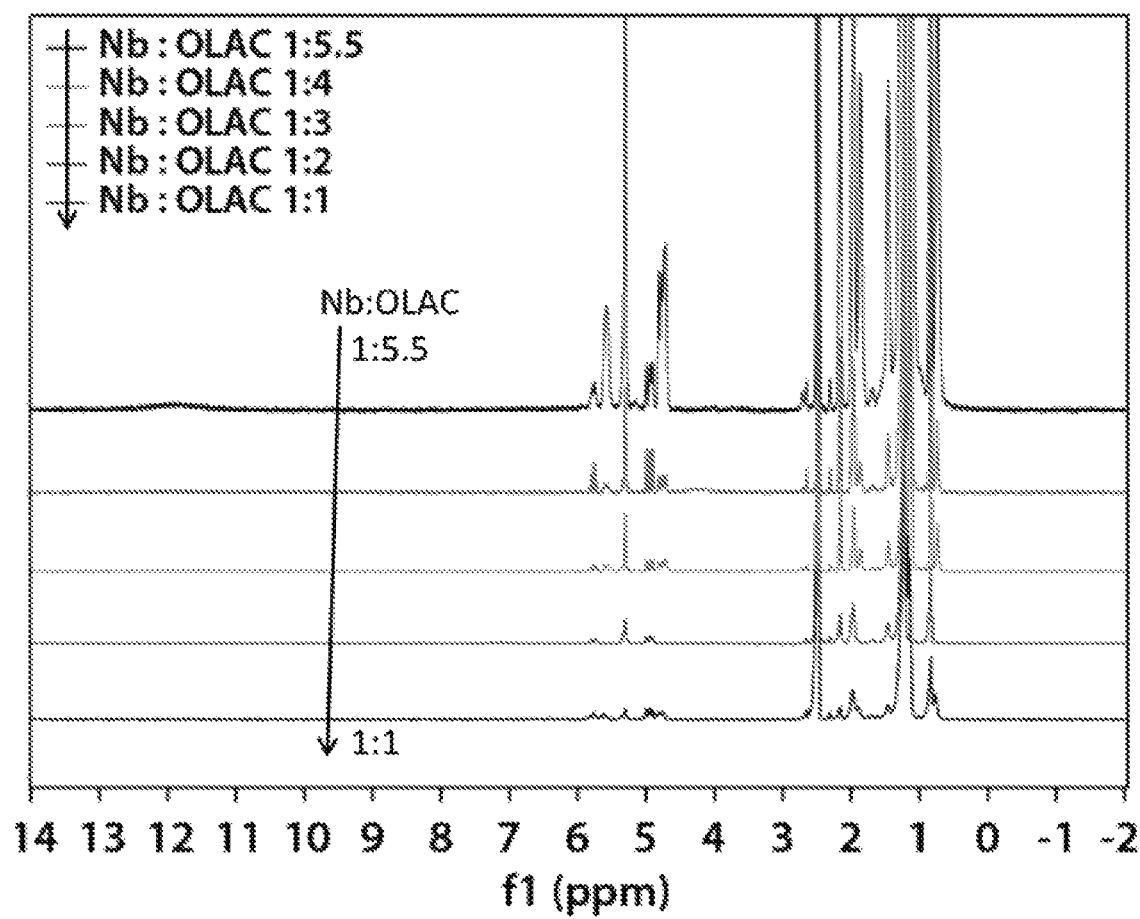
FIG. 39 full range Nuclear magnetic resonance (NMR) spectra of chloro oleyl niobium complex of the niobium-to-oleic acid molar ratio (Nb:OLAC) series.
Figure 41:
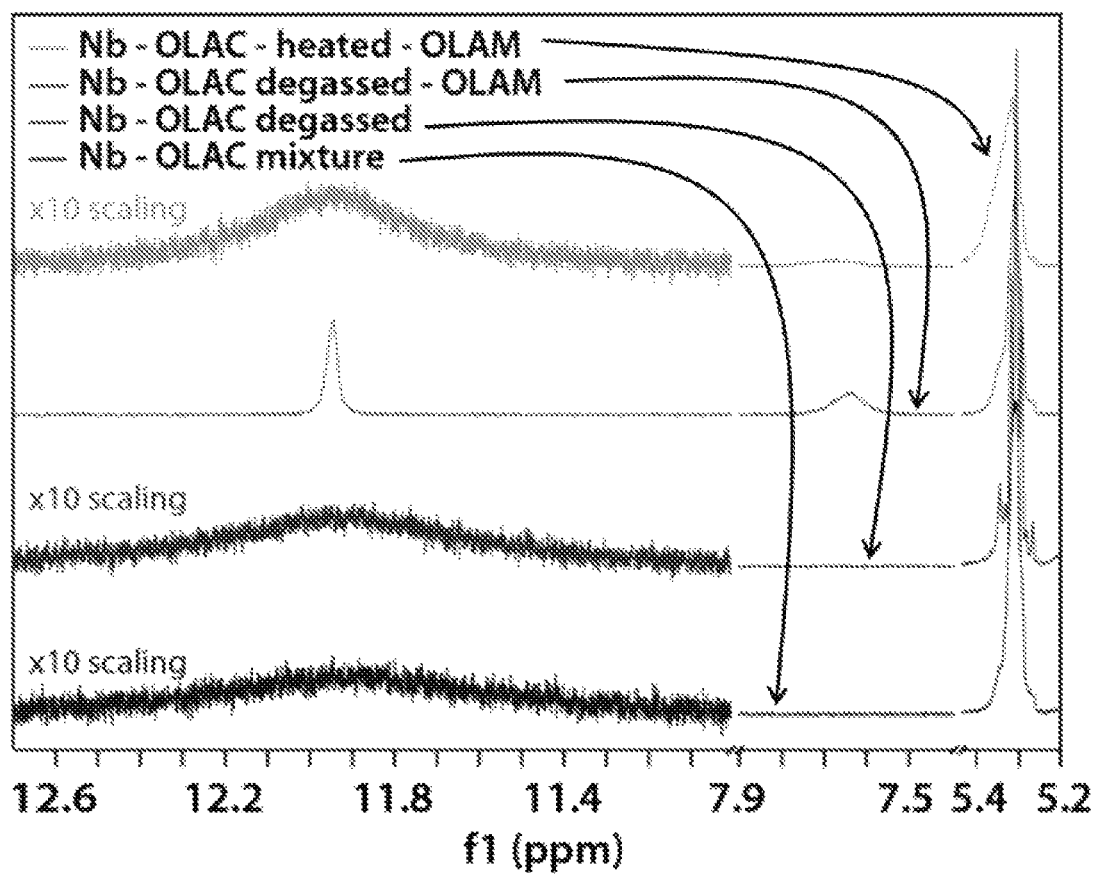
FIG. 41 Nuclear magnetic resonance spectroscopy (NMR) of chloro oleyl niobium complex showing that aminolysis of the chloro oleyl niobium complex after oleylamine (OLAM) injection is favored when the solution is heated at 120° C. and degassed (second spectrum from top), as opposed to heated at 120° C. without degassing (top spectrum), and is detected by the emergence of the —NH peak at 7.64 ppm from the amide byproduct. Comparing the intensity and sharpness of the —COOH peak at 11.94 ppm after heating with and without degassing suggests that in the latter case unbound chlorine in solution interacts with the acidic proton and is released as gaseous HCl.

To uncover the underlying synthetic mechanism, an aliquot study was performed on the reaction starting from the formation of the metal oleate complex to the final formation of the nanorods at the end of the synthesis: the results were analyzed with a combination of electron microscopy (STEM), Raman, XRD, NMR, and FTIR spectroscopy. True to the synthetic design, FTIR and NMR show formation of a metal oleate complex upon mixing of niobium (V) chloride and oleic acid in octadecene (FIG. 35 and FIG. 36). However, the metal oleate complex that is formed is not a completely exchanged niobium oleate as previously suggested (Jana et al. *Nanoscale* 2012, 4 (5), 1782). It is more accurately described as a chloro oleyl niobium (V) complex. These results support prior reports in literature showing that oleic acid can be deprotonated completely to form a niobium chloro complex with bridging oleates at low ratios of niobium-to-oleic acid, such as 1 to 1 ratio (Marchetti et al. *Polyhedron* 2008, 27(8), 4696-4976). This is signified by the absence of the protonated carboxylic acid peak at 1711 cm$^{-1}$ and emergence of the niobium-carboxylate peaks at 1556 and 1495 cm$^{-1}$ in FTIR (FIG. 35 and FIG. 37 and FIG. 38), which agree with the values reported elsewhere (Marchetti et al. *Polyhedron* 2008, 27(8), 4696-4976). However, with increasing oleic acid in solution, the niobium-carboxylate peak remains relatively constant, suggesting that the exchange halts after a 1 to 3 niobium-to-oleic acid ratio. Thus, the niobium oleate that is formed is likely a chloro oleyl niobium (V) composed of 2 to 3 oleate ligands with the remaining shell satisfied by chloride species. This remains unchanged upon heating or degassing of the solution. Upon injection of oleylamine, a new peak emerges at 1515 cm$^{-1}$ that can be assigned to N—H bending, suggesting formation of an amide through reaction of the oleate ligand and oleylamine (FIG. 35). Monitoring the —COOH proton peak at 11.78 ppm with $^1$H NMR of the chloro oleyl niobium (V) complex before and after aminolysis further supports this interpretation of the FTIR. First, the niobium-to-oleic acid concentration series was inspected and the proton peak was found to be absent in the 1-to-1 ratio case (FIG. 39-FIG. 41). This peak steadily reappears as the oleic acid content increases while the niobium content is fixed, indicating that the niobium complex is not completely coordinated with oleates. The NMR was measured in dry d-dimethyl sulfoxide (d-DMSO) to collect a sharp —COOH proton peak, but during the formation of the chloro oleyl niobium (V) complex, the liberated chlorine interacts with the remaining free acidic protons in solution, decreasing the intensity of the acidic proton peak. After degassing the chloro oleyl niobium (V) complex at 120° C., an increase in the —COOH proton peak was observed that can be attributed to the removal of free chlorine from solution. When oleylamine is added to the chloro oleyl niobium (V), the emergence of a N—H peak at 7.64 ppm was observed, indicative of amide formation caused by the aminolysis of niobium oleate (FIG. 36) (Soderberg. Chem. Pub. 2016). The proton from the amine that is removed during aminolysis forms OH— and the metal oxo species is formed as all the amine is used in the reaction. The acidic proton from the remaining oleic acid reappears after the metal oxo species is formed as there is no further interaction with free Cl— or oleylamine. It should be noted that this limited aminolysis occurs only after proper degassing to remove the hydrochloric acid that results from the niobium oleate formation. This is because excess hydrochloric acid would react with the amine as a Bronsted-Lowry acid and base pair which is a competing reaction to the aminolysis for the niobium oxo cluster species. Thus, while degassing of the solution does not lead to further exchange towards a more complete niobium oleate, it is nevertheless critical for the subsequent limited aminolysis reaction (FIG. 39-FIG. 41).

Figure 42:
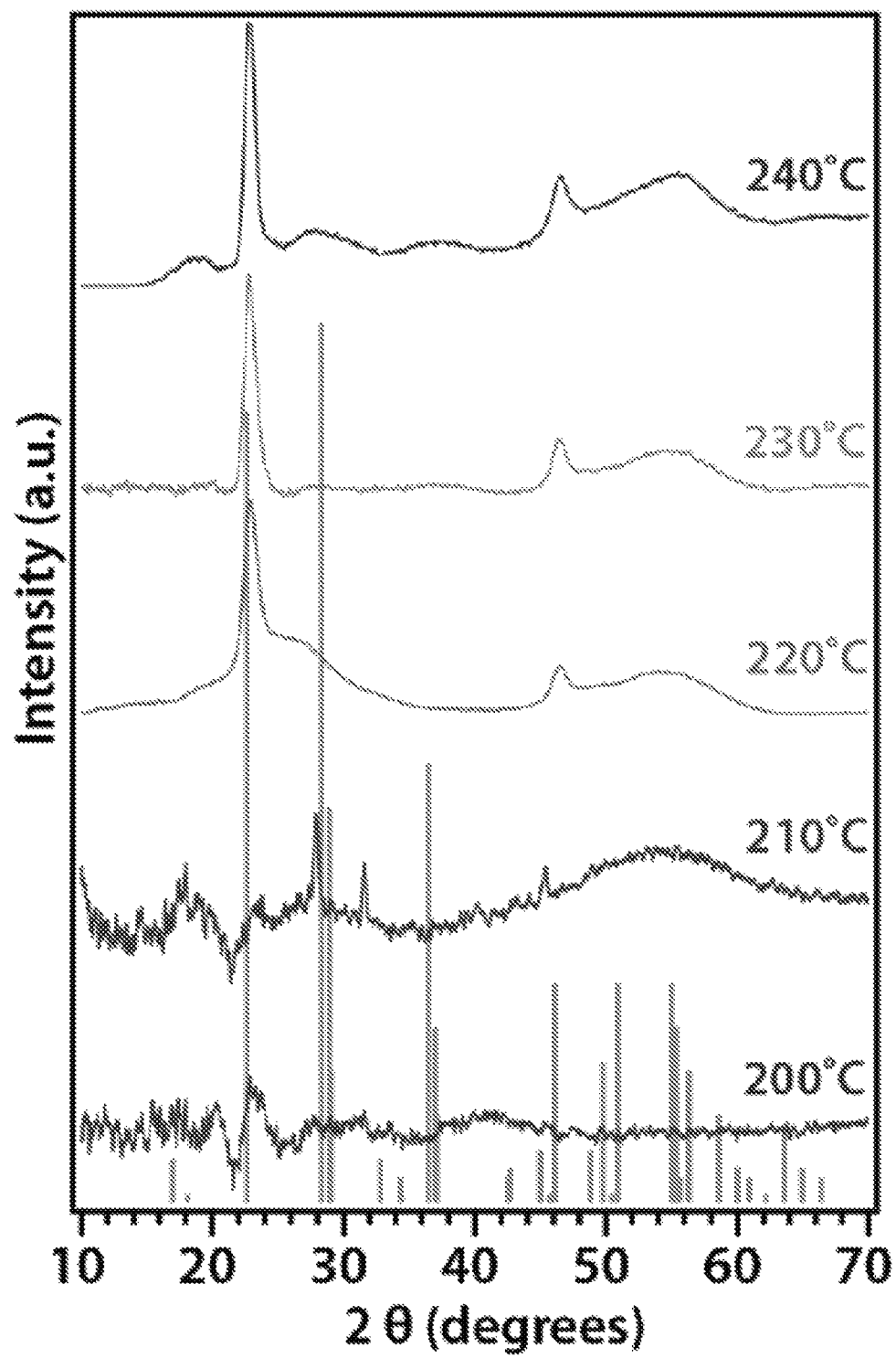
FIG. 42 is the powder XRD results for aliquots collected from 200-240° C.
Figure 43:
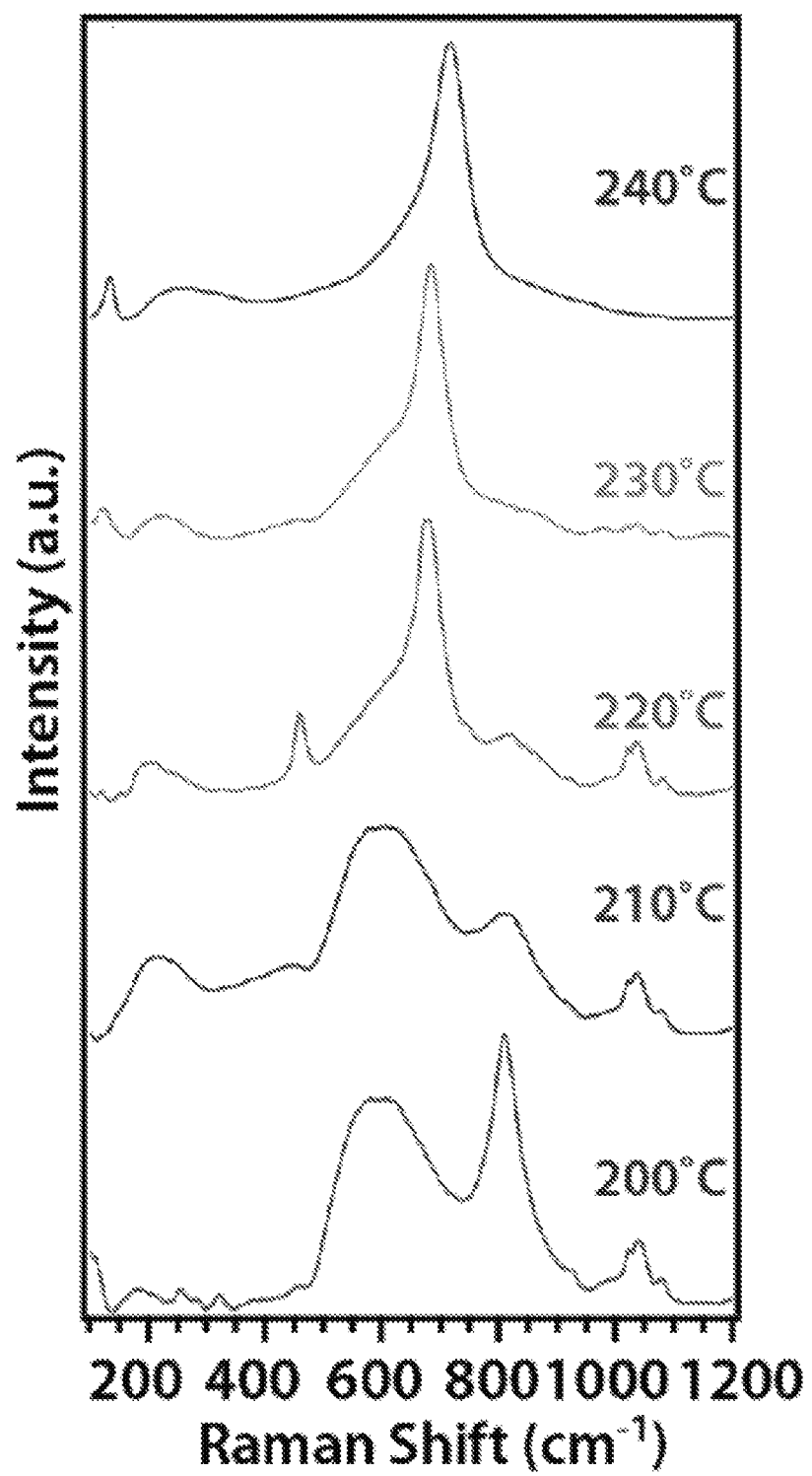
FIG. 43 is the powder Raman spectra for aliquots collected from 200-240° C.
Figure 44:
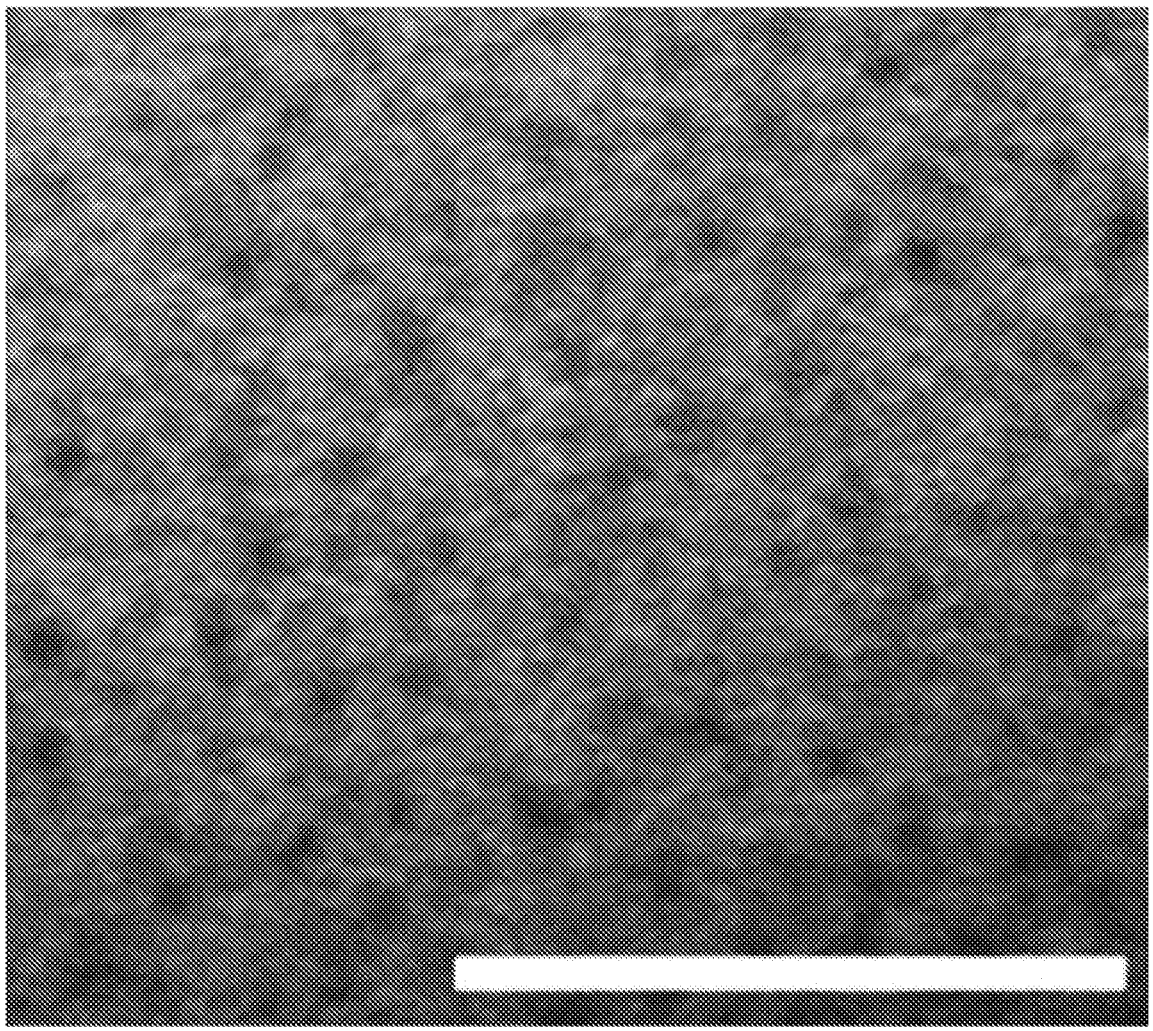
FIG. 44 is a STEM image of a 200° C. aliquot. Scale bar is 25 nm.
Figure 45:
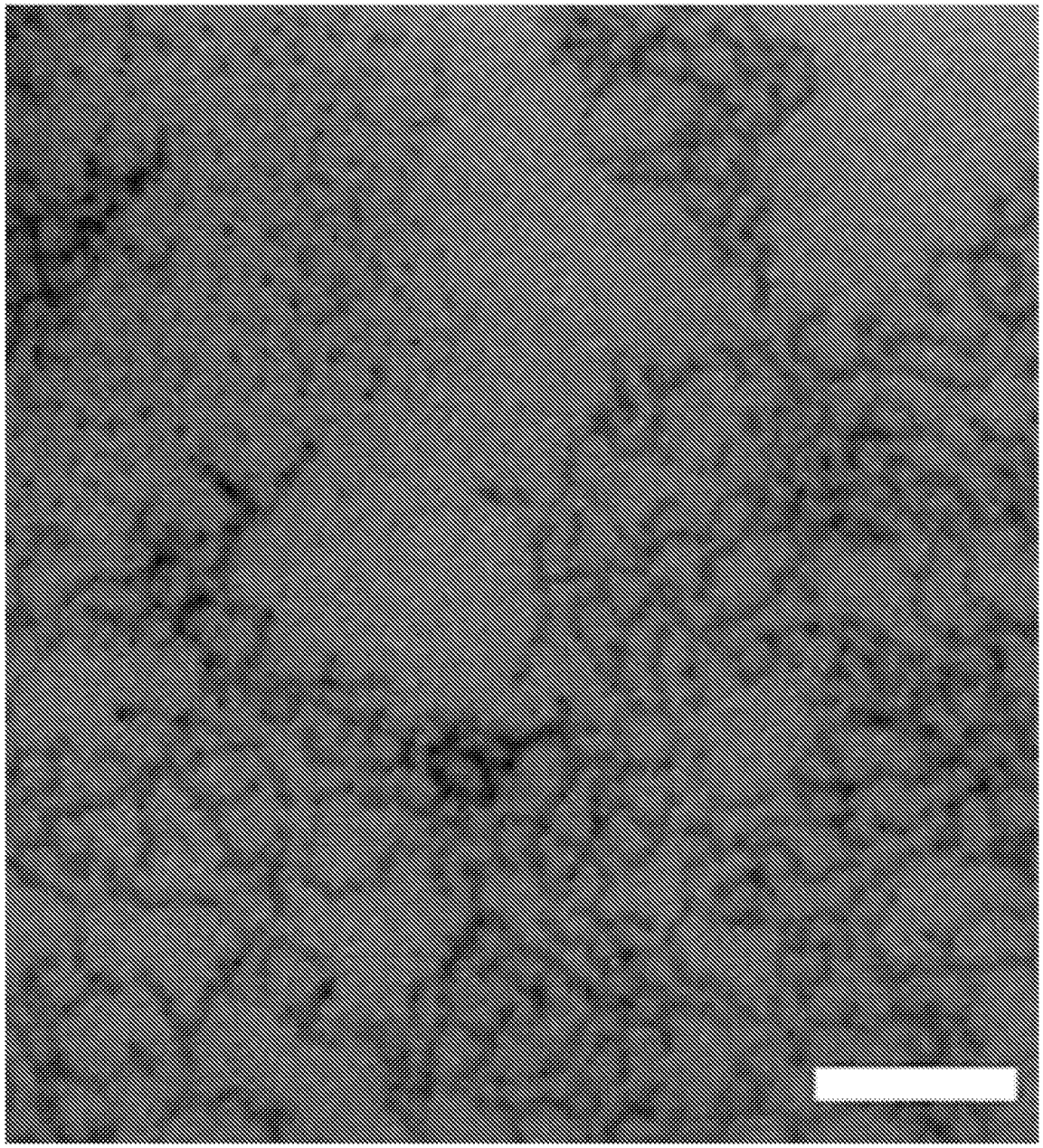
FIG. 45 is a STEM image of a 210° C. aliquot. Scale bar is 25 nm.
Figure 46:
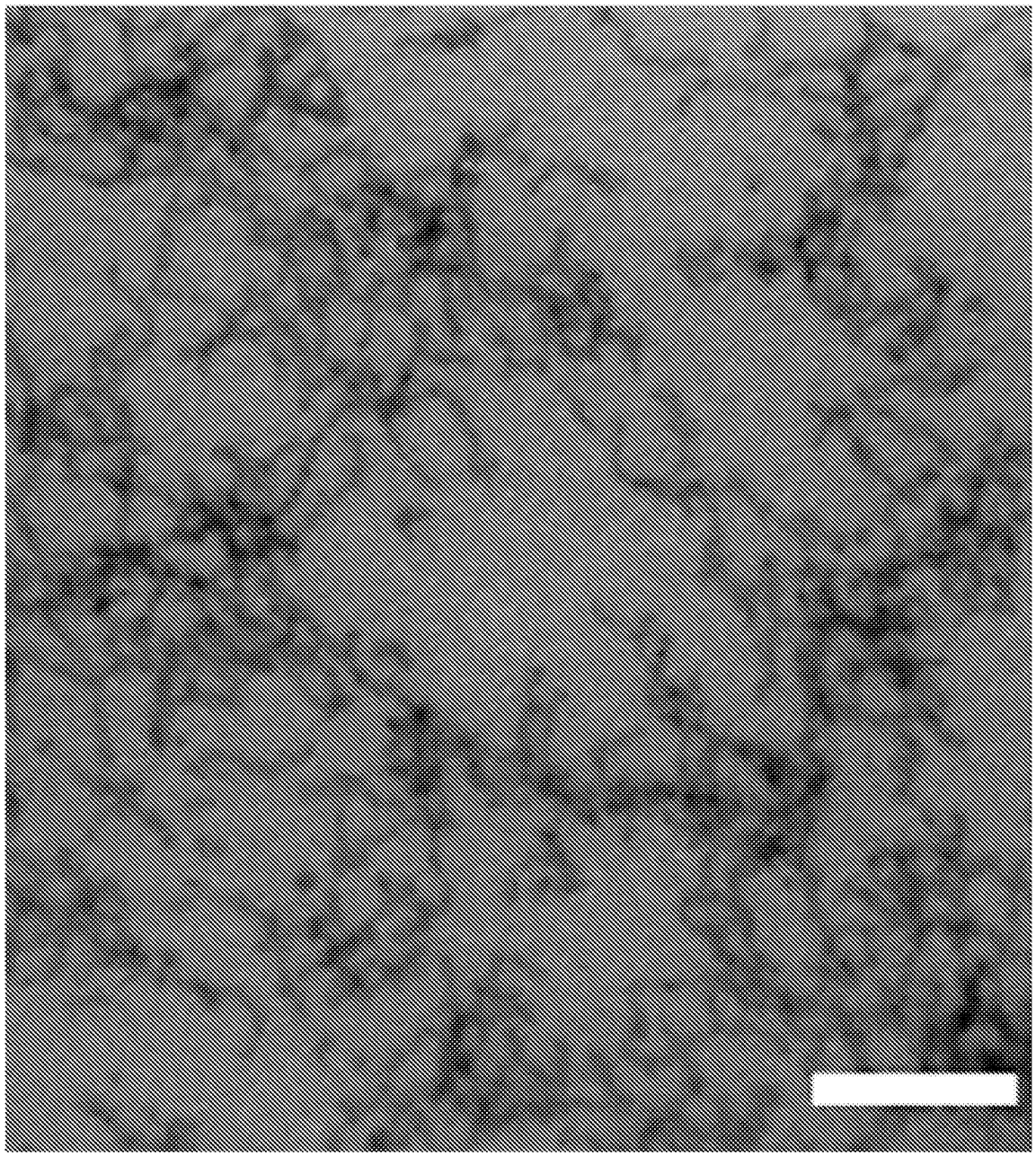
FIG. 46 is a STEM image of a 220° C. aliquot. Scale bar is 25 nm.
Figure 47:
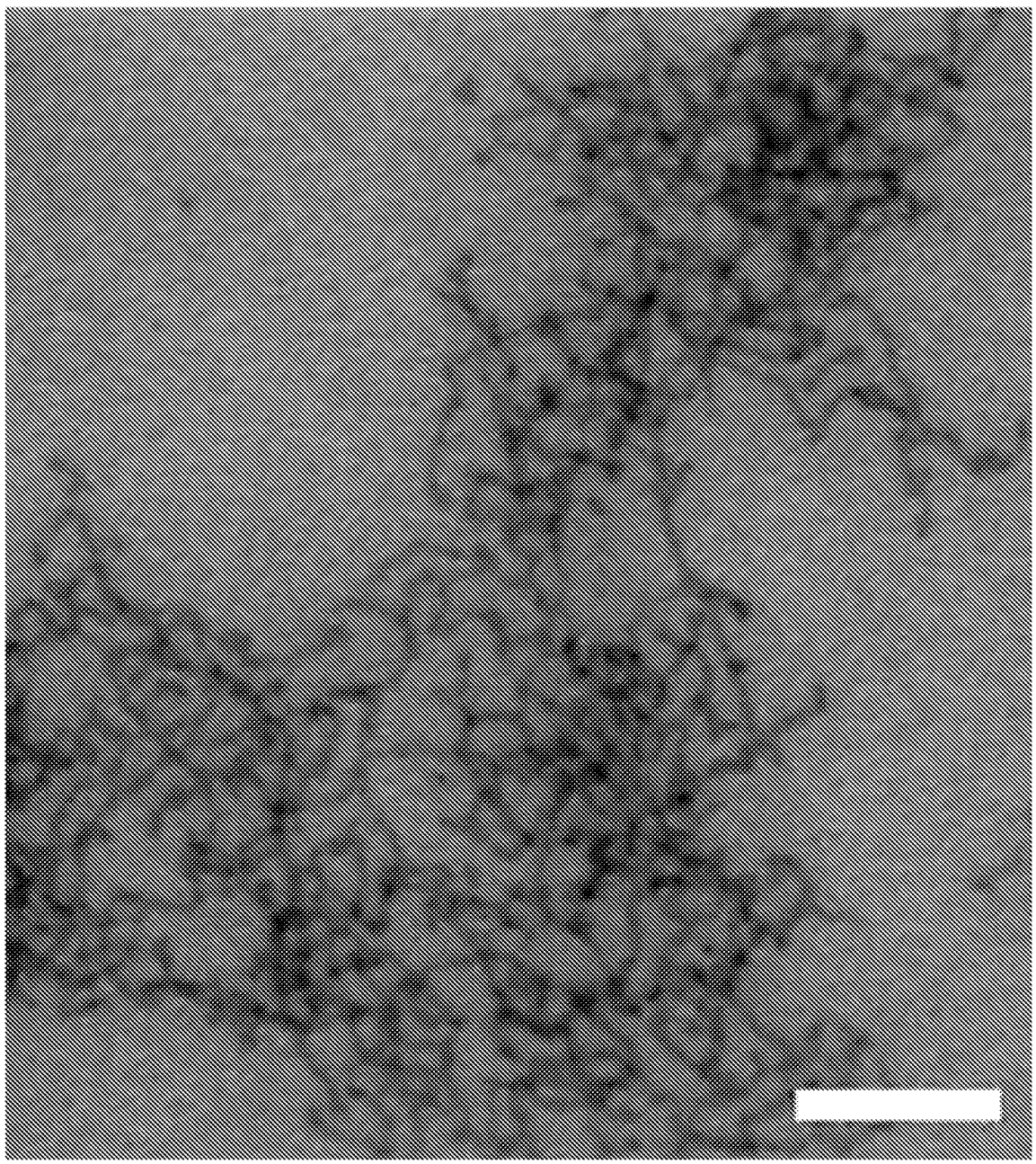
FIG. 47 is a STEM image of a 230° C. aliquot. Scale bar is 25 nm.
Figure 48:
FIG. 48 is a STEM image of a 240° C. aliquot collected at 1 min. Scale bar is 25 nm.
Figure 49:
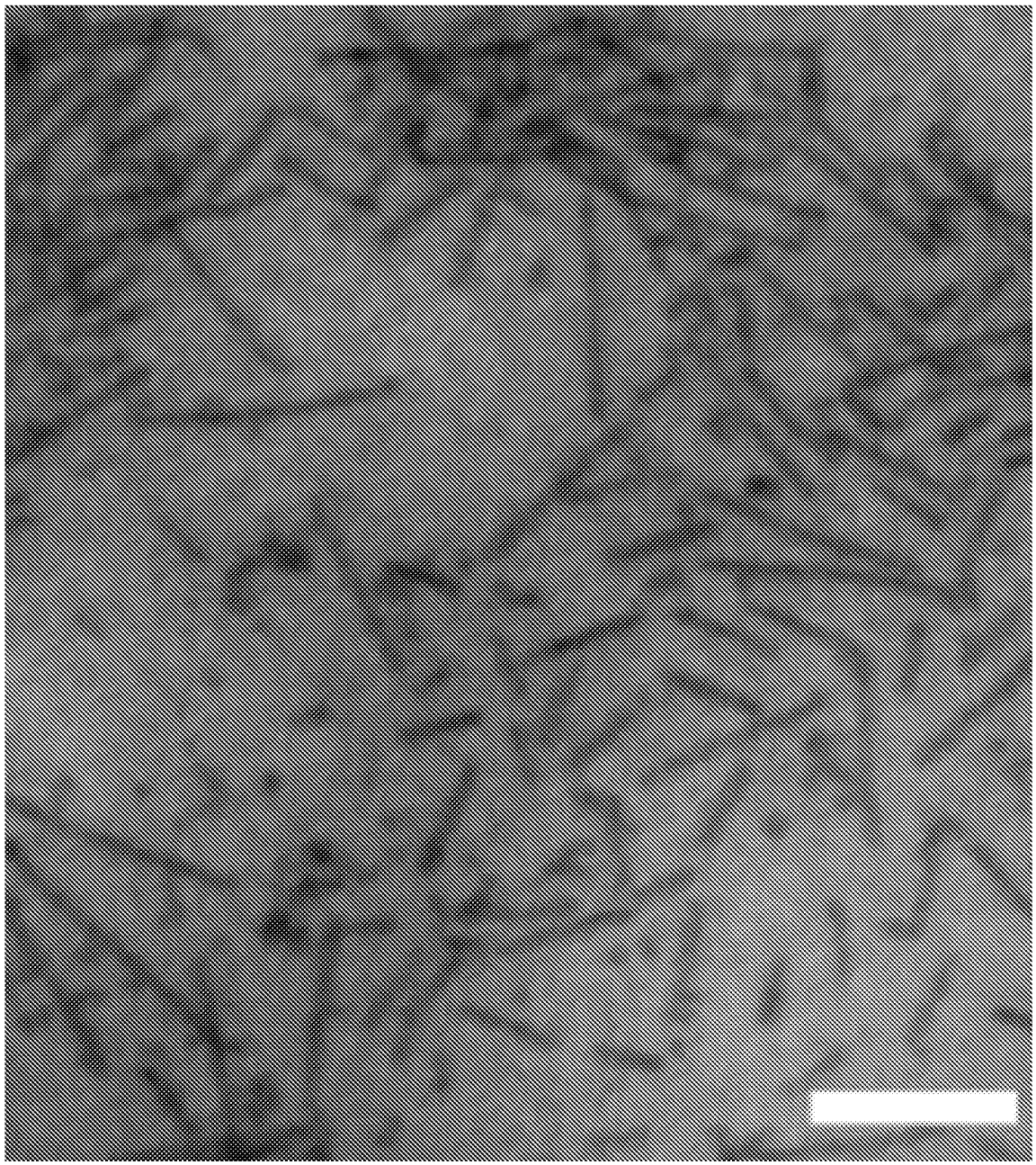
FIG. 49 is a STEM image of 240° C. aliquot collected at 15 min Scale bar is 25 nm.
Figure 50:
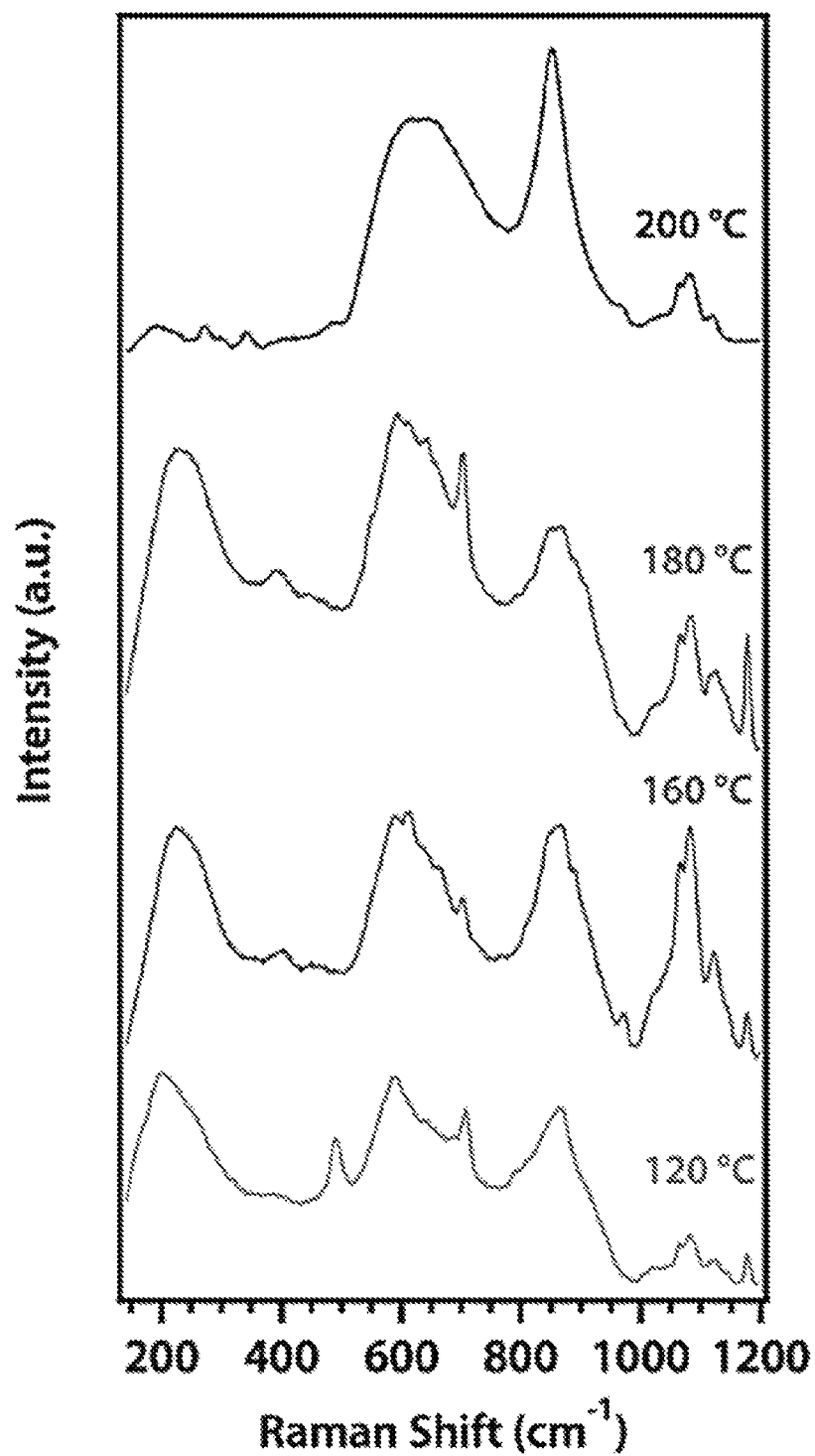
FIG. 50 is the Powder Raman spectra of the niobium oxo cluster synthesis aliquots collected after the injection of oleylamine at 120° C., 160° C., 180° C., and 200° C. The peak at 600 $cm^{-1}$ is typically assigned to Nb—O—Nb bridging vibrational modes (Jehng et al. Chem. Mater. 1991, 3(1), 100-107; Rosenkilde et al. Inorg. Chem. 1995, 34 (17), 4360-4369; Llordes et al. Nat Mater 2016, 15 (12), 1267-1273). Given how sharp the peak is in the 120-180° C. spectra and the presence of a peak at 850 $cm^{-1}$, typically assigned to Nb=O terminal bonds or "free" Nb—O bonds, it is likely that these vibrational modes arise from bridged niobium oxo clusters rather than amorphous niobium oxide. The broadening of the 650 $cm^{-1}$ peak at 200° C. supports the condensation of niobium oxo clusters into amorphous niobium oxide. The very weak peak at 400 $cm^{-1}$ in the 120-180° C. spectra could indicate the presence of Nb—Cl bonds (Rosenkilde et al. Inorg. Chem. 1995, 34 (17), 4360-4369). This peak disappears when the reaction mixtures is heated to 200° C.

After the limited aminolysis reaction, the mechanism progresses through three distinct steps (FIG. 42-FIG. 49): formation of niobium oxo clusters below 200° C. (FIG. 50), condensation of niobium oxo clusters into amorphous niobium oxide seeds between 200° C. and 210° C., and crystallization of amorphous seeds into niobium oxide nanorods. This is clearly demonstrated in FIG. 42 and FIG. 43 through the evolution of the XRD patterns and Raman spectra as the reaction temperature increases. XRD reveals the gradual emergence of crystalline diffraction peaks and synthesis of a crystalline product at 220° C. (FIG. 42). The Raman spectra (FIG. 43) of the intermediate products obtained at 200° C. and 210° C. exhibit a broad peak at 600 cm$^{-1}$ characteristic of a mixture of $NbO_6$, $NbO_7$, and $NbO_8$ polyhedra in amorphous niobium oxide (Jehng et al. Chem. Mater. 1991, 3 (1), 100-107). The transition from an amorphous material to an ordered structure occurring between 210° C. and 220° C. manifests as a sharpening and shift towards higher energies of the niobium-oxygen bridging stretches from 600 cm$^{-1}$ to 675 cm$^{-1}$. Interestingly, the Raman spectrum of the amorphous $Nb_2O_5$ product (200° C.) reveals that the broad peak at 600 cm$^{-1}$ is accompanied by strong terminal niobium-oxygen double bond stretches at 800 cm$^{-1}$ (FIG. 43). Similar Raman spectra have been reported for amorphous niobium oxide composed of a chain-like network of niobium oxide polyhedra that was formed by the hydrolysis-driven condensation of polyoxoniobate clusters (Jehng et al. J. Raman Spectrosc. 1991, 22 (2), 83-89; Llordes et al. Nat. Mater. 2016, 15 (12), 1267-1273). These observations suggest that the amorphous seeds formed by aminolysis of niobium oxo clusters are only partially condensed. The gradual decrease in intensity and broadening of the terminal niobium-oxygen double bond stretches, relative to the bridging niobium-oxygen band, between 200° C. and 210° C. indicate that the condensation of amorphous niobium oxide continues as the system approaches the crystallization temperature (FIG. 43). STEM images corroborate this schema with low contrast pseudo-spherical particles at 200° C. followed by the formation of amorphous asymmetric nanoparticles at 210° C. that then grows into crystalline $Nb_2O_5$ nanorods at elevated temperatures (FIG. 44-FIG. 49).

Figure 51:
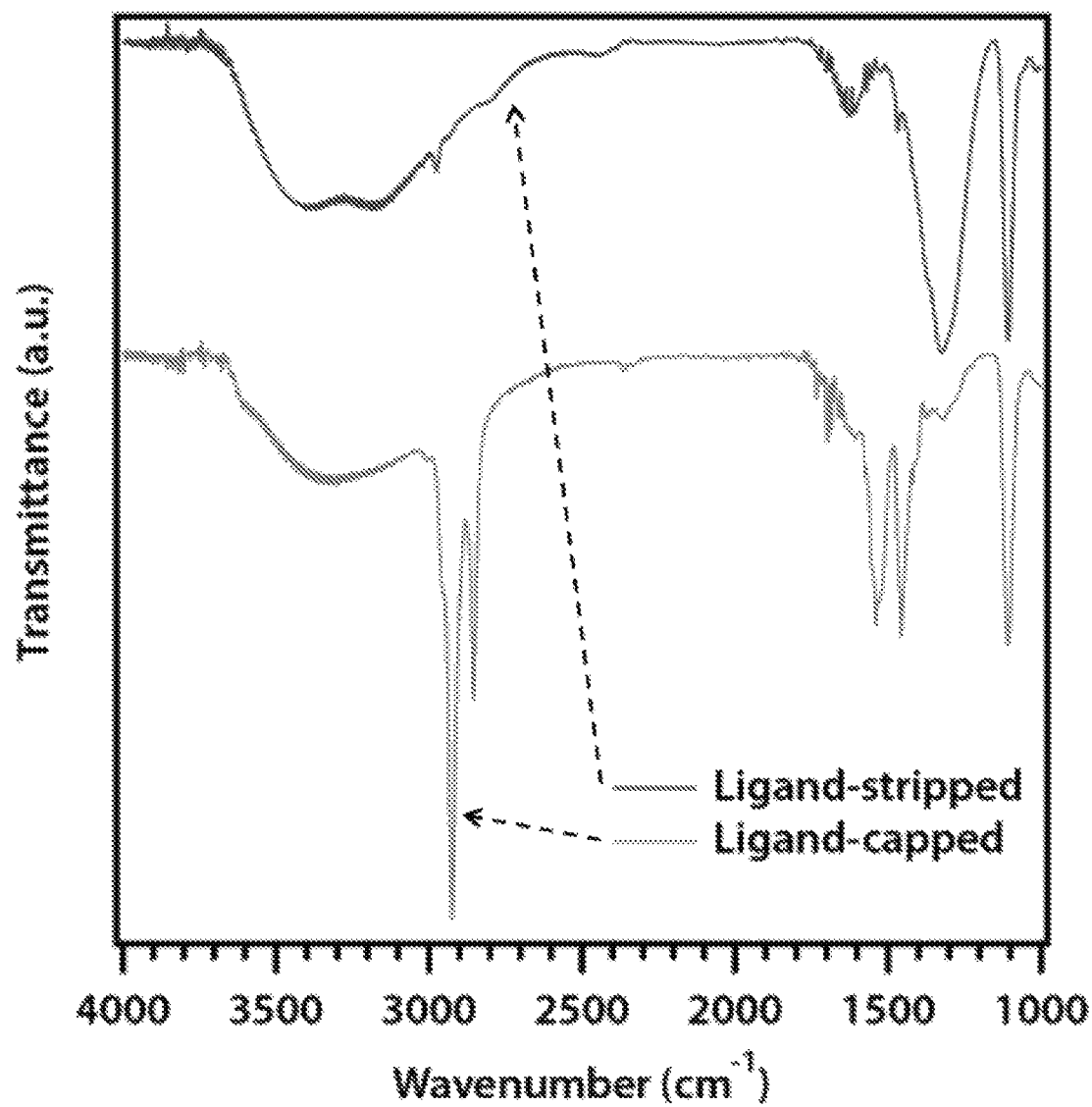
FIG. 51 is FTIR spectra of ligand-capped and ligand-stripped $Nb_2O_5$ nanorods deposited on undoped silicon. Disappearance of the —$CH_2$ stretches at 2926 and 2855 $cm^{-1}$ after treating the nanorods with nitrosonium tetrafluoroborate is characteristic of effective ligand removal.
Figure 52:
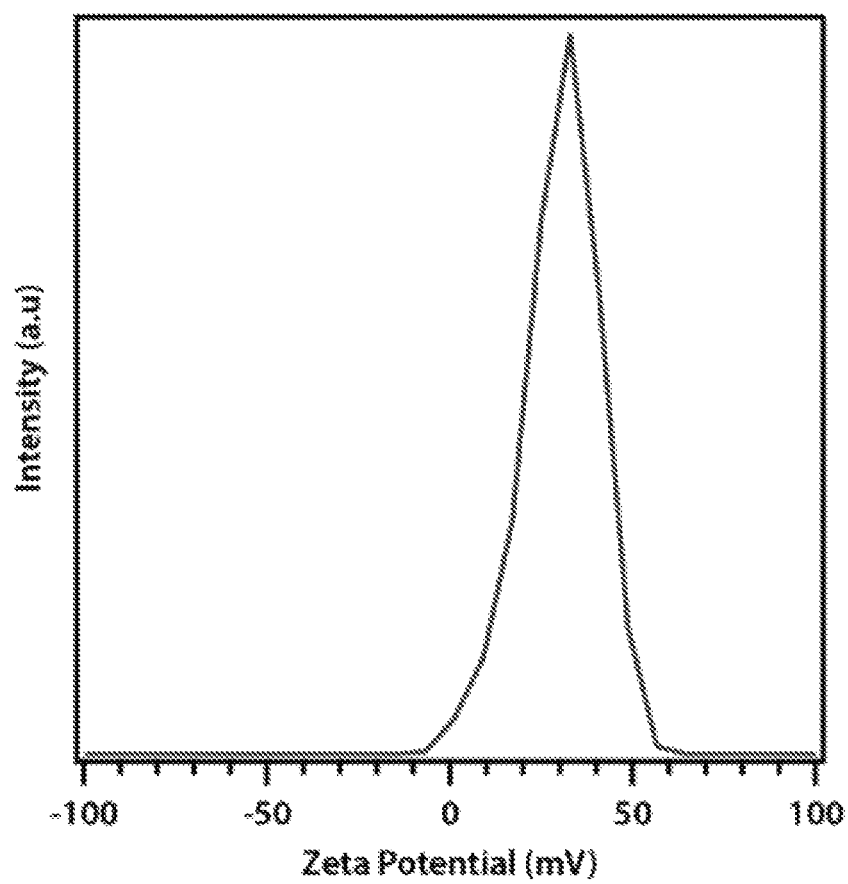
FIG. 52 is the zeta potential of ligand-stripped nanorods dispersed in dimethylformamide ($\zeta$=+33 mV).
Figure 53:
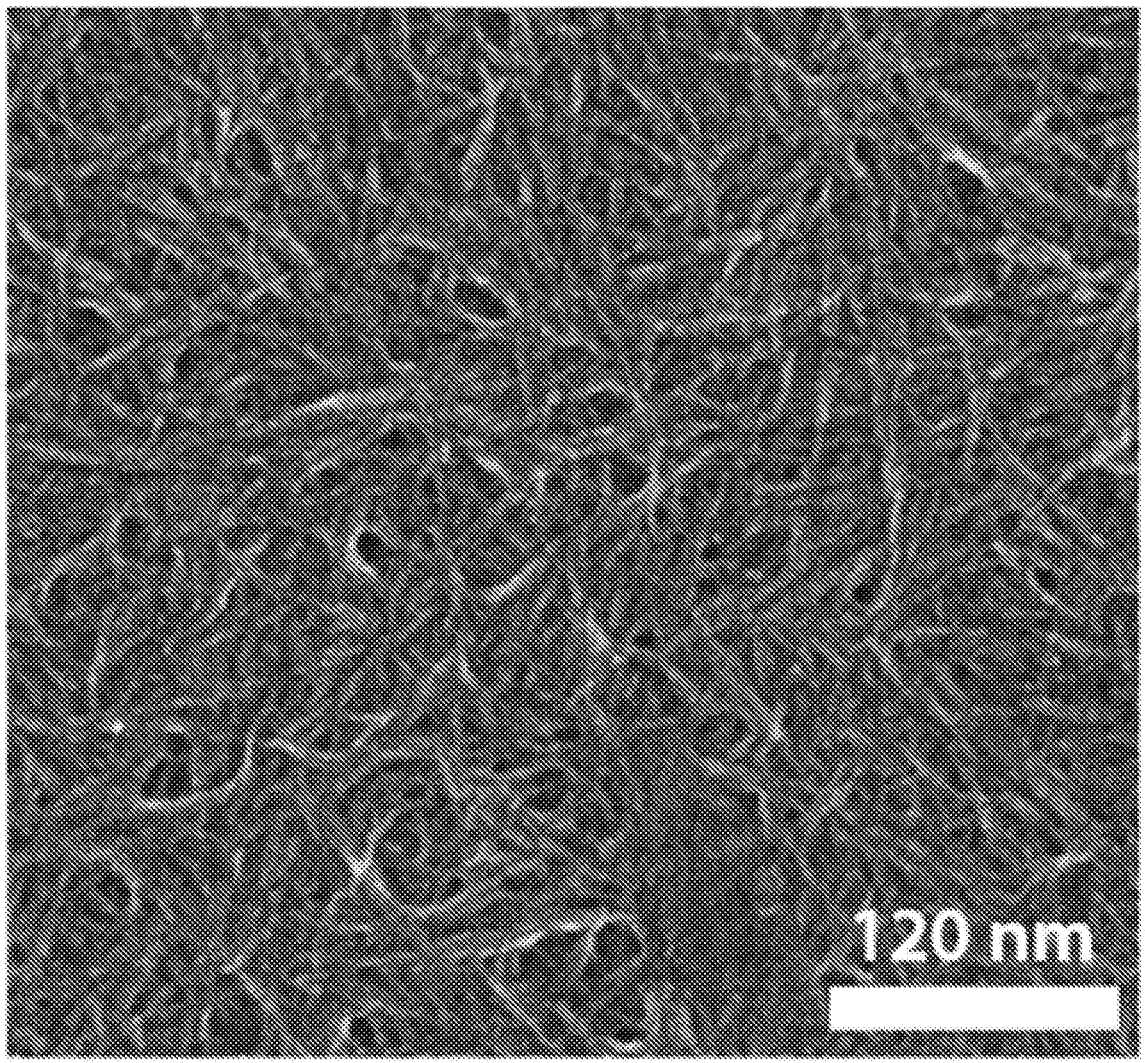
FIG. 53 is a top view scanning electron microscopy image of ligand-stripped nanorod film spin coated on undoped silicon.

One benefit of this lower temperature aminolysis-based synthesis of niobium oxide nanorods is their colloidal stability for the casting of functional thin films. In order to process the nanorods into switchable electrochromic thin films, a strategy similar to that used on tungsten oxide nanorods was employed to yield ligand-free colloidal dispersions that can be spin coated as films on transparent conducting oxide FTO coated glass (Heo et al. Nano Lett. 2017, 17 (9), 5756-5761). Briefly, the as-synthesized nanorods were ligand stripped in solution with a nitrosonium tetrafluoroborate procedure that leaves the surface positively charged and free of its native insulating layer. This electrostatically stabilized surface enables repulsion between nanorods to promote disordered packing and yield porous thin films. The procedure was discussed in detail in the previous paper and is summarized in the Experimental section. The step-by-step characterization of the process is described above (FIG. 51-FIG. 53).

Figure 54:
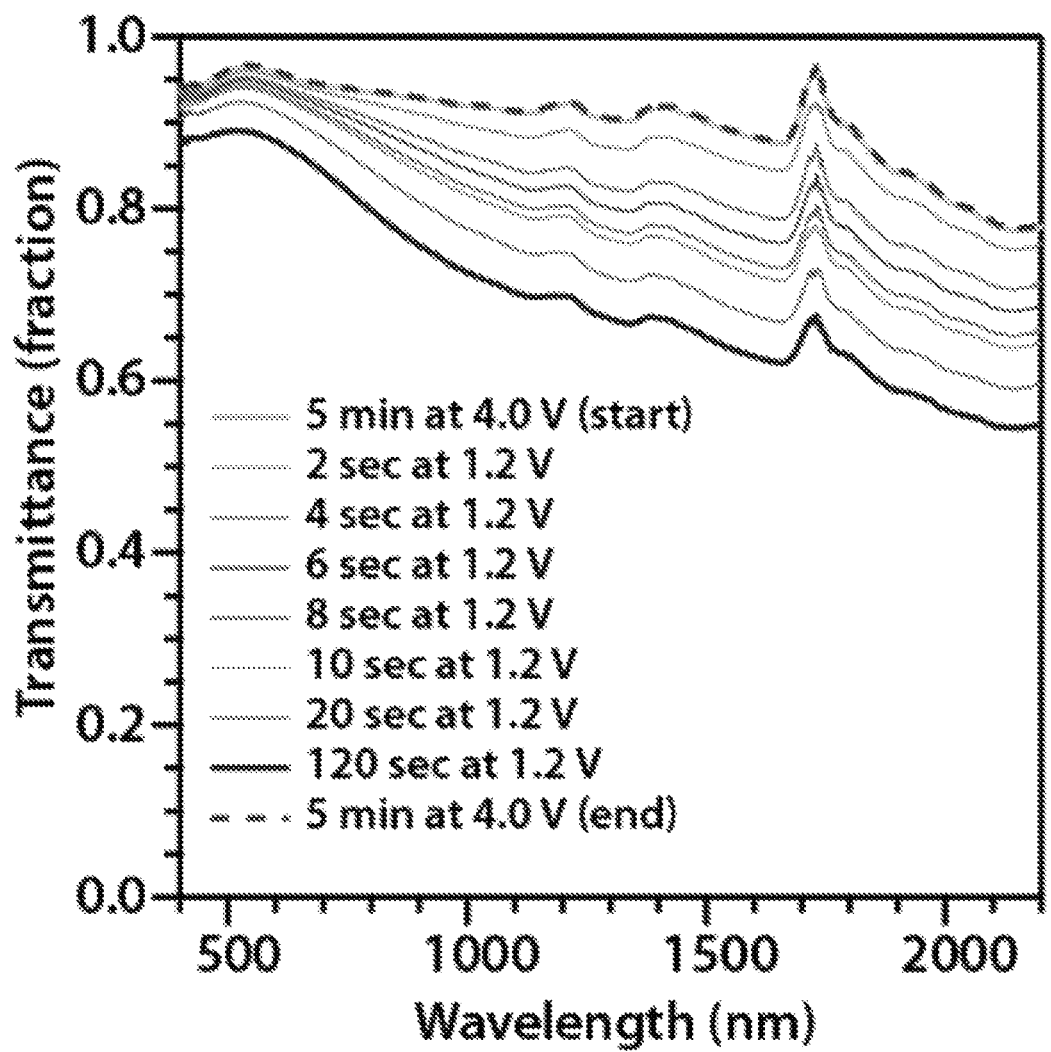
FIG. 54 is the transmittance spectra of a $Nb_2O_5$ nanorod film at 4.0 V ("clear" mode) and 1.2 V ("dark" mode) at different times. Dashed line corresponds to the second bleaching cycle.
Figure 55:
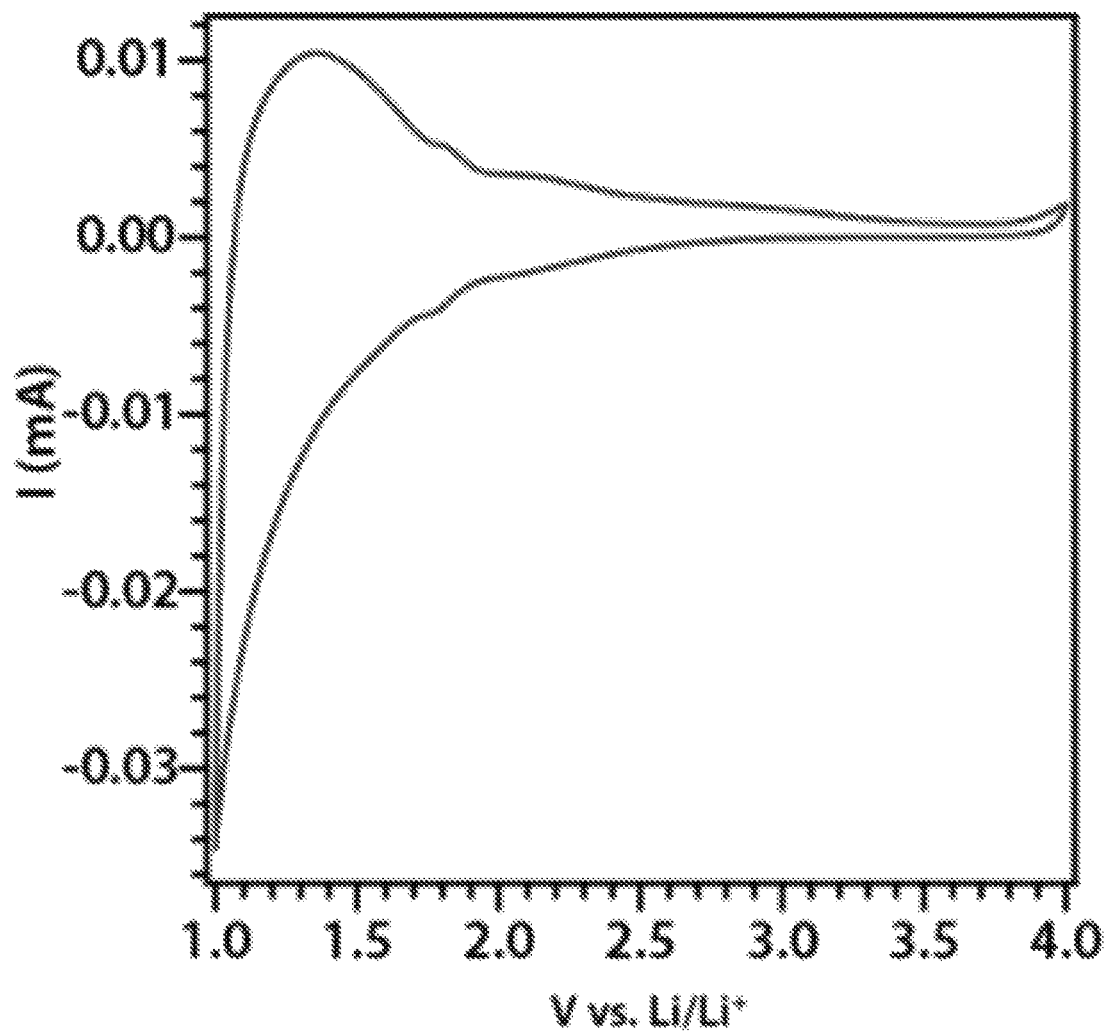
FIG. 55 is the cyclic voltammetry of the same $Nb_2O_5$ nanorod film from FIG. 54 at 1 mV/s scan rate.
Figure 56:
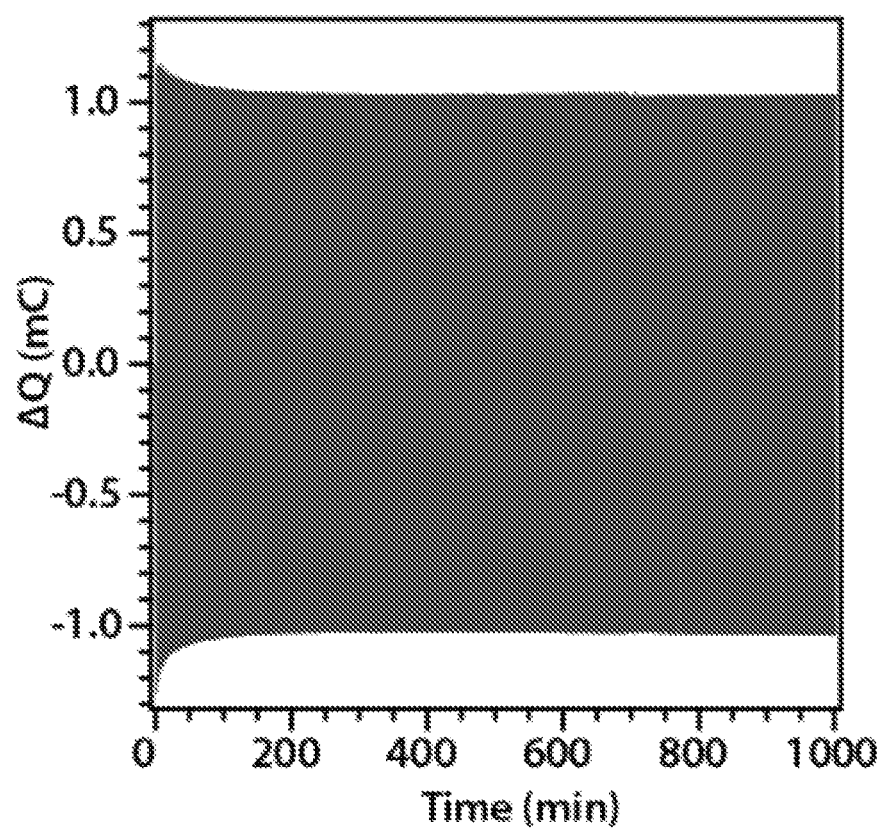
FIG. 56 is the charge and discharge behavior of the same $Nb_2O_5$ nanorod film from FIG. 54 and FIG. 55 by cycling the applied potential between 4.0 and 1.2 V 500 times (each potential step was applied for 1 min).
Figure 57:
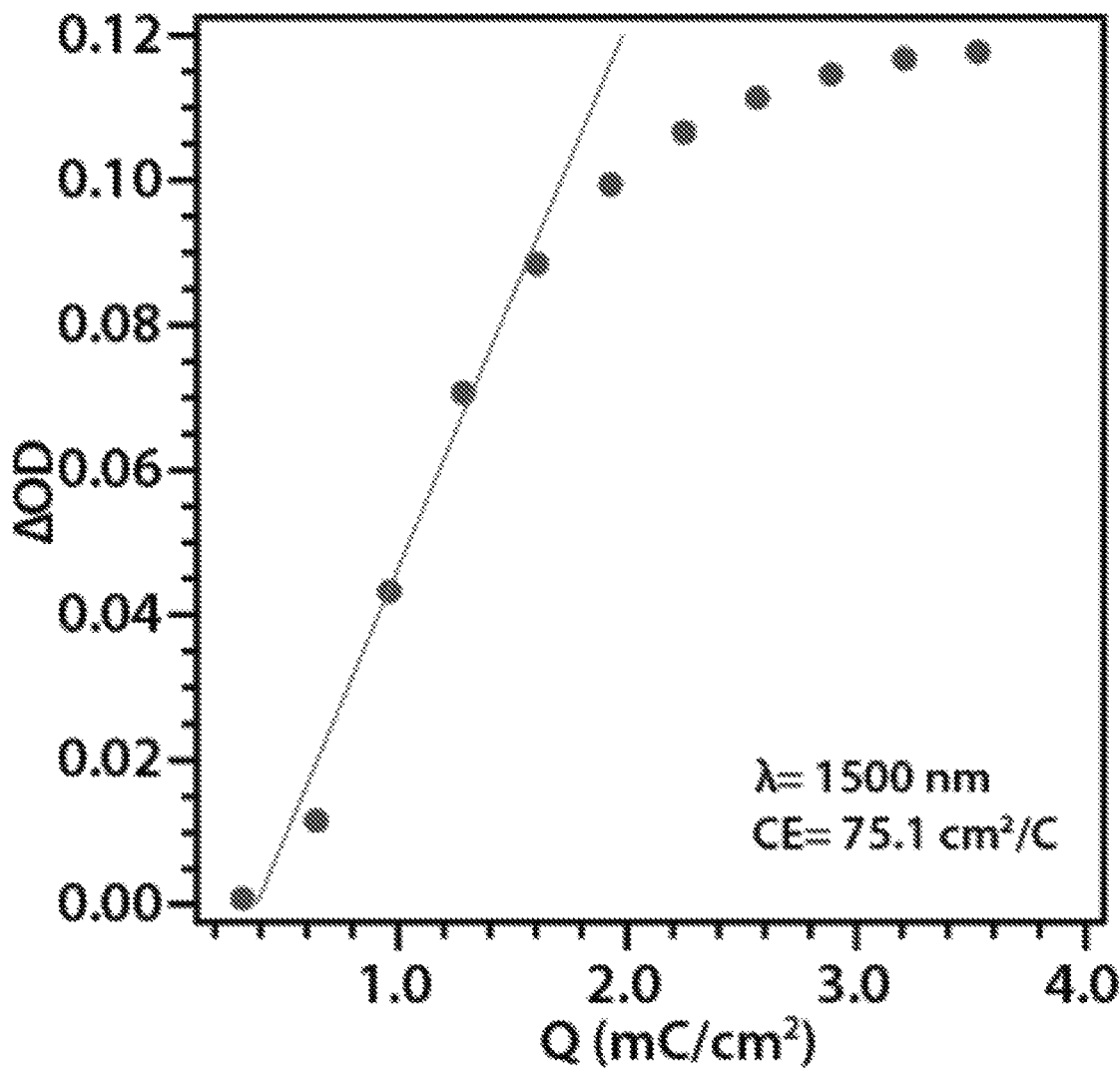
FIG. 57 is the coloration efficiency (CE=$\Delta OD/\Delta Q$) of the same $Nb_2O_5$ nanorod film of FIG. 54-FIG. 56 was determined by fitting the linear region of the plot with $\Delta OD$ measured at 1500 nm. Circles are experimental data points and the line is the fit result.
Figure 58:
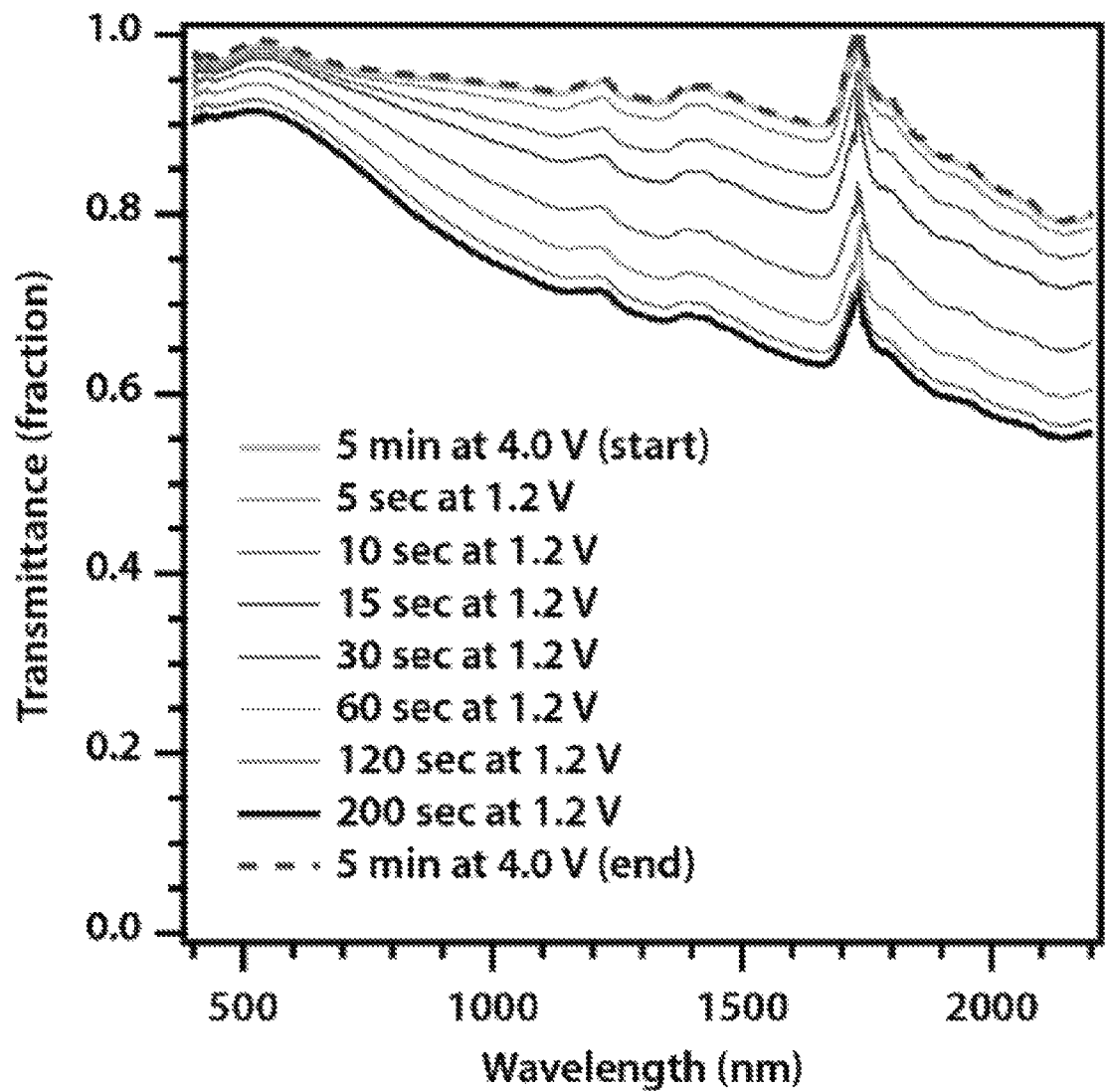
FIG. 58 is the transmittance spectra of $Nb_2O_5$ nanorod film in 0.1 M LiTFSI in tetraglyme electrolyte at 4.0 V ("clear" mode) and 1.2 V ("dark" mode) at different times. Dashed lines correspond to the second bleaching cycle. These experiments were performed on the same film used for the experiments reported in FIG. 54-FIG. 57.
Figure 59:
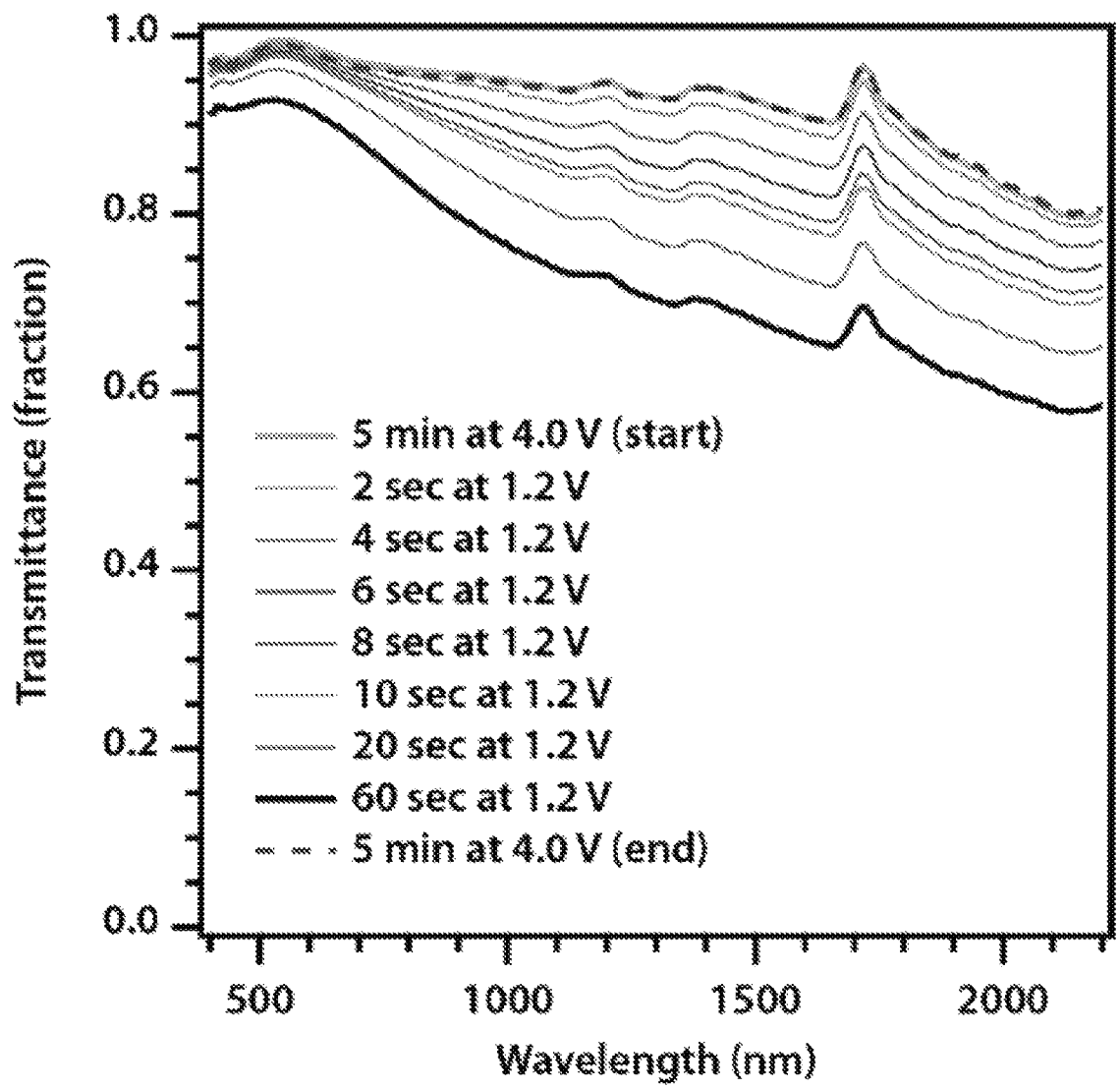
FIG. 59 is the transmittance spectra of $Nb_2O_5$ nanorod film in 3 M LiTFSI in tetraglyme electrolyte at 4.0 V ("clear" mode) and 1.2 V ("dark" mode) at different times. Dashed lines correspond to the second bleaching cycle. These experiments were performed on the same film used for the experiments reported in FIG. 54-FIG. 57.

Unlike prior reports of crystalline niobium oxide electrochromism that extends from the visible regime to the near-infrared, these niobium oxide nanorod films exhibit an electrochromic response that is predominantly in the infrared upon application of a reducing potential (FIG. 54). Cyclic voltammetry performed to identify the cathodic and anodic peaks show an anodic and cathodic peak at 1.82 V and 1.78 V, respectively (FIG. 55). Time dependent measurements of the electrochromic response shown in FIG. 54 further demonstrate that the reversible coloration behavior is fast and is only limited by the kinetics of electrolyte. The time to reach maximum contrast is on the order of 120 seconds for a typical test case electrolyte of 1 M LiTFSI in tetraglyme and decreases to 60 seconds and increases to 200 seconds for 3 M and 0.1 M electrolyte concentrations, respectively (FIG. 58 and FIG. 59). Finally, these electrochromic films can be cyclically bleached and colored up to 500 cycles stably with no significant signs of degradation (FIG. 56). The coloration efficiency at 1500 nm was determined as 75 cm$^2$/C (FIG. 57) and compares favorably to prior coloration efficiency reports around 24-47 cm$^2$/C (Yao et al. J. Phys. Chem. C 2014, 118 (1), 476-481). The observed cathodic and anodic potentials, fast kinetics, and cyclic stability are consistent with previously studied solid-state processed (sputter coated or chemical vapor deposited) thin films of orthorhombic niobium oxide (Yoshimura et al. J. Electrochem. Soc. 1997, 144 (9), 2982; Maruyama et al. J. Electrochem. Soc. 1994, 141 (10), 2868). Fast switching kinetics has been attributed to fast Li$^+$ diffusion along the [001] direction in the orthorhombic lattice and therefore anticipated in the nanorod films where the [001] direction is the predominant crystal direction. For cyclic stability specifically, it was assumed that prior solution processed sol-gel niobium oxide films were not durable, likely due to poor crystallinity or the presence of impurity phases, since cyclic performance tests were not discussed in prior studies (Ohtani et al. J. Electrochem. Soc. 1994, 141 (9), 2439). The solution-processed nanorods here exhibit cyclic stability comparable to sputter processed films and is attributed to the high crystal quality and phase purity afforded by colloidal nanocrystal synthesis.

One finding in this study is the anomalous electrochromic behavior of these nanorod films. Unlike prior reports on niobium oxide electrochromism where amorphous systems demonstrate a predominantly visible response and crystalline systems demonstrate a response across the visible and infrared regime, these nanorod films show an electrochromic response predominantly in the near infrared. Prior studies have suggested that the visible response is dependent on polaronic coloration intrinsic to the niobium oxide system while the infrared response may arise from Drude reflection upon electrochemical reduction of the system (Schmitt et al. *Electrochim. Acta* 2001, 46 (13-14), 2105-2111). To shed light on the origins of coloration, a series of experiments were performed to test i) the role of $Li^+$ intercalation and reduction of $Nb^{5+}$, ii) the emergence of Drude reflection or a local surface plasmon resonance upon charging, and iii) the possible extinguishing of the polaronic visible mode due to dimensional constraint.

Figure 62:
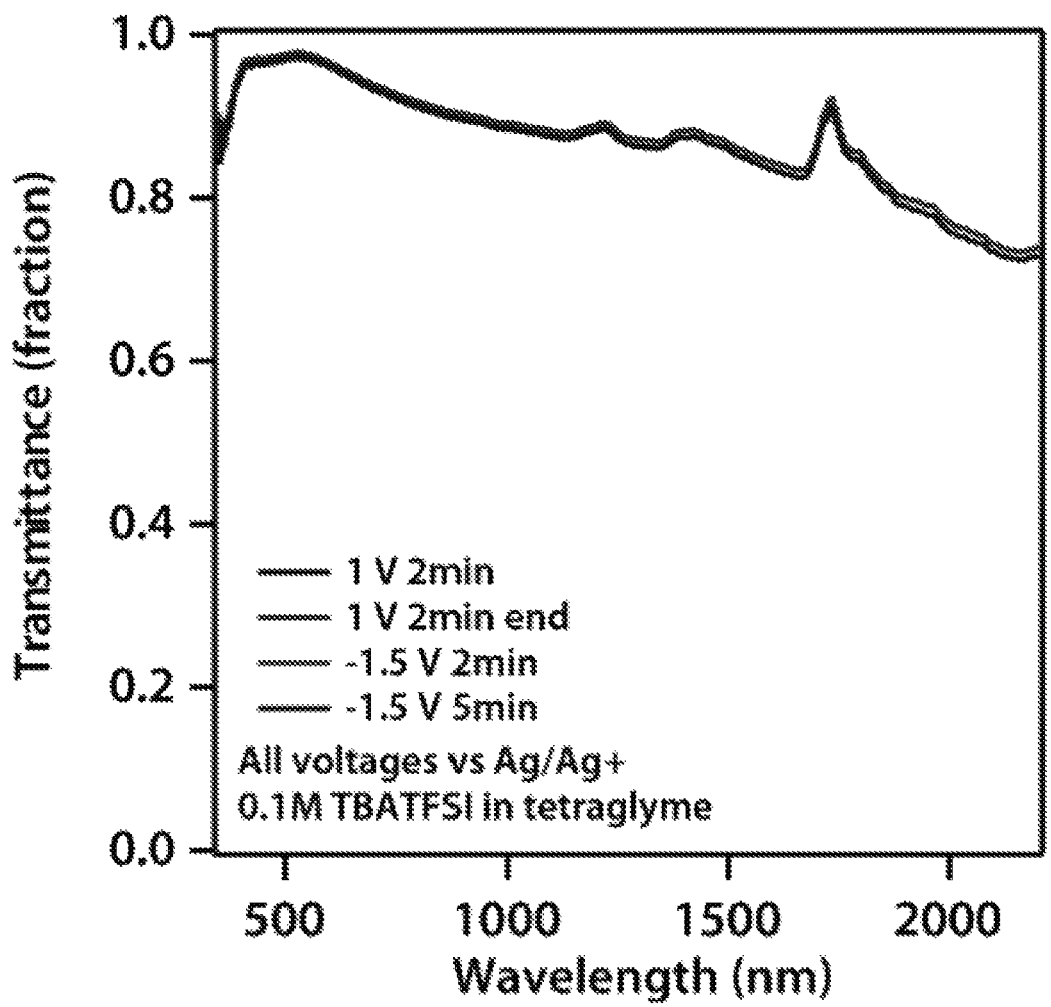
FIG. 62 is the results of testing the electrochromism of niobium oxide in the absence of $Li^+$ intercalation. Tetrabutylammonium bis-trifluoromethanesulfonimidate (TBA-TFSI) was used as the nonintercalating salt. No observable optical change was observed upon charging under similar potentials vs. $Ag/Ag^+$ reference electrode.
Figure 63:
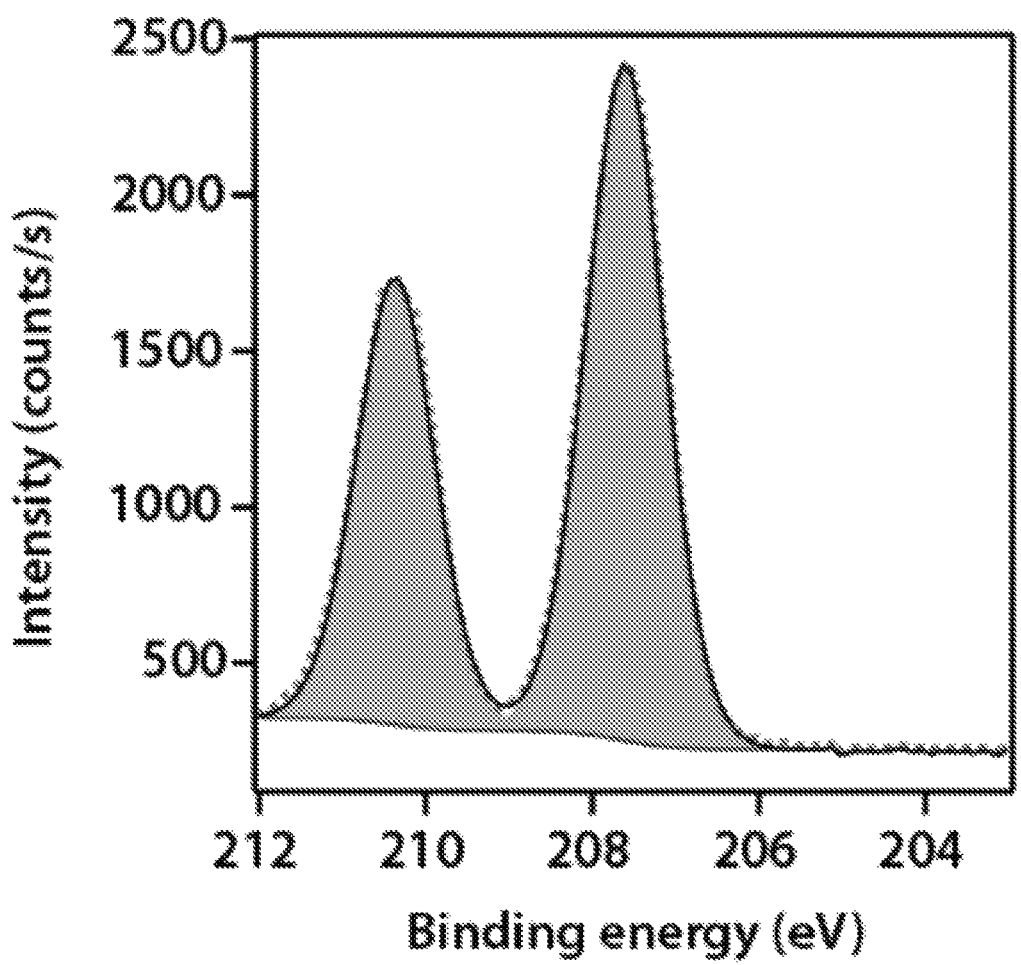
FIG. 63 is the air-free XPS spectrum of an as-prepared niobium oxide film (e.g., before charging ($Li^+$ intercalation)). XPS calibration was done using the $Nb_2O_{5O}$ is peak at 530.7 eV.
Figure 64:
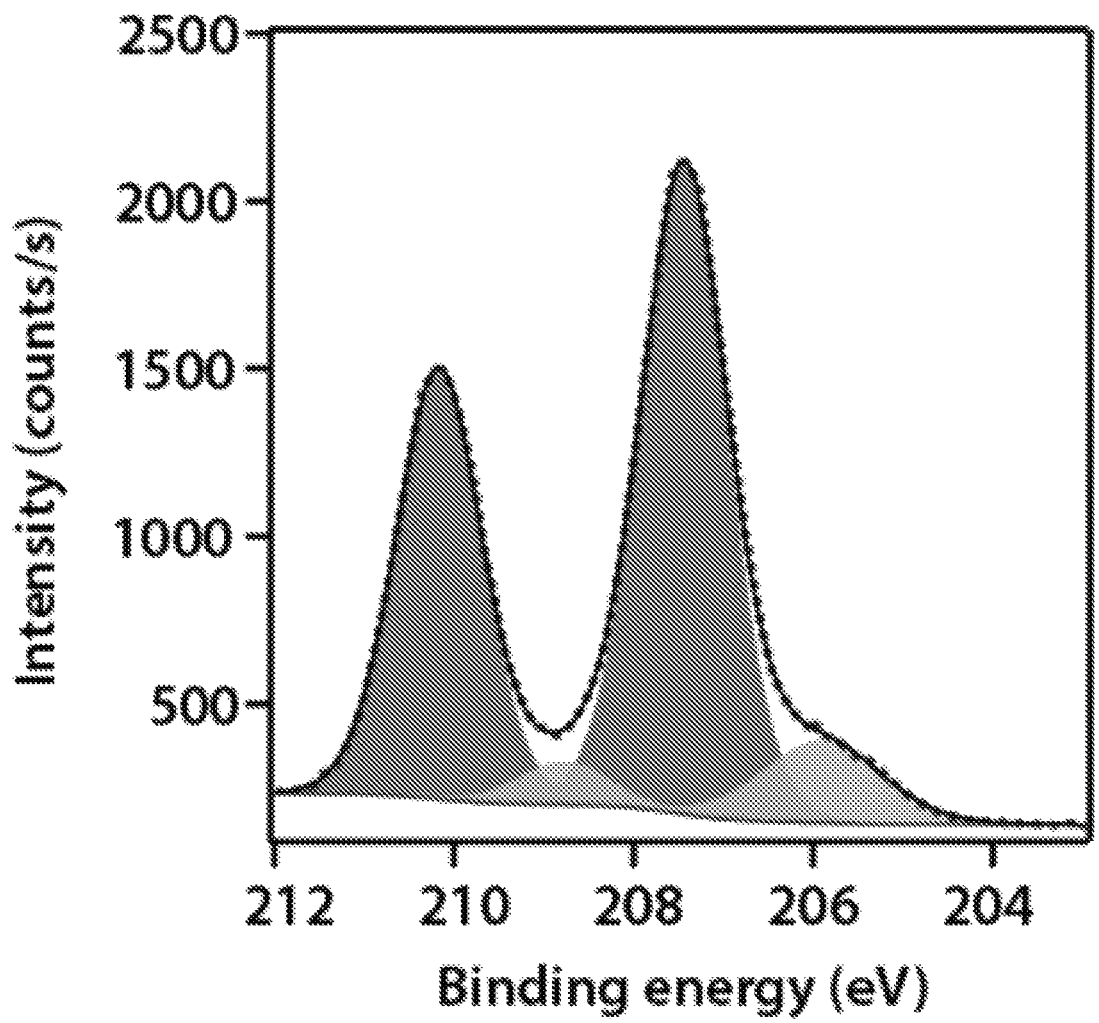
FIG. 64 is the air-free XPS of a niobium oxide nanorod film after charging ($Li^+$ intercalation). XPS calibration was done using the $Nb_2O_{5O}$ is peak at 530.7 eV.

First, films of niobium oxide nanorods were tested with a different electrolyte of non-intercalating TBA-TFSI in tetraglyme. As shown in FIG. 62, no electrochromic response was observed. This establishes the non-capacitive nature of both the visible and infrared electrochromism and their dependence on $Li^+$ intercalation.

Next, air-free XPS was conducted on as-prepared niobium oxide films and $Li^+$ intercalated films to determine the oxidation state of niobium in the film post-electrochemical charging. Shown in FIG. 63 and FIG. 64, the niobium formal oxidation state begins as +5 and becomes a mix of +5 and +4 upon reduction and $Li^+$ intercalation. This establishes equation (1) as still the primary mechanism for coloration for the system.

Figure 65:
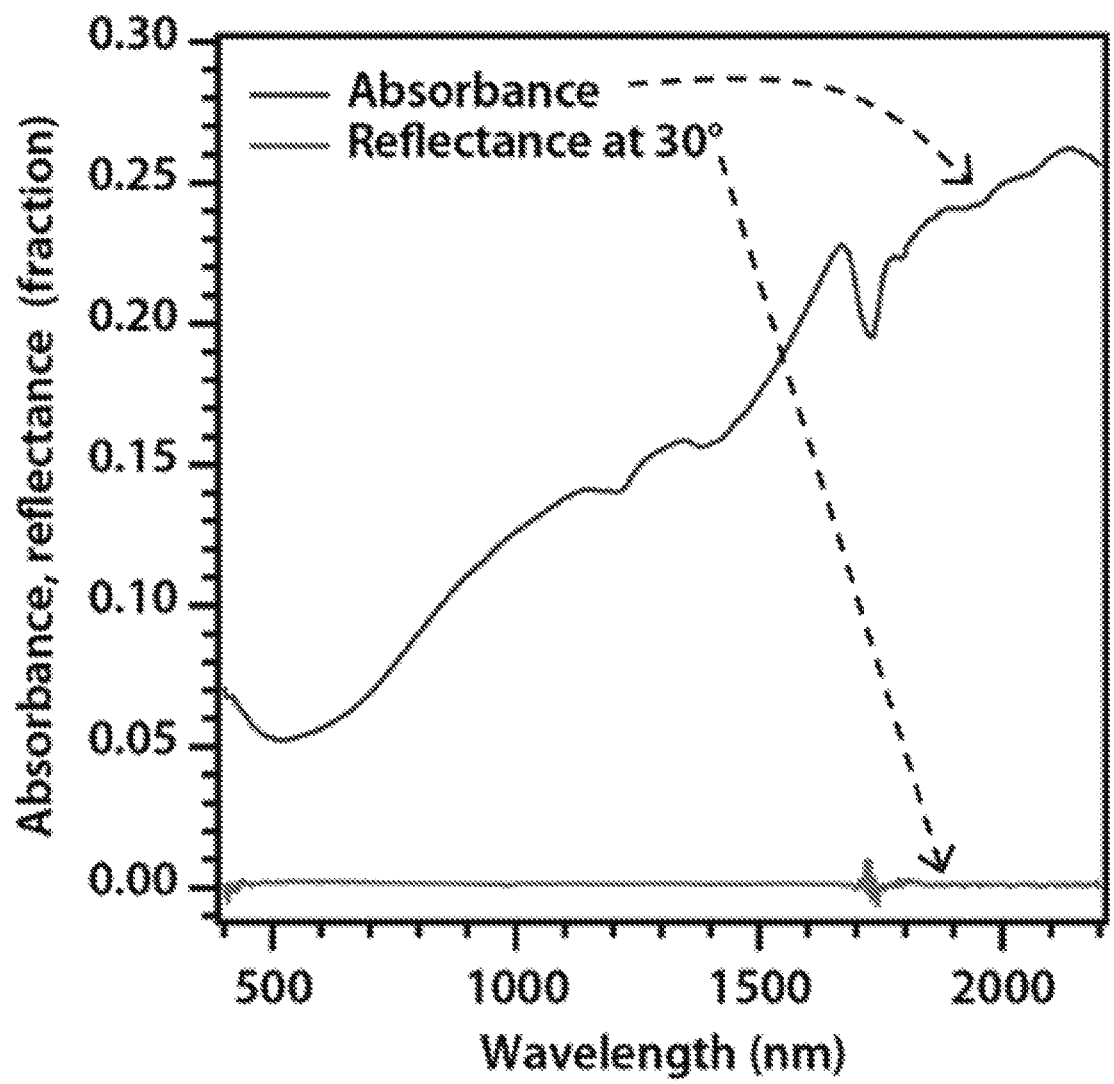
FIG. 65 is the deconvolution of the reflectance and absorbance spectra of $Nb_2O_5$ nanorod film in the colored (charged) state. The experiment was performed on the same film used for all spectroelectrochemical experiments.
Figure 66:
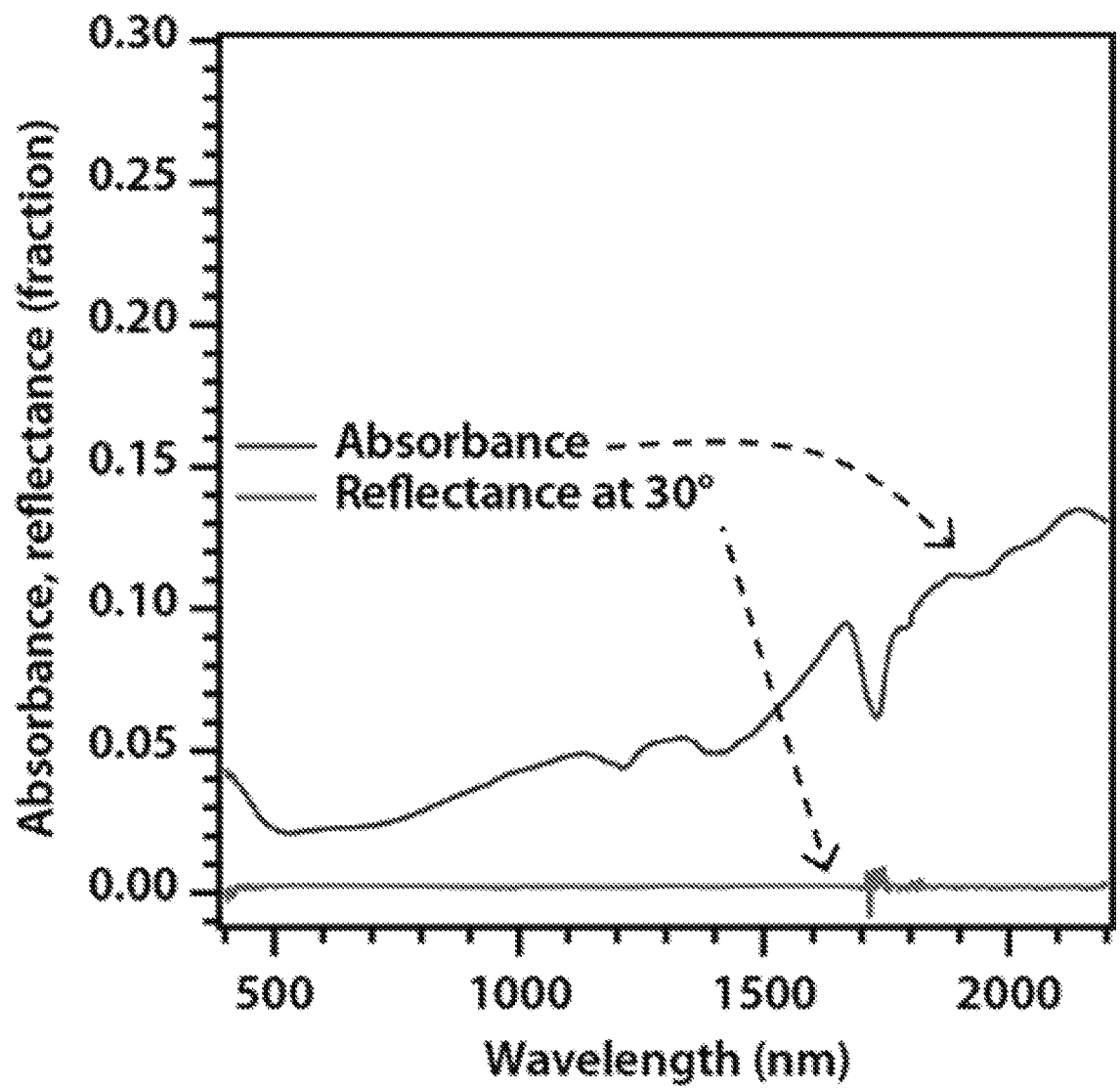
FIG. 66 is the deconvolution of the reflectance and absorbance spectra of $Nb_2O_5$ nanorod film in the bleached (discharged) state. The experiment was performed on the same film used for all spectroelectrochemical experiments.
Figure 67:
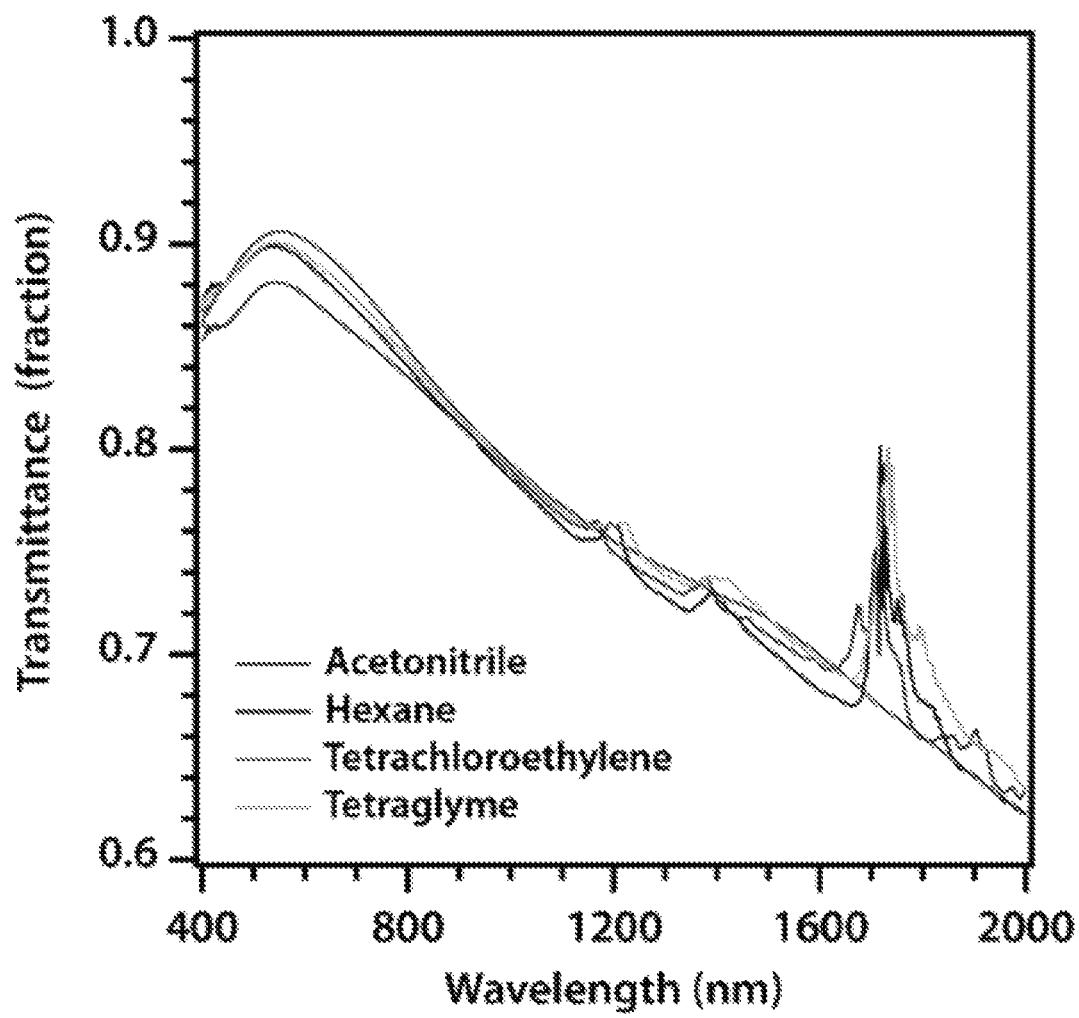
FIG. 67 is the transmittance spectra measured in different dielectric environments of colored $Nb_2O_5$ nanorod film after lithium intercalation (charging) by applying 1.2 V for 5 min in 1 M LiTFSI in tetraglyme. The colored film was immersed in solvents of various dielectric constant: acetonitrile ($\varepsilon$=37), hexane ($\varepsilon$=1.9), tetrachloroethylene ($\varepsilon$=2.5), and tetraglyme ($\varepsilon$=7.6).

Next, the second possibility that an increase in free electrons in the system contributes a metallic Drude reflection in the infrared regime or a localized plasmon resonance in the case of a nanocrystal film was investigated. To test these hypotheses, the transmission spectra was deconvoluted into its constitutive reflection and absorption components. FIG. 65 and FIG. 66 shows that when the niobium oxide nanorod films are charged, there is no observable reflection component. This confirms that both the visible and near infrared modulation is a result of a polaronic response in niobium oxide and is not a result of a metallic Drude reflection. By changing the dielectric constant of the electrolyte surrounding the charged film, there is also no observable change in the optical spectra thus ruling out the emergence of a localized surface plasmon upon charging (FIG. 67).

Figure 68:
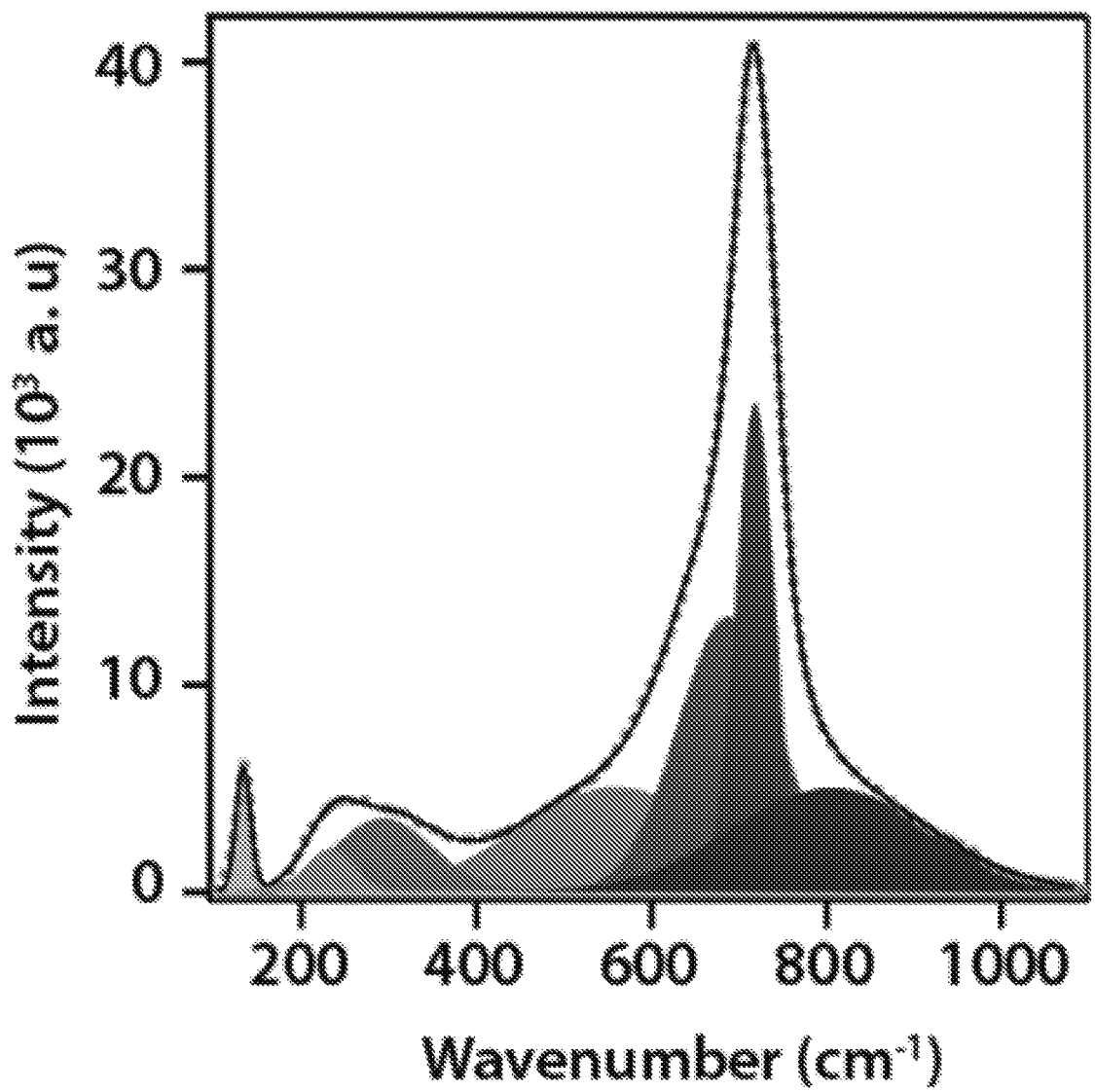
FIG. 68 is the deconvolution of the niobium oxide nanorod film Raman spectrum.
Figure 69:
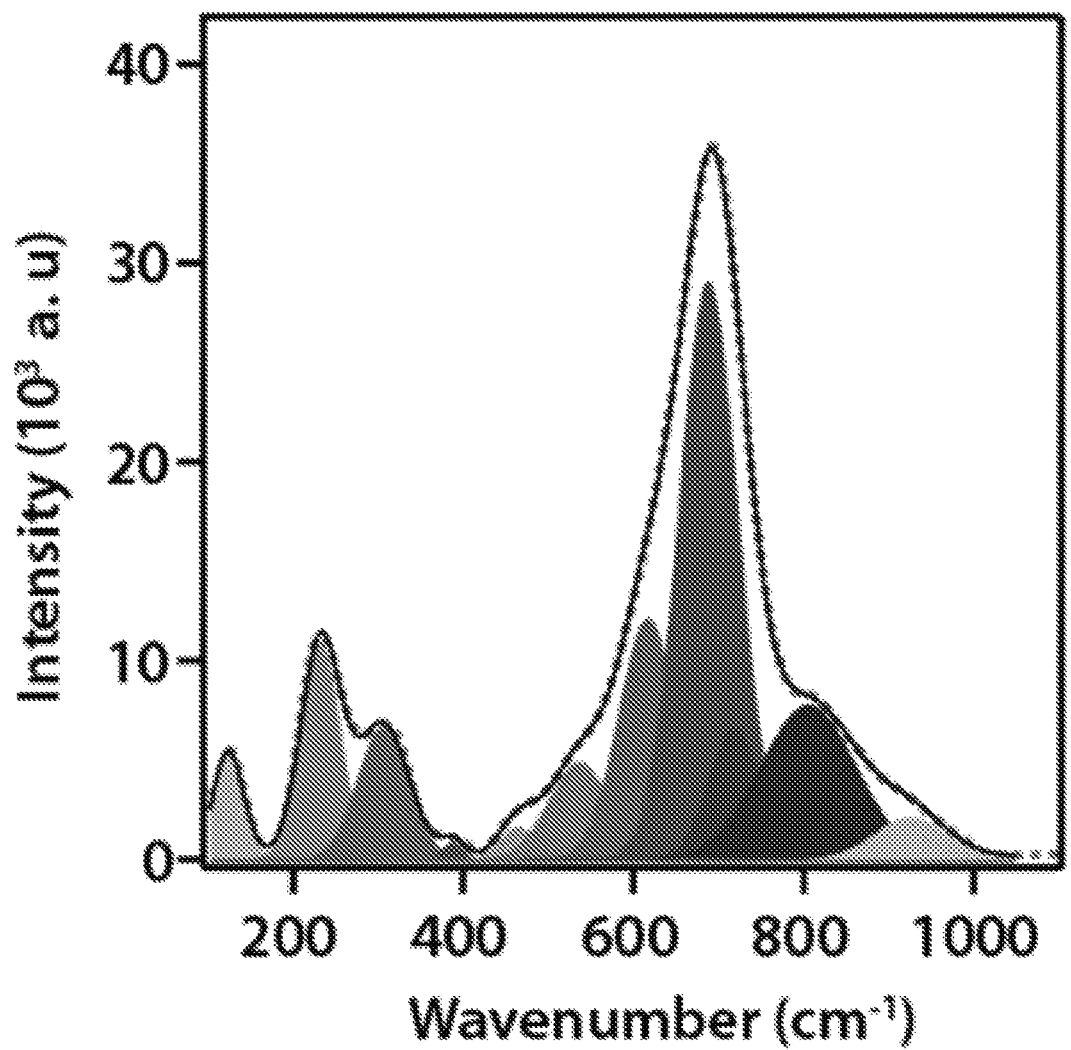
FIG. 69 is the deconvolution of the reference orthorhombic $Nb_2O_5$ Raman spectrum.

Finally, it is only by deconvoluting the Raman spectra of the niobium oxide nanorods and comparing it to the bulk counterpart that a plausible explanation for this anomalous behavior was obtained (FIG. 68 and FIG. 69). Fitting of the Raman spectra was done in IgorPro sequentially by constraining the location of the immediate two peaks to the left and right of a particular peak, and then releasing the constraint for further optimization locally. This procedure was conducted on the reference spectra first, and the locations were used as initial guesses to fit the nanorod spectra using the same method. As such, the uncertainty in location is unavailable globally in the fitting. The results of the fitting is shown in Table 1 and Table 2.

TABLE 1

Results of fitting for Niobium oxide nanorod Raman

| Peak | Type | Location | Amplitude | Amp Sigma | Area | Area Sigma | FWHM | FWHM Sigma |
|---|---|---|---|---|---|---|---|---|
| 0.00 | Gauss | 132.93 | 5927.93 | 61.38 | 126332 | 1334.28 | 20.02 | 0.24 |
| 1.00 | Gauss | 232.18 | 2186.85 | 49.51 | 148936 | 4591.97 | 63.98 | 1.38 |
| 2.00 | Gauss | 293.05 | 3554.11 | 37.12 | 490427 | 10018.90 | 129.63 | 1.83 |
| 3.00 | Gauss | 687.77 | 13245.9 | 48.00 | 1934940 | 7668.62 | 137.23 | 0.42 |
| 4.00 | Gauss | 559.03 | 5047.70 | 29.17 | 1441820 | 12471.40 | 268.34 | 2.92 |
| 5.00 | Gauss | 718.45 | 23557.20 | 48.11 | 1311040 | 4353.65 | 52.28 | 0.13 |
| 6.00 | Gauss | 805.47 | 4992.78 | 33.29 | 1427970 | 7292.39 | 268.69 | 1.53 |

TABLE 2

Results of fitting for Niobium oxide reference Raman

| Peak | Type | Location | Amplitude | Amp Sigma | Area | Area Sigma | FWHM | FWHM Sigma |
|---|---|---|---|---|---|---|---|---|
| 0.00 | Gauss | 123.87 | 5273.41 | 54.17 | 234795 | 2693.50 | 41.83 | 0.59 |
| 1.00 | Gauss | 232.18 | 10927.70 | 49.61 | 638831 | 3285.79 | 54.92 | 0.29 |
| 2.00 | Gauss | 305.52 | 6673.86 | 41.62 | 506858 | 3814.52 | 71.35 | 0.63 |
| 3.00 | Gauss | 388.04 | 842.51 | 60.34 | 26742.5 | 2211.23 | 29.82 | 2.75 |
| 4.00 | Gauss | 463.59 | 1662.10 | 72.43 | 86213.7 | 5352.46 | 48.73 | 2.04 |
| 5.00 | Gauss | 536.20 | 4894.44 | 53.53 | 448384 | 10129.50 | 86.06 | 1.86 |
| 6.00 | Gauss | 616.89 | 12140.90 | 113.35 | 1058110 | 12224.00 | 81.87 | 0.59 |
| 7.00 | Gauss | 687.76 | 29102.6 | 117.58 | 2563090 | 17259.70 | 82.74 | 0.30 |
| 8.00 | Gauss | 718.82 | 6578.66 | 123.87 | 505271 | 12855.10 | 72.15 | 0.83 |
| 9.00 | Gauss | 805.47 | 7794.93 | 39.24 | 1098970 | 10372.60 | 132.45 | 1.34 |
| 10.00 | Gauss | 925.03 | 2110.20 | 50.19 | 223553 | 6320.48 | 99.52 | 2.05 |

From the comparison (FIG. 68 and FIG. 69), it can be seen that there are differences between the Raman spectra of bulk and nanorod $Nb_2O_5$ (Brayner et al. *Phys. Chem. Chem. Phys.* 2003, 5, 1457-1466; McConnell et al. *Spectrochim. Acta Part A Mol. Spectrosc.* 1976, 32(5), 1067-1076). Prior studies addressing the changes in Raman modes for T-$Nb_2O_5$ pre- and post-lithiation have shown shifts, but not systematic broadening of Raman modes or disappearance of contributions to the absorption spectra (Chen, D et al. *J. Am. Chem. Soc.* 2017, 139 (20), 7071-7081). Those results suggest that the Raman spectra measured of the pristine nanorods and bulk powder should be qualitatively representative of the phonon modes responsible for coloration post-lithiation. Comparing the two samples, general broadening of various phonon modes and the disappearance of one of the high-energy longitudinal optical phonon modes at 925 $cm^{-1}$ for the T-$Nb_2O_5$ nanorods was observed. These changes in Raman active phonon modes can be caused by anisotropic nanostructuring since the nanorod width is comparable to the size of a single orthorhombic $Nb_2O_5$ unit cell (a=0.62 nm, b=2.9 nm, and c=0.39) in the a direction and smaller in the b direction while the nanorod length is larger than the unit cell in the c direction. As phonon modes, such as high energy longitudinal optical phonon modes (925 $cm^{-1}$), are key enablers of polaronic absorption in $Nb_2O_5$, the disappearance of this high-energy mode can explain the low visible optical response of this material compared to its bulk counterpart. This analysis further suggests that the visible and infrared absorptions are polaronic responses that are intricately associated with the a-b and c axis directions in the crystal structure, respectively. More broadly, this observation further motivates investigating the use of synthetic methods that can enable independent tuning of crystallite dimensions to select for specific polaronic electrochromic responses by controlling the presence or absence of specific phonon modes and, in turn, polaronic modes Conclusion In summary, the colloidal synthesis of niobium oxide nanorods through the aminolysis of a chloro oleyl niobium (V) complex was demonstrated to yield colloidally stable nanorods that can be further processed into electrochromic thin films. The synthesis proceeds through the initial formation of niobium oxo clusters through the aminolysis of chloro oleyl niobium (V) species, condensation to form small amorphous niobium oxide seeds, and final crystallization at elevated temperatures to yield high aspect ratio nanorods. These materials, when tested as solution deposited films, exhibit properties comparable to sputter coated niobium oxide thin films with the exception of electrochromic coloration that is predominantly in the near infrared. Further investigation of this phenomenon revealed that both the visible and infrared coloration for orthorhombic niobium pentoxide are triggered by polaronic responses that are associated strongly to specific crystalline directions. The synthesis of an anisotropic nanocrystal, that has a width approximately equal to or smaller than the a and b dimensions of one unit cell, can affect the accessibility of phonon modes that support polaronic absorption in the visible range upon charging. Further studies to elucidate the specific link between various phonon modes and coloration behavior in niobium oxide systems are in preparation. More broadly, this study demonstrates how the dimensional control through colloidal nanocrystal synthesis can be exploited to tune the properties of traditional electrochromic materials, such as niobium oxide, as well as open a new opportunity to study the physics that underlie the optical response of these materials.

Example 5

The colloidal synthesis of anisotropic niobium oxide nanocrystals ($Nb_2O_{5-x}$ NCs), enabling phase control between their monoclinic and orthorhombic phases, is discussed herein. The anisotropic monoclinic $Nb_{12}O_{29}$ nanocrystals (am-$Nb_{12}O_{29}$ NCs), possessing a two-dimensional nanoplatelet morphology with ~95 nm in long axis and ~9 nm in short axis, are the first successful synthesis of monoclinic $Nb_2O_{5-x}$ nanocrystals. X-ray diffraction and simulations confirmed the anisotropic monoclinic $Nb_{12}O_{29}$ nanocrystals are monolayer materials with preferential elongation along the [011] crystallographic direction. The anisotropic nature of the anisotropic monoclinic $Nb_{12}O_{29}$ nanocrystals led to reduced abundance of Nb=O terminal bonds in their local structure, as indicated by both experimental and simulated Raman spectra. Phase control was achieved by manipulating the chemistry of the niobium precursors used to initiate the nanocrystal growth, with niobium chloro oleate favoring the growth of the orthorhombic phase, while the niobium oxo clusters favored the growth of the monoclinic phase. The anisotropic monoclinic $Nb_{12}O_{29}$ nanocrystals showed a dual-mode electrochromism: the first step was dominated by capacitive charging, leading to increased concentration of delocalized electrons and absorption in near-infrared region, and the second step was dominated by ion intercalation, leading to generation of localized electrons and absorption in visible region. These results can promote the synthetic development and applications of $Nb_2O_{5-x}$ nanocrystals, as shown in the dual-mode electrochromism of anisotropic monoclinic $Nb_{12}O_{29}$ nanocrystals for independently controlling the solar spectrum in electrochromic smart windows.

Introduction

Niobium(V) oxide ($Nb_2O_{5-x}$) displays rich polymorphic forms with diverse electronic and optical properties which have made it attractive for applications in catalysts, electrochromics, batteries, and sensors (Nowak et al. *Chem. Rev.* 1999, 99 (12), 3603-3624; Rani et al. *J. Mater. Chem. A* 2014, 2 (38), 15683-15703). Especially in electrochromics (materials modulating their optical properties electrochemically in response to an external potential), bulk $Nb_2O_{5-x}$ crystals have drawn interest due to their tunable optical modulation across visible and near-infrared (NIR) regions (Yoshimura et al. *Thin Solid Films* 1996, 281-282, 235-238; Schmitt et al. *Sol. Energy Mater. Sol. Cells* 1998, 54 (1), 9-17), as well as because of their stability, which can be due to minimal change in their crystal structure during ion intercalation and their large band gap (~3.8 eV) (Kumagai et al. *J. Electrochem. Soc.* 1999, 146 (9), 3203-3210; Le Viet et al. *J. Phys. Chem. C* 2010, 114 (49), 21795-21800).

Upon being coated on windows, electrochromics can be used to modulate the incident solar spectrum to gain better energy management (Wang et al. *Annu. Rev. Chem. Biomol. Eng.* 2016, 7 (1), 283-304). However, bulk $Nb_2O_{5-x}$ crystals have had limited success when compared to the state-of-the-art electrochromics, tungsten oxide nanocrystals ($WO_{3-x}$ NCs), due to their relatively poor coloration efficiency and switching kinetics (Wang et al. *Annu. Rev. Chem. Biomol. Eng.* 2016, 7 (1), 283-304; Runnerstrom et al. *Chem. Commun.* 2014, 50 (73), 10555-10572; Mjejri et al. *ACS Appl. Energy Mater.* 2018, 1 (8), 4359-4366; Yao et al. *J. Phys. Chem. C* 2014, 118 (1), 476-481). Nanostructuring of $WO_{3-x}$ has benefited its switching kinetics and yielded the ability to support both ion intercalation electrochromism, associated with polaronic absorption, and capacitive charging electrochromism, associated with localized surface plasmon resonance (LSPR) (Runnerstrom et al. *Chem. Commun.* 2014, 50 (73), 10555-10572). Nanostructuring of $WO_{3-x}$ has also given rise to instability due to irreversible ion intercalation and their small band gap (~2.6 eV) (Balaji et al. *Chem. Mater.* 2009, 21 (7), 1381-1389; Wang et al. *Chem. Mater.* 2016, 28 (20), 7198-7202). In this regard, the synthesis of $Nb_2O_{5-x}$ nanocrystals, which has been treated in various techniques but only obtained limited control, is explored herein for the purpose of promoting $Nb_2O_{5-x}$ nanocrystals as an alternative material for electrochromics to access the stability in their bulk form and the benefits of nanostructuring.

The common phases of crystalline $Nb_2O_{5-x}$ are pseudohexagonal, orthorhombic, and monoclinic, which can be obtained by crystallizing amorphous $Nb_2O_{5-x}$ in an elevated temperature (Nowak et al. *Chem. Rev.* 1999, 99 (12), 3603-3624). The first two phases are structurally similar, with the pseudohexagonal phase being less crystalline. In the monoclinic phase, niobium oxygen octahedra ($NbO_6$ octahedra) sharing vertex are arranged in blocks (or shears) and share edges with $NbO_6$ octahedra in other blocks at different levels, which is also referred as a Wadsley-Roth structure with parallel crystallographic shear planes (Wadsley et al. Eds.; John Wiley & Sons: Chichester, 1970; Vol. 3, p 14). This structure forms a variety of compounds that have attracted interest due to their large capacity in storing $Li^+$ ions (Cava et al. *J. Electrochem. Soc.* 1983, 130 (12), 2345-2351; Griffith et al. *Nature* 2018, 559 (7715), 556-563; Li et al. *Chem. Mater.* 2011, 23 (9), 2292-2294). In particular, the change of electronic properties when stoichiometric monoclinic $Nb_2O_5$ (m-$Nb_2O_5$) is chemically reduced into nonstoichiometric monoclinic $Nb_{12}O_{29}$ (m-$Nb_{12}O_{29}$), with additional electrons being populated into the conduction band of monoclinic $Nb_{12}O_{29}$ giving rise to its metallic conduction, are of interest (Cava et al. *Phys. Rev. B* 1991, 44 (13), 6973-6981; Koçer et al. *Phys. Rev. B* 2019, 99 (7), 075151). This triggers attention to whether the nanocrystals of monoclinic $Nb_{12}O_{29}$ are able to accommodate electrons in their conduction band during electrochemical reduction to instigate the capacitive charging electrochromism that was not reported for $Nb_2O_{5-x}$ electrochromics.

Crystalline $Nb_2O_{5-x}$ has been prepared by sol-gel methods (Özer et al. *Thin Solid Films* 1996, 277 (1), 162-168), solvothermal methods (Ali et al. *Cryst. Growth Des.* 2017, 17 (9), 4637-4646; Lopes et al. *Appl. Catal. B: Environ.* 2014, 144, 800-808), and vapor deposition methods (Yoshimura et al. *Thin Solid Films* 1996, 281-282, 235-238; Masse et al. *Thin Solid Films* 2006, 515 (4), 1674-1682). In the sol-gel method, amorphous $Nb_2O_{5-x}$ sols are crystallized by high temperature annealing; the sol-gel method is widely used in preparing $Nb_2O_{5-x}$ electrochromics but lacks precise control and the accessibility of monoclinic phase that only stabilizes at ~1100° C. (Nowak et al. *Chem. Rev.* 1999, 99 (12), 3603-3624). In contrast, solvothermal synthesis involves the direct crystallization of $Nb_2O_{5-x}$ using various Nb ions and solvents to interact with in a moderate temperature to obtain different nanostructures, thus circumventing the high temperature annealing. However, these solvothermal syntheses include a wide range of procedures without systematic investigation to understand the synthetic mechanism. In addition, most crystals made using these solvothermal syntheses are polydisperse with submicron size and arranged only into pseudohexagonal and orthorhombic phases.

Colloidal synthesis has met great success in synthesizing monodisperse and phase pure colloidal nanocrystals with tight control over their morphology, stoichiometry, and crystal phase (Agrawal et al. *Chem. Rev.* 2018, 118 (6), 3121-3207; Rosi et al. *Chem. Rev.* 2005, 105 (4), 1547-1562; Tao et al. *Small* 2008, 4 (3), 310-325). This method involves direct crystallization of colloidal nanocrystals in a nonaqueous environment by controlling the nucleation and growth of metal ions down to near-atomic precision, therefore enabling an incremental investigation of how metal ions progress into clusters, then eventually into nanocrystals (Hyeon et al. *J. Am. Chem. Soc.* 2001, 123 (51), 12798-12801). In the field of colloidal metal oxide nanocrystals, the syntheses of iron, titanium, and indium oxides have reached excellent control and synthetic understanding using a route wherein a metal oleate is used as a precursor and subsequent alcoholysis or aminolysis reactions produce nanocrystals (Agrawal et al. *Chem. Rev.* 2018, 118 (6), 3121-3207; Hyeon et al. *J. Am. Chem. Soc.* 2001, 123 (51), 12798-12801; Jansons et al. *ACS Nano* 2016, 10 (7), 6942-6951; Buonsanti et al. *J. Am. Chem. Soc.* 2008, 130 (33), 11223-11233). Variation in the crystal structure and morphology of nanocrystals can be achieved by synthetic control, for instance, the phase control between anatase and brookite $TiO_2$ nanocrystals (Buonsanti et al. *J. Am. Chem. Soc.* 2008, 130 (33), 11223-11233). Colloidal synthesis of $Nb_2O_{5-x}$ nanocrystals is not well established, with only one example demonstrating the synthesis of tetragonal $NbO_2$ nanorods and tetragonal $Nb_2O_5$ nanoplatelets using amorphous niobium oxide seeds to initiate nanocrystal growth at different temperatures (Jana et al. *Nanoscale* 2012, 4 (5), 1782-1788). Hence, development of a colloidal synthesis to produce $Nb_2O_{5-x}$ nanocrystals and understanding of the synthetic mechanism as a general guide for the synthetic development of $Nb_2O_{5-x}$ nanocrystals is needed.

Herein, the colloidal synthesis of $Nb_2O_{5-x}$ nanocrystals enabling direct crystallization and phase control between the anisotropic monoclinic $Nb_{12}O_{29}$ nanocrystals (am-$Nb_{12}O_{29}$ NCs) and the anisotropic orthorhombic $Nb_2O_5$ nanocrystals (ao-$Nb_2O_5$ NCs) is demonstrated. The anisotropic monoclinic $Nb_{12}O_{29}$ nanocrystals, being the first reported monoclinic $Nb_2O_{5-x}$ nanocrystals, were characterized by electron microscopy, X-ray diffraction, and Raman spectroscopy to demonstrate their anisotropy, which brings structural anomaly as compared to their bulk counterparts, along with simulations to support this argument. Investigation of the synthetic mechanism revealed that the chemistry of the niobium precursors used to initiate nanocrystal growth, which varied between niobium chloro oleate and niobium oxo clusters, determined the crystal phase of the nanocrystals. In terms of electrochromism, the anisotropic monoclinic $Nb_{12}O_{29}$ nanocrystals exhibited dual-mode electrochromism: a capacitive charging process that leads to the absorption of near-infrared (NIR) light and an ion intercalation process that leads to the absorption of visible light, as investigated by the presence of localized electrons following electrochemical charging in ex situ X-ray photoelectron spectroscopy together with observations of electrochemical kinetics in determining whether ion intercalation occurs.

Experimental Section

Materials.

Toluene (>99.5%), hexane (>99%), isopropanol (>99.5%), N,N-dimethylformamide (DMF, anhydrous 99.8%), nitrosonium tetrafluoroborate ($NOBF_4$, 95%), tetrabutylammonium bis(trifluoromethanesulfonyl)imide (TBA-TFSI, >99.0%), oleic acid (OA, 90%), niobium chloride ($NbCl_5$, anhydrous, 99.995%), tetraethylene glycol dimethyl ether (TG, >99%), 1-octadecene (ODE, 90%) and chloroform-d ($CDCl_3$, 99.96 atom % D) were purchased from Sigma-Aldrich. Oleylamine (OM, 90%) was purchased from Acros Organics. Lithium bis(trifluoromethanesulfonyl) imide (Li-TFSI, HQ-115) was purchased from 3M. oleic acid and oleylamine were degassed under vacuum at 120° C. before use.

Synthesis.

Figure 70:
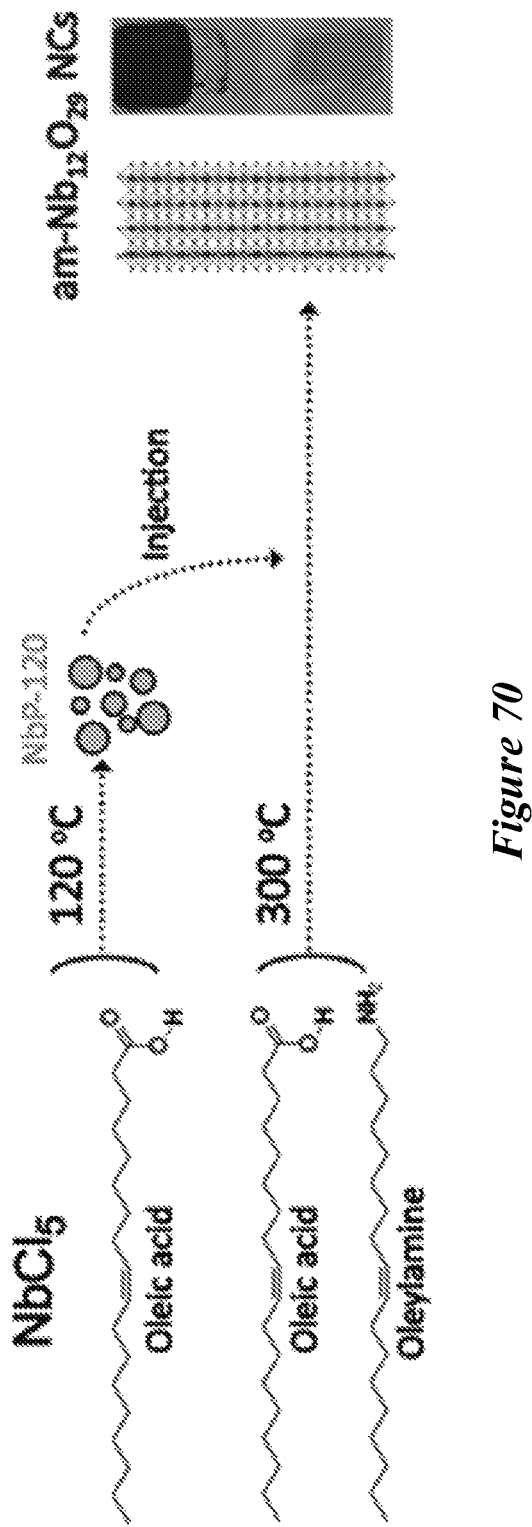
FIG. 70 is a schematic of the colloidal synthesis for producing the anisotropic monoclinic $Nb_{12}O_{29}$ nanocrystals by injecting the 120° C.-niobium precursor to initiate nanocrystal growth. Photograph represents the blue dispersion of anisotropic monoclinic $Nb_{12}O_{29}$ nanocrystals in toluene.

All reactions were carried out using standard Schlenk line techniques under a $N_2$ atmosphere. In a typical synthesis for anisotropic monoclinic $Nb_{12}O_{29}$ nanocrystals, 0.405 g of $NbCl_5$ (1.5 mmol) and 4.237 g of oleic acid (15 mmol) were mixed in a three-neck flask in a $N_2$ glove box and transferred to a Schlenk line. After $NbCl_5$ was completely dissolved and formed a blood-red solution, the mixture was then degassed under vacuum at 120° C. for 30 min. During the heating at 120° C., the blood-red color disappeared and turned into an orange solution of niobium precursor (NbP-120). Meanwhile, 11.298 g of oleic acid (40 mmol) and 2.140 g of oleylamine (8 mmol) were mixed in another three-neck flask and degassed under vacuum at 120° C. for 30 min, then heated to 300° C. Once the first flask was done degassing, the 120° C.-niobium precursor was injected into the second flask and reacted at 300° C. for 10 min Afterwards, the solution containing the nanocrystals was cooled to room temperature and washed using toluene as a solvent for dispersion and isopropanol as an antisolvent for flocculation. After being washed 3 times, the nanocrystals were dispersed in toluene at a concentration of 15 mg/ml, which is referred to as a ligand-capped nanocrystal dispersion throughout and was used throughout the characterizations if not otherwise specified. Illustration of the anisotropic monoclinic $Nb_{12}O_{29}$ nanocrystal synthesis is shown in FIG. 70.

The synthesis that produced a mixture of both anisotropic orthorhombic $Nb_2O_5$ and anisotropic monoclinic $Nb_{12}O_{29}$ nanocrystals was performed using the same protocol as above, except the preparation of the niobium precursor was degassed at 40° C., in which a blood-red color is still remained before injection (NbP-40). Aliquots for tracking the reaction progression were collected at 2, 4, 6, 8, and 10 min after the injection, quenched in toluene, and washed as in the original synthesis.

The synthesis that produced anisotropic orthorhombic $Nb_2O_5$ nanocrystals was performed based on a previous report using a heat-up method. In brief, 0.540 g of $NbCl_5$ (2 mmol), 3.107 g of oleic acid (11 mmol), 0.535 g of oleylamine (2 mmol) and 10.10 g of 1-octadecene (40 mmol) were mixed in a flask, degassed at 120° C., heated to 240° C. and reacted for 30 min.

Bulk monoclinic $Nb_2O_5$ crystals were prepared by annealing the 120° C.-niobium precursor at 1100° C. for 8 hr in a tube furnace under ambient condition.

X-Ray Diffraction (XRD) Analysis.

Nanocrystal dispersions were dried, re-dispersed in mineral oil, and mounted on a cryoloop for XRD analysis. XRD patterns were collected using a Rigaku R-Axis Spider with Cu Kα radiation with wavelength of 1.54 Å.

X-Ray Diffraction (XRD) Simulation.

A crystallographic information file for monoclinic $Nb_{12}O_{29}$ documented by Waldron et al. was used in the simulations herein (Waldron et al. *J. Am. Chem. Soc.* 2001, 123 (24), 5833-5834). The X-ray diffraction pattern of the bulk monoclinic $Nb_{12}O_{29}$ crystals was simulated using a RIETAN-FP package based on Rietveld refinement at a wavelength condition of 1.54 Å to match the experimental X-ray diffraction pattern of bulk monoclinic $Nb_{12}O_{29}$ crystals (PDF #01-073-1610).

X-ray diffraction patterns of the finite crystals were simulated based on a Debye scattering formula, in which:

$$I(q) = \sum_i \sum_j f_i f_j \frac{\sin(qr_{ij})}{qr_{ij}}$$

where I is the scattering intensity, q ($q=4\pi \sin \theta/\lambda$) is the scattering vector, λ (1.54 Å) is the wavelength of the incident X-ray, θ is the diffraction half angle, i and j stand for the ions in the finite crystals that scatter X-ray, $r_{ij}$ is the distance between ions i and j, and $f_i$ and $f_j$ is the scattering factors calculated from the tabulated Cromer-Mann coefficients (Murray et al. *Annu. Rev. Mater. Sci.* 2000, 30 (1), 545-610).

A 3D crystal visualization program was used to obtain the position of every ion in the finite crystals, and the scattering intensity was calculated based on the scattering of all individual pairs of ions using the above equation. To simulate the anisotropy, supercells expanded along different crystallographic directions were made and named as [a×b× c]. For instance, the unit cell of monoclinic $Nb_{12}O_{29}$ was named [1×1×1], and a supercell expanded 2 times in the [100] direction (or a axis), 2 times in the [010] direction (or b axis), and 1 time in the [001] direction (or c axis) was named [2×2×1].

Raman Spectroscopy Analysis.

Nanocrystal dispersions were drop-casted on microscope slides and dried for Raman analysis. Raman spectra were collected using a Horiba LabRAM Aramis instrument. Raman measurements were carried out using a ×50 microscope objective and a laser powered at a wavelength of 532 nm with acquisition time of 5 s.

Raman Spectroscopy Simulation.

Simulated Raman spectra of anisotropic monoclinic $Nb_{12}O_{29}$ nanocrystals, bulk monoclinic $Nb_{12}O_{29}$ crystals, and several related structures were performed using vasp_raman.py, which utilizes the electronic structure optimization methods implemented in Vienna Ab-initio Simulation Package (VASP) (Kresse et al. *Phys. Rev. B* 1993, 47 (1), 558-561; Fonari et al. vasp_raman.py. https://github.com/raman-scNASP/: 2013). Structure minimization was performed with a Perdew-Burke-Ernzerhof (PBE) functional within generalized gradient approximation with on-site coulombic correction on niobium using simplified rotationally invariant approach in VASP (Perdew et al. *Phys. Rev. Lett.* 1996, 77 (18), 3865-3868; Dudarev et al. *Phys. Rev. B* 1998, 57 (3), 1505-1509). The minimized structures were studied computationally for Raman spectra by exploiting the derivatives of polarizability along each phonon mode (Llordés et al. *Nat. Mater.* 2016, 15, 1267). The following structures taken from Materials project were used for simulations: $Nb_{12}O_{29}$ (mp-510554), $Nb_2O_5$ (mp-776896), $Nb_2O_5$ (mp-604), and $Nb_2O_5$ (mp-1101660) (Jain et al. *APL Materials* 2013, 1 (1), 011002).

Spectroelectrochemical Analysis for Electrochromic Applications.

Electrochemical and in situ optical properties of the nanocrystal films on FTO glass (70 Ω/sq) were measured in an argon glove box using an electrochemical workstation (Bio-logic VMP3 potentiostat) and an ASD Quality Spec Pro spectrometer. In a typical measurement, a homemade two-electrode cell comprising a nanocrystal film as the working electrode, a Li foil serving as both the counter and reference electrodes, and 1 M Li-TFSI/tetraethylene glycol dimethyl ether as the electrolyte was used. The capacitive charging experiments were conducted in a homemade three-electrode cell comprising a nanocrystal film as the working electrode, a Pt foil as the counter electrode, a commercial fritted Ag/Ag$^+$ cell as the reference electrode, and 0.1 M TBA-TFSI/tetraethylene glycol dimethyl ether as the electrolyte. The potentials (vs. Ag/Ag$^+$) measured in the three-electrode cell were converted to the potentials (vs. Li/Li$^+$) in the two-electrode cell by calibrating the two different cells using the same nanocrystal film. Upon dipping the nanocrystal film into the electrolytes, open-circuit potentials (OCPs) of 2.6 V (vs. Li/Li$^+$) and −1.0 V (vs. Ag/Ag$^+$) were recorded respectively in the two different cells.

Electron Microscopy Analysis.

Nanocrystal dispersions were dropped onto carbon-coated 400 mesh copper grids (TedPella) and dried in vacuum for electron microscopy analysis. Scanning transmission electron microscopy (STEM) images were obtained using a Hitachi 55500 microscope in STEM mode. High-resolution transmission electron microscopy (HRTEM) images were obtained using a JEOL 2010F microscope. Scanning electron microscopy (SEM) images of the nanocrystal films on silicon substrates were obtained using a Hitachi 55500 microscope in SEM mode.

Ultraviolet-Visible-Near-Infrared (UV-Vis-NIR) Spectroscopy Analysis.

UV-VIS-NIR spectra of the niobium precursors diluted in hexane (1:50 in volume ratio) were measured using an Agilent Cary series UV/Vis-NIR spectrophotometer.

Proton Nuclear Magnetic Resonance (H-NMR) Spectroscopy Analysis.

Niobium precursors were diluted in CDCl$_3$ in special screw-capped NMR tubes (Norell) in a N$_2$ glove box. H-NMR spectra were obtained in an Agilent/Varian MR-400 spectrometer operating at a field strength of 400 MHz.

Ligand Stripping of the Ligand-Capped Nanocrystals.

In a typical ligand-stripping procedure, 30 mg of the ligand-capped anisotropic monoclinic Nb$_{12}$O$_{29}$ nanocrystals were dispersed in 3 ml of hexane and a solution of 30 mg NOBF$_4$ dissolved in DMF was gradually added to the nanocrystal dispersion. After 30 min of stirring, the ligand-capped nanocrystals in the upper hexane layer were removed, and the ligand-stripped nanocrystals in the DMF layer were purified by performing a washing procedure 6 times using DMF as a solvent for dispersion and toluene as an antisolvent for flocculation. The ligand-stripped nanocrystals were subsequently dispersed in DMF at a concentration of 50 mg/ml and used for thin film deposition.

Fourier Transform Infrared Spectroscopy (FT-IR) Analysis.

IR spectra were measured using a Bruker Vertex 70 FTIR at 4 cm$^{-1}$ resolution. Samples of oleic acid and niobium precursors were drop-casted on CaF$_2$ windows and samples of the ligand-capped and ligand-stripped nanocrystal dispersions were drop-casted on silicon substrates and dried. The measurement chamber was purged by N$_2$ for 5 min prior to measuring to eliminate any signal from air.

Thin Film Deposition.

To clean the FTO glass and silicon substrates for thin film deposition, sequential sonication was carried out in a solution of 2 vol % Hellmanex in deionized water, acetone, and isopropanol, for 30 min, respectively. After cleaning, UV-ozone treatment was performed to create a hydrophilic surface for deposition. The ligand-stripped nanocrystal dispersion (20 µl) was spin-coated at 250 rpm on the cleaned hydrophilic FTO glass. For comparison, 20 µl of the ligand-capped nanocrystal dispersion was spin-coated at 250 rpm on the cleaned hydrophobic FTO glass. Afterwards, films were dried at 150° C. for 30 min before spectroelectrochemical measurements. The resulting ligand-stripped nanocrystal films had an average thickness of 350 nm as measured by a Veeco Dektak 150 profilometer. The same deposition conditions were performed on silicon substrates for scanning electron microscopy imaging.

X-ray Photoelectron Spectroscopy (XPS) Analysis.

Ligand-stripped nanocrystal films on FTO glass were immersed in 1 M Li-TFSI/tetraethylene glycol dimethyl ether and no potential (e.g., in which the sample was kept at open-circuit potential) or potentials at 2.0 V and 1.5 V were applied to different films for 5 min After that, samples were transferred in an argon-filled condition for analysis. Spectra were collected using a Kratos Axis Ultra DLD spectrometer with a monochromatic Al K$_\alpha$ source (1486.6 eV). Wide survey scans were measured at a pass energy of 80 eV and the high-resolution scans were measured at a pass energy of 20 eV with steps of 0.1 eV. The binding energy of the spectra was referenced to the C is peak at 284.8 eV.

Results and Discussion

Morphological Characterization by Electron Microscopy.

Figure 71:
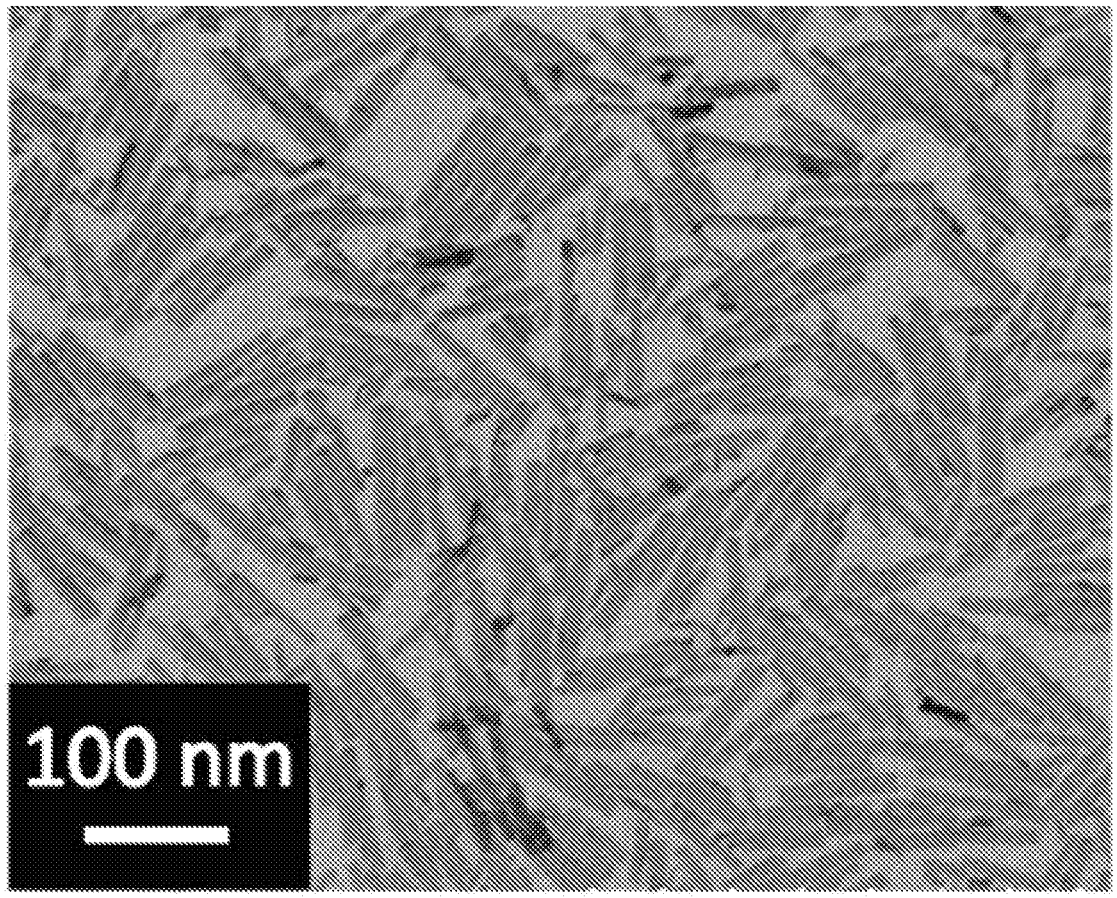
FIG. 71 is a scanning transmission electron microscopy image of the nanoplatelets synthesized by injecting the 120° C.-niobium precursor.
Figure 72:
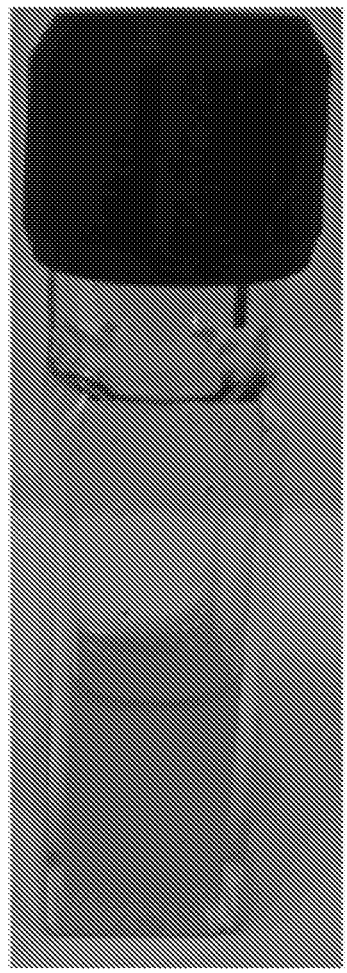
FIG. 72 is a photograph of the blue nanoplatelet dispersion in toluene.
Figure 73:
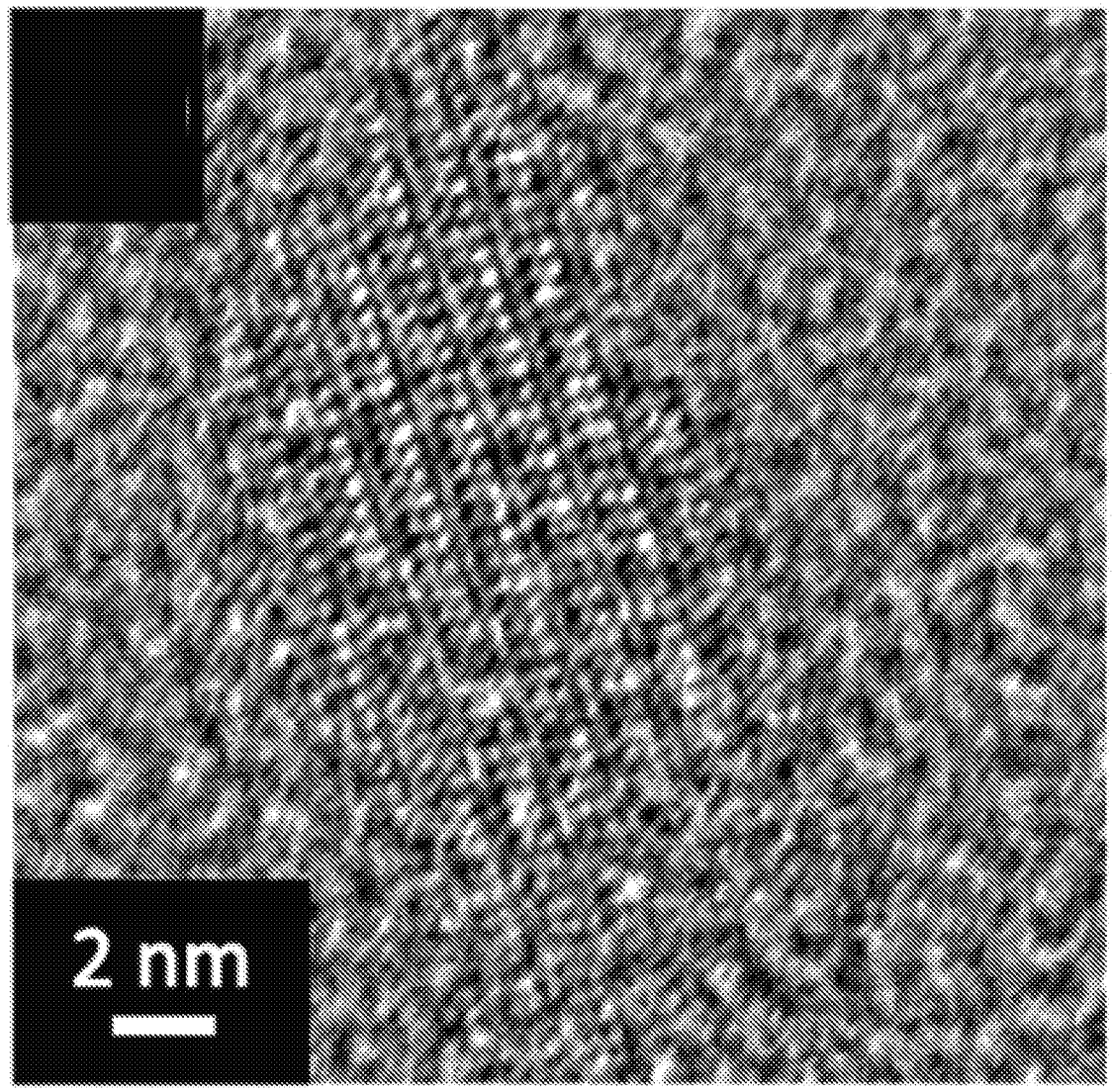
FIG. 73 is a high-resolution transmission electron microscopy image of the nanoplatelets synthesized by injecting the 120° C.-niobium precursor.
Figure 74:
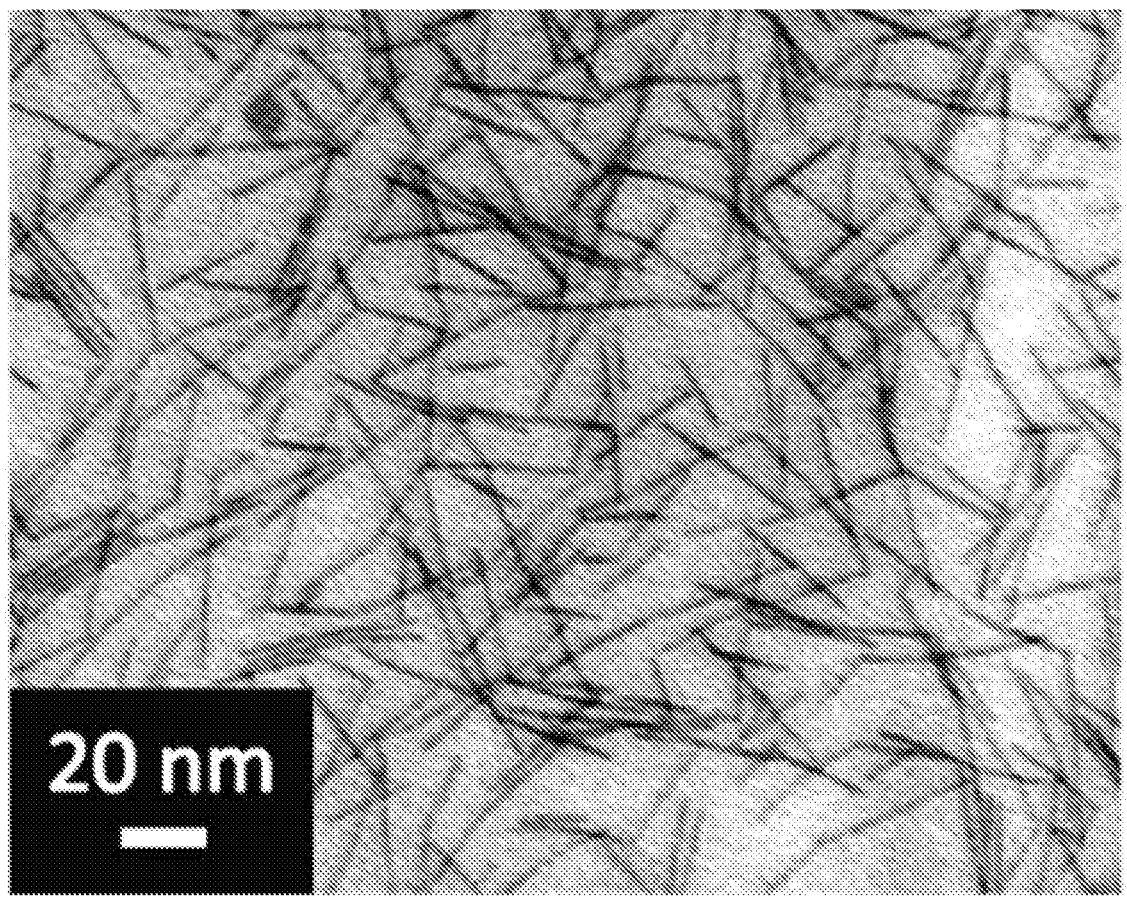
FIG. 74 is a scanning transmission electron microscopy image of the nanorods synthesized by heat-up method.
Figure 75:
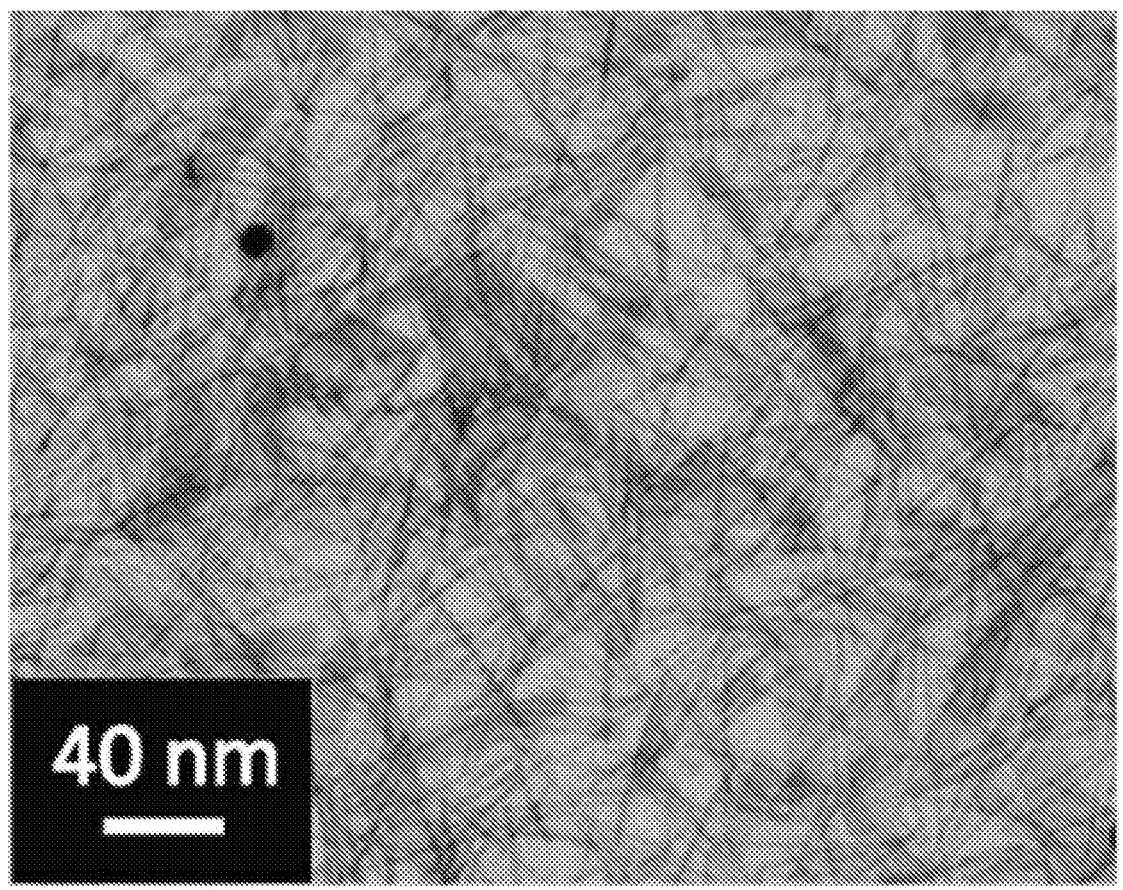
FIG. 75 is a scanning transmission electron microscopy image of the mixture of both nanoplatelets and nanorods synthesized by injecting the 40° C.-niobium precursor.
Figure 76:
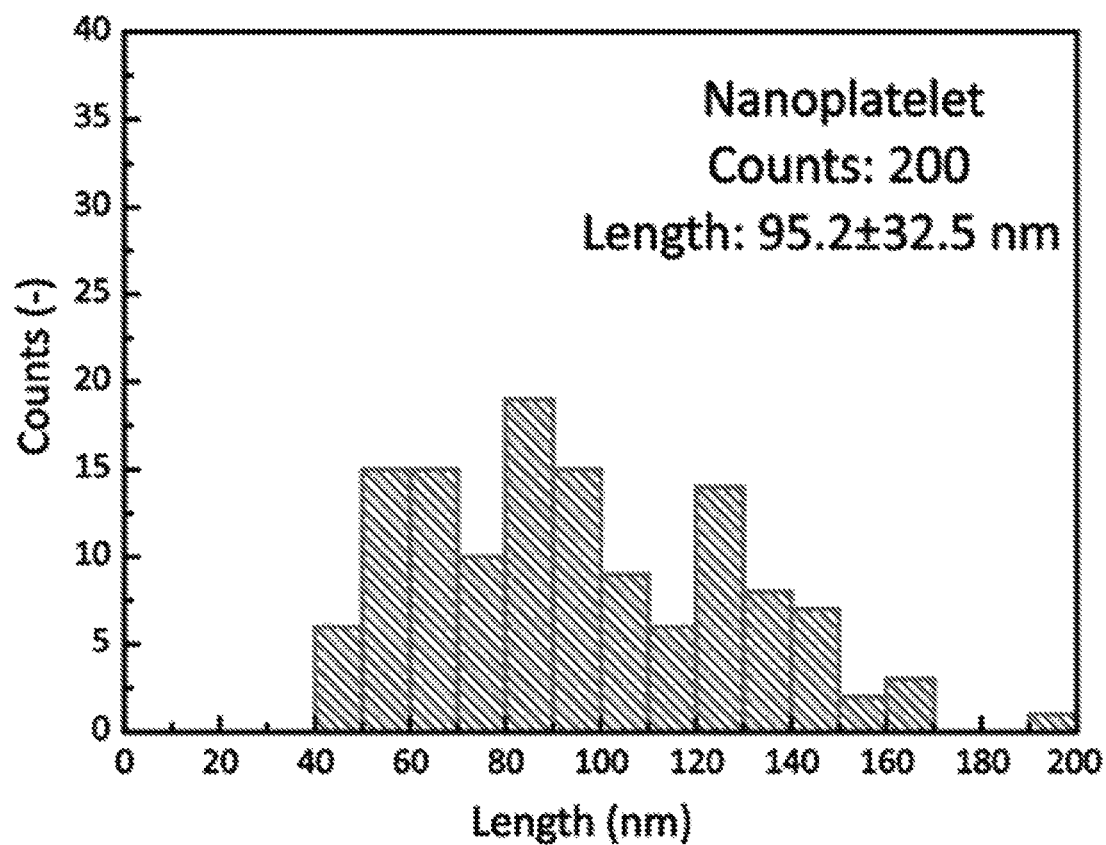
FIG. 76 is a size distribution histogram of the nanoplatelet long axis (length).
Figure 77:
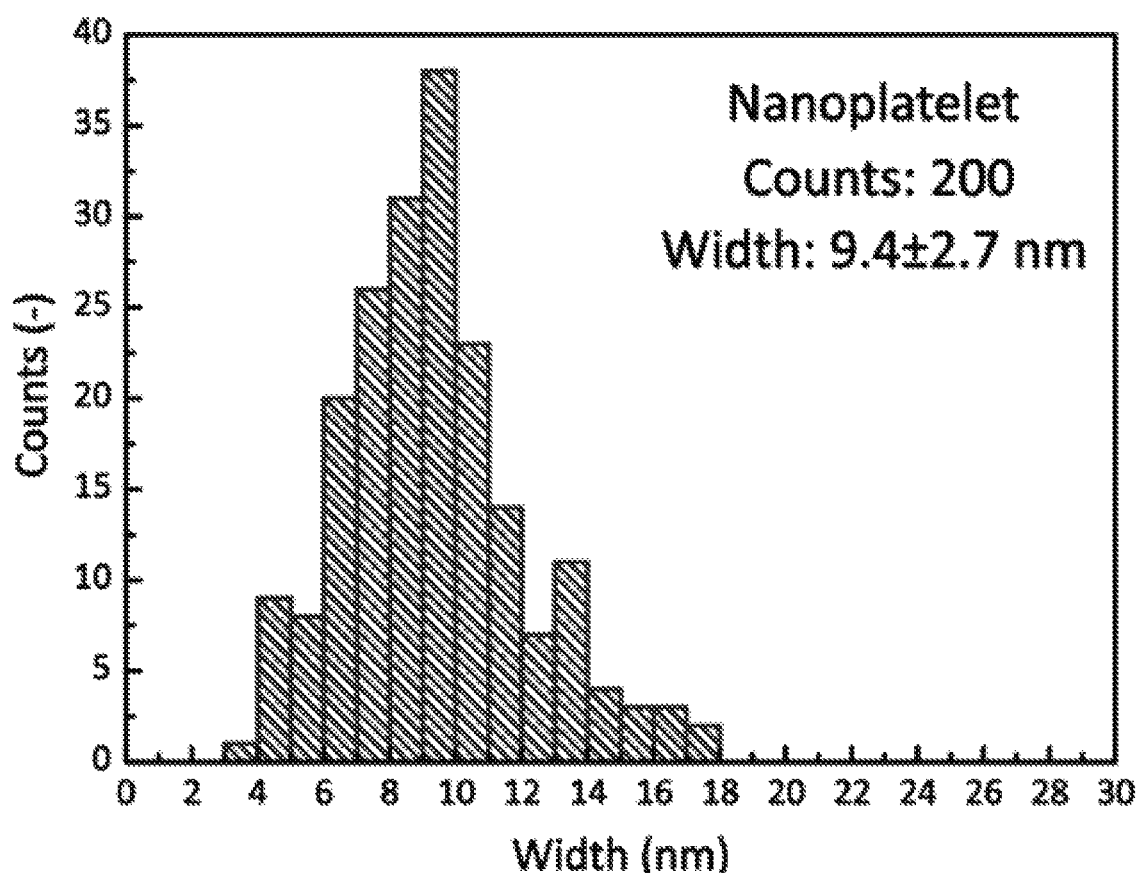
FIG. 77 is a size distribution histogram of the nanoplatelet short axis (width).
Figure 78:
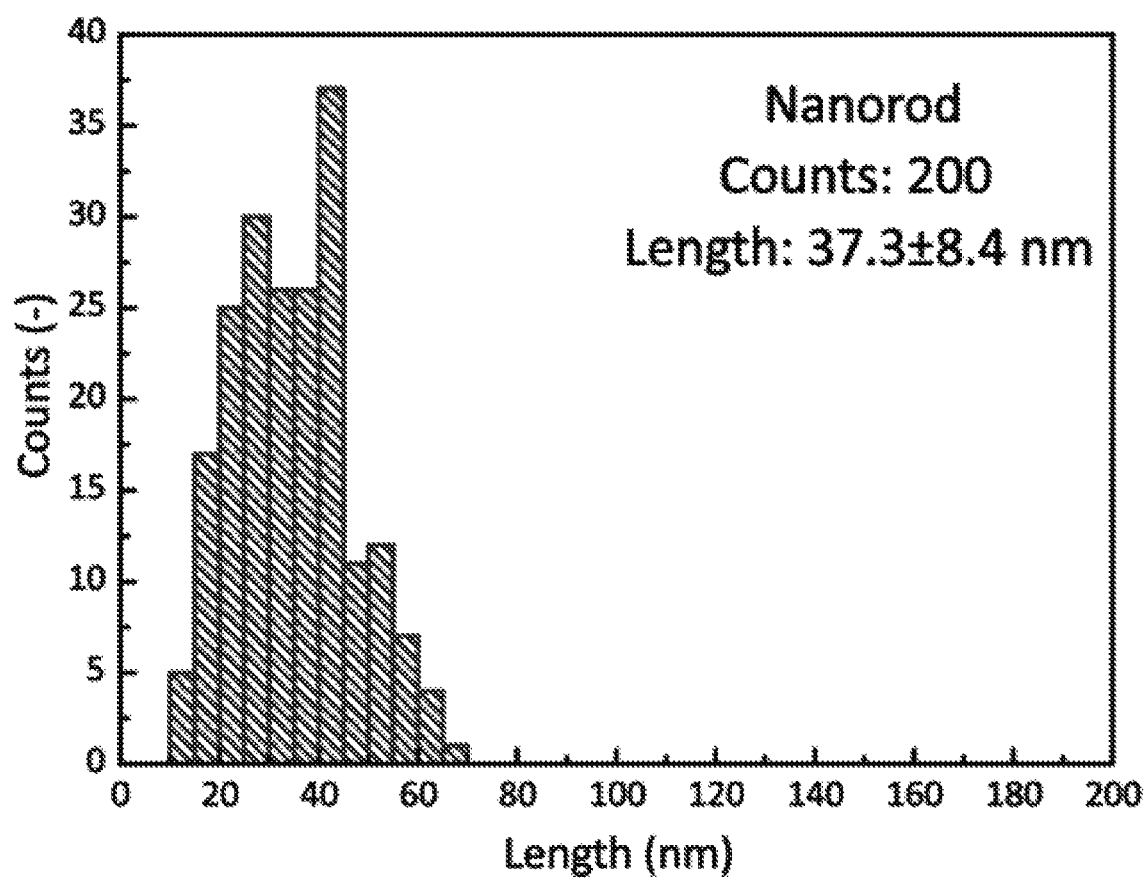
FIG. 78 is a size distribution histogram of the nanorod long axis (length).

Synthetic techniques employed herein are: the hot injection of 120° C.-niobium precursor and 40° C.-niobium precursor to initiate nanocrystal growth at 300° C., and the heat-up method in which nanocrystals grow gradually during ramping temperature. The injection of 120° C.-niobium precursor lead to the formation of nanocrystals with a two-dimensional nanoplatelet morphology, as shown in scanning transmission electron microscopy (STEM) imaging (FIG. 71). After washing, the dispersion of nanoplatelets in toluene exhibited a blue color (FIG. 72). In high-resolution transmission electron microscopy (HRTEM) imaging (FIG. 73), the nanoplatelets showed a structural-column arrangement with a boundary between each column, a signature suggesting the presence of parallel crystallographic shear planes separating the basic building blocks. More representative examples of the crystallographic shear planes can be seen in the images of bulk monoclinic niobium oxide crystals (monoclinic Nb$_2$O$_5$ and monoclinic Nb$_{12}$O$_{29}$) (Weissman et al. *Chem. Mater.* 1989, 1 (2), 187-193; Andersen et al. *Phys. Rev. B* 2005, 72 (3), 033413). For comparison, the heat-up method produced nanocrystals with a one-dimensional nanorod morphology (FIG. 74). In contrast to the nanoplatelet synthesis, the injection of 40° C.-niobium precursor lead to a mixture of nanocrystals containing both nanorods and nanoplatelets (FIG. 75). Size distribution histograms showed that the nanoplatelets have an average length of 95.2±32.5 nm in the long axis (FIG. 76) and an average width of 9.4±2.7 nm in the short axis (FIG. 77), and the nanorods have an average length of 37.3±8.4 nm in the long axis (FIG. 78) and a narrow width of around 1 nm in the short axis.

Structural Characterization by X-Ray Diffraction.

Figure 79:
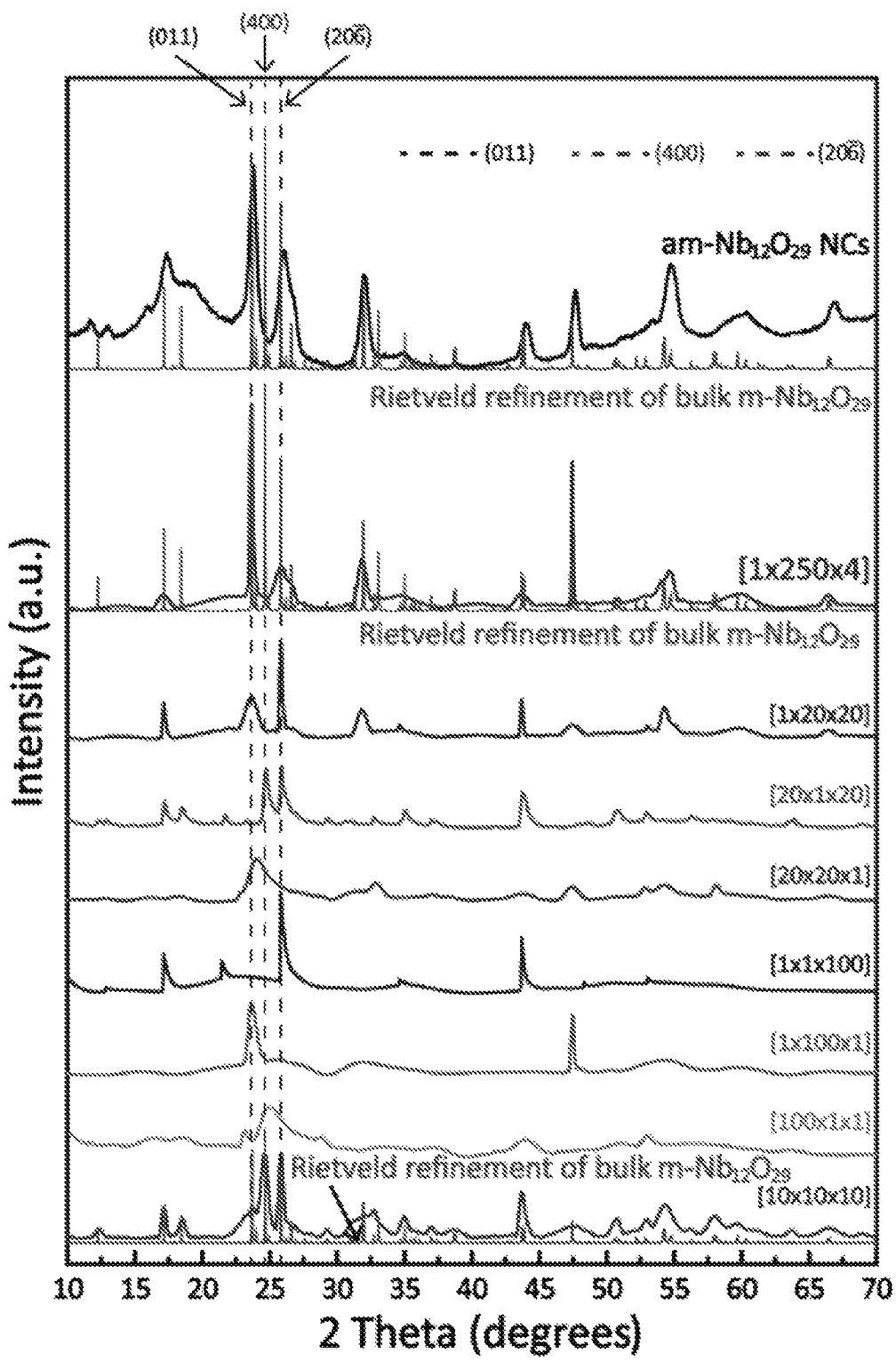
FIG. 79 is the experimental X-ray diffraction (XRD) pattern of the nanoplatelets (the anisotropic monoclinic $Nb_{12}O_{29}$ nanocrystals, am-$Nb_{12}O_{29}$), simulated pattern of bulk monoclinic $Nb_{12}O_{29}$ crystals based on Rietveld refinement, simulated patterns of the anisotropic monoclinic $Nb_{12}O_{29}$ nanocrystals based on Debye scattering formula using [1×250×4], [10×10×10], [100×1×1], [1×100×1], [1×1×100], [20×20×1], [20×1×20], and [1×20×20] supercells. Dashed vertical lines correspond to (011) (left), (400) (center), and (206) (right) reflections.

The crystal structure of the as-synthesized nanocrystals was investigated by X-ray diffraction analysis, along with simulations for both bulk crystals and finite crystals. As seen in FIG. 79, the experimental X-ray diffraction pattern of the nanoplatelets shared a similar signature with the simulated pattern of bulk monoclinic Nb$_{12}$O$_{29}$ crystals (PDF #01-073-1610), except for several missing reflections, including the (400) reflection with the strongest intensity (2θ=24.6°).

Figure 80:
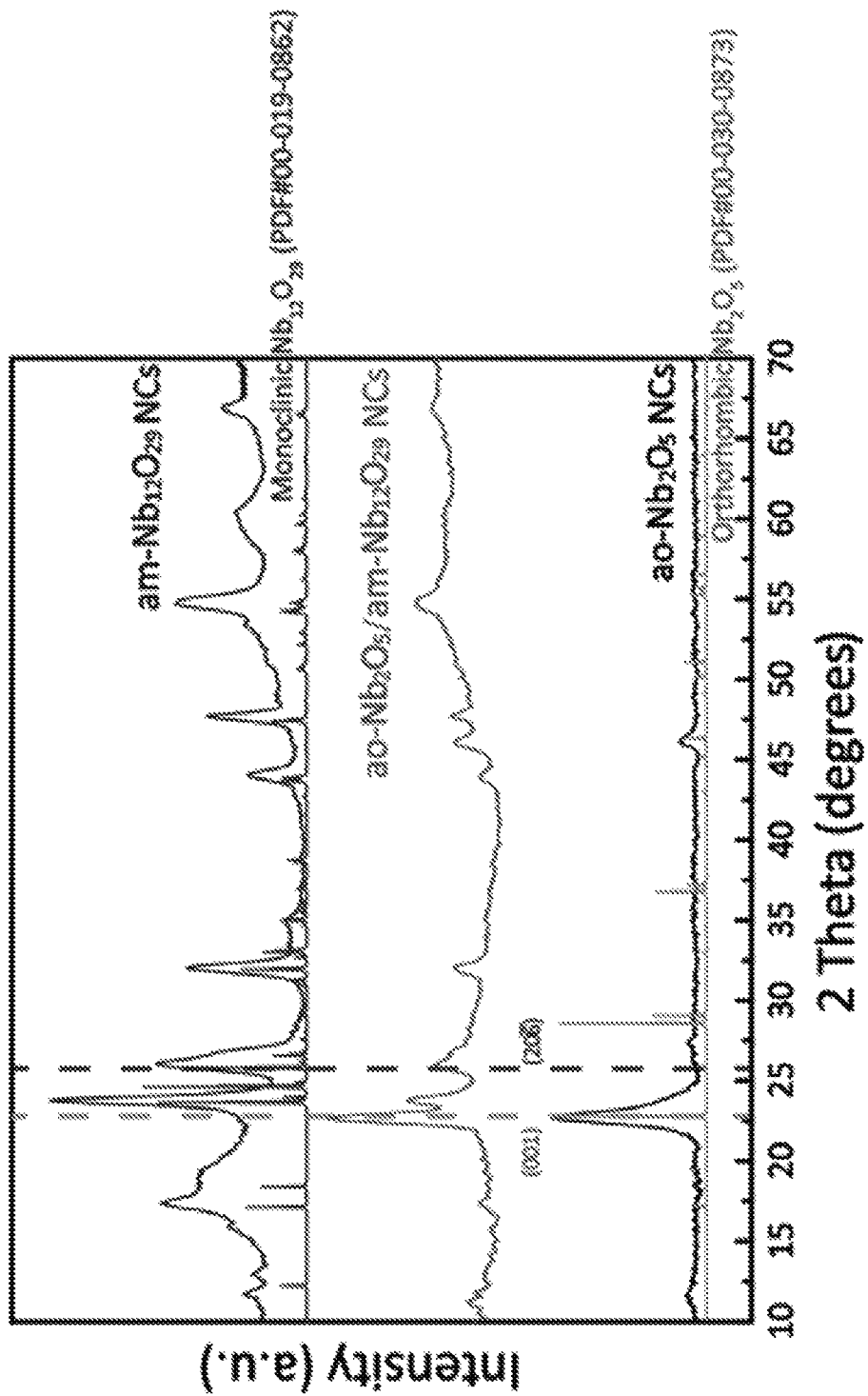
FIG. 80 is the experimental X-ray diffraction patterns of the anisotropic orthorhombic $Nb_2O_5$ nanocrystals (nanorods, ao-$Nb_2O_5$ NCs), the anisotropic monoclinic $Nb_{12}O_{29}$ nanocrystals (nanoplatelets, am-$Nb_{12}O_{29}$ NCs), and the mixture of both nanocrystals (ao-$Nb_2O_5$/am-$Nb_{12}O_{29}$ NCs). Simulated patterns of bulk monoclinic $Nb_{12}O_{29}$ crystals (PDF #01-073-1610) and bulk orthorhombic $Nb_2O_5$ crystals (PDF #00-030-0873) were based on Rietveld refinement. Left vertical dashed line represents the (001) reflection in orthorhombic $Nb_2O_5$ and right vertical dashed line represents the (206) reflection in monoclinic $Nb_{12}O_{29}$.

The nanoplatelets were therefore proposed to be an anisotropic case of monoclinic Nb$_{12}$O$_{29}$, abbreviated as anisotropic monoclinic Nb$_{12}$O$_{29}$ nanocrystals (am-Nb$_{12}$O$_{29}$ NCs). FIG. 80 shows the experimental X-ray diffraction patterns of the nanorods, which show only the (001) reflection and can be assigned to anisotropic orthorhombic Nb$_2$O$_5$ nanocrystals, and the nanocrystal mixture, with signatures from both anisotropic monoclinic Nb$_{12}$O$_{29}$ nanocrystals and anisotropic orthorhombic Nb$_2$O$_5$ nanocrystals.

Figure 81:
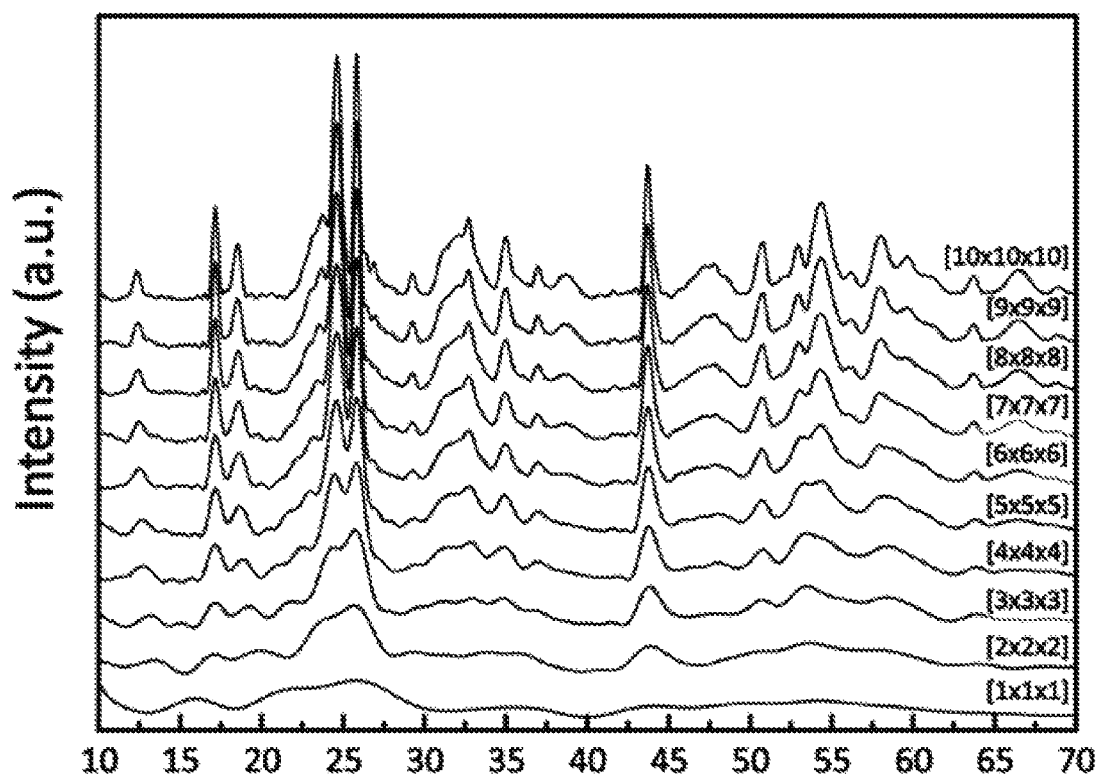
FIG. 81 is the simulated X-ray diffraction patterns of the anisotropic monoclinic $Nb_{12}O_{29}$ nanocrystals based on Debye scattering formula using the progression of supercells from [1×1×1] to [10×10×10].

To investigate the anisotropy of the anisotropic monoclinic $Nb_{12}O_{29}$ nanocrystals, simulations were performed based on the Debye scattering formula, in which the intensity of the incident X-ray being scattered by every pair of ions within a finite crystal is calculated (Murray et al. *Annu. Rev. Mater. Sci.* 2000, 30 (1), 545-610). In FIG. 81, the progression of supercells from [1×1×1] to [10×10×10] shows patterns that are broad in all reflections initially to patterns with distinct reflections in the end. The broadened reflections in the small supercells address the fact that, in finite crystals, insufficient scattering intensity is generated due to the finite number of ions and therefore leads to the contraction of reflections in their X-ray diffraction pattern (Murray et al. *J. Am. Chem. Soc.* 1993, 115 (19), 8706-8715). On the contrary, the [10×10×10] supercell results in a simulated pattern with distinct reflections, which is similar to the simulated pattern of bulk monoclinic $Nb_{12}O_{29}$ crystals, as presented in FIG. 79.

Figure 82:
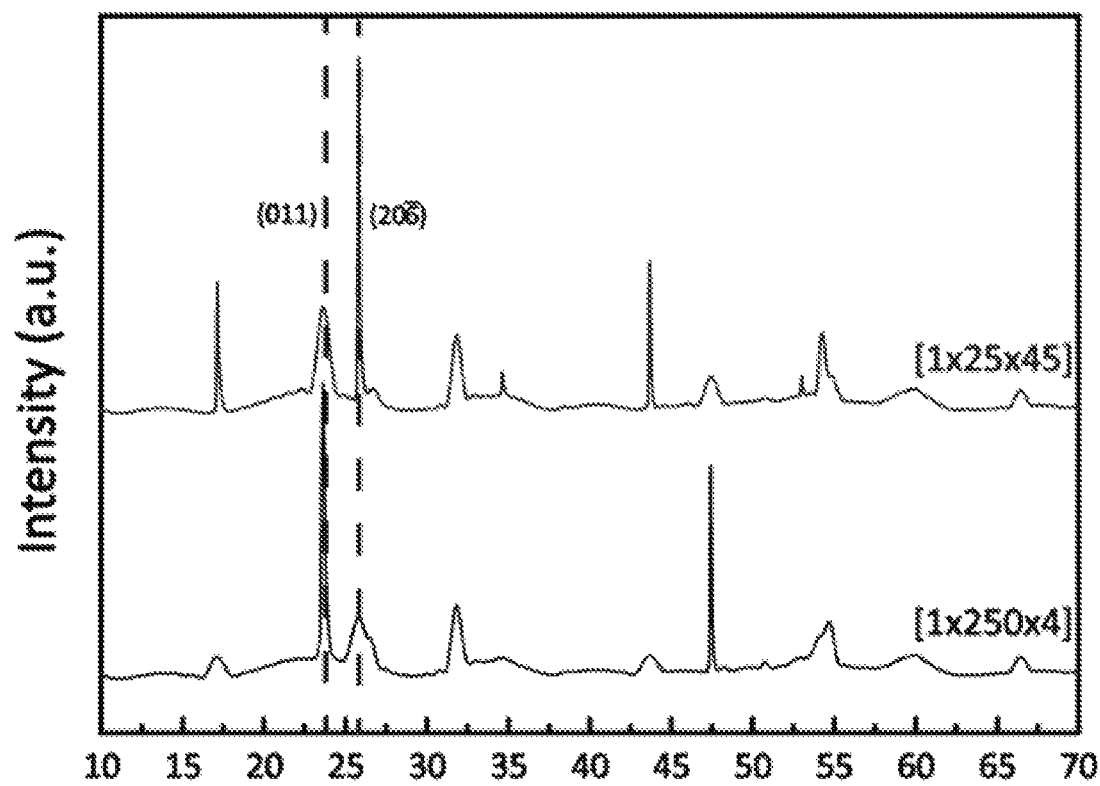
FIG. 82 is the simulated X-ray diffraction patterns of the anisotropic monoclinic $Nb_{12}O_{29}$ nanocrystals based on Debye scattering formula using the [1×250×4] and [1×25×45] supercells.
Figure 83:
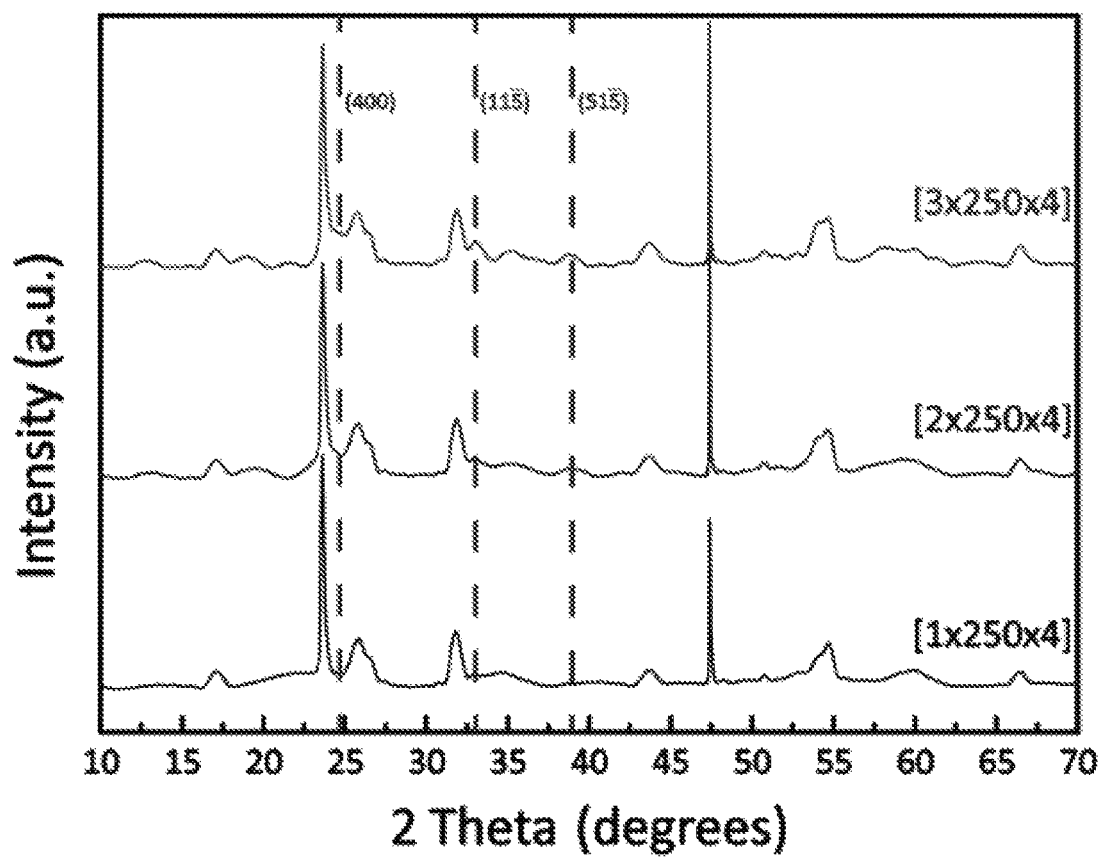
FIG. 83 is the simulated X-ray diffraction patterns of the anisotropic monoclinic $Nb_{12}O_{29}$ nanocrystals based on Debye scattering formula using the progression of supercells from [1×250×4] to [3×250×4] for simulating the number of layers in the [100] direction. The intensity of (400), (115), and (515) reflections increase along with increasing layers in the [100] direction.

The simulations of anisotropic finite crystals were used to approach the experimental X-ray diffraction pattern of anisotropic monoclinic $Nb_{12}O_{29}$ nanocrystals (FIG. 79). In the simulations of one-dimensional cases ([100×1×1], [1×100×1], and [1×1×100] supercells), it was found that the main reflections in the pattern of bulk monoclinic $Nb_{12}O_{29}$ crystals, namely the (011) (2θ=23.8°), (400) (2θ=24.6°) and (20$\bar{6}$) (2θ=25.8°), were contributed by the ions in the [010], [100], and [001] directions, respectively. In two-dimensional anisotropic cases ([20×20×1], [20×1×20], and [1×20×20] supercells), the (400) reflection was only contracted if the supercell was expanded in the [011] direction, suggesting that the anisotropic monoclinic $Nb_{12}O_{29}$ nanocrystals could elongate two-dimensionally along the [011] direction since the (400) reflection is forbidden. In order to make the relative intensity in the simulations match the experimental pattern, which is not archived using the [1×20×20] supercell, [1×250×4] and [1×25×45] supercells were built assuming that the [010] direction or the [001] direction is parallel to the long axis of the nanoplatelets, respectively, while the size of these two supercells was calculated to match the size of nanoplatelets shown in scanning transmission electron microscopy imaging. Simulation results showed that the pattern of the [1×250×4] supercell has a stronger intensity in the (011) reflection (FIG. 79 and FIG. 82) that matches the experimental pattern of the anisotropic monoclinic $Nb_{12}O_{29}$ nanocrystals, whereas the pattern of the [1×25×45] supercell has a stronger intensity in the (20$\bar{6}$) reflection (FIG. 82). The influence of layers in the [100] direction was investigated by simulating the patterns of [1×250×4], [2×250×4], and [3×250×4] supercells (FIG. 83). The results highlight the fact that the (400), (11$\bar{5}$), and (51$\bar{5}$) reflections are only contracted in the pattern of [1×250×4] supercell (FIG. 83). The (400), (11$\bar{5}$), and (51$\bar{5}$) reflections are not present in the experimental pattern of the anisotropic monoclinic $Nb_{12}O_{29}$ nanocrystals, thus the results in FIG. 83 indicate that the anisotropic monoclinic $Nb_{12}O_{29}$ nanocrystals are monolayer monoclinic $Nb_{12}O_{29}$ elongating along the [011] direction. The deviation between the experimental pattern and the optimized simulated pattern using the [1×250×4] supercell can be attributed to: (a) vacancies of Nb and O in the crystal structure are not considered in the simulation, (b) the [010] direction is not completely parallel to the nanocrystals long axis, and/or (c) the diffraction from the amorphous mineral oil during measurement.

Figure 84:
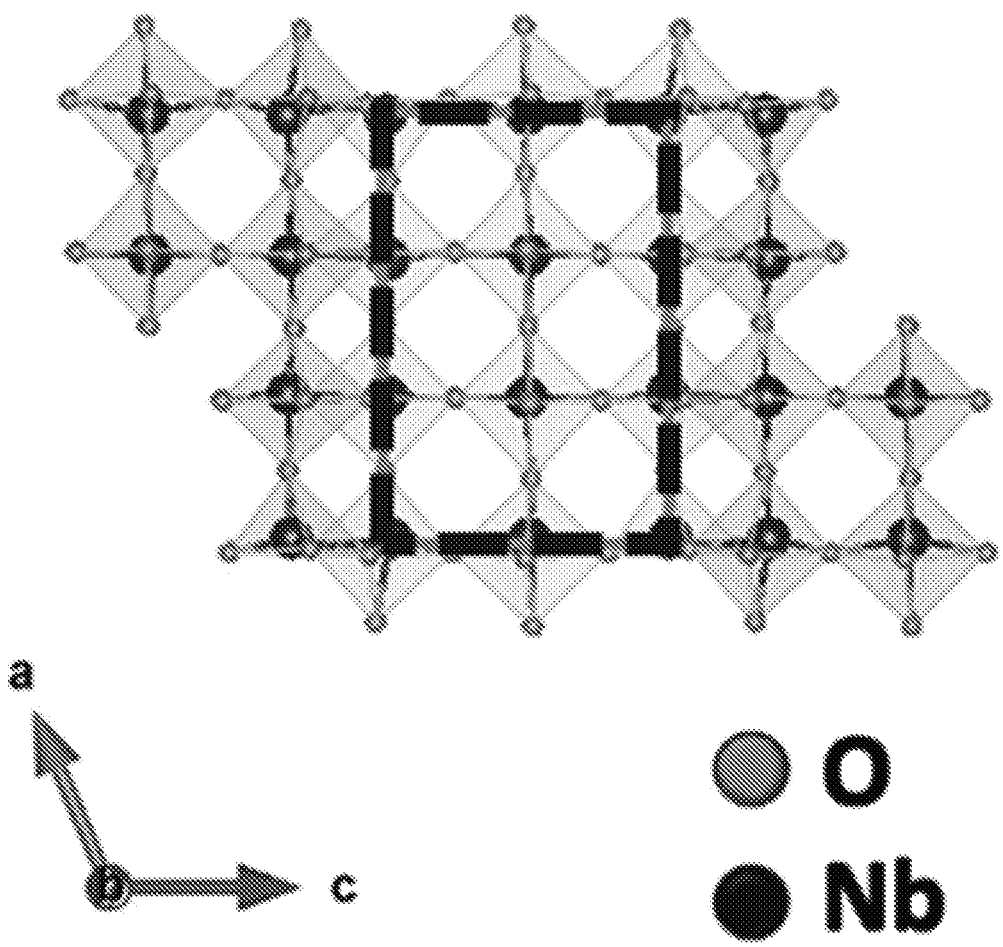
FIG. 84 is the crystal visualization of [1×1×1] unit cell viewed from the (010) plane. Dashed block represents the basic building block containing 12 vertex-shared $NbO_6$ octahedra.
Figure 85:
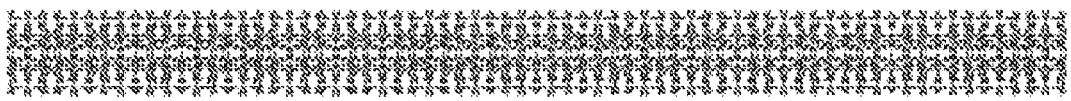
FIG. 85 is the crystal visualization of [1×250×4] supercell matching the size of anisotropic monoclinic $Nb_{12}O_{29}$ nanocrystals.
Figure 85:

The atomic models of the [1×1×1] unit cell and the [1×250×4] supercell used in the simulations are shown in FIG. 84 and FIG. 85, respectively. Monoclinic $Nb_{12}O_{29}$ has a crystal structure composed of 12 vertex-shared $NbO_6$ octahedra arranged into a block in the center layer as a shear (dashed block in FIG. 84), and connected with the other blocks in different levels by edge-shared $NbO_6$ octahedra (McConnell et al. *Spectrochim. Acta* 1976, 32 (5), 1067-1076). The presence of a shear structure along each block is referred as a crystallographic shear plane. The [1×250×4] supercell is the expansion of the unit cell along the crystallographic direction to match the monolayer nature, which causes the missing reflections, and the actual size of the anisotropic monoclinic $Nb_{12}O_{29}$ nanocrystals.

Structural Characterization by Raman Spectroscopy.

Raman spectroscopy was used to study the structural features of niobium oxygen bonds in the as-synthesized nanocrystals, which have different Raman shifts depending on their bond order and angle. According to previous reports, these bonds can be classified in a descending bond order into Nb=O terminal bonds (950-1050 $cm^{-1}$), Nb—O—Nb collinear bonds (800-900 $cm^{-1}$), Nb—O—Nb bridging bonds (550-750 $cm^{-1}$), $ONb_3$ bonds (350-500 $cm^{-1}$), and Nb—O—Nb angle deformation bonds (150-350 $cm^{-1}$) (Llordés et al. *Nat. Mater.* 2016, 15, 1267; Orel et al. *J. Solid State Electrochem.* 1998, 2 (4), 221-236; Ikeya et al. *Non-Cryst. Solids* 1988, 105 (3), 243-250). In terms of structure, previous simulations demonstrated that the Nb=O terminal bonds and Nb—O—Nb collinear bonds are exclusively contributed by the vertex-shared $NbO_6$ octahedra, while the other three modes can be either from vertex-shared $NbO_6$ octahedra or edge-shared $NbO_6$ octahedra (Llordés et al. *Nat. Mater.* 2016, 15, 1267).

Figure 86:
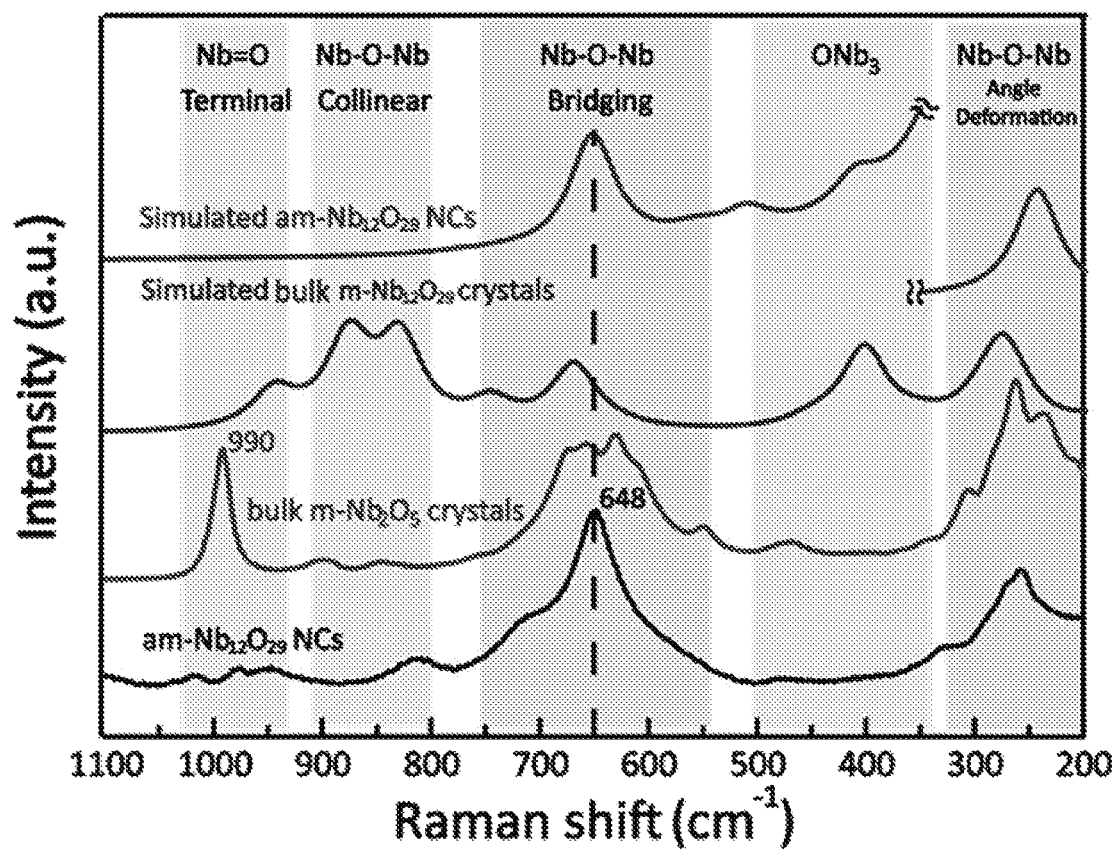
FIG. 86 is the experimental Raman spectra of anisotropic monoclinic $Nb_{12}O_{29}$ nanocrystals (am-$Nb_{12}O_{29}$ NCs) and bulk monoclinic $Nb_2O_5$ crystals (bulk m-$Nb_2O_5$ crystals). Simulated Raman spectra of bulk monoclinic $Nb_{12}O_{29}$ crystals (Simulated bulk m-$Nb_{12}O_{29}$ crystals) and anisotropic monoclinic $Nb_{12}O_{29}$ nanocrystals (Simulated am-$Nb_{12}O_{29}$ NCs). Peaks at 648 $cm^{-1}$ and 990 $cm^{-1}$ represent the Nb—O—Nb bridging bonds in anisotropic monoclinic $Nb_{12}O_{29}$ nanocrystals and Nb=O terminal bonds in bulk monoclinic $Nb_2O_5$ crystals respectively.
Figure 87:
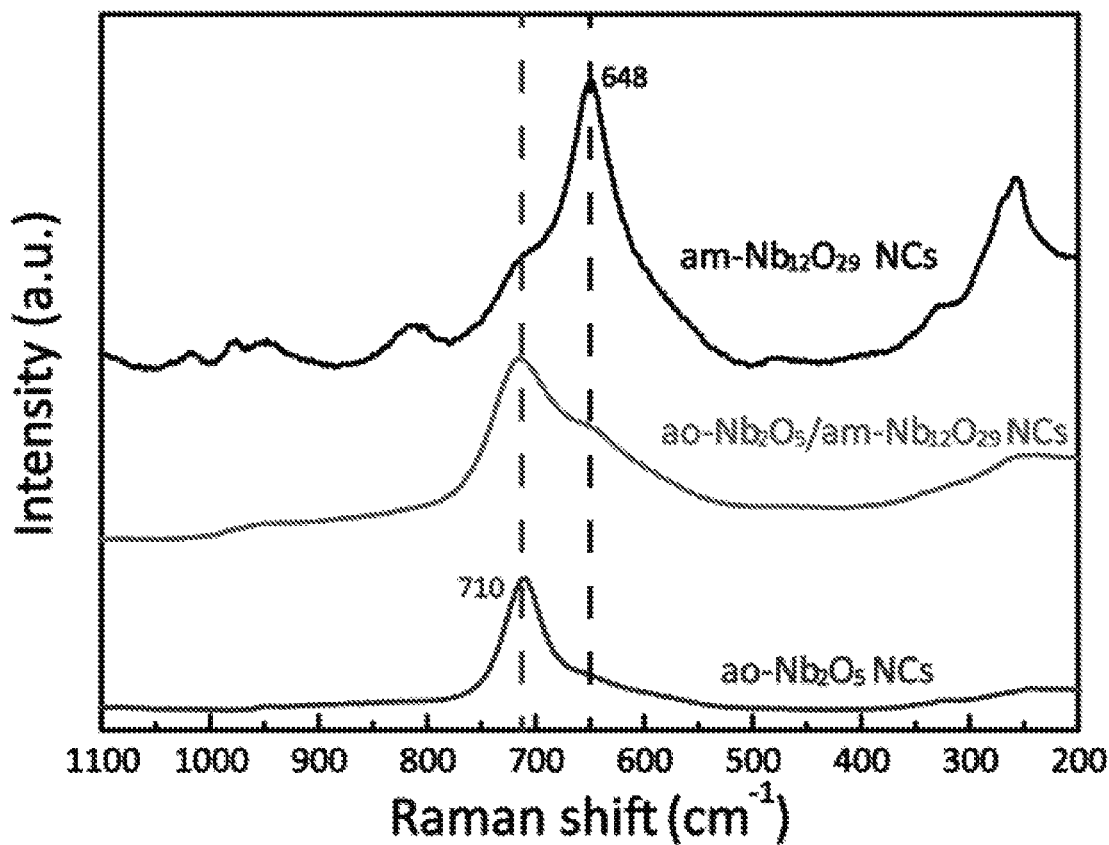
FIG. 87 is the experimental Raman spectra of anisotropic orthorhombic $Nb_2O_5$ nanocrystals (ao-$Nb_2O_5$ NCs, bottom), the mixture of anisotropic orthorhombic $Nb_2O_5$ nanocrystals and anisotropic monoclinic $Nb_{12}O_{29}$ nanocrystals (ao-$Nb_2O_5$/am-$Nb_{12}O_{29}$ NCs, middle), and anisotropic monoclinic $Nb_{12}O_{29}$ nanocrystals (am-$Nb_{12}O_{29}$ NCs, top).

In FIG. 86, the experimental Raman spectrum of the anisotropic monoclinic $Nb_{12}O_{29}$ nanocrystals shows a single peak at 648 $cm^{-1}$ in the Nb—O—Nb bridging bond region, which is identical to the isostructural $Ti_2Nb_{10}O_{29}$ (McConnell et al. *Spectrochim. Acta* 1976, 32 (5), 1067-1076; Cheng et al. *J. Mater. Chem. A* 2014, 2 (41), 17258-17262). However, when compared to the spectrum of bulk $Ti_2Nb_{10}O_{29}$ crystals and bulk monoclinic $Nb_2O_5$ crystals that show a distinct peak in the Nb=O terminal bond region (FIG. 86) (Cheng et al. *J. Mater. Chem. A* 2014, 2 (41), 17258-17262), the spectrum of anisotropic monoclinic $Nb_{12}O_{29}$ nanocrystals has a relatively low intensity peak in this region. The relatively low intensity peak in the Nb=O terminal bond region indicates a reduced abundance of Nb=O terminal bonds in the anisotropic monoclinic $Nb_{12}O_{29}$ nanocrystals, which could be related to the absence of some vertex-shared $NbO_6$ octahedra. In FIG. 87, the spectrum of anisotropic orthorhombic $Nb_2O_5$ nanocrystals shows a distinct peak at 710 $cm^{-1}$ in the Nb—O—Nb bridging bond region, corresponding to the Nb—O—Nb bridging bonds of orthorhombic $Nb_2O_5$ (Ikeya et al. *Non-Cryst. Solids* 1988, 105 (3), 243-250), and the spectrum of nanocrystal mixture shows signatures from both.

Figure 89:
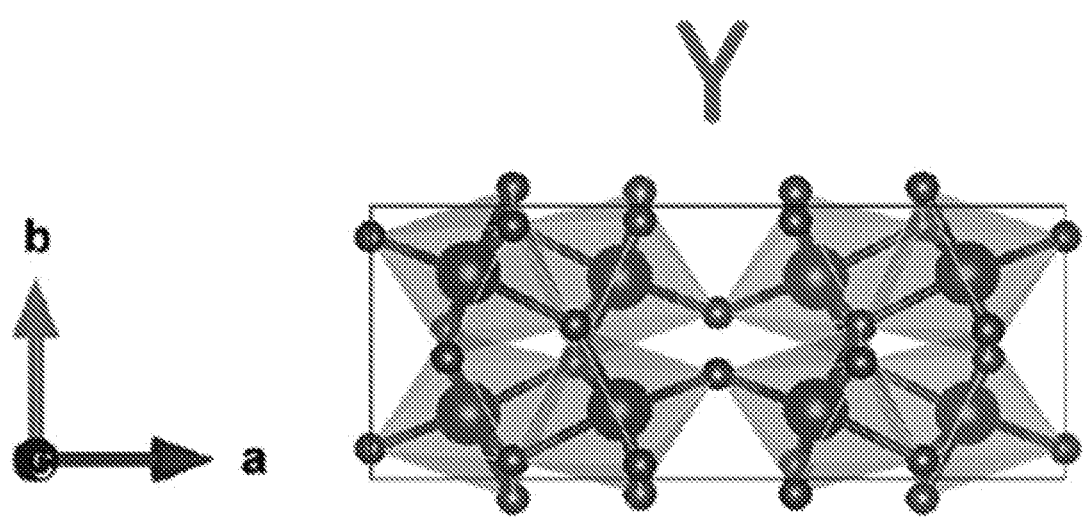
FIG. 89 is the Y unit cell being used in the simulations shown in FIG. 91.
Figure 88:
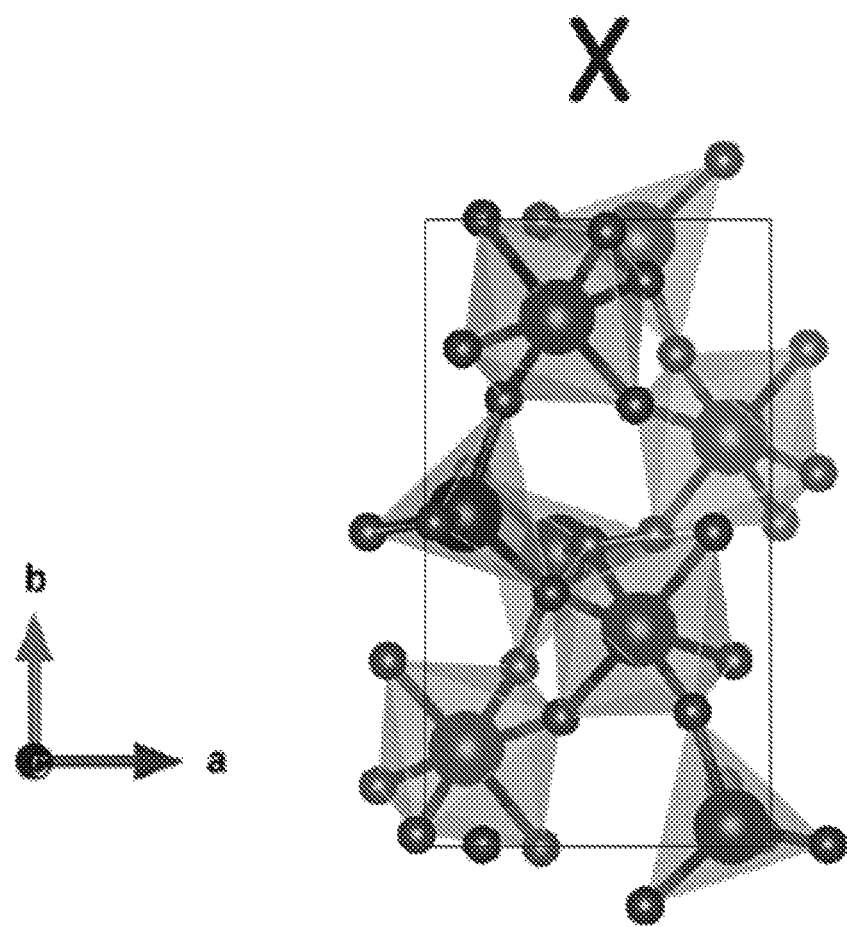
FIG. 88 is the X unit cell being used in the simulations shown in FIG. 91.
Figure 90:
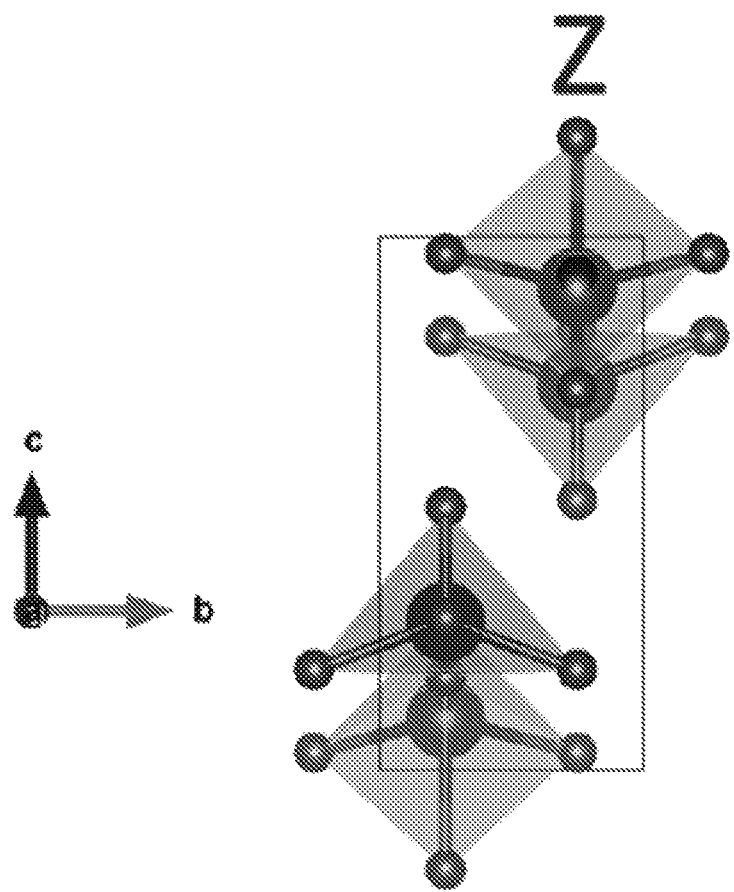
FIG. 90 is the Z unit cell being used in the simulations shown in FIG. 91.
Figure 91:
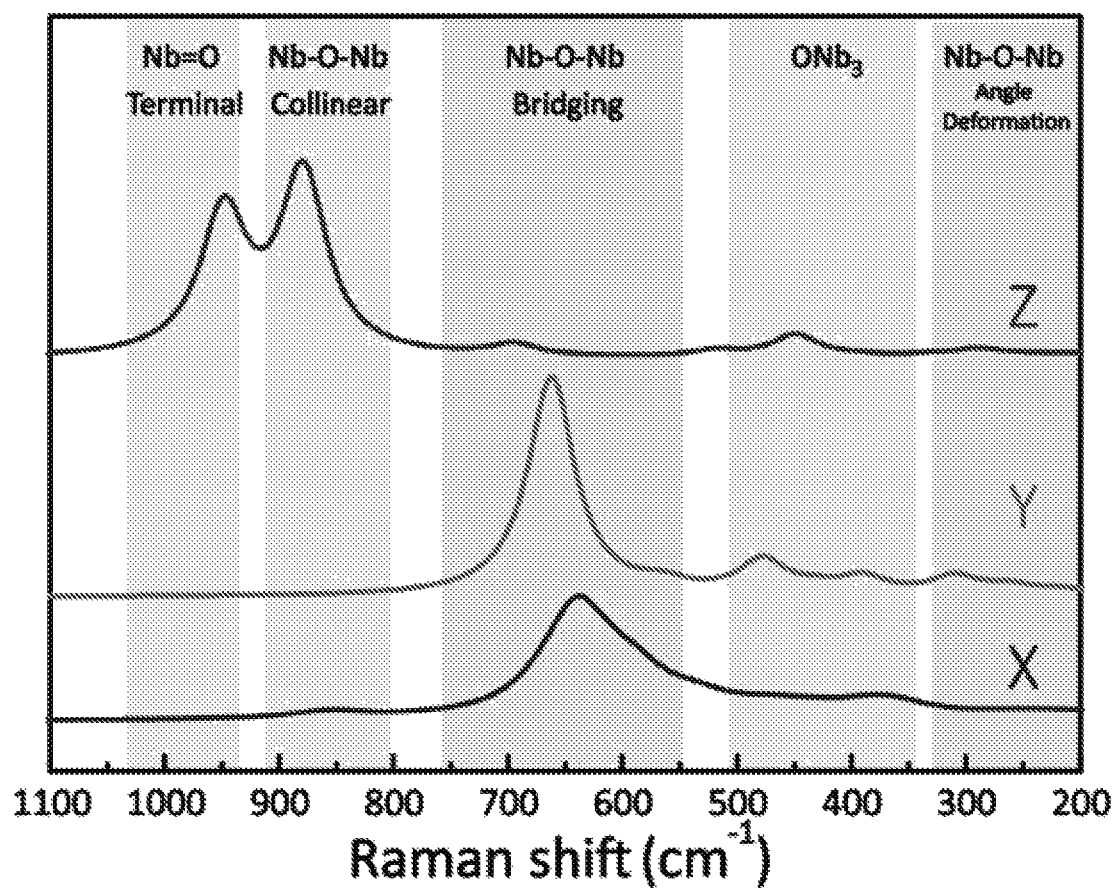
FIG. 91 is the Simulated Raman spectra of the cells with predominantly Nb—O—Nb bridging bonds (X), with predominantly Nb—O—Nb bridging bonds and $ONb_3$ bonds (Y), with predominantly Nb—O—Nb collinear bonds and Nb=O terminal bonds (Z).

Simulations of Raman spectra were used to identify the missing bonds in the anisotropic monoclinic $Nb_{12}O_{29}$ nanocrystals. To begin with, the simulations were performed for several structures of $Nb_2O_5$ (X—FIG. 88, Y—FIG. 89, and Z—FIG. 90) to assign the peaks in their simulated Raman spectra (FIG. 91). Structures X and Y are structurally similar, with Y showing more $ONb_3$ bonds (FIG. 88 and FIG. 89); this gives rise to similar simulated spectra for X and Y, but Y has stronger intensity in the $ONb_3$ bond region (FIG. 91). Structure Z has four vertex-shared $NbO_6$ octahedra with Nb—O—Nb bond angles around ~180 and ~140 degrees (FIG. 90), which gives rise to peaks in the Nb=O terminal bond and Nb—O—Nb collinear bond regions along with weak features in other regions as seen X and Y (FIG. 91). This observation aligns with previous results indicating that the Nb=O terminal bonds and Nb—O—Nb collinear bonds are exclusively from vertex-shared $NbO_6$ octahedra (Llordés et al. *Nat. Mater.* 2016, 15, 1267).

Figure 92:
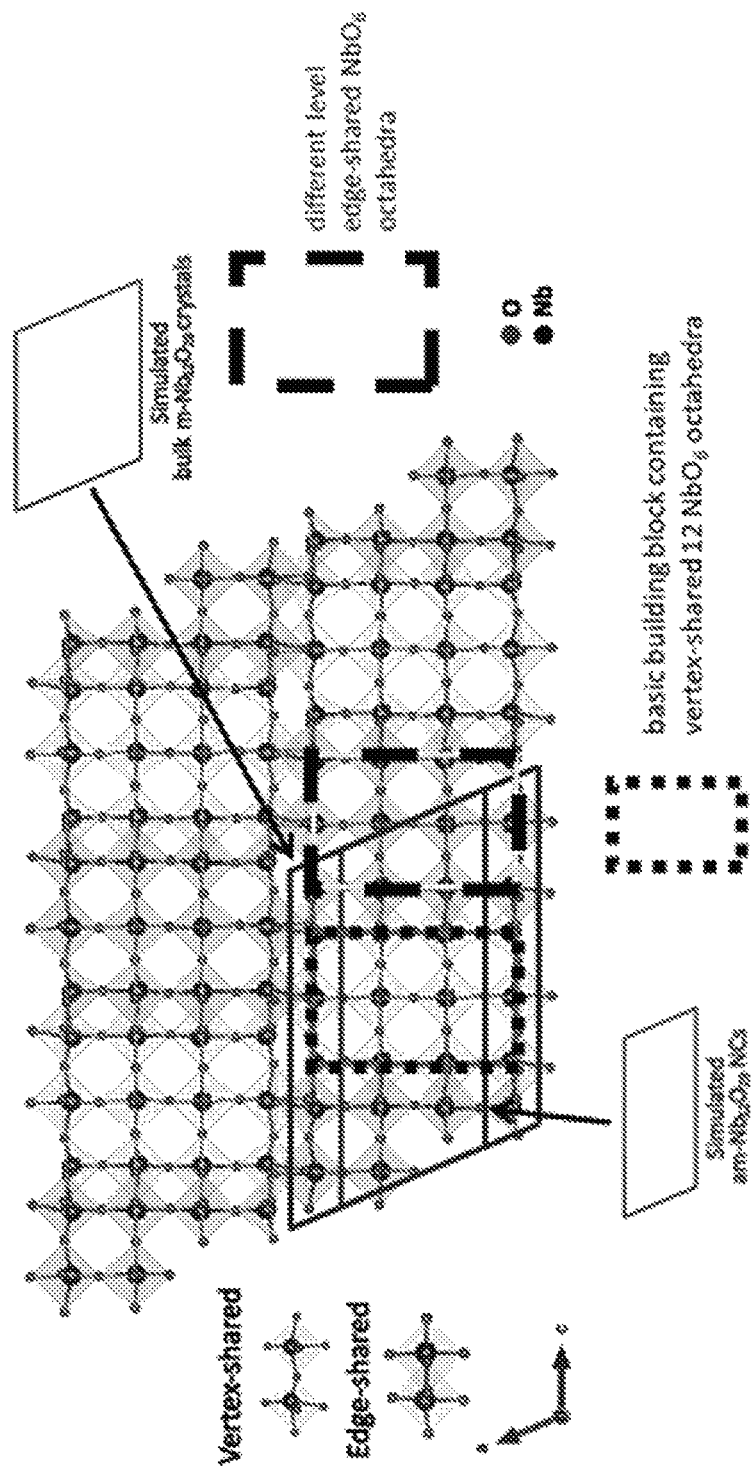
FIG. 92 is the crystal structure of monoclinic $Nb_{12}O_{29}$. "Simulated bulk m-$Nb_{12}O_{29}$ crystals" block represents the cell used in simulation for bulk monoclinic $Nb_{12}O_{29}$ crystals, "Simulated bulk am-$Nb_{12}O_{29}$ NCs" block for the cell used for anisotropic monoclinic $Nb_{12}O_{29}$ nanocrystals, dotted block for the basic building block containing vertex-shared 12 $NbO_6$ octahedra and connected with the dashed block at different level by edge-shared $NbO_6$ octahedra.

Having assigned the structural features in the Raman spectra, the simulations were performed using the structure present in the "Simulated bulk m-$Nb_{12}O_{29}$ crystals" block in FIG. 92, which is the unit cell of monoclinic $Nb_{12}O_{29}$, so the bond nature should resemble the bulk monoclinic $Nb_{12}O_{29}$ crystals. The Raman spectrum of the simulated monoclinic $Nb_{12}O_{29}$ shows strong intensity in the Nb=O terminal bond, Nb—O—Nb collinear bond, and $ONb_3$ bond regions, which are not present in the experimental spectrum of the anisotropic monoclinic $Nb_{12}O_{29}$ nanocrystals (FIG. 86). Nevertheless, the argument of bulk monoclinic $Nb_{12}O_{29}$ crystals possessing more abundant Nb=O terminal, Nb—O—Nb collinear, and $ONb_3$ bonds than the anisotropic monoclinic $Nb_{12}O_{29}$ nanocrystals might not be valid, since, experimentally, the structurally similar bulk monoclinic $Nb_2O_5$ crystals have strong intensity only in the Nb=O terminal bond region but not in the Nb—O—Nb collinear and $ONb_3$ bond regions (FIG. 86), as well as the structurally identical bulk $Ti_2Nb_{10}O_{29}$ crystals (Cheng et al. *J. Mater. Chem. A* 2014, 2 (41), 17258-17262). Thus, it was concluded that the structure of anisotropic monoclinic $Nb_{12}O_{29}$ nanocrystals has a significantly reduced abundance of Nb=O terminal bonds by comparing the experimental spectrum to the spectrum of experimental bulk monoclinic $Nb_2O_5$ crystals, experimental bulk $Ti_2Nb_{10}O_{29}$ crystals (Cheng et al. *J. Mater. Chem. A* 2014, 2 (41), 17258-17262), and simulated bulk monoclinic $Nb_{12}O_{29}$ crystals. In FIG. 92, where the dotted block represents 12 vertex-shared $NbO_6$ octahedra being arranged into one basic building block and connected with the dashed block at a different level by edge-shared $NbO_6$ octahedra, a cropped cell ("Simulated bulk am-$Nb_{12}O_{29}$ NCs" block) was used to simulate the case of removing half of the vertex-shared $NbO_6$ octahedra at the edge of each basic building block along the [100] direction (a axis), as well as some edge-shared $NbO_6$ octahedra. When compared to the simulation using "Simulated bulk m-$Nb_{12}O_{29}$ crystals" block, after cropping the cell, the simulation using "Simulated bulk am-$Nb_{12}O_{29}$ NCs" block demonstrates reduced abundance of Nb=O terminal and Nb—O—Nb collinear bonds (FIG. 92), and the peak position of the Nb—O—Nb bridging bonds becomes identical to the experimental spectrum of anisotropic monoclinic $Nb_{12}O_{29}$ nanocrystals. Hence, by using the simulated spectra of bulk monoclinic $Nb_{12}O_{29}$ crystals and anisotropic monoclinic $Nb_{12}O_{29}$ nanocrystals, the reduced abundance of Nb=O terminal and Nb—O—Nb collinear bonds was demonstrated in the case of losing certain structural units, mainly from the vertex-shared $NbO_6$ octahedra. The reduced abundance of Nb=O terminal bonds in simulations agrees with the previous arguments by comparing the features of several experimental Raman spectra. In conclusion, the anisotropy of anisotropic monoclinic $Nb_{12}O_{29}$ nanocrystals led to significantly reduced abundance of Nb=O terminal bonds due to variation in the local structure, presumably missing the $NbO_6$ octahedra, both vertex-shared and edge-shared, at the edge of each basic building block in the [100] crystallographic direction.

Synthetic Mechanism Investigation.

The choice of niobium precursor injected into the same reaction environment led to diverse results: the 120° C.-niobium precursor led to pure anisotropic monoclinic $Nb_{12}O_{29}$ nanocrystals, while the 40° C.-niobium precursor led to a mixture of anisotropic orthorhombic $Nb_2O_5$ and anisotropic monoclinic $Nb_{12}O_{29}$ nanocrystals. To investigate this result further, ultraviolet-visible-near-infrared spectra of the niobium precursors were recorded.

Figure 93:
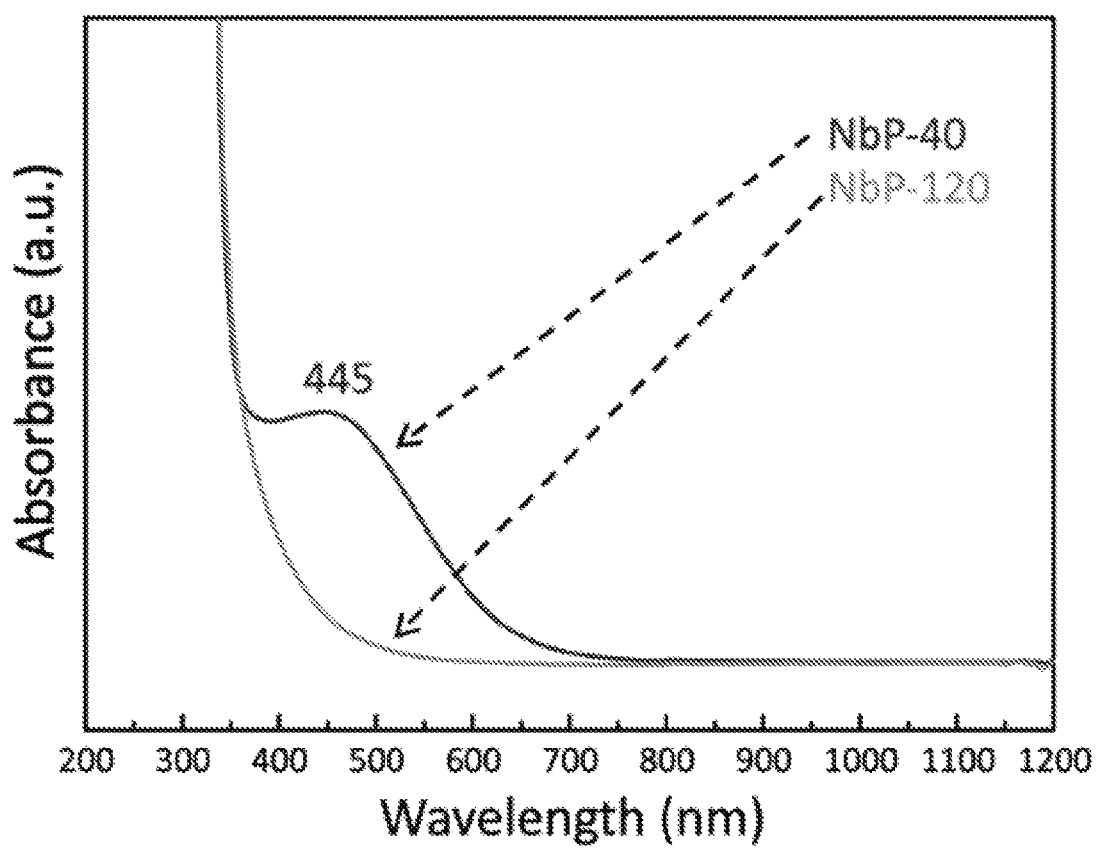
FIG. 93 is the UV-VIS-NIR spectroscopic characterizations of the 40° C.-niobium precursor (NbP-40) and 120° C.-niobium precursor (NbP-120) showing the ligand to metal charge transfer (LMCT) absorption peak centered at 445 nm.

The results show that the blood-red color of 40° C.-niobium precursor is from an absorption peak centered at 445 nm (FIG. 93), which can be attributed to the ligand to metal charge transfer (LMCT) absorption occurring from the electrons of $COO^-$ ions in oleic acid molecules to the empty d orbitals of $Nb^{5+}$ ions. Thus, the 40° C.-niobium precursor can be a mixed complex of $Nb^{5+}$ ions coordinated to $COO^-$ ions in oleic acid molecules and $Cl^-$ ions ($Nb(OA)_xCl_{5-x}$), named niobium chloro oleate herein. A similar complex based on $Nb^{5+}$ ions, $COO^-$ ions, and $Cl^-$ ions upon mixing $NbCl_5$ and carboxylic acid was also reported with known structure and IR signature, however, without the spectroscopic details in visible region (Marchetti et al. *Polyhedron* 2008, 27 (8), 1969-1976).

Figure 94:
FIG. 94 is a photograph of the 40° C.-niobium precursor.
Figure 95:
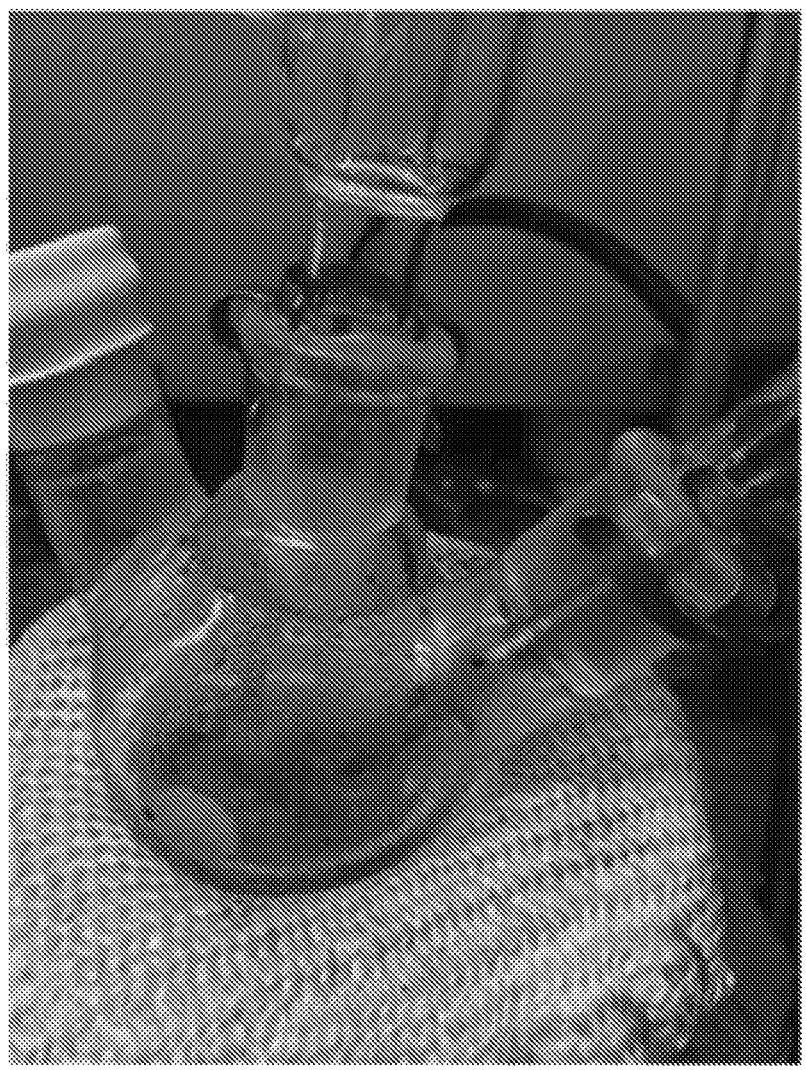
FIG. 95 is a photograph of the 120° C.-niobium precursor.

On the other hand, the 120° C.-niobium precursor shows weak absorption in the visible and an orange color (FIG. 93), indicating the absence of ligand to metal charge transfer absorption when the precursor was heated to 120° C. It was hypothesized that the niobium chloro oleate was converted into niobium oxo clusters with abundant Nb—O—Nb bonds, therefore losing the absorption from ligand to metal charge transfer and behaving similarly to amorphous niobium oxides with only band absorption residing in the UV region. Photographs of the 40° C.-niobium precursor and 120° C.-niobium precursor are shown in FIG. 94 and FIG. 95 respectively.

Figure 96:
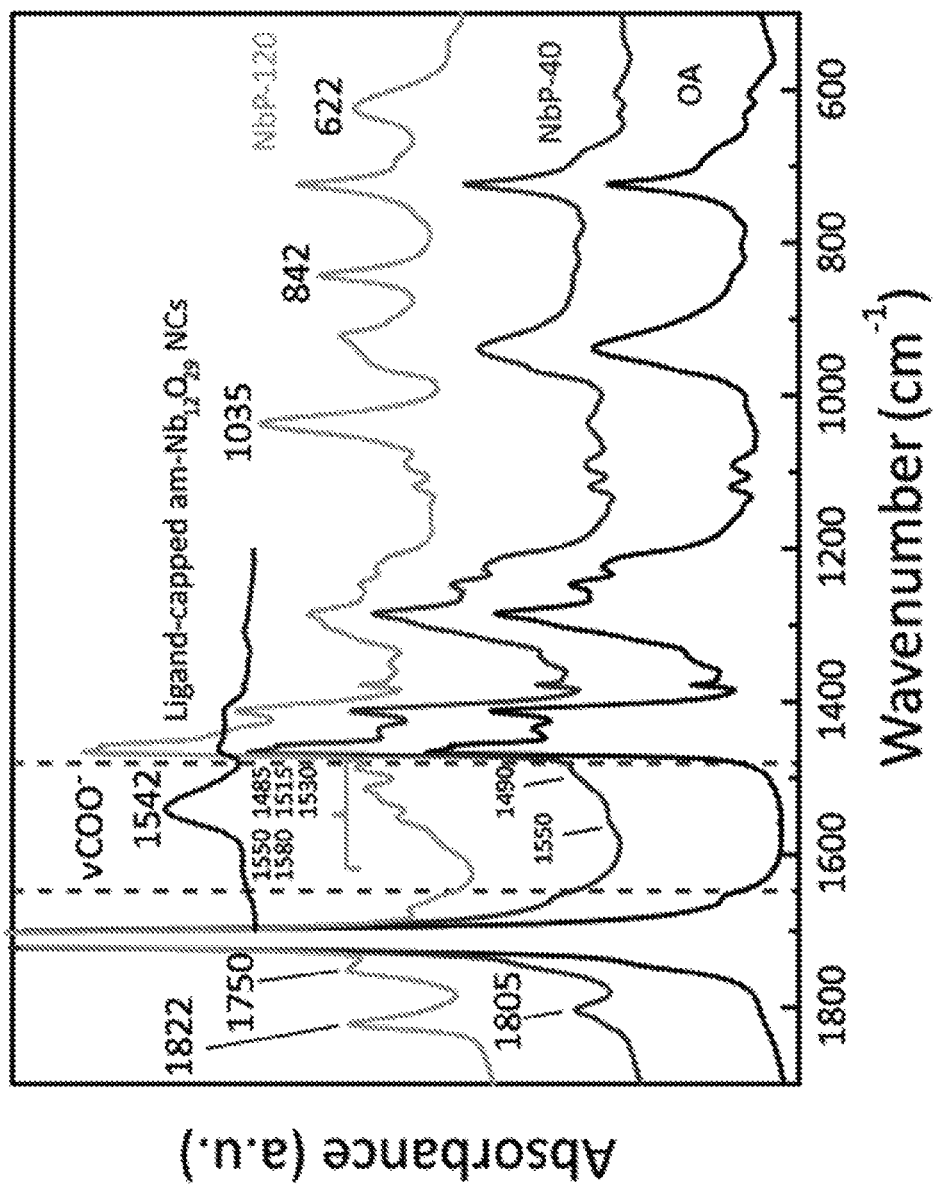
FIG. 96 FT-IR spectroscopic characterizations of the 40° C.-niobium precursor (NbP-40), 120° C.-niobium precursor (NbP-120), ligand-capped anisotropic monoclinic $Nb_{12}O_{29}$ nanocrystals (ligand-capped am-$Nb_{12}O_{29}$ NCs), and oleic acid (OA) showing the $COO^-$ stretches when $COO^-$ ions coordinate to $Nb^{5+}$ ions (between 1480 $cm^{-1}$ and 1650 $cm^{-1}$), Nb—O—Nb bonds (622 $cm^{-1}$ and 842 $cm^{-1}$), and signals from oleoyl chloride (1805 $cm^{-1}$) and oleic anhydride (1035 $cm^{-1}$, 1750 $cm^{-1}$, and 1822 $cm^{-1}$).

IR spectroscopy is useful for identifying the structure of metal ions coordinating to oleic acid molecules, namely the metal oleate, and the chemistry leading to diverse results (Buonsanti et al. *J. Am. Chem. Soc.* 2008, 130 (33), 11223-11233; Bronstein et al. *Chem. Mater.* 2007, 19 (15), 3624-3632; Cho et al. *Chem. Mater.* 2019, 31 (7), 2661-2676). Upon the $COO^-$ ions coordinating to metal ions, several peaks of coordinated $COO^-$ stretches (v COO) can be observed mostly located between 1480 $cm^{-1}$ and 1650 $cm^{-1}$ compared to the non-coordinated $COO^-$ stretches (Bronstein et al. *Chem. Mater.* 2007, 19 (15), 3624-3632; Cho et al. *Chem. Mater.* 2019, 31 (7), 2661-2676). In the FT-IR spectrum of non-coordinated oleic acid (FIG. 96), no apparent peak was observed in the v $COO^-$ region (v $COO^-$ region indicated by dashed lines in FIG. 96). With the presence of $Nb^{5+}$ ions (FIG. 96), the 40° C.-niobium precursor shows two weak peaks at 1490 $cm^{-1}$ and 1550 $cm^{-1}$ that can be attributed to the bridging mode of $COO^-$ stretches (Marchetti et al. *Polyhedron* 2008, 27 (8), 1969-1976), while the 120° C.-niobium precursor shows multiple strong peaks in this region (1485 $cm^{-1}$, 1515 $cm^{-1}$, 1530 $cm^{-1}$, 1550 $cm^{-1}$, and 1580 $cm^{-1}$), suggesting a strong coordination involving several different modes between $COO^-$ ions and $Nb^{5+}$ ions (Bronstein et al. *Chem. Mater.* 2007, 19 (15), 3624-3632). For reference, the strong peak at 1542 $cm^{-1}$ in the FT-IR spectrum of the ligand-capped anisotropic monoclinic $Nb_{12}O_{29}$ nanocrystals demonstrates that the $COO^-$ ions are tightly bound on the niobium oxide surface (FIG. 96). Peaks at 622 $cm^{-1}$ and 842 $cm^{-1}$, which are not associated to any organic in the reaction environment, can be assigned to the stretch of the Nb—O—Nb bridging and collinear bonds, respectively (Orel et al. *J. Solid State Electrochem.* 1998, 2 (4), 221-236). Based on the observations of $COO^-$ stretches and Nb—O—Nb bonds, it was concluded that the 40° C.-niobium precursor is niobium chloro oleate with $COO^-$ ions weakly coordinating to $Nb^{5+}$ ions, whereas the 120° C.-niobium precursor comprises niobium oxo clusters capped by oleic acid molecules, thus showing the signature of Nb—O—Nb bonds and coordinated $COO^-$ ions. In the proton nuclear magnetic resonance ($^1$H-NMR) spectra (FIG. 97), the protons on the alpha carbon of oleic acid molecules have triplet resonance centered at 2.35 ppm, while the spectrum of the 120° C.-niobium precursor shows broadened triplet resonance and downfield chemical shift, indicating that the COO$^-$ ions are tightly bound onto the surface of niobium oxo clusters instead of weakly coordinating to Nb$^{5+}$ ions in the 40° C.-niobium precursor (Hens et al. *Chem. Mater.* 2013, 25 (8), 1211-1221).

Figure 97:
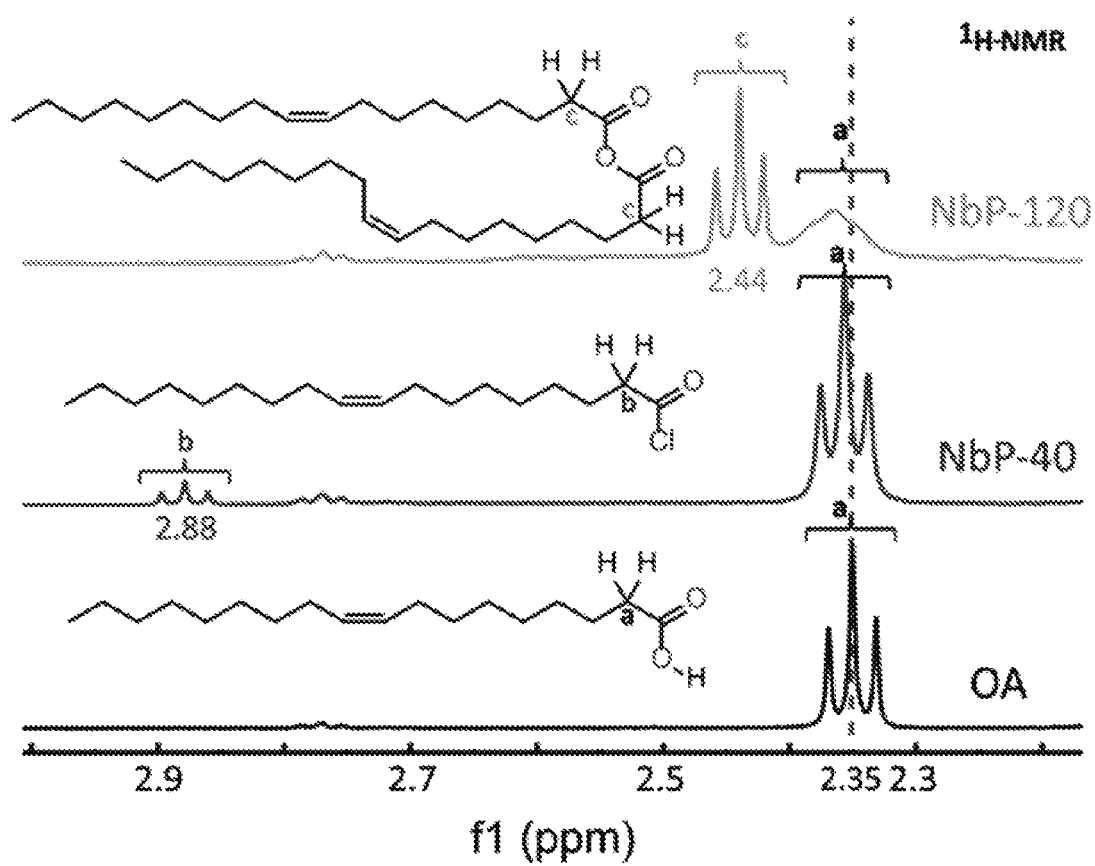
FIG. 97 is the $^1$H-NMR spectroscopic characterizations of the 40° C.-niobium precursor (NbP-40), 120° C.-niobium precursor (NbP-120), and oleic acid (OA) showing signals from oleic acid (2.35 ppm), oleoyl chloride (2.88 ppm), and oleic anhydride (2.44 ppm) along with their structure. Downfield shift of peaks centered at 2.35 ppm in the 120° C.-niobium precursor represents the $COO^-$ ions tightly bound onto the surface of niobium oxo clusters.

The formation of byproduct in both precursors were studied by IR and $^1$H-NMR spectroscopies (FIG. 96 and FIG. 97). In the FT-IR spectrum of the 40° C.-niobium precursor (FIG. 96), a peak from the C=O stretch (1802 cm$^{-1}$) of oleoyl chloride can be observed, while peaks from the C—O—C stretch (1035 cm$^{-1}$), C=O symmetric and asymmetric stretches (1750 cm$^{-1}$ and 1822 cm$^{-1}$) can be assigned to oleic anhydride. The observations of these two compounds are further supported by $^1$H-NMR spectra (FIG. 97), showing triplet resonances at 2.88 ppm and 2.44 ppm which can be assigned to oleoyl chloride and oleic anhydride, respectively.

Figure 98:
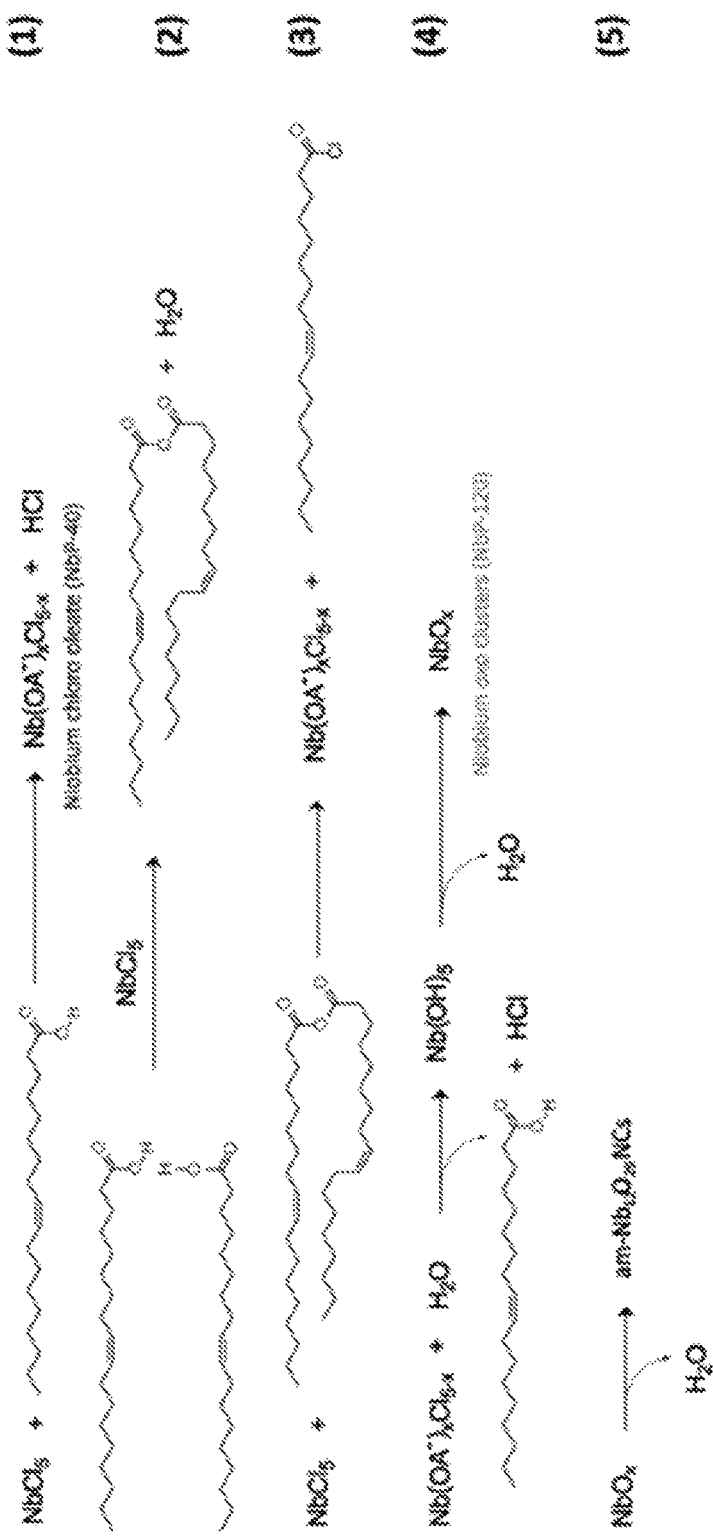
FIG. 98 is the proposed mechanism accounting for the formation of niobium chloro oleate upon mixing $NbCl_5$ and oleic acid (Equation (1)), oleic anhydride as a product from the condensation of oleic acid catalyzed by $NbCl_5$ (Equation (2)), oleoyl chloride from the reaction between $NbCl_5$ and oleic anhydride (Equation (3)), niobium oxo clusters from hydrolysis (Equation (4)), and the growth of anisotropic monoclinic $Nb_{12}O_{29}$ nanocrystals (Equation (5)).

Based on the above observations, the mechanisms accounting for the formation of niobium oxo clusters in 120° C.-niobium precursor and the other byproducts shown in FIG. 98 were proposed. Upon mixing NbCl$_5$ and oleic acid molecules and heating at 40° C. (NbP-40), niobium chloro oleate with COO$^-$ ions weakly coordinating to the Nb$^{5+}$ ions was formed (FIG. 98, Equation (1)) (Marchetti et al. *Polyhedron* 2008, 27 (8), 1969-1976). In the meantime, a small amount of oleic acid molecule was proposed to condense into oleic anhydride and subsequently react with NbCl$_5$ to form oleoyl chloride and niobium chloro oleate (FIG. 98, Equation (2), and Equation (3)). A similar reaction scheme to Equation (3) was reported by reacting NbCl$_5$ with acetic anhydride to form niobium chloro carboxylate and acetyl chloride (Marchetti et al. *Polyhedron* 2008, 27 (8), 1969-1976). As for Equation (2), the presence of NbCl$_5$ could catalyze the condensation of deprotonated oleic acid molecules (Yadav et al. *J. Mol. Cat., A: Chem.* 2005, 230 (1), 107-111). At 120° C. (NbP-120), it was proposed that a large amount of oleic anhydride was produced with water as a byproduct and consumed all the remained NbCl$_5$. Niobium chloro oleate will react with water via a hydrolysis route and eventually form niobium oxo clusters (FIG. 98, Equation(4)) (Agrawal et al. *Chem. Rev.* 2018, 118 (6), 3121-3207). According to this mechanism, oleic anhydride will remain as a byproduct as well as the signatures of niobium oxo clusters with tightly bound COO$^-$ ions. The injection of 120° C.-niobium precursor will lead to the formation of anisotropic monoclinic Nb$_{12}$O$_{29}$ nanocrystals (FIG. 98, Equation(5)).

Figure 99:
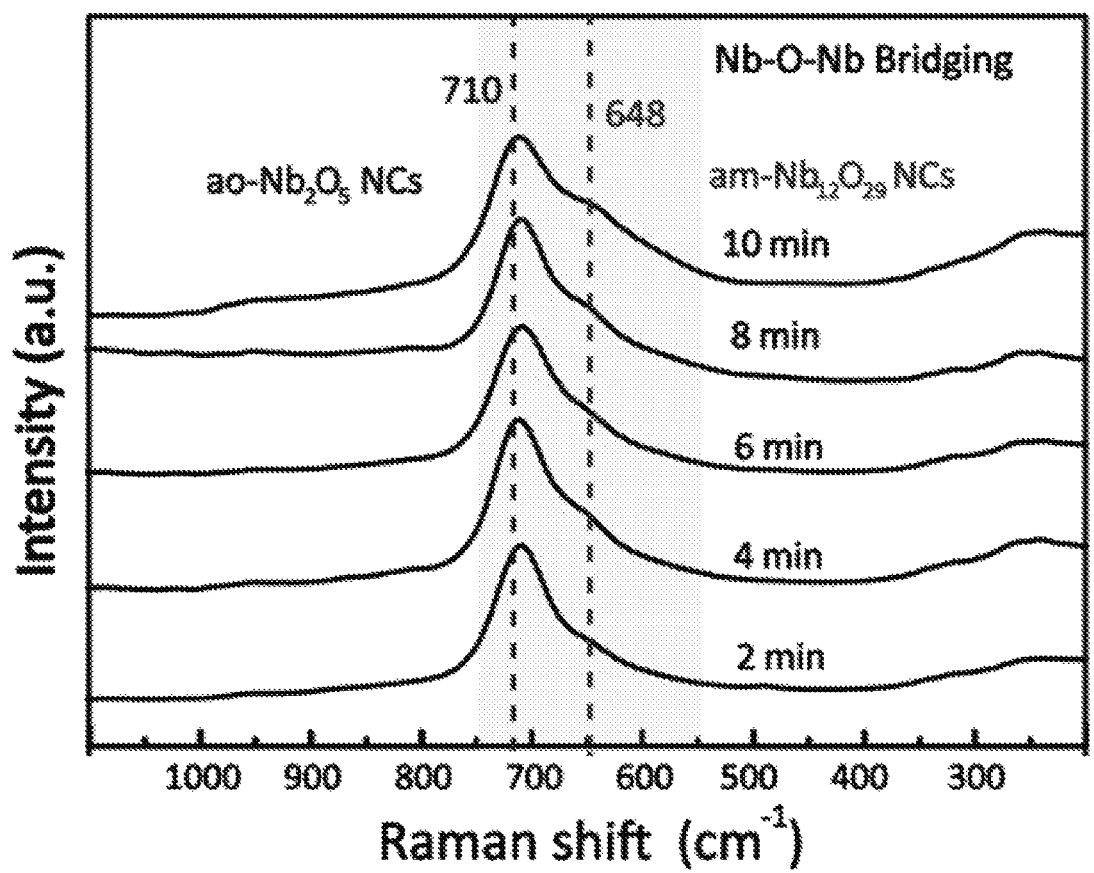
FIG. 99 is the Raman spectra of aliquots used for tracking the reaction progression in the hot-injection synthesis using 40° C.-niobium precursor to initiate the nanocrystal growth. Peaks at 710 $cm^{-1}$ (left vertical dashed line) and 648 $cm^{-1}$ (right vertical dashed line) represent the Nb—O—Nb bridging bonds from anisotropic orthorhombic $Nb_2O_5$ nanocrystals and anisotropic monoclinic $Nb_{12}O_{29}$ nanocrystals, respectively. Peaks at 625 $cm^{-1}$ and 980 $cm^{-1}$ represent the feature of Nb—O—Nb bridging and Nb=O terminal bonds from amorphous nanocrystal seeds, respectively.
Figure 100:
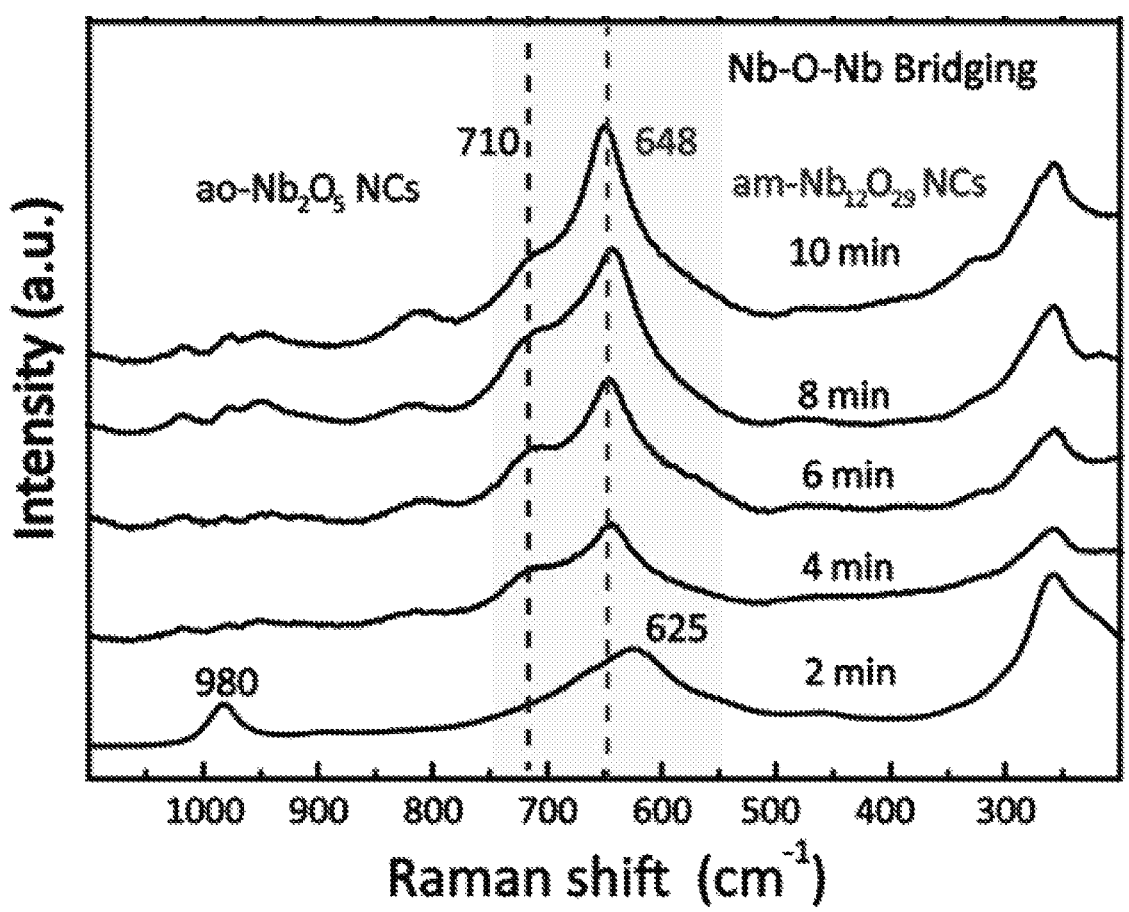
FIG. 100 is the Raman spectra of aliquots used for tracking the reaction progression in the hot-injection synthesis using 120° C.-niobium precursor to initiate the nanocrystal growth. Peaks at 710 $cm^{-1}$ (left vertical dashed line) and 648 $cm^{-1}$ (right vertical dashed line) represent the Nb—O—Nb bridging bonds from anisotropic orthorhombic $Nb_2O_5$ nanocrystals and anisotropic monoclinic $Nb_{12}O_{29}$ nanocrystals, respectively. Peaks at 625 $cm^{-1}$ and 980 $cm^{-1}$ represent the feature of Nb—O—Nb bridging and Nb=O terminal bonds from amorphous nanocrystal seeds, respectively.

Upon injecting the metal precursors into a high temperature environment, they undergo lysis and react with the protic moieties, presumably the oleylamine and the aminolysis reaction (Agrawal et al. *Chem. Rev.* 2018, 118 (6), 3121-3207). The bond between COO$^-$ ions and Nb$^{5+}$ ions, either in the form of coordination or tightly bound onto niobium oxo clusters, will be cleaved by oleylamine, form niobium hydroxide, and subsequently condense into nanocrystals. The mechanism of nanocrystal growth was investigated by tracking the reaction progression using aliquots during the hot-injection synthesis. In the Raman spectra (FIG. 99 and FIG. 100), peaks at 710 cm$^{-1}$ and 648 cm$^{-1}$ represent the Nb—O—Nb bridging bond from anisotropic orthorhombic Nb$_2$O$_5$ nanocrystals and anisotropic monoclinic Nb$_{12}$O$_{29}$ nanocrystals, respectively. Upon injecting 40° C.-niobium precursor (FIG. 99), a strong peak at 710 cm$^{-1}$ was observed throughout the aliquots, while a weak peak at 648 cm$^{-1}$ evolved gradually during the progression, suggesting that the 40° C.-niobium precursor, or niobium chloro oleate, strongly favors the growth of anisotropic orthorhombic Nb$_2$O$_5$ nanocrystals, or equivalently being deposited on the {001} facet of orthorhombic Nb$_2$O$_5$. Such a mechanism can also be supported by the result of the heat-up synthesis, in which anisotropic orthorhombic Nb$_2$O$_5$ nanocrystals were formed by gradually heating the niobium chloro oleate from lower temperature. In FIG. 100, the injection of the 120° C.-niobium precursor led to a broadened spectrum with peaks at 625 cm$^{-1}$ and 980 cm$^{-1}$ at 2 min and evolves into the spectra with signature of anisotropic monoclinic Nb$_{12}$O$_{29}$ nanocrystals in the end. The broadened peak at 625 cm$^{-1}$ lies in the region of Nb—O—Nb bridging bond, but does not belong to any common crystalline Nb$_2$O$_5$ (Ikeya et al. *Non-Cryst. Solids* 1988, 105 (3), 243-250; Jehng et al. *Chem. Mater.* 1991, 3 (1), 100-107), so it can be considered the signature of niobium oxo clusters in an amorphous phase. The peak at 980 cm$^{-1}$ can be assigned to the terminal Nb=O bonds also from the clusters (Jehng et al. *J. Raman Spectrosc.* 1991, 22 (2), 83-89). Based on these observations, it was concluded that upon injecting the 120° C.-niobium precursor, or equivalently the niobium oxo clusters, they will serve as amorphous nanocrystal seeds and be deposited on the {011} facet of monoclinic Nb$_{12}$O$_{29}$. As for the formation of a small amount of anisotropic monoclinic Nb$_{12}$O$_{29}$ nanocrystals in the synthesis injecting the 40° C.-niobium precursor, this can be attributed to the partial conversion of niobium chloro oleate to niobium oxo clusters during the reaction before forming into anisotropic orthorhombic Nb$_2$O$_5$ nanocrystals.

Figure 101:
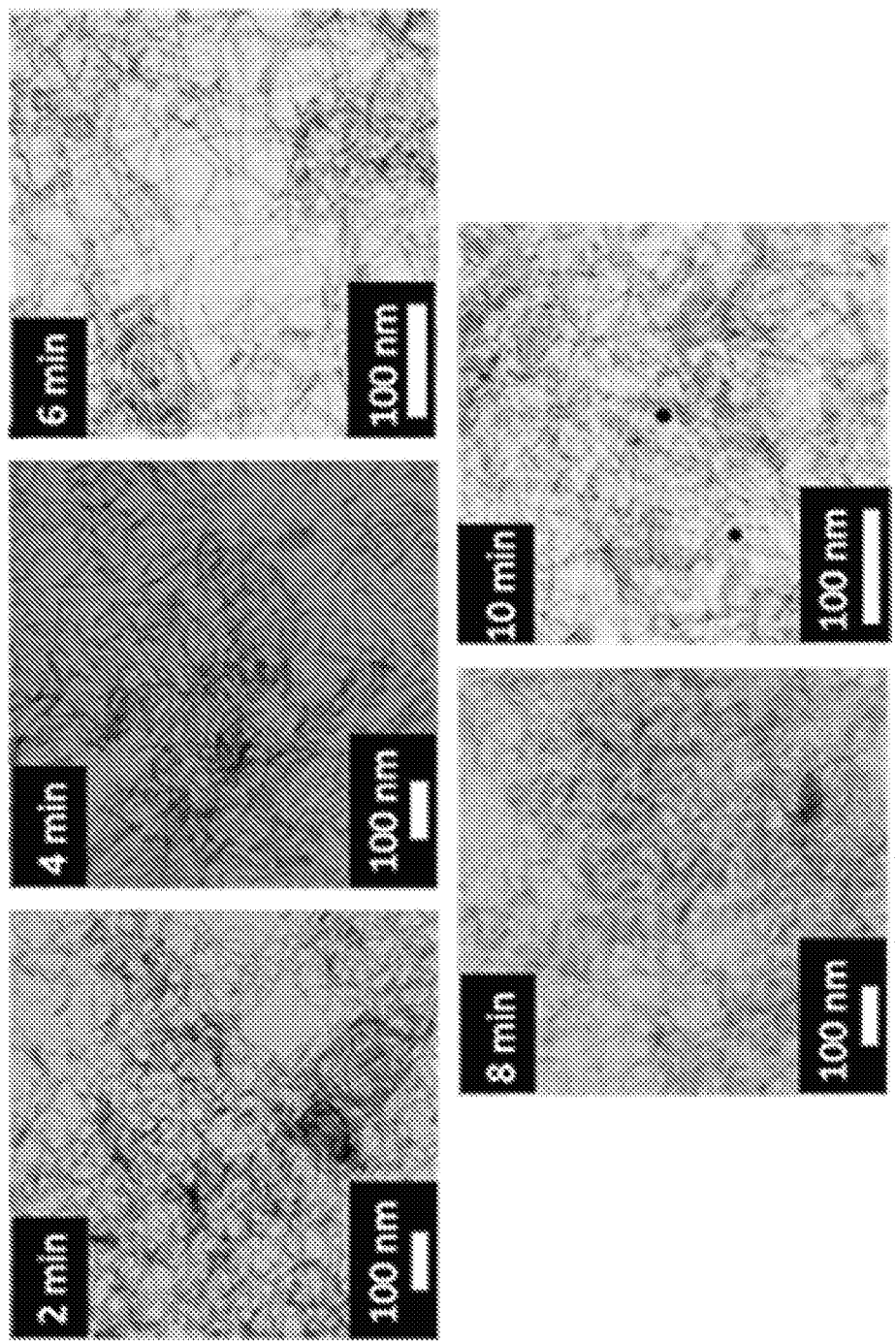
FIG. 101 shows scanning transmission electron microscopy images of aliquots for tracking the reaction progression in hot-injection synthesis using the 40° C.-niobium precursor to initiate the nanocrystal growth, showing a mixture of nanorods and nanoplatelets at every stage.
Figure 102:
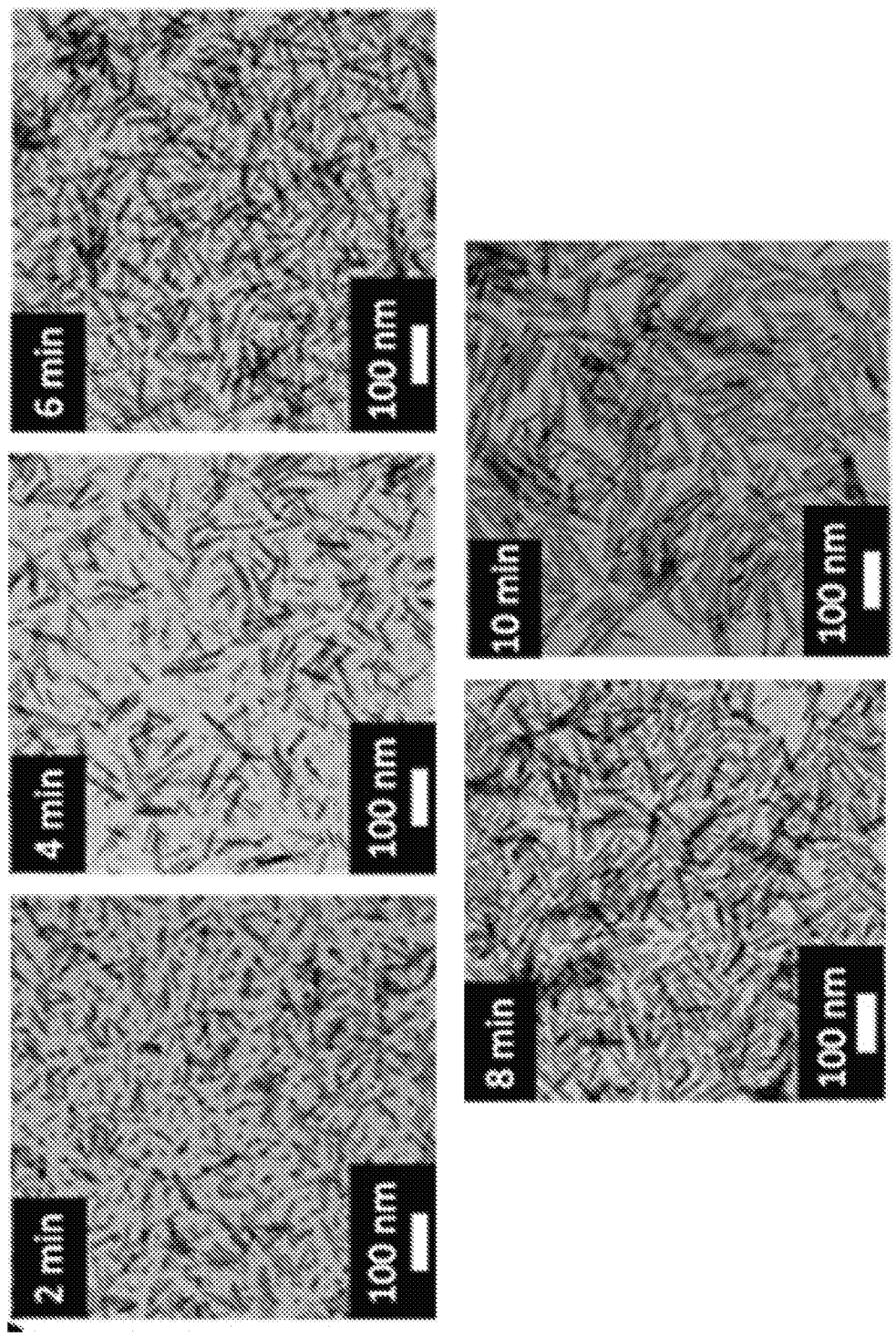
FIG. 102 shows scanning transmission electron microscopy images of aliquots for tracking the reaction progression in hot-injection synthesis using the 120° C.-niobium precursor to initiate the nanocrystal growth, showing clusters and fragmented nanoplatelets in the beginning (left) and evolving into nanoplatelets in the end (right).
Figure 103:
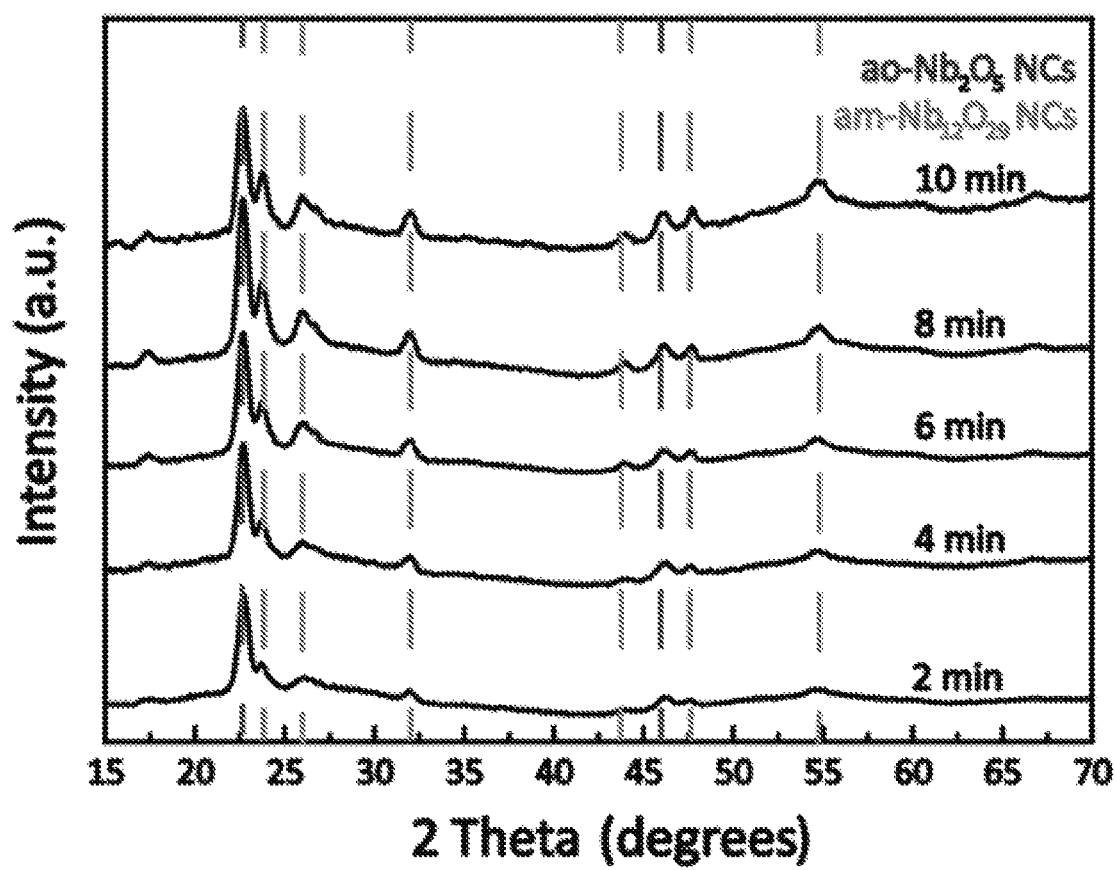
FIG. 103 is the experimental X-ray diffraction patterns of aliquots for tracking the reaction progression in hot-injection synthesis using the 40° C.-niobium precursor to initiate the nanocrystal growth, showing signatures from both anisotropic orthorhombic $Nb_2O_5$ nanocrystals and anisotropic monoclinic $Nb_{12}O_{29}$ nanocrystals.
Figure 104:
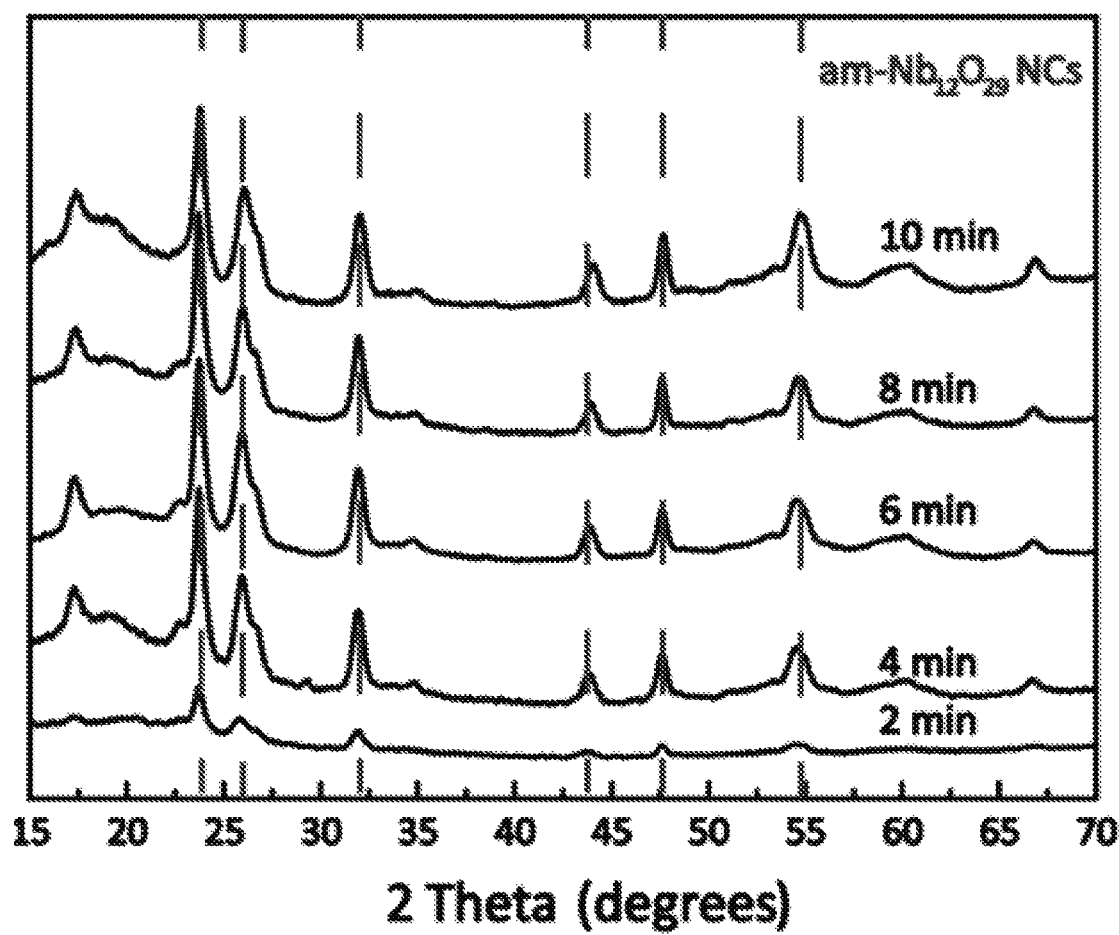
FIG. 104 is the experimental X-ray diffraction patterns of aliquots for tracking the reaction progression in hot-injection synthesis using the 120° C.-niobium precursor to initiate the nanocrystal growth, showing weak signals from nanoplatelets in the beginning and strong signals from nanoplatelets in the end.

The mechanism was also investigated using scanning transmission electron microscopy images and experimental X-ray diffraction patterns of the reaction aliquots in the synthesis injecting the 40° C.-niobium precursor (FIG. 101 and FIG. 103) and the synthesis injecting the 120° C.-niobium precursor (FIG. 102 and FIG. 104). In FIG. 101, a mixture of nanorods and nanoplatelets was observed throughout the aliquots, which were difficult to distinguish. On the contrary, small clusters and fragmented nanoplatelets were observed initially in the synthesis injecting the 120° C.-niobium precursor (FIG. 102), supporting the observation in Raman spectra that the initial stage of reaction includes clusters serving as nanocrystal seeds. Along with the reaction progressing, these clusters gradually decompose and deposit on the fragmented nanoplatelets. The experimental X-ray diffraction patterns in FIG. 103 show the signature from both anisotropic orthorhombic Nb$_2$O$_5$ nanocrystals and anisotropic monoclinic Nb$_{12}$O$_{29}$ nanocrystals with signals from anisotropic monoclinic Nb$_{12}$O$_{29}$ nanocrystals gradually evolving. In FIG. 104, the pattern showing weak signals from anisotropic monoclinic Nb$_{12}$O$_{29}$ nanocrystals at 2 min can be attributed to the result of mixed amorphous clusters and fragmented nanoplatelets, while the patterns after 2 min show clear signals from anisotropic monoclinic Nb$_{12}$O$_{29}$ nanocrystals.

Controlling the complex of metal oleate to vary the preferred facet during nanocrystal growth was extensively investigated, with finest examples from iron oxide and titanium oxide nanocrystals (Feld et al. *ACS Nano* 2019, 13 (1), 152-162; Chang et al. *J. Am. Chem. Soc.* 2019, 141 (17), 7037-7045; Gordon et al. *J. Am. Chem. Soc.* 2012, 134 (15), 6751-6761). In this report, the chemistry of niobium precursors was investigated and showed that the niobium chloro oleate will preferentially deposit on the {001} facet of orthorhombic $Nb_2O_5$, and the niobium oxo clusters will preferentially deposit on the {011} facet of monoclinic $Nb_{12}O_{29}$.

Influence of Ligand Stripping.

Figure 105:
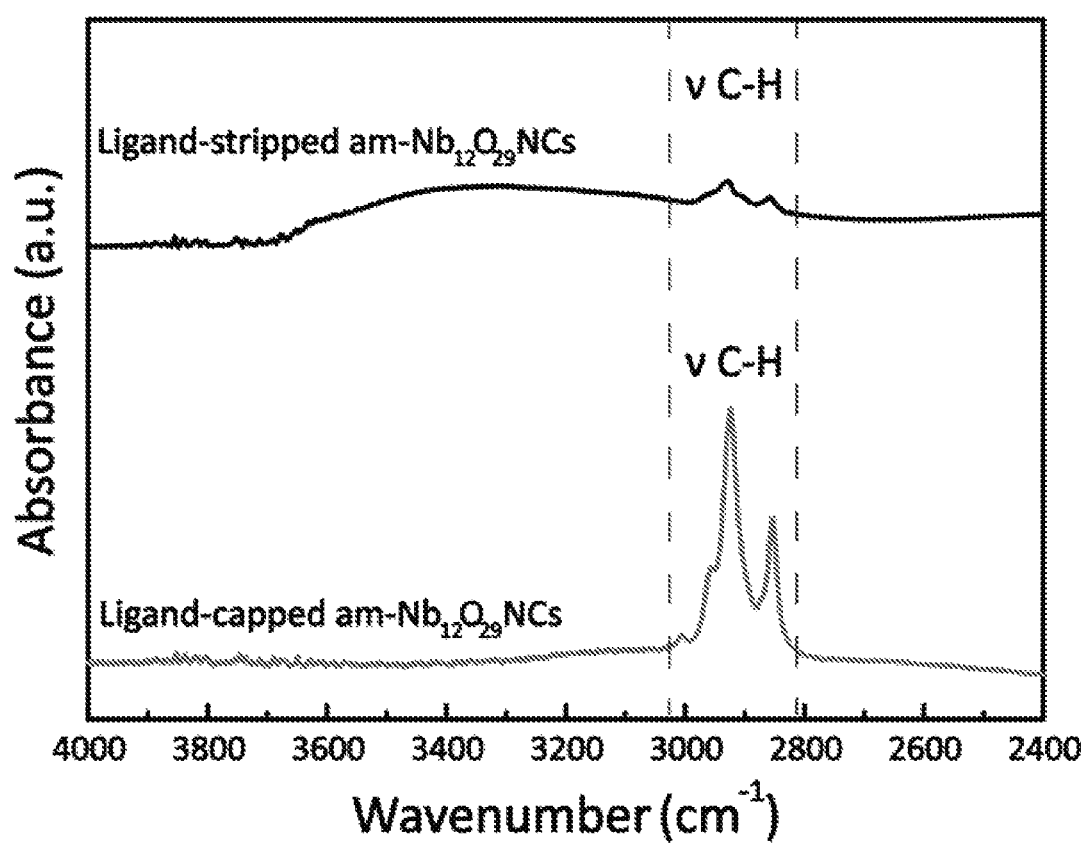
FIG. 105 is the FT-IR spectra of the ligand-capped (bottom) and ligand-stripped (top) anisotropic monoclinic $Nb_{12}O_{29}$ nanocrystals showing that the intensity of C—H stretches are significantly reduced after ligand stripping.
Figure 106:
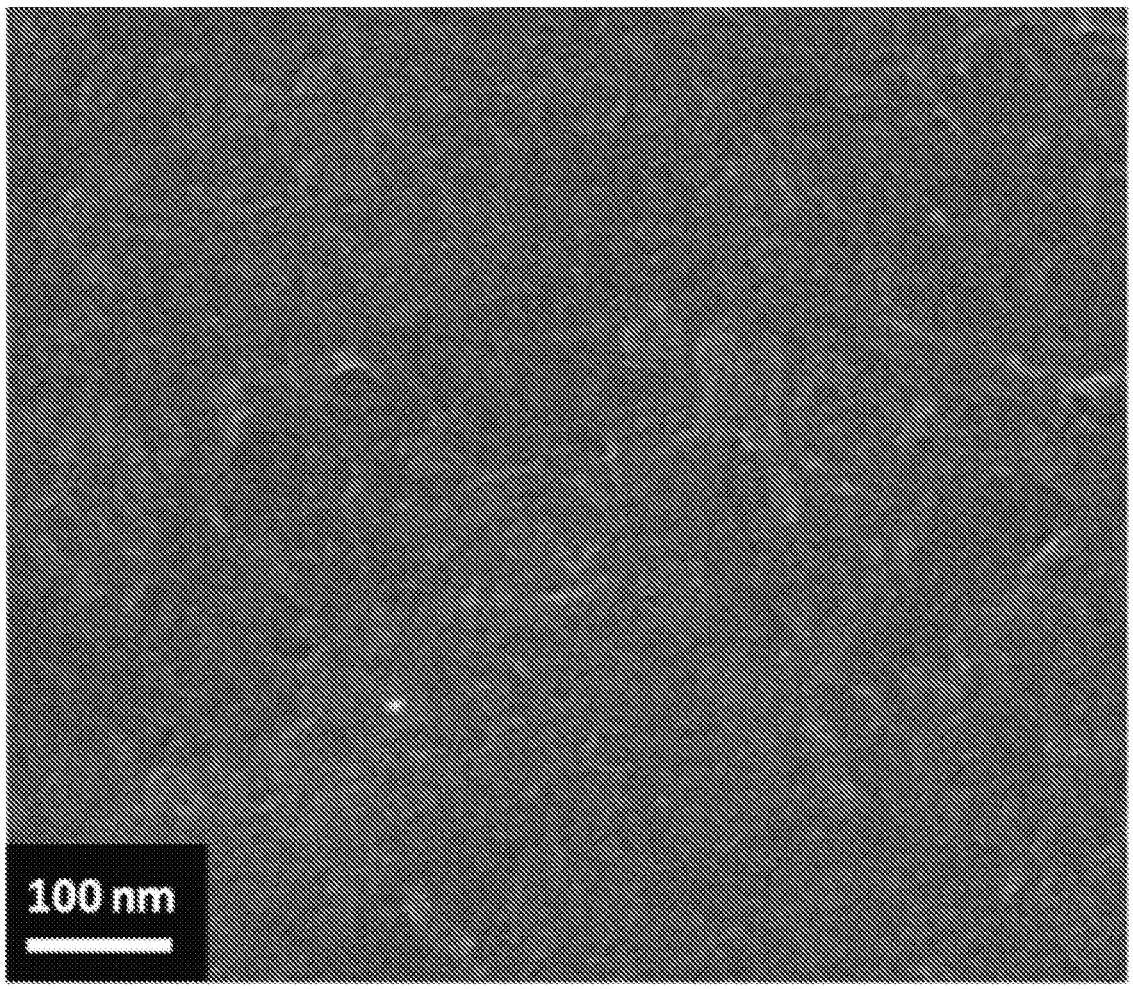
FIG. 106 is a SEM image of the spin-coated anisotropic monoclinic $Nb_{12}O_{29}$ nanocrystal film using ligand-capped nanocrystals, showing densely-packed morphology.
Figure 107:
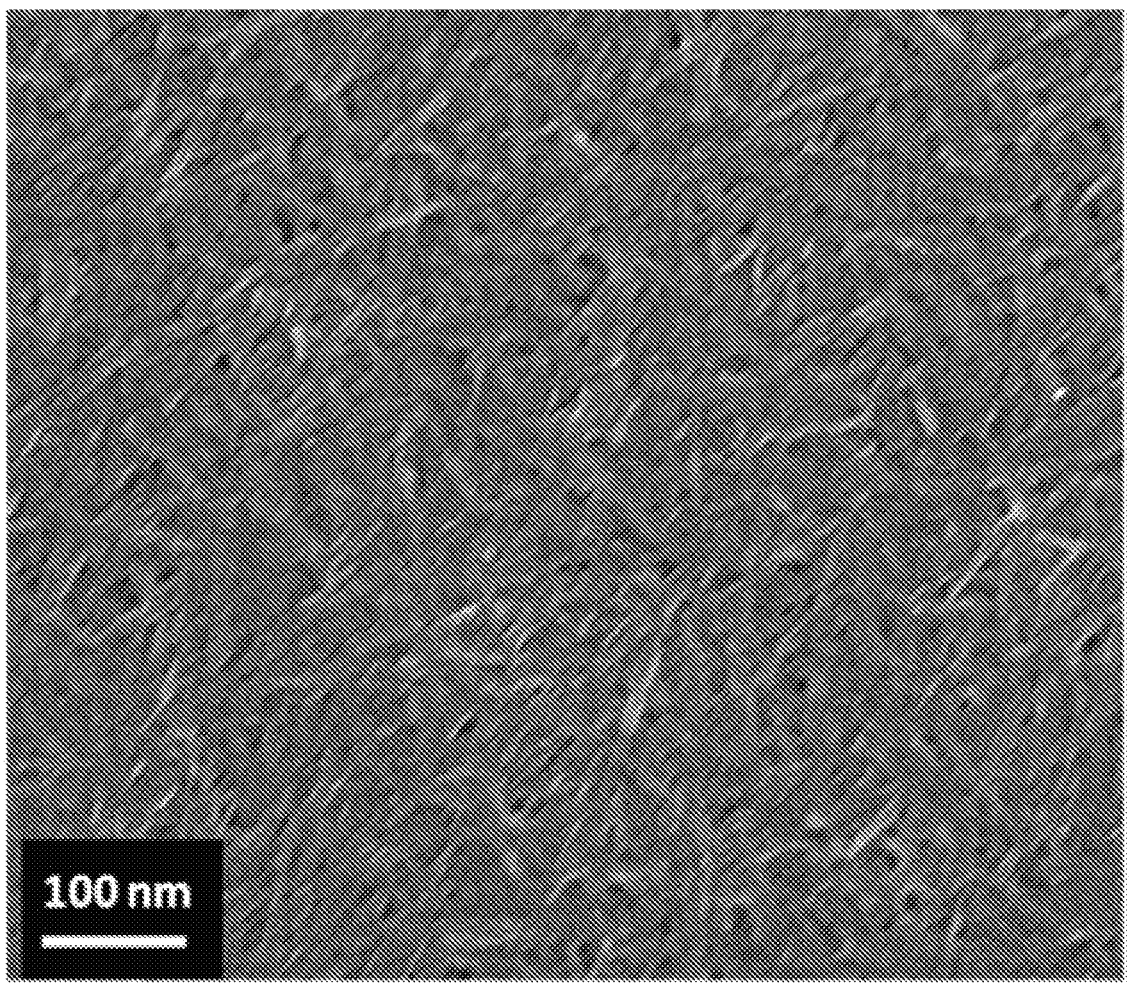
FIG. 107 is a SEM image of the spin-coated anisotropic monoclinic $Nb_{12}O_{29}$ nanocrystal film using ligand-stripped nanocrystals, showing porous morphology.
Figure 108:
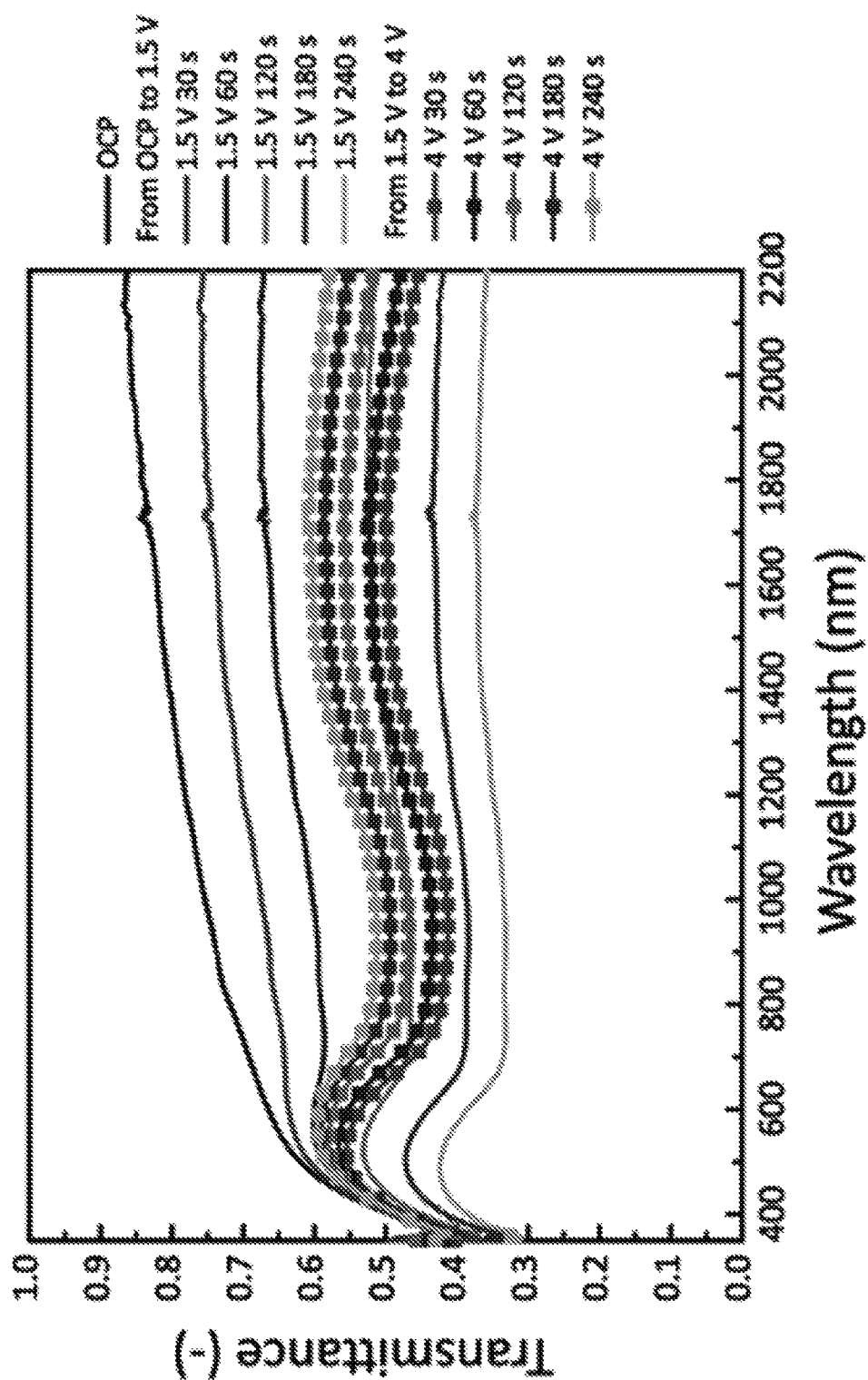
FIG. 108 is the transmittance spectra of ligand-capped nanocrystal films being reduced at 1.5 V (vs. $Li/Li^+$) and oxidized at 4.0 V in 1 M Li-TFSI/tetraethylene glycol dimethyl ether, showing an irreversible response in ligand-capped nanocrystal films.
Figure 109:
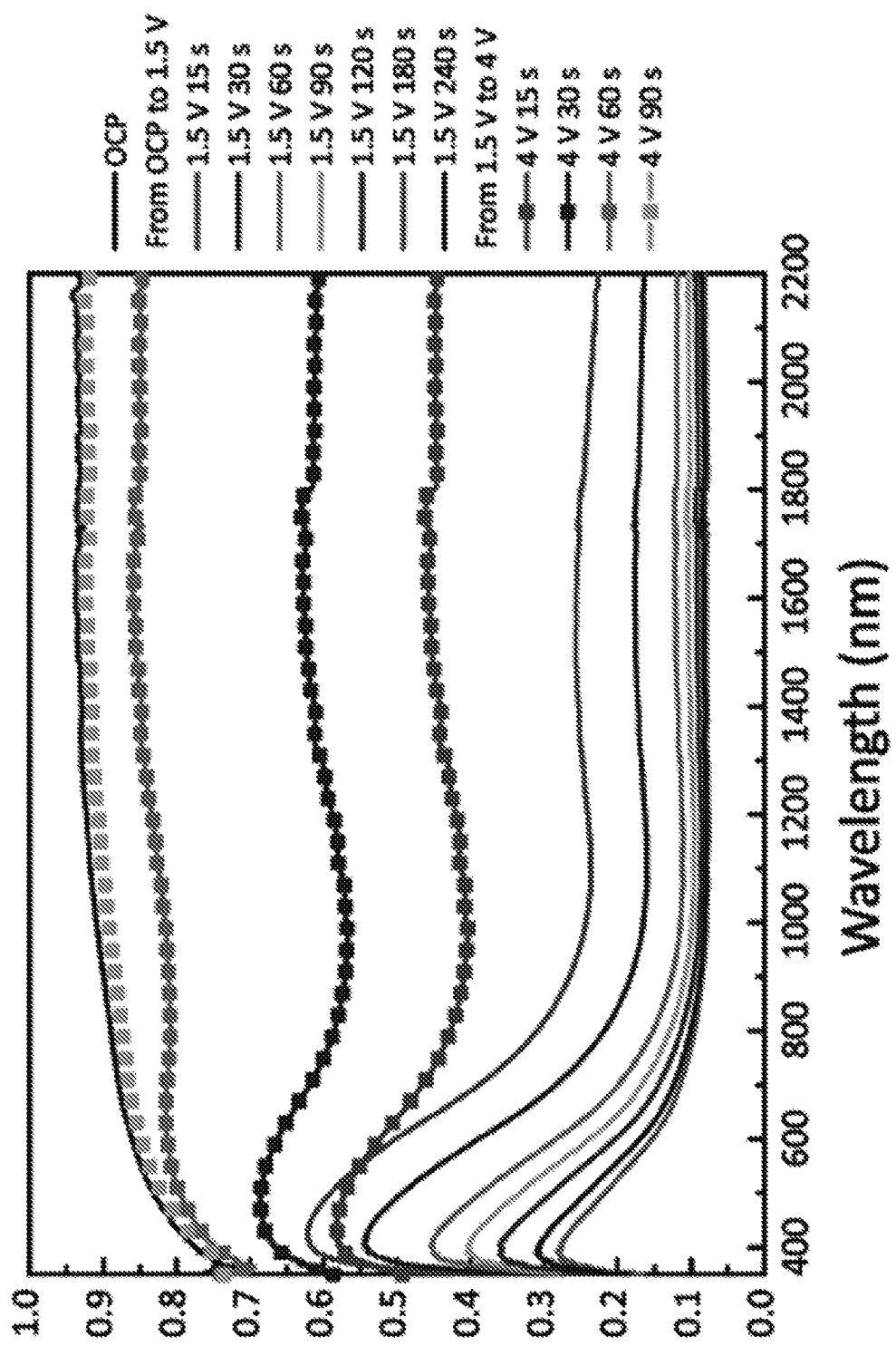
FIG. 109 is the transmittance spectra of ligand-stripped nanocrystal films being reduced at 1.5 V (vs. $Li/Li^+$) and oxidized at 4.0 V in 1 M Li-TFSI/tetraethylene glycol dimethyl ether, showing a reversible response in ligand-stripped nanocrystal films.

The presence of bulky capping ligands on the surface of nanocrystals are considered to block the ion/electron transport at the nanocrystal-to-nanocrystal or nanocrystal-to-electrolyte interfaces (Dong et al. *J. Am. Chem. Soc.* 2011, 133 (4), 998-1006; Kim et al. *ACS Nano* 2018, 12 (4), 3200-3208). In this regard, a method for stripping the oleic acid molecules capped on the anisotropic monoclinic $Nb_{12}O_{29}$ nanocrystals was developed based on a reported protocol using $NOBF_4$ (Dong et al. *J. Am. Chem. Soc.* 2011, 133 (4), 998-1006). The FT-IR spectra of the ligand-capped and ligand-stripped anisotropic monoclinic $Nb_{12}O_{29}$ nanocrystals show that the intensity of C—H stretches are significantly reduced after ligand stripping (FIG. 105), suggesting the oleic acid molecules with a long alkyl chain have been replaced by DMF with a short alkyl chain. By doing so, the ligand-stripped anisotropic monoclinic $Nb_{12}O_{29}$ nanocrystals are stabilized by electrostatic repulsion instead of steric repulsion when capped by oleic acid molecules (Dong et al. *J. Am. Chem. Soc.* 2011, 133 (4), 998-1006; Heo et al. *Nano Lett.* 2017, 17 (9), 5756-576). SEM imaging of the spin-coated anisotropic monoclinic $Nb_{12}O_{29}$ nanocrystal films demonstrate a densely-packed morphology using ligand-capped nanocrystals, and a porous morphology using ligand-stripped nanocrystal (FIG. 106 and FIG. 107). The observation of porous morphology brought by the electrostatic repulsion between ligand-stripped nanocrystals was also reported previously in making films based on $WO_{3-x}$ nanorods (Heo et al. *Nano Lett.* 2017, 17 (9), 5756-576). The porous morphology obtained by using ligand-stripped anisotropic monoclinic $Nb_{12}O_{29}$ nanocrystal can be attributed to electrostatic repulsion, which leads to a random arrangement in the anisotropic nanocrystal films. The influence of ligand stripping on the spectroelectrochemical properties was tested by reducing the ligand-capped and ligand-stripped anisotropic monoclinic $Nb_{12}O_{29}$ nanocrystal films in 1 M Li-TFSI/tetraethylene glycol dimethyl ether (FIG. 108 and FIG. 109). Upon being reduced at 1.5 V, both nanocrystal films are able to demonstrate a change in their transmittance spectra. However, the ligand-capped nanocrystal films show poor reversibility upon being oxidized at 4.0 V for retrieving their transmittance at open-circuit potential, and on the contrary the ligand-stripped nanocrystal films demonstrate good reversibility. The dense morphology and the bulky oleic acid molecules are both proposed to be detrimental to the electrochemical reversibility of the ligand-capped nanocrystal films. In the following section, only ligand-stripped nanocrystal films will be discussed for their reversible spectroelectrochemical properties.

Spectroelectrochemical Characterization.

Figure 110:
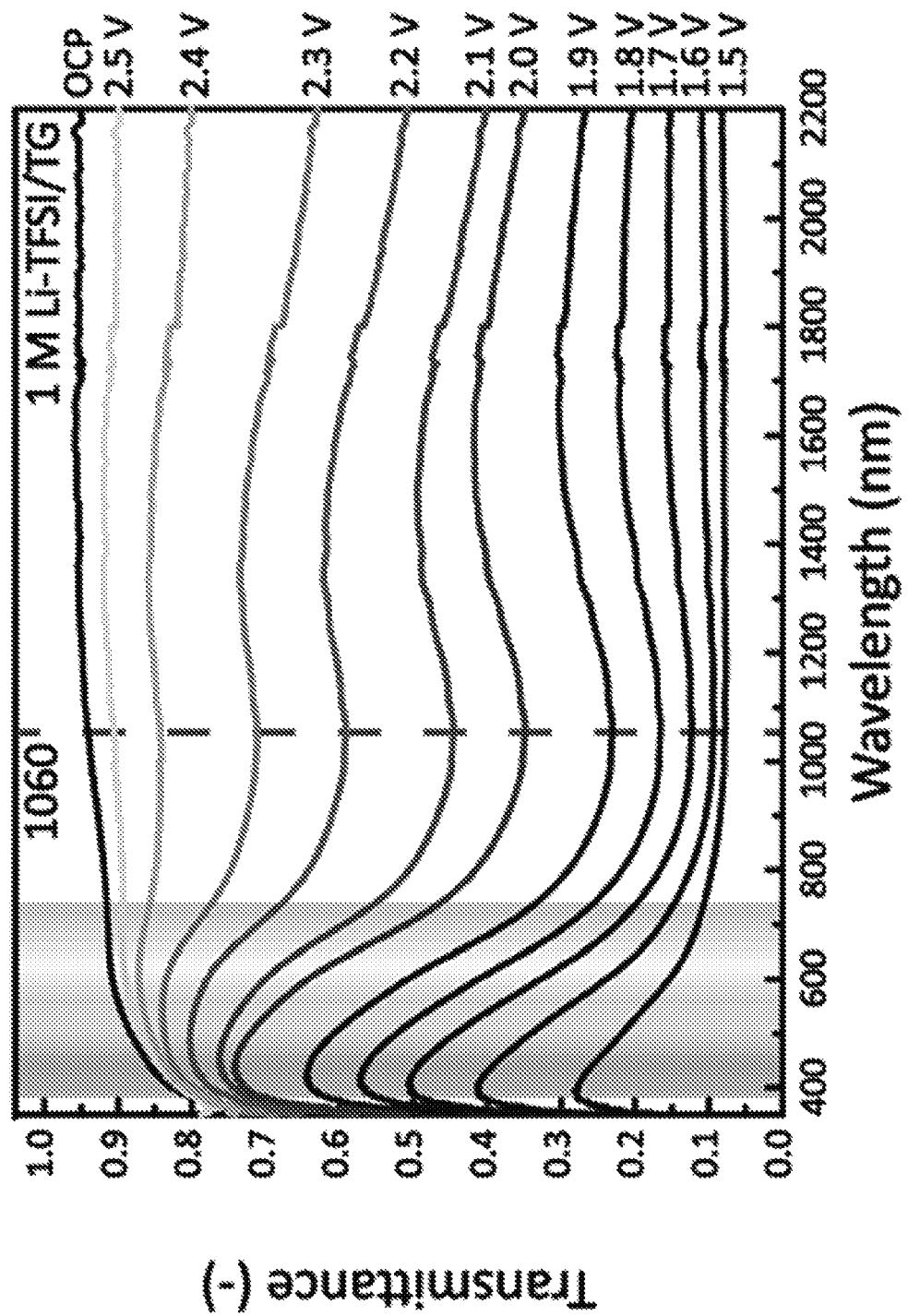
FIG. 110 is the transmittance spectra of the ligand-stripped anisotropic monoclinic $Nb_{12}O_{29}$ nanocrystal films in 1 M Li-TFSI/tetraethylene glycol dimethyl ether at various potentials (vs. Li/Li$^+$) that were applied for 5 min by chronoamperometry. The absorption peak centered at 1060 nm represents the contribution from capacitive charging.
Figure 111:
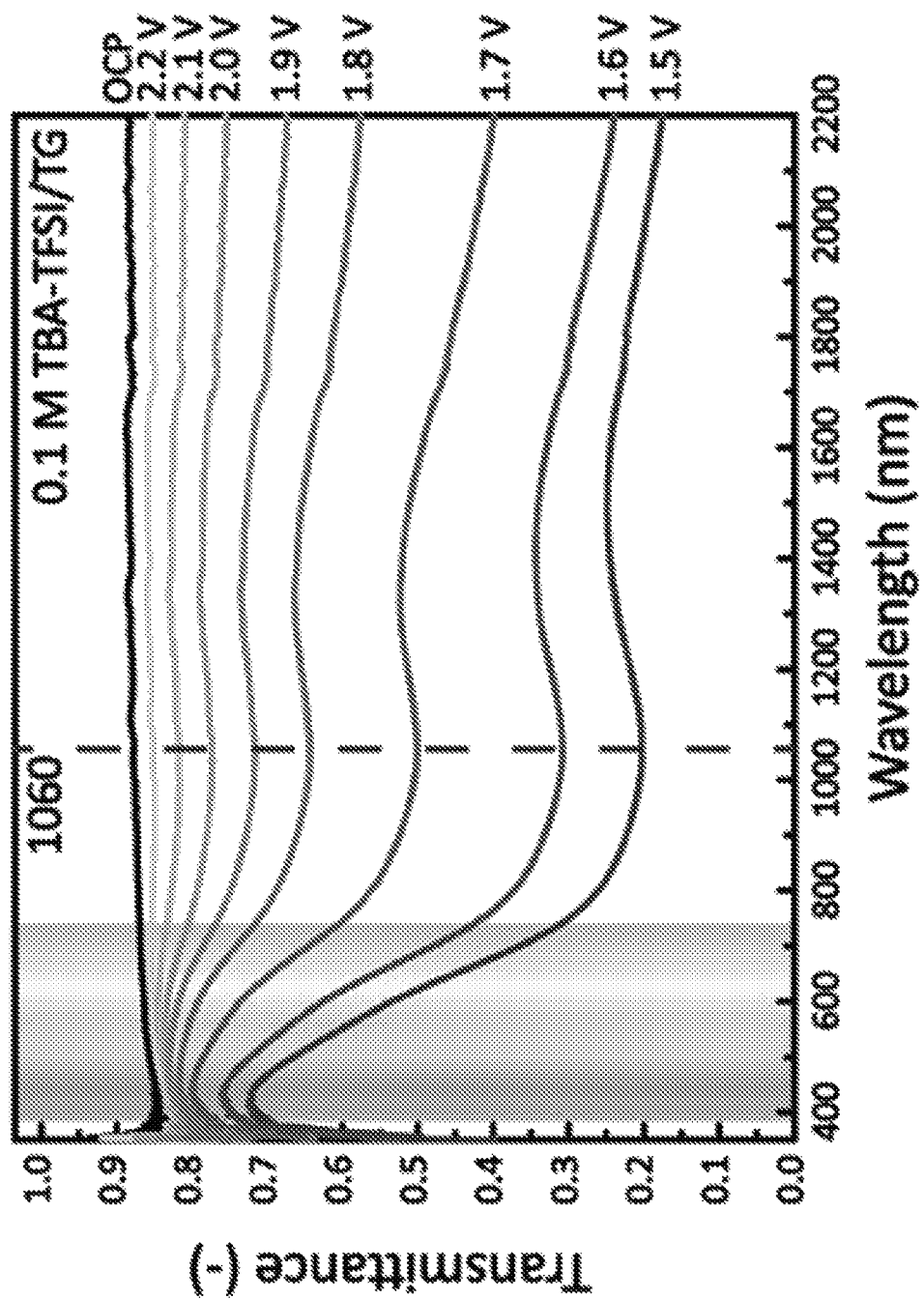
FIG. 111 is the transmittance spectra of the ligand-stripped anisotropic monoclinic $Nb_{12}O_{29}$ nanocrystal films in 0.1 M TBA-TFSI/tetraethylene glycol dimethyl ether at various potentials (vs. Li/Li$^+$) that were applied for 5 min by chronoamperometry. The absorption peak centered at 1060 nm represents the contribution from capacitive charging.

The anisotropic monoclinic $Nb_{12}O_{29}$ nanocrystals were ligand-stripped to remove the insulating oleic acid molecules on their surface before electrochemical measurement. The ligand-stripped anisotropic monoclinic $Nb_{12}O_{29}$ nanocrystal films were electrochemically reduced by using two different cations for charge balance, small $Li^+$ ions for both ions intercalating into the nanocrystal lattice and being adsorbed on the nanocrystal surface as electrical double layer capacitance, and bulky $TBA^+$ ions for only the adsorbed process (Dahlman et al. *J. Am. Chem. Soc.* 2015, 137 (28), 9160-9166). In FIG. 110 and FIG. 111, the decrease of transmittance following electrochemical reduction at fixed potentials is the result of nanocrystal films absorbing the incident light. For a Li-based electrolyte (FIG. 110), the nanocrystal films absorb light mostly in NIR region ranging from open-circuit potential to 2.0 V with peak centered at 1060 nm, and absorb both visible and NIR lights ranging from 2.0 V to 1.5 V. In a TBA-based electrolyte (FIG. 111), absorption mostly resides in NIR region with a peak centered at 1060 nm throughout the applied potentials.

In a previous report using $Li^+$ ions for charge balance, the reduction of Nb-doped $TiO_2$ nanocrystal films populates both delocalized electrons into the conduction band of nanocrystals and localized electrons into the self-trapped states between the valence and conduction band, referred to as polarons, while using a TBA-based electrolyte will contribute to delocalized electrons only (Dahlman et al. *J. Am. Chem. Soc.* 2015, 137 (28), 9160-9166). These two processes were distinguished by the optical response of nanocrystal films: delocalized electrons will give rise to the plasmonic absorption residing in NIR region, and the localized electrons will give rise to the polaronic absorption in visible region. It was hypothesized for the optical modulation in anisotropic monoclinic $Nb_{12}O_{29}$ nanocrystal films in a Li-based electrolyte that the first mode, ranging from open-circuit potential to 2.0 V, is a capacitive charging process with increasing concentration of delocalized electrons that gives rise to the plasmonic absorption in NIR region. The second mode, ranging from 2.0 V to 1.5 V, involves both the ion intercalation process with electrons being localized and giving rise to the polaronic absorption in visible region, and the previous capacitive charging process as well. When using $TBA^+$ ions for charge balance, ions intercalating into the nanocrystal lattice is forbidden due to their bulky nature, and therefore the absorption mostly resides in NIR region because of capacitive charging and shares the same peak position with the first mode in Li-based electrolyte. The involvement of both capacitive charging and ion intercalation electrochromisms were investigated previously in Nb-doped $TiO_2$ for their metallic nature and finite scale that are able to support capacitive charging electrochromism (Dahlman et al. *J. Am. Chem. Soc.* 2015, 137 (28), 9160-9166), whereas the ion intercalation is present when the metal ions are reduced. The metallic nature of bulk monoclinic $Nb_{12}O_{29}$ crystals reported in literature is proposed to have led to the observation of capacitive charging electrochromism (Li et al. *Chem. Mater.* 2011, 23 (9), 2292-2294; Cava et al. *Phys. Rev. B* 1991, 44 (13), 6973-6981; Kocer et al. *Phys. Rev. B* 2019, 99 (7), 075151), and the ion intercalation electrochromism is from the $Nb^{5+}$ ions being reduced into $Nb^{4+}$ ion (Özer et al. *Sol. Energy Mater. Sol. Cells* 1996, 40 (4), 285-296; Macek et al. *J. Electrochem. Soc.* 1997, 144 (9), 3002-3010). In terms of where the $Li^+$ ions located during ion intercalation, possible candidates are the cavities within four vertex-shared $NbO_6$ octahedra in the basic building block (Li et al. *Chem. Mater.* 2011, 23 (9), 2292-2294).

Figure 112:
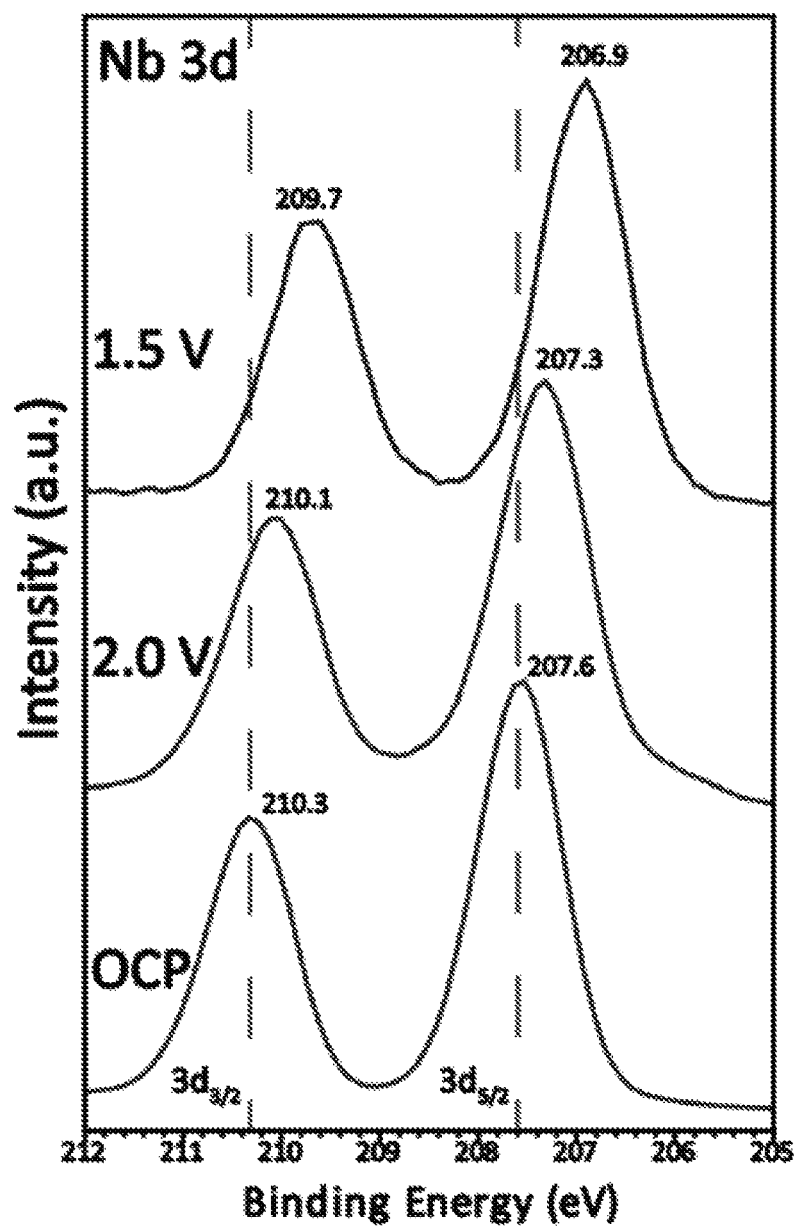
FIG. 112 is the ex situ XPS spectra in the Nb 3d region of the ligand-stripped anisotropic monoclinic $Nb_{12}O_{29}$ nanocrystal films being kept at open-circuit potential, or being reduced 2.0 V and 1.5 V using 1 M Li-TFSI/tetraethylene glycol dimethyl ether (vs. Li/Li$^+$), respectively. Peaks at 210.3 eV and 207.6 eV correspond to $3d_{3/2}$ and $3d_{5/2}$ bands, respectively.
Figure 113:
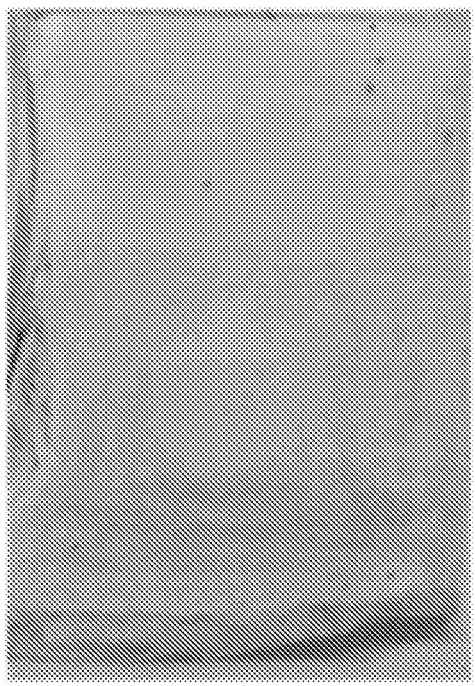
FIG. 113 is a photograph of the ligand-stripped anisotropic monoclinic $Nb_{12}O_{29}$ nanocrystal films being kept at open-circuit potential using 1 M Li-TFSI/TG (vs. Li/Li$^+$).
Figure 114:
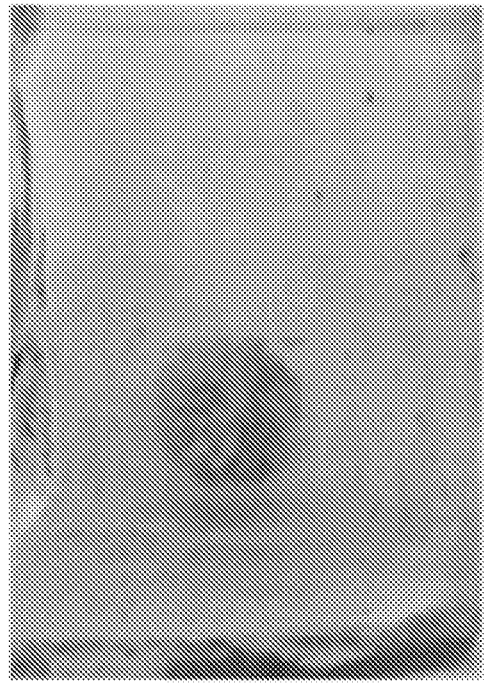
FIG. 114 is a photograph of the ligand-stripped anisotropic monoclinic $Nb_{12}O_{29}$ nanocrystal films being reduced 2.0 V using 1 M Li-TFSI/tetraethylene glycol dimethyl ether (vs. Li/Li$^+$).
Figure 115:
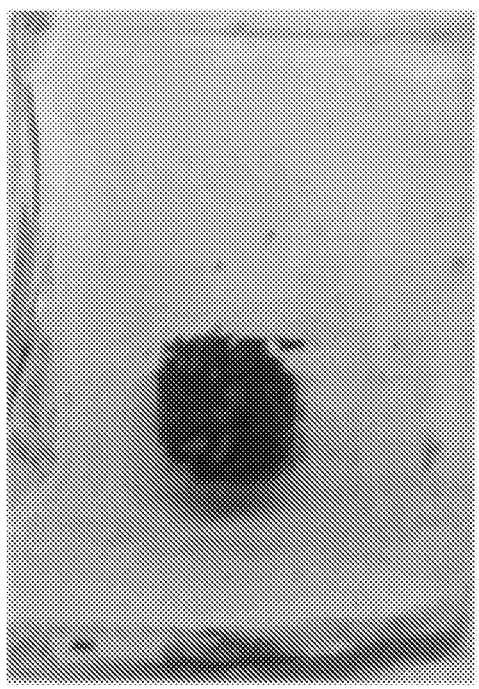
FIG. 115 is a photograph of the ligand-stripped anisotropic monoclinic $Nb_{12}O_{29}$ nanocrystal film being reduced at 1.5 V using 1 M Li-TFSI/tetraethylene glycol dimethyl ether (vs. Li/Li$^+$).

The nature of localized electrons can be observed by the change of oxidation state of the metal ions being reduced (Özer et al. *Sol. Energy Mater. Sol. Cells* 1996, 40 (4), 285-296). For $Nb_2O_{5-x}$, decrease in the binding energy of Nb $3d_{3/2}$ and Nb $3d_{5/2}$ bands is considered as the result of $Nb^{5+}$ being reducing to $Nb^{4+}$ and balanced by $Li^+$ ion intercalation. In FIG. 112, the ex situ XPS spectra of the ligand-stripped anisotropic monoclinic $Nb_{12}O_{29}$ nanocrystal films in 1 M Li-TFSI/tetraethylene glycol dimethyl ether demonstrate that only slight decrease of the binding energy was observed at 2.0 V compared to open-circuit potential, indicating the reduction at 2.0 V is presumably still a capacitive charging process showing weak signature of localized electrons. As for the reduction at 1.5 V, a larger shift indicates the presence of localized electrons in the nanocrystal films. XPS analysis supports the hypothesis proposed for the dual-mode electrochromism in a Li-based electrolyte: the first step from open-circuit potential to 2.0 V is dominated by capacitive charging, and the second step from 2.0 V to 1.5 V is dominated by ion intercalation. Photographs of the nanocrystal films at various states are presented in FIG. 113-FIG. 115, showing no color at open-circuit potential (FIG. 113), blue color at 2.0 V (FIG. 114), and black color at 1.5 V (FIG. 115).

The electrochemical nature of ligand-stripped anisotropic monoclinic $Nb_{12}O_{29}$ nanocrystal films were further investigated by analyzing the dependence of current on the sweep rate in cyclic voltammograms. The so called b-value test is a method for determining the extent to which the electrochemical process is limited by diffusion, in which:

$$\log(i)=\log(a)+b*\log(v)$$

where i is the current density in cyclic voltammogram, v is the sweep rate, a is a constant determined by the testing environment, and b is a constant determining the kinetics of the electrochemical reaction (Lindstrom et al. *J. Phys. Chem. B* 1997, 101 (39), 7717-7722; Augustyn et al. *Nat. Mater.* 2013, 12, 518). A b value of 0.5 indicates a purely diffusion-limited reaction controlled by the boundary condition of semi-infinite linear diffusion, and a b value of 1 indicates that the reaction behaves similarly to a capacitor, equivalently a non-diffusion-limited reaction with no apparent concentration gradient in the system.

Figure 116:
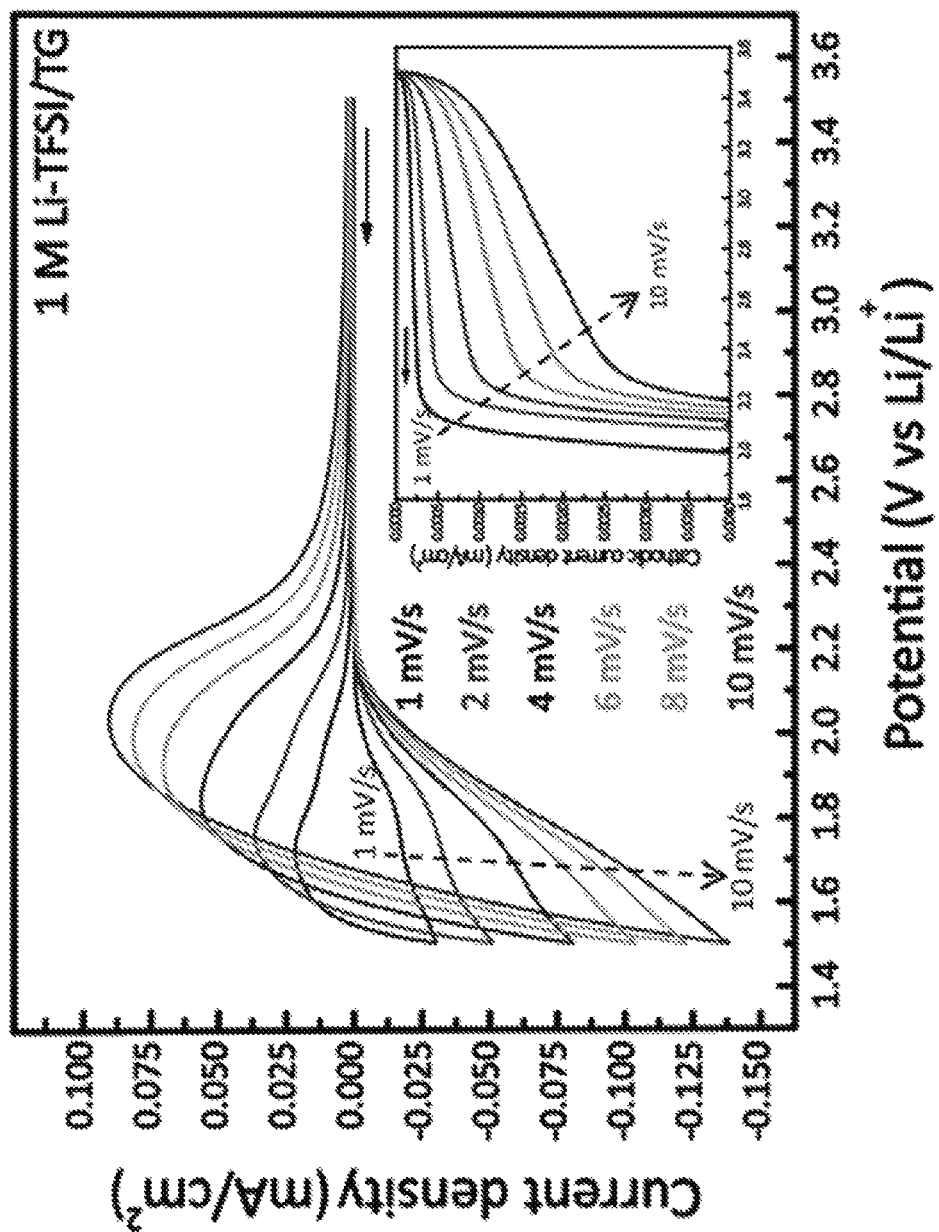
FIG. 116 shows the cyclic voltammograms of the ligand-stripped anisotropic monoclinic $Nb_{12}O_{29}$ nanocrystal films at various sweep rates in 1 M Li-TFSI/tetraethylene glycol dimethyl ether and the inset representing only the portion of cathodic current density.
Figure 117:
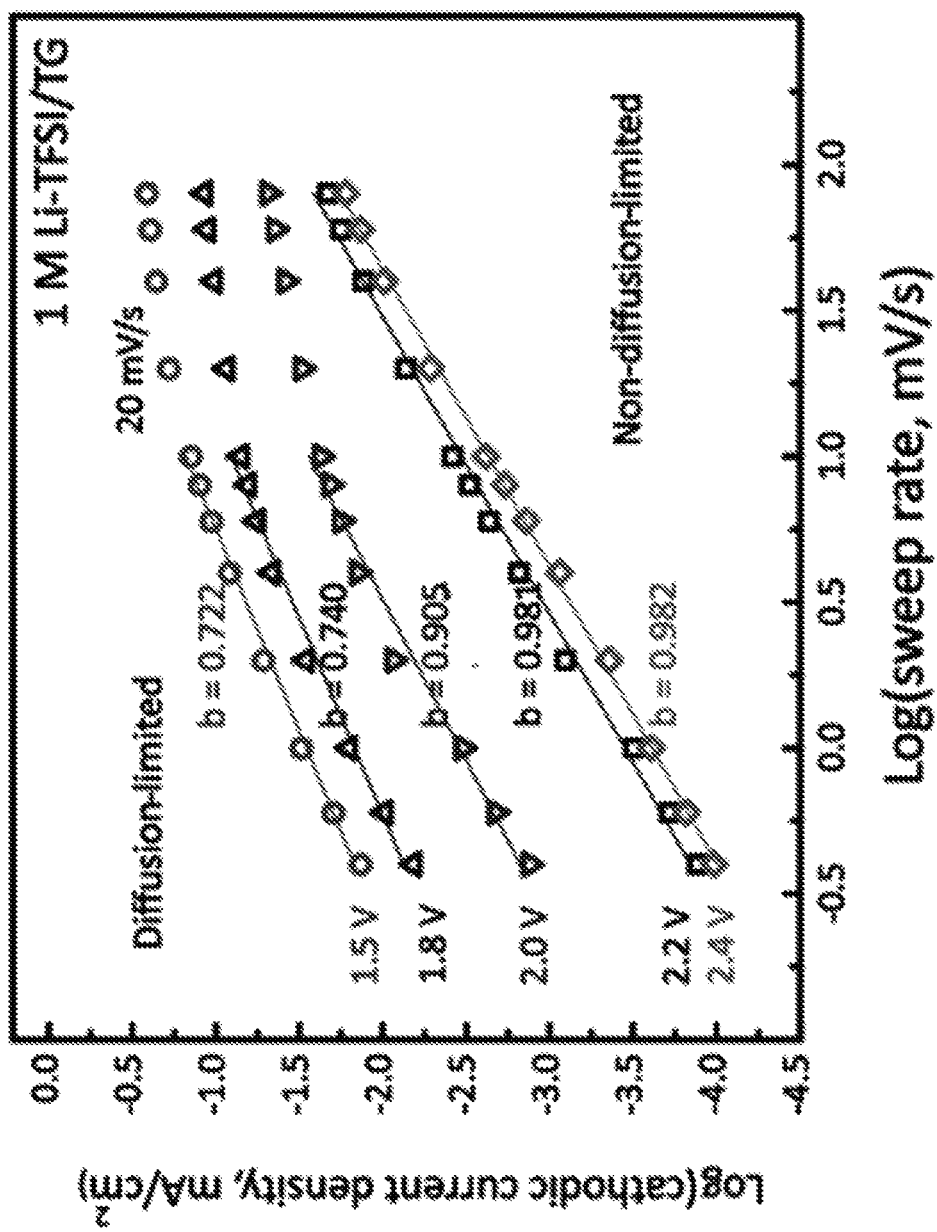
FIG. 117 shows the variation of the cathodic current density at several sweep rates for determining the b value of the ligand-stripped anisotropic monoclinic $Nb_{12}O_{29}$ nanocrystal films in 1 M Li-TFSI/tetraethylene glycol dimethyl ether. At 2.0 V, b value deviates from 1 indicating the process is limited by Li$^+$ ion diffusion to some extent.

In this case, the diffusion of $Li^+$ ions in the nanocrystal lattice during ion intercalation may limit the reaction kinetics. Cyclic voltammograms of the nanocrystal films at various sweep rate ranging from 4 mV/s to 80 mV/s were recorded, with the results from 1 mV/s to 10 mV/s presented in FIG. 116 where the inset shows only the portion of cathodic current density. In FIG. 116, current density comprises the electrical double layer capacitance occurring upon the $Li^+$ ions being adsorbed, and the redox reaction occurring when the nanocrystal films are reduced along with $Li^+$ ion intercalating into the lattice, the latter one giving rise to pronounced current density at potentials lower than 2 V when scanning from 4 V to 1.5 V, and the concomitant oxidation when scanning from 1.5 V to 4 V. FIG. 117 shows the dependence of cathodic current density at various potentials against sweep rate, and the values of b were obtained by linear fitting. At 2.2 V and 2.4 V, b values are close to 1, indicating non-diffusion-limited kinetics. At lower potentials (2.0 V, 1.8 V, and 1.5 V), b values decrease with the same trend of decreasing potentials, indicating that the kinetics start to be limited by the diffusion of $Li^+$ ions. At sweep rates larger than 20 mV/s, strong polarization causing an extra current density to proceed the reduction reaction, and therefore deviates from the result at lower sweep rates (Augustyn et al. *Nat. Mater.* 2013, 12, 518). The result shown in FIG. 117 support the capacitive charging and ion intercalation processes discussed earlier. At higher potentials, $Li^+$ ions are only adsorbed on the surface of nanocrystal films acting as electrical double layer capacitance, and therefore the reaction has non-diffusion-limited kinetics with no apparent concentration gradient in the nanocrystal lattice. At lower potentials, $Li^+$ ions will both be adsorbed on the surface and intercalate into the nanocrystal lattice, and at this stage there will be a concentration gradient in the nanocrystal lattice, causing the kinetics to be limited by the diffusion of $Li^+$ ions in some extent. The boundary of these two behaviors is considered to be 2.0 V, when b value starts to deviate from 1.

Figure 118:
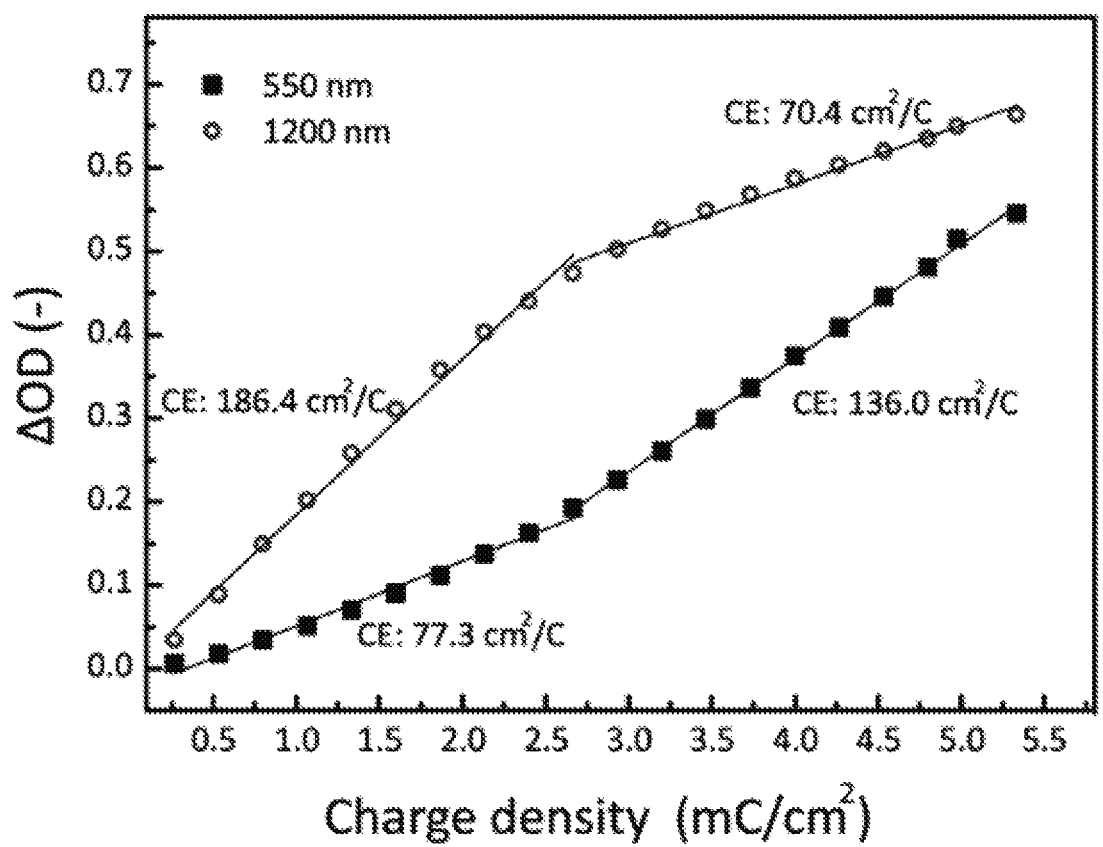
FIG. 118 shows the variation of ΔOD against Q in the ligand-stripped anisotropic monoclinic $Nb_{12}O_{29}$ nanocrystal films at 550 nm (squares) and 1200 nm (circles) obtained by cathodically charging at 10 µA/cm$^2$ (1C) using chronopotentiometry. Coloration efficiency (CE) was obtained by linear fitting.

The optical density changes ($\Delta OD$) at different charge densities (Q) injected into the nanocrystal films were measured by cathodically charging the films at 10 $\mu A/cm^2$ using chronopotentiometry (FIG. 118). Coloration efficiency (CE, CE=$\Delta OD$/Q) was obtained by the linear fittings of this plot. A higher coloration efficiency was observed at 1200 nm (186.4 $cm^2/C$) in the beginning of the charging compared to the coloration efficiency at 550 nm (77.3 $cm^2/C$), corresponding to the capacitive charging process with dominated absorption in NIR region. In the stage of charging, the coloration efficiency at 550 nm (136.0 $cm^2/C$) is higher than the coloration efficiency at 1200 nm (70.4 $cm^2/C$), indicating that the ion intercalation electrochromic process starts to dominate and primarily gives rise to visible coloration. The stability of the nanocrystal films were tested by continuously cycling between 4 V and 1.7 V (FIG. 119), showing good stability with 68% of the original charge density ($Q/Q_o$) retained in the nanocrystal films after 500 cycles.

FIG. 120-FIG. 122 illustrates the band structure and electrochemical behavior of the ligand-stripped anisotropic monoclinic $Nb_{12}O_{29}$ nanocrystal films along with the working principle using these films as smart window coatings. From open-circuit potential to 2.0 V, electrons will be populated into the conduction band of nanocrystals as delocalized electrons (FIG. 120), along with $Li^+$ ions being adsorbed to compensate the electronic charge, giving rise to electrical double layer capacitance on the surface of nanocrystals (FIG. 121). From 2.0 V to 1.5 V, electrons will be populated both into the conduction band as delocalized electrons and polaron band as localized electrons (FIG. 120), along with $Li^+$ ions being adsorbed on the surface and intercalating into the nanocrystal lattice (FIG. 121). In terms of optical modulation, the nanocrystal films can selectively block NIR light at 2.0 V, with most of the visible light being transmitted through due to capacitive charging electrochromism, while the film blocks both NIR and visible light at 1.5 V due to ion intercalation electrochromism (FIG. 122). This allows the electrochromic smart window coatings to independently control the solar spectrum for optimum building energy management.

CONCLUSION

Phase control in the colloidal synthesis of $Nb_2O_{5-x}$ nanocrystals was developed, varying between pure anisotropic orthorhombic $Nb_2O_5$ nanocrystals, pure anisotropic monoclinic $Nb_{12}O_{29}$ nanocrystals, and a mixture of both. Among them, the anisotropic monoclinic $Nb_{12}O_{29}$ nanocrystals are the first successful synthesis of monoclinic $Nb_2O_{5-x}$ nanocrystals using a colloidal approach without high temperature annealing. The anisotropic monoclinic $Nb_{12}O_{29}$ nanocrystals have a nanoplatelet morphology, monolayer feature with elongation only in the direction, and reduced abundance of Nb=O terminal bonds due to their anisotropy. In terms of enabling phase control, two niobium precursors for hot-injection synthesis were synthesized, the niobium chloro oleate leading to the nanocrystal mixture with anisotropic orthorhombic $Nb_2O_5$ nanocrystals being the main product, and the niobium oxo clusters leading to pure anisotropic monoclinic $Nb_{12}O_{29}$ nanocrystals. As a complementary synthesis, heat-up synthesis using niobium chloro oleate leads to pure anisotropic orthorhombic $Nb_2O_5$ nanocrystals. Thin films based on ligand-stripped anisotropic monoclinic $Nb_{12}O_{29}$ nanocrystals demonstrate dual-mode electrochromism: the first step is dominated by capacitive charging that generates delocalized electrons and absorbs NIR light, and the second step is dominated by ion intercalation that generates localized electrons and absorbs visible light. Electrochemical kinetics of the films were investigated by b-value test, showing that the described capacitive charging process is a non-diffusion-limited process, while the ion intercalation process is limited by the diffusion of Li$^+$ ions in the nanocrystal lattice.

Electrochromic properties of anisotropic monoclinic $Nb_{12}O_{29}$ nanocrystals demonstrate the first case of capacitive charging electrochromic process existing in $Nb_2O_{5-x}$, usually considered unavailable in bulk $Nb_2O_{5-x}$ materials, and also the independent control of solar spectrum utilizing the two different processes. The optical and chemical evidence of these two processes was presented along with an approach to distinguish them, using b-value test to track whether Li$^+$ ion diffusion is occurring in the crystal lattice, a concomitant process with the generation of localized electrons as polarons. The ability of anisotropic monoclinic $Nb_{12}O_{29}$ nanocrystals to independently control NIR and visible light can promote their usage in electrochromic smart windows.

The compositions, devices, and methods of the appended claims are not limited in scope by the specific devices and methods described herein, which are intended as illustrations of a few aspects of the claims and any devices and methods that are functionally equivalent are within the scope of this disclosure. Various modifications of the compositions, devices, and methods in addition to those shown and described herein are intended to fall within the scope of the appended claims. Further, while only certain representative compositions, devices, and methods, and aspects of these compositions, devices, and methods are specifically described, other compositions, devices, and methods and combinations of various features of the compositions, devices, and methods are intended to fall within the scope of the appended claims, even if not specifically recited. Thus a combination of steps, elements, components, or constituents can be explicitly mentioned herein; however, all other combinations of steps, elements, components, and constituents are included, even though not explicitly stated.

What is claimed is:

1. A porous electrochromic niobium oxide film comprising:
    a plurality of niobium oxide nanocrystals,
    wherein the plurality of niobium oxide nanocrystals comprise niobium oxide having a formula $NbO_x$ where x represents an average Nb: O ratio in the niobium oxide and where x is from 2 to 2.6,
    wherein the plurality of niobium oxide nanocrystals are substantially plate-shaped such that the plurality of niobium oxide nanocrystals comprise a plurality of plate-shaped niobium oxide nanocrystals, and
    wherein the plurality of plate-shaped niobium oxide nanocrystals have an average length of from 0.5 nm to 200 nm, an average width of from 0.5 nm to 95 nm, and an average thickness of from 0.5 nm to 20 nm.

2. The porous electrochromic niobium oxide film of claim 1, wherein x is from 2.3 to 2.5.

3. The porous electrochromic niobium oxide film of claim 1, wherein the plurality of niobium oxide nanocrystals comprise $Nb_2O_5$, $Nb_{12}O_{29}$, or a combination thereof.

4. The porous electrochromic niobium oxide film of claim 1, wherein the plurality of niobium oxide nanocrystals further comprise a plurality of rod-shaped niobium oxide nanocrystals and the plurality of rod-shaped niobium oxide nanocrystals have an average length of from 0.5 nm to 200 nm and an average width of from 0.5 nm to 20 nm.

5. The porous electrochromic niobium oxide film of claim 1, wherein the average width and the average thickness are substantially the same, such that the plurality of plate-shaped niobium oxide nanocrystals are substantially rod-shaped.

6. The porous electrochromic niobium oxide film of claim 1, wherein the plurality of niobium oxide nanocrystals have a crystal structure that is substantially orthorhombic, pseudo-hexagonal, substantially monoclinic, or a combination thereof.

7. The porous electrochromic niobium oxide film of claim 6, wherein the plurality of plate-shaped niobium oxide nanocrystals have an elongated axis that is substantially parallel to the [001] direction of the crystal structure or the [011] direction of the crystal structure.

8. The porous electrochromic niobium oxide film of claim 1, wherein the plurality of niobium oxide nanocrystals are substantially free of ligands and/or capping materials.

9. The porous electrochromic niobium oxide film of claim 1, wherein the porous electrochromic niobium oxide film has an average porosity of from 15% to 80%.

10. The porous electrochromic niobium oxide film of claim 1, wherein the porous electrochromic niobium oxide film has an average thickness of from 10 nm to 2 microns.

11. A method of making the porous electrochromic niobium oxide film of claim 1, the method comprising:
    making the plurality of niobium oxide nanocrystals, wherein making the niobium oxide nanocrystals comprises aminolysis-driven formation of a plurality of niobium oxo clusters, condensation of the plurality of niobium oxo clusters into a plurality of amorphous niobium oxide seeds, and crystallization and growth of the plurality of amorphous niobium oxide seeds to thereby form the plurality of niobium oxide nanocrystals;
    dispersing the plurality of niobium oxide nanocrystals in a first solvent, thereby forming a dispersion; and
    depositing the dispersion on a substrate;
    thereby forming the electrochromic niobium oxide film.

12. The method of claim 11, wherein the method of making the plurality of niobium oxide nanocrystals comprises:
    mixing a niobium salt with a ligand and a second solvent to form a solution comprising a niobium-ligand complex;
    mixing the solution comprising the niobium-ligand complex with an amine, an alcohol, or a combination thereof, and subsequently heating at a first temperature to form a solution comprising a plurality of niobium oxo clusters; and
    heating the solution comprising the plurality of niobium oxo clusters at a second temperature to crystallize and grow the plurality of niobium oxide nanocrystals.

13. The method of claim 12, wherein the niobium salt comprises a niobium halide, a niobium ethoxide, a niobium oxalate, or a combination thereof.

14. The method of claim 12, wherein the ligand comprises an alkyl carboxylic acid, an alkylphosphonic acid, and alkylphosphinic acid, an alkylsulfonic acid, or combinations thereof.

15. The method of claim 12, wherein the niobium-ligand complex comprises a niobium oleate complex.

16. The method of claim 12, wherein the method is performed under an inert atmosphere.

17. The method of claim 12, further comprising stripping the ligands from the plurality of niobium oxide nanocrystals prior to forming the electrochromic niobium oxide film.

18. An electrochromic electrode comprising the porous electrochromic niobium oxide film of claim 1 deposited on a conducting layer.

19. An electrochromic device comprising the electrochromic film of claim 1, wherein the electrochromic device comprises an electronic device, an energy storage device, an energy conversion device, an optical device, an optoelectronic device, or a combination thereof.

20. The porous electrochromic niobium oxide film of claim 1, wherein the average length of the plurality of plate-shaped niobium oxide nanocrystals is from 0.5 nm to 95 nm.

* * * * *